US012540196B2

(12) United States Patent
Drever et al.

(10) Patent No.: US 12,540,196 B2
(45) Date of Patent: Feb. 3, 2026

(54) GPC3 BINDING MOLECULES

(71) Applicant: Kite Pharma, Inc., Santa Monica, CA (US)

(72) Inventors: Matthew Drever, Concord, CA (US); Gabrielle M. Romain, Albany, CA (US); Sarah K. Wyman, Washington, DC (US); Chi Ying, Oakland, CA (US)

(73) Assignee: Kite Pharma, Inc., Santa Monica, CA (US)

( * ) Notice: Subject to any disclaimer, the term of this patent is extended or adjusted under 35 U.S.C. 154(b) by 771 days.

(21) Appl. No.: 17/834,183

(22) Filed: Jun. 7, 2022

(65) Prior Publication Data

US 2023/0020993 A1    Jan. 19, 2023

Related U.S. Application Data

(60) Provisional application No. 63/208,274, filed on Jun. 8, 2021.

(51) Int. Cl.
| *A61P 35/00* | (2006.01) |
| *A61K 40/11* | (2025.01) |
| *A61K 40/31* | (2025.01) |
| *A61K 40/42* | (2025.01) |
| *C07K 14/705* | (2006.01) |
| *C07K 14/725* | (2006.01) |
| *C07K 16/30* | (2006.01) |

(52) U.S. Cl.
CPC ............ *C07K 16/303* (2013.01); *A61K 40/11* (2025.01); *A61K 40/31* (2025.01); *A61K 40/4229* (2025.01); *A61K 40/4261* (2025.01); *A61P 35/00* (2018.01); *C07K 14/7051* (2013.01); *C07K 14/70517* (2013.01); *C07K 14/70578* (2013.01); *A61K 2239/53* (2023.05); *C07K 2317/24* (2013.01); *C07K 2317/33* (2013.01); *C07K 2317/622* (2013.01); *C07K 2317/92* (2013.01); *C07K 2319/03* (2013.01); *C07K 2319/33* (2013.01)

(58) Field of Classification Search
None
See application file for complete search history.

(56) References Cited

U.S. PATENT DOCUMENTS

| 5,219,740 | A | 6/1993 | Miller et al. |
| 6,207,453 | B1 | 3/2001 | Maass et al. |
| 8,993,524 | B2 | 3/2015 | Bedi et al. |
| 9,926,377 | B2 | 3/2018 | Polakis et al. |
| 10,233,258 | B2 * | 3/2019 | Akamatsu ........... C07K 16/2803 |
| 12,109,235 | B2 | 10/2024 | Wyman et al. |
| 2003/0125251 | A1 | 7/2003 | Wakefield et al. |
| 2013/0039911 | A1 | 2/2013 | Bedi et al. |
| 2013/0287802 | A1 | 10/2013 | Govindappa et al. |
| 2018/0066057 | A1 | 3/2018 | Govindappa et al. |
| 2019/0151362 | A1 | 5/2019 | Li et al. |
| 2020/0002402 | A1 | 1/2020 | Emtage et al. |
| 2020/0397823 | A1 | 12/2020 | Wyman et al. |
| 2023/0020993 | A1 | 1/2023 | Drever et al. |
| 2025/0109182 | A1 | 4/2025 | Wyman et al. |

FOREIGN PATENT DOCUMENTS

| CN | 109863242 | A | 6/2019 |
| CN | 105949324 | B | 8/2019 |
| EP | 3569709 | A1 | 11/2019 |
| TW | 201902929 | A | 1/2019 |
| WO | 1993009228 | A1 | 5/1993 |
| WO | 1994009815 | A1 | 5/1994 |
| WO | 2003000883 | A1 | 1/2003 |
| WO | 2004022597 | A1 | 3/2004 |
| WO | 2011109789 | A2 | 9/2011 |
| WO | 2012145469 | A1 | 10/2012 |
| WO | 2013070468 | A1 | 5/2013 |
| WO | 2013181543 | A1 | 12/2013 |
| WO | 2014127261 | A1 | 8/2014 |
| WO | 2014134165 | A1 | 9/2014 |
| WO | 2014180306 | A1 | 11/2014 |
| WO | 2015027082 | A1 | 2/2015 |
| WO | 2015142675 | A2 | 9/2015 |
| WO | 2015150526 | A2 | 10/2015 |
| WO | 2015179658 | A2 | 11/2015 |
| WO | 2016036973 | A1 | 3/2016 |
| WO | 2016049459 | A1 | 3/2016 |
| WO | 2016113203 | A1 | 7/2016 |
| WO | 2016115482 | A1 | 7/2016 |
| WO | 2017196847 | A1 | 11/2017 |
| WO | 2018018958 | A1 | 2/2018 |
| WO | 2018038945 | A1 | 3/2018 |

(Continued)

OTHER PUBLICATIONS

Koenig P, Lee CV, Walters BT, et al. Mutational landscape of antibody variable domains reveals a switch modulating the interdomain conformational dynamics and antigen binding. Proc Natl Acad Sci U S A. 2017;114(4):E486-E495. (Year: 2017).*

Rabia LA, Desai AA, Jhajj HS, Tessier PM. Understanding and overcoming trade-offs between antibody affinity, specificity, stability and solubility. Biochem Eng J. Sep. 15, 2018;137:365-374. (Year: 2018).*

Alonso-Camino et al., "CARbodies: Human Antibodies Against Cell Surface Tumor Antigens Selected From Repertoires Displayed on T Cell Chimeric Antigen Receptors" Mol. Ther. Nucleic Acids 2:e93, 2013.

(Continued)

*Primary Examiner* — Joanne Hama
*Assistant Examiner* — Hannah Sunshine
(74) *Attorney, Agent, or Firm* — Fish & Richardson P.C.

(57) ABSTRACT

Provided are antibodies, fragments thereof, chimeric antigen receptors (CARs) and T cell receptors (TCRs) comprising one or more of the GPC3 binding domains disclosed herein. Provided are compositions, cells and cell therapies comprising the same. Further provided are methods of treatment.

116 Claims, No Drawings

Specification includes a Sequence Listing.

(56) References Cited

FOREIGN PATENT DOCUMENTS

| | | | |
|---|---|---|---|
| WO | 2018044866 A1 | 3/2018 | |
| WO | 2018111763 A1 | 6/2018 | |
| WO | 2018131586 A1 | 7/2018 | |
| WO | 2018200586 A1 | 11/2018 | |
| WO | 2018204594 A1 | 11/2018 | |
| WO | 2019094482 A1 | 5/2019 | |
| WO | 2019109980 A1 | 6/2019 | |
| WO | 2020190217 A2 | 9/2020 | |
| WO | 2021110095 A1 | 6/2021 | |

OTHER PUBLICATIONS

Barrett et al., "Chimeric antigen receptor therapy for cancer", Annu Rev Med (2014) 65:333-47.
Bollard, Catherine M., et al. "Adapting a transforming growth factor β-related tumor protection strategy to enhance antitumor immunity." Blood, The Journal of the American Society of Hematology 99.9 (2002): 3179-3187.
Boris-Lawrie et al., "Recent Advances in Retrovirus Vector Technology", Cur. Opin. Genet. Develop. 3:102-109, 1993.
Burns et al., "Vesicular stomatitis virus G glycoprotein pseudotyped retroviral vectors: concentration to very high titer and efficient gene transfer into mammalian and nonmammalian cells" Proc. Natl. Acad. Sci. U.S.A. 90:8033-8037, 1993.
Carlens et al., "Ex vivo T lymphocyte expansion for retroviral transduction", Exp. Hematol. 28(10):1137-1146, 2000.
Cartellieri et al., "Chimeric antigen receptor-engineered T cells for immunotherapy of cancer" J Biomed Biotechnol (2010) 956304.
Cavalieri et al., "Human T lymphocytes transduced by lentiviral vectors in the absence of TCR activation maintain an intact immune competence", Blood 30 102(2):497-505, 2003.
Cheadle et al., "CART cells: driving the road from the laboratory to the clinic", Lmmunol Rev (2014) 257(1):91-106.
Chen et al., "Molecular mechanisms ofT cell co-stimulation and co-inhibition", Nature Reviews Immunol. 13:227-242, 2013.
Cooper et al., "T-cell clones can be rendered specific for CD19: toward the selective augmentation of the graft-versus-B-lineage leukemia effect", Blood 101:1637-1644, 2003.
Eshhar et al., "Specific activation and targeting of cytotoxic lymphocytes through chimeric single chains consisting of antibody-binding domains and the gamma or zeta subunits of the immunoolobulin and T-cell receptors" Proc. Natl. Acad. Sci. U.S.A. 90(2):720-724, 1993.
Fedorov et al., "PD-1- and CTLA-4-based inhibitory chimeric antigen receptors (iCARs) divert off-target immunotherapy responses", Sci Transl Med (2013) 5(215):215ra172.
Gao, Huiping, et al. "Development of T Cells Redirected to Glypican-3 for the Treatment of Hepatocellular CarcinomaGPC3-Targeted CAR T Cells for HCC Treatment." Clinical Cancer Research 20.24 (2014): 6418-6428.
Glienke et al., "Advantages and applications of CAR-expressing natural killer cells", Front Pharmacol (2015) 6:21.
Hurton et al., "Tethered IL-15 augments antitumor activity and promotes a stem-cell memory subset in tumor-specific T cells", Proc. Natl Acad Sci USA 113(48): E7788-E7797.
International Search Report, issued in PCT/US2020/070157, dated Jan. 18, 2021.
Kakarla et al., "CART cells for solid tumors: armed and ready to go?", Cancer J (2014) 20(2):151-5.
Kershaw et al., "Supernatural T cells: genetic modification of T cells for cancer therapy", Nature Reviews Immunol. 5(12):928-940, 2005.
Kloss, Christopher C., et al. "Dominant-negative TGF-β receptor enhances PSMA-targeted human CAR T cell proliferation and augments prostate cancer eradication." Molecular therapy 26.7 (2018): 1855-1866.

Li, Wenpeng, et al. "Redirecting T cells to glypican-3 with 4-1BB zeta chimeric antigen receptors results in Th1 polarization and potent antitumor activity." Human gene therapy 28.5 (2017): 437-448.
Miller et al., "Improved retroviral vectors for gene transfer and expression", BioTechniques 7:980-990, 1989.
Miller, "Retrovirus packaging cells" Human Gene Therapy 1:5-14, 25 1990.
Palmer et al., "Interleukin-7 receptor signaling network: an integrated systems perspective", Cell. Mol. Immunol. 5(2):79-89, 2008.
Park et al., "Treating cancer with genetically engineered T cells", Trends Biotechnol. 29(11):550-557,2011.
Pegram et al., "CD28z CARs and armored CARs," Cancer J (2014) 20(2):127-33.
Ranganathan, "Pinpointing the putative heparin/sialic acid-binding residues in the 'sushi' domain 7 of factor H: a molecular modeling study", Pac. Symp Biocomput. 20 2000:155-67.
Riddell et al., "Adoptive therapy with chimeric antigen receptor-modified T cells of defined subset composition," Cancer J (2014) 20(2):141-4.
Sadelain et al., "The basic principles of chimeric antigen receptor design", Cancer Discov (2013) 3(4):388-98.
Sadelain et al.,"The promise and potential pitfalls of chimeric antigen receptors.", Curr. Opin. Immunol. 21(2):215-223, 2009.
Scarpa et al., "Characterization of recombinant helper retroviruses from Moloney-based vectors in ecotropic and amphotropic packaging cell lines." Virology 180:849-852, 1991.
Shochat et al., "Novel activating mutations lacking cysteine in type I cytokine receptors in acute lymphoblastic leukemia", Blood, 124(1): 106-110.
UniProta0a213szg2, pp. 1-6. Accessed on Oct. 27, 2022. (Year: 2022).
Verhoeyen et al., "Lentiviral vector gene transfer into human T cells", Methods Mol. Biol. 506:97-114, 2009.
Wang et al., "Phenotypic and Functional Attributes of Lentivirus Modified CD19-specific Human CDS+ Central Memory T Cells Manufactured at Clinical Scale", J. Immunother. 35(9):689-701, 2003.
Wieser, R., et al. "Signaling activity of transforming growth factor beta type II receptors lacking specific domains in the cytoplasmic region." Molecular and Cellular Biology 13.12 (1993): 7239-7247.
Yu et al., "Development of GPC3-Specific Chimeric Antigen Receptor-Engineered Natural Killer Cells for the Treatment of Hepatocellular Carcinoma," Molecular Therapy, vol. 26, No. 2, (2017), pp. 366-378.
Zhai, Bo, et al. "A phase I study of anti-GPC3 chimeric antigen receptor modified T cells (GPC3 CAR-T) in Chinese patients with refractory or relapsed GPC3+ hepatocellular carcinoma (r/r GPC3+ HCC)." (2017): 3049-3049.
Jul. 25, 2019 (Jul. 25, 2019), "IL2RG fusion protein, Seq ID 27.", retrieved from EBI accession No. GSP:BGL03586 Database accession No. BGL03586 sequence & Database Geneseq [Online].
Jul. 25, 2019 (Jul. 25, 2019), "Human TGF-beta receptor I protein extracellular domain, Seq ID 4.", retrieved from EBI accession No. GSP:BGL03563 Database accession No. BGL03563 Sequence.
Aug. 9, 2018 (Aug. 9, 2018), "Dominant negative TGFB-RII protein, Seq ID 97.", retrieved from EBI accession No. GSP:BFK39104 Database accession No. BFK39104 Sequence.
May 3, 2018 (May 3, 2018), "Cixutumumab light chain-TGF-beta RII ECO fusion protein.", retrieved from EBI accession No. GSP:BFD37600 Database accession No. BFD37600 Sequence.
Hurton Lenka V., et al. "Tethered IL-15 augments antitumor activity and promotes a stem-cell memory subset in tumor-specific T cells." Proceedings of the National Academy of Sciences, Nov. 14, 2016, p. E7788-E7797, vol. 113, No. 48.
Shochat Chen, et al. "Novel activating mutations lacking cysteine in type I cytokine receptors in acute lymphoblastic leukemia." Blood, The Journal of the American Society of Hematology, Jul. 3, 2014, p. 106-110, vol. 124, No. 1.
International Search Report issued in PCT/US2022/032455, dated Oct. 5, 2022.

(56) References Cited

OTHER PUBLICATIONS

Bendle, Gavin M., et al. "Blockade of TGF-β signaling greatly enhances the efficacy of TCR gene therapy of cancer." The Journal of Immunology 191.6 (2013): 3232-3239.
Ishiguro, Takahiro, et al. "Anti-glypican 3 antibody as a potential antitumor agent for human liver cancer." Cancer research 68.23 (2008): 9832-9838.
Phung, Yen, et al. "High-affinity monoclonal antibodies to cell surface tumor antigen glypican-3 generated through a combination of peptide immunization and flow cytometry screening." MAbs. vol. 4. No. 5. Taylor & Francis, 2012.
Vong, Queenie, et al. "Inhibiting TGFβ signaling in CAR T-cells may significantly enhance efficacy of tumor Immunotherapy." Blood 130 (2017): 1791.
Zhang, Yi-Fan, and Mitchell Ho. "Humanization of high-affinity antibodies targeting glypican-3 in hepatocellular carcinoma." Scientific reports 6.1 (2016): 1-11.
Fabregat et al., "TGF-beta signaling in cancer treatment," Current pharmaceutical design, May 1, 2014, 20(17):2934-47.
GenBank Accession No. NM_003242.5, "*Homo sapiens* transforming growth factor beta receptor 2 (TGFBR2), transcript variant 2, mRNA," May 28, 2019, 6 pages.
Heldin et al., "Signaling receptors for TGF-β family members," Cold Spring Harbor perspectives in biology, Aug. 1, 2016, 8(8):a022053.
Inman et al., "Nucleocytoplasmic shuttling of Smads 2, 3, and 4 permits sensing of TGF-β receptor activity," Molecular cell, Aug. 1, 2002, 10(2):283-94.
International Preliminary Report in International Appln. No. Patentability PCT/US2020/070157, mailed on Dec. 30, 2021, 13 pages.
Office Action in Australian Appln. No. 2020296878, dated Nov. 17, 2022, 3 pages.
Office Action in Australian Appln. No. 2023206126, dated Aug. 28, 2024, 3 pages.
Office Action in Canadian Appln. No. 3143271, dated Apr. 29, 2024, 6 pages.
Office Action in Canadian Appln. No. 3143271, dated Jan. 25, 2023, 5 pages.
Office Action in Chinese Appln. No. 202080052340.2, dated Apr. 22, 2025, 12 pages (with English translation).
Office Action in Chinese Appln. No. 202080052340.2, dated Aug. 15, 2024, 16 pages (with English translation).
Office Action in Chinese Appln. No. 202080052340.2, dated Jan. 13, 2025, 11 pages (with English translation).
Office Action in Chinese Appln. No. 202080052340.2, dated Mar. 25, 2024, 16 pages (with English translation).
Office Action in Egyptian Appln. No. PCT2023/2021, dated Apr. 25, 2025, 11 pages (with English translation).
Office Action in EP Appln No. 20737860.5 dated Jun. 25, 2025, 5 pages.
Office Action in Eurasian Appln. No. 202393559, mailed on Jan. 15, 2025, 6 pages (with English translation).
Office Action in Japanese Appln. No. 2021-575501, mailed on Aug. 1, 2023, 10 pages (with English translation).
Office Action in Japanese Appln. No. 2021-575501, mailed on dated Feb. 19, 2024, 5 pages (with English translation).
Office Action in Japanese Appln. No. 2021-575501, mailed on Feb. 7, 2023, 16 pages (with English translation).
Office Action in Korean Appln. No. 10-2022-7001748, dated Feb. 25, 2025, 10 pages (with English translation).
Office Action in Korean Appln. No. 10-2022-7001748, dated Jun. 26, 2024, 18 pages (with English translation).
Office Action in Mexican Appln. No. MX/a/2021/015451, dated May 24, 2024, 10 pages (with machine English translation).
Office Action in New Zealand Appln. No. 783560, dated Feb. 13, 2025, 6 pages.
Office Action in New Zealand Appln. No. 783560, dated Jul. 29, 2024, 4 pages.
Office Action in Saudi Arabian Appln. No. 521431148, dated Jun. 13, 2024, 12 pages (with English translation).
Office Action in Saudi Arabian Appln. No. 521431148, dated Mar. 26, 2023, 17 pages (with machine English translation).
Office Action in Singaporean Appln. No. 11202113969Y, dated Mar. 13, 2023, 7 pages.
Office Action in Taiwanese Appln. No 111121144, mailed Jul. 24, 2023, 10 pages (with English translation).
Office Action in Taiwanese Appln. No. 109121004, dated May 31, 2024, 10 pages (with English translation).
Office Action in United Arab Emirates Appln. No. P6002352/2021, dated Oct. 10, 2024, 11 pages.
Office Action, issued in TW Application No. 108121854, dated Nov. 3, 2020.
Pickup et al., "The roles of TGFβ in the tumour microenvironment," Nature Reviews Cancer, Nov. 2013, 13(11):788-99.
Thomas et al., "TGF-β directly targets cytotoxic T cell functions during tumor evasion of immune surveillance," Cancer cell, Nov. 1, 2005, 8(5):369-80.
Wieser et al., "Signaling activity of transforming growth factor β type II receptors lacking specific domains in the cytoplasmic region," Molecular and cellular biology, Dec. 1, 1993, 13(12): 7239-47.
Yang et al., "TGF-β and immune cells: an important regulatory axis in the tumor microenvironment and progression," Trends in immunology, Jun. 1, 2010, 31(6):220-7.

\* cited by examiner

GPC3 BINDING MOLECULES

CROSS-REFERENCES TO RELATED APPLICATIONS

This application claims the benefit of priority to U.S. Provisional Patent Application No. 63/208,274, filed 8 Jun. 2021 and titled "GPC3 Binding Molecules," the entirety of which is incorporated by reference herein.

SEQUENCE LISTING

The instant application contains a Sequence Listing which has been submitted electronically in ASCII format and is hereby incorporated by reference in its entirety. Said ASCII copy, created on Jul. 22, 2022, is named K-1107-US-NP_SL.txt and is 147,617 bytes in size.

TECHNICAL FIELD

The present disclosure relates to the field of cell therapy, and more specifically, to antibodies, CARs and/or TCRs that target glypican 3 (GPC3).

BACKGROUND

Human cancers are by their nature comprised of normal cells that have undergone a genetic or epigenetic conversion to become abnormal cancer cells. In doing so, cancer cells begin to express proteins and other antigens that are distinct from those expressed by normal cells. These aberrant tumor antigens can be used by the body's innate immune system to specifically target and kill cancer cells. However, cancer cells employ various mechanisms to prevent immune cells, such as T and B lymphocytes, from successfully targeting cancer cells.

Current T cell therapies use on enriched or modified human T cells to target and kill cancer cells in a patient. To increase the ability of T cells and NK cells to target and kill a particular cancer cell, methods have been developed to engineer T cells to express constructs which direct T cells or NK cells to a particular target cancer cell. Chimeric antigen receptors (CARs) and engineered T cell receptors (TCRs), which comprise binding domains capable of interacting with a particular tumor antigen, allow T cells to target and kill cancer cells that express the particular tumor antigen. A need exists for CARs and TCRs for targeting and killing cancer cells and, in particular, cells expressing glypican 3 (GPC3), such as hepatocellular carcinoma (HCC) cells.

SUMMARY

Disclosed is an antibody, or antigen binding fragment thereof comprising a GPC3 binding domain, wherein the GPC3 binding domain comprise sequences of three heavy chain complementarity determining regions (HCDRs) of the heavy chain variable region (HCVR) of SEQ ID NO: 3, and sequences of three light chain CDRs (LCDRs) of the light chain variable region (LCVR) of SEQ ID NO: 14. In embodiments, the GPC3 binding domain binding domain comprises a first domain comprising three heavy chain complementarity determining regions (HCDR1, HCDR2 and HCDR3) and a second domain comprising three light chain complementarity determining regions (LCDR1, LCDR2 and LCDR3), wherein (i) the HCDR1 has a sequence according to any one of SEQ ID NOs: 5-7; (ii) the HCDR2 has a sequence according to any one of SEQ ID NOs: 8-10; (iii) the HCDR3 has a sequence according to any one of SEQ ID NOs: 11-13; (iv) the LCDR1 has a sequence according to any one of SEQ ID NOs: 16-18; (v) the LCDR2 has a sequence according to any one of SEQ ID NOs: 19-21; and (vi) the LCDR3 has a sequence according to any one of SEQ ID NOs: 22-24. In embodiments, the antibody, or antigen binding fragment thereof comprises a first domain comprising three heavy chain complementarity determining regions (HCDRs) and a second domain comprising three light chain complementarity determining regions (LCDRs), wherein: the HCDRs and LCDRs comprise: (i) an HCDR1 according to any of SEQ ID NOs: 5-7; an HCDR2 according to any of SEQ ID NOs: 8-10; an HCDR3 according to any one of SEQ ID NOs: 11-13; an LCDR1 according to any of SEQ ID NOs: 16-18; an LCDR2 according to any of SEQ ID NOs: 19-21; an LCDR3 according to any one of SEQ ID NOs: 22-24. In embodiments, the antibody, or antigen binding fragment thereof comprises a first heavy chain variable domain comprising the three HCDRs and a light chain variable domain comprising the three LCDRs, wherein: (i) the heavy chain variable domain is at least 80% identical to SEQ ID NO: 3, SEQ ID NO: 27, SEQ ID NO: 33, SEQ ID NO: 39, or SEQ ID NO: 45; and (ii) the light chain variable domain is at least 80% identical to SEE ID NO: 14, SEQ ID NO: 29, SEQ ID NO: 35, SEQ ID NO: 41, or SEQ ID NO: 47. In embodiments, the antibody, or antigen binding fragment thereof comprises a first heavy chain variable domain comprising the three HCDRs and a light chain variable domain comprising the three LCDRs, wherein: (i) the heavy chain variable domain is at least 80% identical to SEQ ID NO: 3 and the light chain variable domain is at least 80% identical to SEQ ID NO: 14; (ii) the heavy chain variable domain is at least 80% identical to SEQ ID NO: 27 and the light chain variable domain is at least 80% identical to SEQ ID NO: 29; (iii) the heavy chain variable domain is at least 80% identical to SEQ ID NO: 33 and the light chain variable domain is at least 80% identical to SEQ ID NO: 35; or (iv) the heavy chain variable domain is at least 80% identical to SEQ ID NO: 39 and the light chain variable domain is at least 80% identical to SEQ ID NO: 41; or (v) the heavy chain variable domain is at least 80% identical to SEQ ID NO: 45 and the light chain variable domain is at least 80% identical to SEQ ID NO: 47. In embodiments, the three HCDRs and the three LCDRs are comprised by a single polypeptide. In embodiments, the antigen binding fragment thereof comprises an scFv. In embodiments, the scFv comprises an amino acid sequence according to one of SEQ ID NOs: 25, 31, 37, 43, or 49.

Disclosed is a chimeric antigen receptor, comprised by a disclosed antibody, or antigen binding fragment thereof. In embodiments, the chimeric antigen receptor further comprises a transmembrane domain of 4-1BB/CD137, an alpha chain of a T cell receptor, a beta chain of a T cell receptor, 2B4, CD3 epsilon, CD4, CD5, CD8 alpha, CD9, CD16, CD19, CD22, CD28, CD33, CD37, CD45, CD64, CD80, CD86, CD134, CD137, CD154, NKG2D, or a zeta chain of a T cell receptor, or any combination thereof.

Disclosed is a nucleic acid encoding a disclose chimeric antigen receptor, antibody, or antigen binding fragment thereof. Disclosed is a recombinant vector comprising a disclosed nucleic acid. In embodiments, the nucleic acid and/or recombinant vector further comprises a nucleic acid encoding a dominant negative TGFβ receptor (DN TGFβR), comprising: an extracellular domain (ECD) from a TGF-β receptor, and a transmembrane domain (TMD), wherein the recombinant polypeptide lacks amino acid residues responsible for signaling and phosphorylation present in a wild-type TGF-β receptor.

Disclosed is a host cell transformed with a disclosed nucleic acid or recombinant vector. In embodiments, the host cell is transformed with: a nucleic acid encoding a disclose chimeric antigen receptor, antibody, or antigen binding fragment thereof, and a nucleic acid encoding a dominant negative TGFβ receptor (DN TGFβR). In embodiments, the host cell is transformed with a nucleic acid encoding a membrane bound IL-15-IL-15Rα sushi domain chimeric receptor. In embodiments, the host cell comprises an iPSC, a T cell, or a NK cell. Disclose is a pharmaceutical composition comprising a disclosed T cell and/or NK cell.

Disclosed is a method of treating disease in a patient in need of thereof, comprising administering a disclosed T cell and/or NK cell or a pharmaceutical composition comprising a disclosed T cell and/or NK cell. In embodiments, the disease is hepatocellular carcinoma. Disclosed is a method of inducing an immune response in a subject or immunizing a subject against hepatocellular carcinoma, the method comprising administering to the subject a disclosed T cell and/or NK cell or a pharmaceutical composition comprising a disclosed T cell and/or NK cell. In embodiments, the T cell and/or an NK cell s allogeneic to the patient.

DETAILED DESCRIPTION OF THE INVENTION

Terms

In order for the present disclosure to be more readily understood, certain terms are first defined below. Additional definitions for the following terms and other terms are set forth throughout the Specification.

As used in this Specification and the appended claims, the singular forms "a," "an" and "the" include plural referents unless the context clearly dictates otherwise.

Unless specifically stated or obvious from context, as used herein, the term "or" is understood to be inclusive and covers both "or" and "and".

The term "and/or" where used herein is to be taken as specific disclosure of each of the two specified features or components with or without the other. Thus, the term "and/or" as used in a phrase such as "A and/or B" herein is intended to include A and B; A or B; A (alone); and B (alone). Likewise, the term "and/or" as used in a phrase such as "A, B, and/or C" is intended to encompass each of the following aspects: A, B, and C; A, B, or C; A or C; A or B; B or C; A and C; A and B; B and C; A (alone); B (alone); and C (alone).

The term "e.g.," as used herein, is used merely by way of example, without limitation intended, and should not be construed as referring only those items explicitly enumerated in the specification.

The terms "or more", "at least", "more than", and the like, e.g., "at least one" are understood to include but not be limited to at least 1, 2, 3, 4, 5, 6, 7, 8, 9, 10, 11, 12, 13, 14, 15, 16, 17, 18, 19 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 100, 101, 102, 103, 104, 105, 106, 107, 108, 109, 110, 111, 112, 113, 114, 115, 116, 117, 118, 119, 120, 121, 122, 123, 124, 125, 126, 127, 128, 129, 130, 131, 132, 133, 134, 135, 136, 137, 138, 139, 140, 141, 142, 143, 144, 145, 146, 147, 148, 149 or 150, 200, 300, 400, 500, 600, 700, 800, 900, 1000, 2000, 3000, 4000, 5000 or more than the stated value. Also included is any greater number or fraction in between.

Conversely, the term "no more than" includes each value less than the stated value. For example, "no more than 100 nucleotides" includes 100, 99, 98, 97, 96, 95, 94, 93, 92, 91, 90, 89, 88, 87, 86, 85, 84, 83, 82, 81, 80, 79, 78, 77, 76, 75, 74, 73, 72, 71, 70, 69, 68, 67, 66, 65, 64, 63, 62, 61, 60, 59, 58, 57, 56, 55, 54, 53, 52, 51, 50, 49, 48, 47, 46, 45, 44, 43, 42, 41, 40, 39, 38, 37, 36, 35, 34, 33, 32, 31, 30, 29, 28, 27, 26, 25, 24, 23, 22, 21, 20, 19, 18, 17, 16, 15, 14, 13, 12, 11, 10, 9, 8, 7, 6, 5, 4, 3, 2, 1, and 0 nucleotides. Also included is any lesser number or fraction in between.

The terms "plurality", "at least two", "two or more", "at least second", and the like, are understood to include but not limited to at least 2, 3, 4, 5, 6, 7, 8, 9, 10, 11, 12, 13, 14, 15, 16, 17, 18, 19 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 100, 101, 102, 103, 104, 105, 106, 107, 108, 109, 110, 111, 112, 113, 114, 115, 116, 117, 118, 119, 120, 121, 122, 123, 124, 125, 126, 127, 128, 129, 130, 131, 132, 133, 134, 135, 136, 137, 138, 139, 140, 141, 142, 143, 144, 145, 146, 147, 148, 149 or 150, 200, 300, 400, 500, 600, 700, 800, 900, 1000, 2000, 3000, 4000, 5000 or more. Also included is any greater number or fraction in between.

Throughout the specification the word "comprising," or variations such as "comprises" or "comprising," will be understood to imply the inclusion of a stated element, integer or step, or group of elements, integers or steps, but not the exclusion of any other element, integer or step, or group of elements, integers or steps. It is understood that wherever aspects are described herein with the language "comprising," otherwise analogous aspects described in terms of "consisting of" and/or "consisting essentially of" are also provided.

Unless specifically stated or evident from context the term "about" refers to a value or composition that is within an acceptable error range for the particular value or composition as determined by one of ordinary skill in the art, which will depend in part on how the value or composition is measured or determined, i.e., the limitations of the measurement system. For example, "about" or "comprising essentially of" can mean within one or more than one standard deviation per the practice in the art. "About" or "comprising essentially of" can mean a range of up to 10% (i.e., ±10%). Thus, "about" can be understood to be within 10%, 9%, 8%, 7%, 6%, 5%, 4%, 3%, 2%, 1%, 0.5%, 0.1%, 0.05%, 0.01%, or 0.001% greater or less than the stated value. For example, about 5 mg can include any amount between 4.5 mg and 5.5 mg. Furthermore, particularly with respect to biological systems or processes, the terms can mean up to an order of magnitude or up to 5-fold of a value. When particular values or compositions are provided in the instant disclosure, unless otherwise stated, the meaning of "about" or "comprising essentially of" should be assumed to be within an acceptable error range for that particular value or composition.

As described herein, any concentration range, percentage range, ratio range or integer range is to be understood to be inclusive of the value of any integer within the recited range and, when appropriate, fractions thereof (such as one-tenth and one-hundredth of an integer), unless otherwise indicated.

Units, prefixes, and symbols used herein are provided using their Système International de Unites (SI) accepted form. Numeric ranges are inclusive of the numbers defining the range.

Unless defined otherwise, all technical and scientific terms used herein have the same meaning as commonly understood by one of ordinary skill in the art to which this disclosure is related. For example, Juo, "The Concise Dictionary of Biomedicine and Molecular Biology", $2^{nd}$ ed., (2001), CRC Press; "The Dictionary of Cell & Molecular Biology", $5^{th}$ ed., (2013), Academic Press; and "The Oxford Dictionary Of Biochemistry And Molecular Biology", Cammack et al. eds., $2^{nd}$ ed, (2006), Oxford University Press, provide those of skill in the art with a general dictionary for many of the terms used in this disclosure.

"Administering" refers to the physical introduction of an agent to a subject, such as a modified T cell or NK cell disclosed herein, using any of the various methods and delivery systems known to those skilled in the art. Exemplary routes of administration for the formulations disclosed herein include intravenous, intramuscular, subcutaneous, intraperitoneal, spinal or other parenteral routes of administration, for example by injection or infusion. The phrase "parenteral administration" means modes of administration other than enteral and topical administration, usually by injection, and includes, without limitation, intravenous, intramuscular, intraarterial, intrathecal, intralymphatic, intralesional, intracapsular, intraorbital, intracardiac, intradermal, intraperitoneal, transtracheal, subcutaneous, subcuticular, intraarticular, subcapsular, subarachnoid, intraspinal, epidural and intrasternal injection and infusion, as well as in vivo electroporation. In some embodiments, the formulation is administered via a non-parenteral route, e.g., orally. Other non-parenteral routes include a topical, epidermal or mucosal route of administration, for example, intranasally, vaginally, rectally, sublingually or topically. Administering can also be performed, for example, once, a plurality of times, and/or over one or more extended periods.

The terms, "activated" and "activation" refer to the state of a T cell that has been sufficiently stimulated to induce detectable cellular proliferation. In one embodiment, activation may also be associated with induced cytokine production, and detectable effector functions. The term "activated T cells" refers to, among other things, T cells that are proliferating. Signals generated through the TCR alone may be insufficient for full activation of the T cell and one or more secondary or costimulatory signals may also be required. Thus, T cell activation comprises a primary stimulation signal through the TCR/CD3 complex and one or more secondary costimulatory signals. Costimulation may be evidenced by proliferation and/or cytokine production by T cells that have received a primary activation signal, such as stimulation through the TCR/CD3 complex.

The term "agent" may refer to a molecule or entity of any class comprising, or a plurality of molecules or entities, any of which may be, for example, a polypeptide, nucleic acid, saccharide, lipid, small molecule, metal, cell (such as a T cell or NK cell or progenitor of such cells, for example an iPSC), or organism (for example, a fraction or extract thereof) or component thereof. In some embodiments, an agent may be utilized in isolated or pure form. In some embodiments, an agent may be utilized in a crude or impure form. In some embodiments, an agent may be provided as a population, collection, or library, for example that may be screened to identify or characterize members present therein.

The term "allogeneic" refers to any material derived from one individual which is then introduced to another individual of the same species, e.g., allogeneic T cell or NK cell transplantation.

The term "antibody" (Ab) includes, without limitation, a glycoprotein immunoglobulin which binds specifically to an antigen. In general, an antibody can comprise at least two heavy (H) chains and two light (L) chains interconnected by disulfide bonds, or an antigen-binding molecule thereof. Each H chain comprises a heavy chain variable region (abbreviated herein as VH) and a heavy chain constant region. The heavy chain constant region comprises three constant domains, CH1, CH2 and CH3. Each light chain comprises a light chain variable region (abbreviated herein as VL) and a light chain constant region. The light chain constant region comprises one constant domain, CL. The VH and VL regions can be further subdivided into regions of hypervariability, termed complementarity determining regions (CDRs), interspersed with regions that are more conserved, termed framework regions (FR). Each VH and VL comprises three CDRs and four FRs, arranged from amino-terminus to carboxy-terminus in the following order: FR1, CDR1, FR2, CDR2, FR3, CDR3, and FR4. The variable regions of the heavy and light chains contain a binding domain that interacts with an antigen. The constant regions of the Abs may mediate the binding of the immunoglobulin to host tissues or factors, including various cells of the immune system (e.g., effector cells) and the first component (C1q) of the classical complement system. In general, human antibodies are approximately 150 kD tetrameric agents composed of two identical heavy (H) chain polypeptides (about 50 kD each) and two identical light (L) chain polypeptides (about 25 kD each) that associate with each other into what is commonly referred to as a "Y-shaped" structure. The heavy and light chains are linked or connected to one another by a single disulfide bond; two other disulfide bonds connect the heavy chain hinge regions to one another, so that the dimers are connected to one another and the tetramer is formed. Naturally-produced antibodies are also glycosylated, e.g., on the CH2 domain.

The term "human antibody" is intended to comprise antibodies having variable and constant domain sequences generated, assembled, or derived from human immunoglobulin sequences, or sequences indistinguishable therefrom. In some embodiments, antibodies (or antibody components) may be considered to be "human" even though their amino acid sequences comprise residues or elements not encoded by human germline immunoglobulin sequences (e.g., variations introduced by in vitro random or site-specific mutagenesis or introduced by in vivo somatic mutation). The term "humanized" is intended to comprise antibodies having a variable domain with a sequence derived from a variable domain of a non-human species (e.g., a mouse), modified to be more similar to a human germline encoded sequence. In some embodiments, a "humanized" antibody comprises one or more framework domains having substantially the amino acid sequence of a human framework domain, and one or more complementary determining regions having substantially the amino acid sequence as that of a non-human antibody. In some embodiments, a humanized antibody comprises at least a portion of an immunoglobulin constant region (Fc), generally that of a human immunoglobulin constant domain. In some embodiments, humanized antibodies may comprise a $C_H1$, hinge, $C_H2$, $C_H3$, and, optionally, a $C_H4$ region of a human heavy chain constant domain.

Antibodies can include, for example, monoclonal antibodies, recombinantly produced antibodies, monospecific antibodies, multispecific antibodies (including bispecific antibodies), human antibodies, engineered antibodies, humanized antibodies, chimeric antibodies, immunoglobulins, synthetic antibodies, tetrameric antibodies comprising two heavy chain and two light chain molecules, an antibody light chain monomer, an antibody heavy chain monomer, an antibody light chain dimer, an antibody heavy chain dimer, an antibody light chain-antibody heavy chain pair, intrabodies, antibody fusions (sometimes referred to herein as "antibody conjugates"), heteroconjugate antibodies, single domain antibodies, monovalent antibodies, single chain antibodies or single-chain Fvs (scFv), camelized antibodies, affybodies, Fab fragments, F(ab')$_2$ fragments, disulfide-linked Fvs (sdFv), anti-idiotypic (anti-Id) antibodies (including, e.g., anti-anti-Id antibodies), minibodies, domain antibodies, synthetic antibodies (sometimes referred to herein as "antibody mimetics"), and antigen binding fragments of any of the above. In certain embodiments, antibodies described herein refer to polyclonal antibody populations. Antibodies may also comprise, for example, Fab' fragments, Fd' fragments, Fd fragments, isolated CDRs, single chain Fvs, polypeptide-Fc fusions, single domain antibodies (e.g., shark single domain antibodies such as IgNAR or fragments thereof, and UniAb® single heavy chain antibodies), camelid antibodies, single chain or Tandem diabodies (TandAb®), Anticalins®, Nanobodies® minibodies, BiTE®s, ankyrin repeat proteins or DARPINs®, Avimers®, DARTs, TCR-like antibodies, Adnectins®, Affilins®, TransBodies®, Affibodies®, TrimerX®, MicroProteins, Fynomers®, Centyrins®, and KALBITOR®s.

An immunoglobulin may derive from any of the commonly known isotypes, including but not limited to IgA, secretory IgA, IgG, IgE and IgM. IgG subclasses are also well known to those in the art and include but are not limited to human IgG1, IgG2, IgG3 and IgG4. "Isotype" refers to the Ab class or subclass (e.g., IgM or IgG1) that is encoded by the heavy chain constant region genes. The term "antibody" includes, by way of example, both naturally occurring and non-naturally occurring Abs; monoclonal and polyclonal Abs; chimeric and humanized Abs; human or nonhuman Abs; wholly synthetic Abs; and single chain Abs. A nonhuman Ab may be humanized by recombinant methods to reduce its immunogenicity in man. Where not expressly stated, and unless the context indicates otherwise, the term "antibody" also includes an antigen binding fragment or an antigen-binding portion of any of the aforementioned immunoglobulins, and includes a monovalent and a divalent fragment or portion, and a single chain Ab.

An "antigen binding molecule," "antigen binding portion," "antigen binding fragment," or "antibody fragment" or "antigen binding domain" refers to any molecule that comprises the antigen binding parts (e.g., CDRs) of the antibody from which the molecule is derived. An antigen binding molecule can include the antigenic complementarity determining regions (CDRs). Examples of antibody fragments include, but are not limited to, Fab, Fab', F(ab')2, and Fv fragments, dAb, linear antibodies, scFv antibodies, and multispecific antibodies formed from antigen binding molecules. Peptibodies (i.e., Fc fusion molecules comprising peptide binding domains) are another example of suitable antigen binding molecules. In some embodiments, the antigen binding molecule binds to an antigen on a tumor cell. In some embodiments, the antigen binding molecule binds to an antigen on a cell involved in a hyperproliferative disease or to a viral or bacterial antigen. In certain embodiments, an antigen binding molecule is a chimeric antigen receptor (CAR) or an engineered T cell receptor (TCR). In certain embodiments, the antigen binding molecule or domain binds to glypican 3 (GPC3). In certain embodiments, the antigen binding molecule or domain is an antibody fragment that specifically binds to the antigen, including one or more of the complementarity determining regions (CDRs) thereof. In further embodiments, the antigen binding molecule is a single chain variable fragment (scFv). In some embodiments, the antigen binding molecule or domain comprises or consists of avimers.

In some instances, a CDR is substantially identical to one found in a reference antibody (e.g., an antibody of the present disclosure) and/or the sequence of a CDR provided in the present disclosure. In some embodiments, a CDR is substantially identical to a reference CDR (e.g., a CDR provided in the present disclosure) in that it is either identical in sequence or contains between 1, 2, 3, 4, or 5 (e.g., 1-5) amino acid substitutions as compared with the reference CDR. In some embodiments a CDR is substantially identical to a reference CDR in that it shows at least 85%, 86%, 87%, 88%, 89%, 90%, 91%, 92%, 93%, 94%, 95%, 96%, 97%, 98%, 99%, or 100% sequence identity with the reference CDR (e.g., 85-90%, 85-95%, 85-100%, 90-95%, 90-100%, or 95-100%). In some embodiments a CDR is substantially identical to a reference CDR in that it shows at least 96%, 96%, 97%, 98%, 99%, or 100% sequence identity with the reference CDR. In some embodiments a CDR is substantially identical to a reference CDR in that one amino acid within the CDR is deleted, added, or substituted as compared with the reference CDR while the CDR has an amino acid sequence that is otherwise identical with that of the reference CDR. In some embodiments a CDR is substantially identical to a reference CDR in that 2, 3, 4, or 5 (e.g., 2-5) amino acids within the CDR are deleted, added, or substituted as compared with the reference CDR while the CDR has an amino acid sequence that is otherwise identical to the reference CDR. In various embodiments, an antigen binding fragment binds a same antigen as a reference antibody. In various embodiments, an antigen binding fragment cross-competes with the reference antibody, for example, binding to substantially the same or identical epitope as the reference antibody.

An antigen binding fragment may be produced by any means. For example, in some embodiments, an antigen binding fragment may be enzymatically or chemically produced by fragmentation of an intact antibody. In some embodiments, an antigen binding fragment may be recombinantly produced (such as by expression of an engineered nucleic acid sequence). In some embodiments, an antigen binding fragment may be wholly or partially synthetically produced. In some embodiments, an antigen binding fragment may have a length of at least about 50, 60, 70, 80, 90, 100, 110, 120, 130, 140, 150, 160, 170, 180, 190 amino acids or more; in some embodiments at least about 200 amino acids (e.g., 50-100, 50-150, 50-200, or 100-200 amino acids).

The term "variable region" or "variable domain" is used interchangeably. The variable region typically refers to a portion of an antibody, generally, a portion of a light or heavy chain, typically about the amino-terminal 110 to 120 amino acids in the mature heavy chain and about 90 to 115 amino acids in the mature light chain, which differ extensively in sequence among antibodies and are used in the binding and specificity of a particular antibody for its particular antigen. The variability in sequence is concentrated in those regions called complementarity determining regions (CDRs) while the more highly conserved regions in the variable domain are called framework regions (FR). Without wishing to be bound by any particular mechanism or theory, it is believed that the CDRs of the light and heavy chains are primarily responsible for the interaction and specificity of the antibody with antigen. In certain embodiments, the variable region is a human variable region. In certain embodiments, the variable region comprises rodent or murine CDRs and human framework regions (FRs). In embodiments, the variable region is a primate (e.g., non-human primate) variable region. In certain embodiments, the variable region comprises rodent or murine CDRs and primate (e.g., non-human primate) framework regions (FRs).

The terms "VL" and "VL domain" are used interchangeably to refer to the light chain variable region of an antibody or an antigen-binding molecule thereof.

The terms "VH" and "VH domain" are used interchangeably to refer to the heavy chain variable region of an antibody or an antigen-binding molecule thereof.

A number of definitions of the CDRs are commonly in use: Kabat numbering, Chothia numbering, AbM numbering, or contact numbering. The AbM definition is a compromise between the two used by Oxford Molecular's AbM antibody modelling software. The contact definition is based on an analysis of the available complex crystal structures.

TABLE 1

CDR Numbering

| Loop | Kabat | AbM | Chothia | Contact |
|---|---|---|---|---|
| L1 | L24--L34 | L24--L34 | L24--L34 | L30--L36 |
| L2 | L50--L56 | L50--L56 | L50--L56 | L46--L55 |
| L3 | L89--L97 | L89--L97 | L89--L97 | L89--L96 |
| H1 | H31--H35B (Kabat Numbering) | H26--H35B | H26--H32 . . . 34 | H30--H35B |
| H1 | H31--H35 (Chothia Numbering) | H26--H35 | H26--H32 | H30--H35 |
| H2 | H50--H65 | H50--H58 | H52--H56 | H47--H58 |
| H3 | H95--H102 | H95--H102 | H95--H102 | H93--H101 |

The term "Kabat numbering" and like terms are recognized in the art and refer to a system of numbering amino acid residues in the heavy and light chain variable regions of an antibody, or an antigen-binding molecule thereof. In certain aspects, the CDRs of an antibody can be determined according to the Kabat numbering system (see, e.g., Kabat E A & Wu T T (1971) Ann NY Acad Sci 190: 382-391 and Kabat E A et al., (1991) Sequences of Proteins of Immunological Interest, Fifth Edition, U.S. Department of Health and Human Services, NIH Publication No. 91-3242). Using the Kabat numbering system, CDRs within an antibody heavy chain molecule are typically present at amino acid positions 31 to 35, which optionally can include one or two additional amino acids, following 35 (referred to in the Kabat numbering scheme as 35A and 35B) (CDR1), amino acid positions 50 to 65 (CDR2), and amino acid positions 95 to 102 (CDR3). Using the Kabat numbering system, CDRs within an antibody light chain molecule are typically present at amino acid positions 24 to 34 (CDR1), amino acid positions 50 to 56 (CDR2), and amino acid positions 89 to 97 (CDR3). In a specific embodiment, the CDRs of the antibodies described herein have been determined according to the Kabat numbering scheme.

In certain aspects, the CDRs of an antibody can be determined according to the Chothia numbering scheme, which refers to the location of immunoglobulin structural loops (see, e.g., Chothia C & Lesk A M, (1987), J Mol Biol 196: 901-917; Al-Lazikani B et al., (1997) J Mol Biol 273: 927-948; Chothia C et al., (1992) J Mol Biol 227: 799-817; Tramontano A et al., (1990) J Mol Biol 215(1): 175-82; and U.S. Pat. No. 7,709,226). Typically, when using the Kabat numbering convention, the Chothia CDR-H1 loop is present at heavy chain amino acids 26 to 32, 33, or 34, the Chothia CDR-H2 loop is present at heavy chain amino acids 52 to 56, and the Chothia CDR-H3 loop is present at heavy chain amino acids 95 to 102, while the Chothia CDR-L1 loop is present at light chain amino acids 24 to 34, the Chothia CDR-L2 loop is present at light chain amino acids 50 to 56, and the Chothia CDR-L3 loop is present at light chain amino acids 89 to 97. The end of the Chothia CDR-HI loop when numbered using the Kabat numbering convention varies between H32 and H34 depending on the length of the loop (this is because the Kabat numbering scheme places the insertions at H35A and H35B; if neither 35A nor 35B is present, the loop ends at 32; if only 35A is present, the loop ends at 33; if both 35A and 35B are present, the loop ends at 34). In a specific embodiment, the CDRs of the antibodies described herein have been determined according to the Chothia numbering scheme.

The terms "constant region" and "constant domain" are interchangeable and have a meaning common in the art. The constant region is an antibody portion, e.g., a carboxyl terminal portion of a light and/or heavy chain which is not directly involved in binding of an antibody to antigen but which can exhibit various effector functions, such as interaction with the Fc receptor. The constant region of an immunoglobulin molecule generally has a more conserved amino acid sequence relative to an immunoglobulin variable domain.

The term "heavy chain" when used in reference to an antibody can refer to any distinct type, e.g., alpha ($\alpha$), delta ($\delta$), epsilon ($\varepsilon$), gamma ($\gamma$) and mu ($\mu$), based on the amino acid sequence of the constant domain, which give rise to IgA, IgD, IgE, IgG and IgM classes of antibodies, respectively, including subclasses of IgG, e.g., $IgG_1$, $IgG_2$, $IgG_3$ and $IgG_4$.

The term "light chain" when used in reference to an antibody can refer to any distinct type, e.g., kappa ($\kappa$) or lambda ($\lambda$) based on the amino acid sequence of the constant domains. Light chain amino acid sequences are well known in the art. In specific embodiments, the light chain is a human light chain.

An "antigen" refers to a compound, composition, or substance that may stimulate the production of antibodies or a T cell response in a human or animal, including compositions (such as one that includes a tumor-specific protein) that are injected or absorbed into a human or animal. An antigen reacts with the products of specific humoral or cellular immunity, including those induced by heterologous antigens, such as the disclosed antigens. A "target antigen" or "target antigen of interest" is an antigen that is not substantially found on the surface of other normal (desired) cells and to which a binding domain of a TCR or CAR contemplated herein, is designed to bind. A person of skill in the art would readily understand that any macromolecule, including virtually all proteins or peptides, can serve as an antigen. An antigen can be endogenously expressed, i.e., expressed by genomic DNA, or can be recombinantly expressed. An antigen can be specific to a certain tissue, such as a cancer cell, or it can be broadly expressed. In addition, fragments of larger molecules can act as antigens. In one embodiment, antigens are tumor antigens. In one particular embodiment, the antigen is all or a fragment of glypican 3 (GPC3). A "target" is any molecule bound by a binding domain, antigen binding system, CAR or antigen binding agent, e.g., an antibody.

"Antigen-specific targeting region" (ASTR) refers to the region of the CAR, antibody or TCR, which targets specific antigens. The targeting regions on a CAR or TCR are extracellular. In some embodiments, the antigen-specific targeting regions comprise an antibody or a functional equivalent thereof or a fragment thereof or a derivative thereof and each of the targeting regions target a different antigen. The targeting regions may comprise full length heavy chain, Fab fragments, single chain Fv (scFv) fragments, divalent single chain antibodies or diabodies, each of which are specific to the target antigen. There are, however, numerous alternatives, such as linked cytokines (which leads to recognition of cells bearing the cytokine receptor), affibodies, ligand binding domains from naturally occurring receptors, soluble protein/peptide ligand for a receptor (for example on a tumor cell), peptides, and vaccines to prompt an immune response, which may each be used in various embodiments of this disclosure. In fact, almost any molecule that binds a given antigen with high affinity can be used as an antigen-specific targeting region, as will be appreciated by those of skill in the art.

"Antigen presenting cell" or "APC" refers to cells that process and present antigens to T cells. Exemplary APCs comprise dendritic cells, macrophages, B cells, certain activated epithelial cells, and other cell types capable of TCR stimulation and appropriate T cell costimulation.

An "anti-tumor effect" refers to a biological effect that can present as a decrease in tumor volume, a decrease in the number of tumor cells, a decrease in tumor cell proliferation, a decrease in the number of metastases, an increase in overall or progression-free survival, an increase in life expectancy, or amelioration of various physiological symptoms associated with the tumor. An anti-tumor effect can also refer to the prevention of the occurrence of a tumor.

Two events or entities are "associated" with one another if the presence, level, and/or form of one is correlated with that of the other. For example, an entity (e.g., polypeptide, genetic signature, metabolite, microbe, etc.) is considered to be associated with a disease, disorder, or condition, if its presence, level, and/or form correlates with incidence of and/or susceptibility to the disease, disorder, or condition (e.g., across a relevant population). For example, two or more entities are physically "associated" with one another if they interact, directly or indirectly, so that they are and/or remain in physical proximity with one another (e.g., bind). In additional examples, two or more entities that are physically associated with one another are covalently linked or connected to one another, or non-covalently associated, for example by means of hydrogen bonds, van der Waals interaction, hydrophobic interactions, magnetism, and combinations thereof.

The term "autologous" refers to any material derived from the same individual to which it is later to be re-introduced. For example, the engineered autologous cell therapy (eACT™) method described herein involves collection of lymphocytes from a patient, which are then engineered to express, e.g., a CAR construct, and then administered back to the same patient.

"Binding affinity" generally refers to the strength of the sum total of non-covalent interactions between a single binding site of a molecule (e.g., an antibody) and its binding partner (e.g., an antigen). Unless indicated otherwise "binding affinity" refers to intrinsic binding affinity which reflects a 1:1 interaction between members of a binding pair (e.g., antibody and antigen). The affinity of a molecule X for its partner Y can generally be represented by the dissociation constant ($K_D$). Affinity can be measured and/or expressed in a number of ways known in the art, including, but not limited to, equilibrium dissociation constant ($K_D$), and equilibrium association constant ($K_A$). The $K_D$ is calculated from the quotient of $k_{off}/k_{on}$, whereas $K_A$ is calculated from the quotient of $k_{on}/k_{off}$. $k_{on}$ refers to the association rate constant of, e.g., an antibody to an antigen, and $k_{off}$ refers to the dissociation of, e.g., an antibody to an antigen. The $k_{on}$ and $k_{off}$ can be determined by techniques known to one of ordinary skill in the art, such as BIACORE® or KinExA.

The term "KD" (M) refers to the dissociation equilibrium constant of a particular antibody-antigen interaction, or the dissociation equilibrium constant of an antibody or antibody-binding fragment binding to an antigen. There is an inverse relationship between $K_D$ and binding affinity, therefore the smaller the $K_D$ value, the higher, i.e., stronger, the affinity. Thus, the terms "higher affinity" or "stronger affinity" relate to a higher ability to form an interaction and therefore a smaller $K_D$ value, and conversely the terms "lower affinity" or "weaker affinity" relate to a lower ability to form an interaction and therefore a larger $K_D$ value. In some circumstances, a higher binding affinity (or $K_D$) of a particular molecule (e.g. antibody) to its interactive partner molecule (e.g. antigen X) compared to the binding affinity of the molecule (e.g. antibody) to another interactive partner molecule (e.g. antigen Y) may be expressed as a binding ratio determined by dividing the larger $K_D$ value (lower, or weaker, affinity) by the smaller $K_D$ (higher, or stronger, affinity), for example expressed as 5-fold or 10-fold greater binding affinity, as the case may be.

The term "$k_d$" (sec-1 or 1/s) refers to the dissociation rate constant of a particular antibody-antigen interaction, or the dissociation rate constant of an antibody or antibody-binding fragment. Said value is also referred to as the $k_{off}$ value.

The term "$k_a$" (M-1×sec-1 or 1/M) refers to the association rate constant of a particular antibody-antigen interaction, or the association rate constant of an antibody or antibody-binding fragment.

The term "KA" (M-1 or 1/M) refers to the association equilibrium constant of a particular antibody-antigen interaction, or the association equilibrium constant of an antibody or antibody binding fragment. The association equilibrium constant is obtained by dividing the $k_a$ by the $k_d$.

The term "binding" generally refers to a non-covalent association between or among two or more entities. Direct binding involves physical contact between entities or moieties. "Indirect" binding involves physical interaction by way of physical contact with one or more intermediate entities. Binding between two or more entities may be assessed in any of a variety of contexts, e.g., where interacting entities or moieties are studied in isolation or in the context of more complex systems (e.g., while covalently or otherwise associated with a carrier entity and/or in a biological system such as a cell).

The terms "immunospecifically binds," "immunospecifically recognizes," "specifically binds," and "specifically recognizes" are analogous terms in the context of antibodies and refer to molecules that bind to an antigen (e.g., epitope or immune complex) as such binding is understood by one skilled in the art. For example, a molecule that specifically binds to an antigen may bind to other peptides or polypeptides, generally with lower affinity as determined by, e.g., immunoassays, BIACORE®, KinExA 3000 instrument (Sapidyne Instruments, Boise, ID), or other assays known in the art. In a specific embodiment, molecules that specifically bind to an antigen bind to the antigen with a $K_A$ that is at least 2 logs, 2.5 logs, 3 logs, 4 logs or greater than the $K_A$ when the molecules bind to another antigen. Binding may comprise preferential association of a binding domain, antibody, or antigen binding system with a target of the binding domain, antibody, or antigen binding system as compared to association of the binding domain, antibody, or antigen binding system with an entity that is not the target (i.e., non-target). In some embodiments, a binding domain, antibody, or antigen binding system selectively binds a target if binding between the binding domain, antibody, or antigen binding system and the target is greater than 2-fold, greater than 5-fold, greater than 10-fold, 20-fold, 30-fold, 40-fold, 50-fold, 60-fold, 70-fold, 80-fold, 90-fold, or greater than 100-fold as compared with binding of the binding domain, antibody, or antigen binding system and a non-target. In some embodiments, a binding domain, antibody, or antigen binding system selectively binds a target if the binding affinity is less than about $10^{-1}$ M, less than about $10^{-6}$ M, less than about $10^{-7}$ M, less than about $10^{-8}$ M, or less than about $10^{-9}$ M.

In another embodiment, molecules that specifically bind to an antigen bind with a dissociation constant ($K_d$) of about $1\times10^{-7}$ M. In some embodiments, the antigen binding molecule specifically binds an antigen with "high affinity" when the $K_d$ is about $1\times10^{-9}$ M to about $5\times10^{-9}$ M. In some embodiments, the antigen binding molecule specifically binds an antigen with "very high affinity" when the $K_d$ is $1\times10^{-10}$ M to about $5\times10^{-10}$ M. In one embodiment, the antigen binding molecule has a $K_d$ of $10^{-9}$ M. In one embodiment, the off-rate is less than about $1\times10^{-5}$. In embodiments, the antigen binding molecule binds GPC3 with a $K_d$ of about $1\times10^{-10}$ M to about $5\times10^{-10}$ M.

In certain embodiments, provided herein is an antibody or an antigen binding molecule thereof that binds to the target human antigen, e.g., In certain embodiments, the antigen binding molecule binds to GPC3 with a 5%, 10%, 15%, 20%, 25%, 30%, 35%, 40%, 45%, 50%, 55%, 60%, 65%, 70% or higher affinity than to another species of the target antigen as measured by, e.g., a radioimmunoassay, surface plasmon resonance, or kinetic exclusion assay. In a specific embodiment, an antibody or an antigen binding molecule thereof described herein, which binds to a target human antigen, will bind to another species of the target antigen with less than 10%, 15%, or 20% of the binding of the antibody or an antigen binding molecule thereof to the human antigen as measured by, e.g., a radioimmunoassay, surface plasmon resonance, or kinetic exclusion assay.

"Cancer" refers to a broad group of various diseases characterized by the uncontrolled growth of abnormal cells in the body. Unregulated cell division and growth results in the formation of malignant tumors that invade neighboring tissues and may also metastasize to distant parts of the body through the lymphatic system or bloodstream. A "cancer" or "cancer tissue" can include a tumor. In some embodiments, the methods of the present disclosure can be used to reduce the tumor size of a tumor derived from, for example, liver cancer (including hepatocellular carcinoma (HCC)), prostate cancer, bone cancer, pancreatic cancer, skin cancer, cancer of the head or neck, cutaneous or intraocular malignant melanoma, cervical intraepithelial neoplasia g3, cervical squamous cells carcinoma, endocervical adenocarcinoma, ovarian cancer, rectal cancer, cancer of the anal region, stomach cancer, testicular cancer, uterine cancer, carcinoma of the fallopian tubes, carcinoma of the endometrium, carcinoma of the cervix, carcinoma of the vagina, carcinoma of the vulva, multiple myeloma, Hodgkin's Disease, non-Hodgkin's lymphoma (NHL), primary mediastinal large B cell lymphoma (PMBC), diffuse large B cell lymphoma (DLBCL), follicular lymphoma (FL), transformed follicular lymphoma, splenic marginal zone lymphoma (SMZL), cancer of the esophagus (adeno and squamous cell carcinoma), breast cancer (such as breast invasive carcinoma, gastric cancer (such as alpha-fetoprotein producing gastric cancer), liposarcoma, schwannoma, cancer of the small intestine, cancer of the endocrine system, cancer of the thyroid gland, cancer of the parathyroid gland, cancer of the adrenal gland, sarcoma of soft tissue, cancer of the urethra, lung cancer (including squamous non-small cell lung cancer), colon cancer, cancer of the penis, chronic or acute leukemia, acute myeloid leukemia, chronic myeloid leukemia, acute lymphoblastic leukemia (ALL) (including non T cell ALL), chronic lymphocytic leukemia (CLL), solid tumors of childhood, lymphocytic lymphoma, cancer of the bladder, cancer of the kidney or ureter, carcinoma of the renal pelvis, neoplasm of the central nervous system (CNS), primary CNS lymphoma, tumor angiogenesis, spinal axis tumor, brain stem glioma, pituitary adenoma, Kaposi's sarcoma, epidermoid cancer, squamous cell cancer, T cell lymphoma, environmentally induced cancers including those induced by asbestos, mesothelioma, cholangiocarcinoma, other B cell malignancies, multiple myeloma, and combinations of said cancers. The particular cancer can be responsive to chemo-or radiation therapy or the cancer can be refractory. A refractory cancer refers to a cancer that is not amendable to surgical intervention and the cancer is either initially unresponsive to chemo- or radiation therapy or the cancer becomes unresponsive over time.

"Chemokines" are a type of cytokine that mediates cell chemotaxis, or directional movement. Examples of chemokines include, but are not limited to, IL-8, IL-16, eotaxin, eotaxin-3, macrophage-derived chemokine (MDC or CCL22), monocyte chemotactic protein 1 (MCP-1 or CCL2), MCP-4, macrophage inflammatory protein 1α (MIP-1α, MIP-1a), MIP-1β (MIP-1b), gamma-induced protein 10 (IP-10), and thymus and activation regulated chemokine (TARC or CCL17).

"Chimeric antigen receptor" or "CAR" refers to a molecule engineered to comprise a binding domain and a means of activating immune cells (for example T cells such as naive T cells, central memory T cells, effector memory T cells, NK cells or combination thereof) upon antigen binding. CARs are also known as artificial T cell receptors, chimeric T cell receptors or chimeric immunoreceptors. In some embodiments, a CAR comprises a binding domain, an extracellular domain, a transmembrane domain, one or more co-stimulatory domains, and an intracellular signaling domain. A T cell that has been genetically engineered to express a chimeric antigen receptor may be referred to as a CAR T cell. Similarly, an NK cell that has been genetically engineered to express a chimeric antigen receptor may be referred to as a CAR NK cell.

By "decrease" or "lower," or "lessen," or "reduce," or "abate" refers generally to the ability of a composition contemplated herein to produce, elicit, or cause a lesser physiological response (i.e., a downstream effect) compared to the response caused by either the vehicle alone (i.e., an active moiety) or a control molecule/composition. A "decrease" or "reduced" amount is typically a "statistically significant" amount, and may include an decrease that is 1.1, 1.2, 1.5, 2, 2.5, 3, 3.5, 4, 4.5, 5, 5.5, 6, 6.5, 7, 7.5, 8, 8.5, 9, 9.5, 10, 15, 20, 30 or more times (e.g., 500, 1000 times) (including all integers and decimal points in between and above 1, e.g., 1.5, 1.6, 1.7. 1.8, etc.) the response (reference response) produced by vehicle, a control composition.

"Extracellular domain" (or "ECD") refers to a portion of a polypeptide that, when the polypeptide is present in a cell membrane, is understood to reside outside of the cell membrane, in the extracellular space.

The term "extracellular ligand-binding domain," as used herein, refers to an oligo- or polypeptide that is capable of binding a ligand, e.g., a cell surface molecule. For example, the extracellular ligand-binding domain may be chosen to recognize a ligand that acts as a cell surface marker on target cells associated with a particular disease state (e.g., cancer). Examples of cell surface markers that may act as ligands include those associated with viral, bacterial and parasitic infections, autoimmune disease and cancer cells.

The binding domain of the CAR may be followed by a "spacer," or, "hinge," which refers to the region that moves the antigen binding domain away from the effector cell surface to enable proper cell/cell contact, antigen binding and activation (Patel et al., Gene Therapy, 1999; 6: 412-419). The hinge region in a CAR is generally between the transmembrane (TM) and the binding domain. In certain embodiments, a hinge region is an immunoglobulin hinge region and may be a wild type immunoglobulin hinge region or an altered wild type immunoglobulin hinge region. Other exemplary hinge regions used in the CARs described herein include the hinge region derived from the extracellular regions of type 1 membrane proteins such as CD8alpha, CD4, CD28 and CD7, which may be wild-type hinge regions from these molecules or may be altered.

The "transmembrane" region or domain is the portion of the CAR that anchors the extracellular binding portion to the plasma membrane of the immune effector cell, and facilitates binding of the binding domain to the target antigen. The transmembrane domain may be a CD3zeta transmembrane domain, however other transmembrane domains that may be employed include those obtained from CD8alpha, CD4, CD28, CD45, CD9, CD16, CD22, CD33, CD64, CD80, CD86, CD134, CD137, NKG2D, 2B4 and CD154. In certain embodiments, the transmembrane domain is synthetic in which case it would comprise predominantly hydrophobic residues such as leucine and valine.

The "intracellular signaling domain" or "signaling domain" refers to the part of the chimeric antigen receptor protein that participates in transducing the message of effective CAR binding to a target antigen into the interior of the immune effector cell to elicit effector cell function, e.g., activation, cytokine production, proliferation and cytotoxic activity, including the release of cytotoxic factors to the CAR-bound target cell, or other cellular responses elicited with antigen binding to the extracellular CAR domain. The term "effector function" refers to a specialized function of the cell. Effector function of the T cell, for example, may be cytolytic activity or help or activity including the secretion of a cytokine. Thus, the terms "intracellular signaling domain" or "signaling domain," used interchangeably herein, refer to the portion of a protein which transduces the effector function signal and that directs the cell to perform a specialized function. While usually the entire intracellular signaling domain can be employed, in many cases it is not necessary to use the entire domain. To the extent that a truncated portion of an intracellular signaling domain is used, such truncated portion may be used in place of the entire domain as long as it transduces the effector function signal. The term intracellular signaling domain is meant to include any truncated portion of the intracellular signaling domain sufficient to transducing effector function signal. The intracellular signaling domain is also known as the, "signal transduction domain," and is typically derived from portions of the human CD3 or FcRγ chains.

It is known that signals generated through the T cell receptor alone are insufficient for full activation of the T cell and that a secondary, or costimulatory signal is also required. Thus, T cell activation can be said to be mediated by two distinct classes of cytoplasmic signaling sequences: those that initiate antigen dependent primary activation through the T cell receptor (primary cytoplasmic signaling sequences) and those that act in an antigen independent manner to provide a secondary or costimulatory signal (secondary cytoplasmic signaling sequences). Cytoplasmic signaling sequences that act in a costimulatory manner may contain signaling domains which are known as immunoreceptor tyrosine-based activation domain or ITAMs. Examples of ITAM containing primary cytoplasmic signaling sequences that are of particular use in the disclosure include those derived from DAP10, DAP12, TCRzeta, FcRgamma, FcRbeta, CD3zeta, CD3gamma, CD3delta, CD3epsilon, CD5, CD22, CD79a, CD79b and CD66d.

As used herein, the term, "costimulatory signaling domain," or "costimulatory domain", refers to the portion of the CAR comprising the intracellular domain of a costimulatory molecule. Costimulatory molecules are cell surface molecules other than antigen receptors or Fc receptors that provide a second signal required for efficient activation and function of T lymphocytes upon binding to antigen. Examples of such co-stimulatory molecules include CD27, CD28, 4-1 BB (CD137), OX40 (CD134), CD30, CD40, PD-1, ICOS (CD278), LFA-1, CD2, CD7, LIGHT, NKD2C, 2B4, CD137, DAP12, B7-H2 and a ligand that specifically binds CD83. Accordingly, while the present disclosure provides exemplary costimulatory domains derived from CD28, other costimulatory domains are contemplated for use with the CARs described herein. The inclusion of one or more co stimulatory signaling domains may enhance the efficacy and expansion of T cells and NK cells expressing CAR receptors. The intracellular signaling and costimulatory signaling domains may be linked in any order in tandem to the carboxyl terminus of the transmembrane domain.

Although scFv-based CARs engineered to contain a signaling domain from CD3 or FcRgamma have been shown to deliver a potent signal for T cell activation and effector function, they are not sufficient to elicit signals that promote T cell survival and expansion in the absence of a concomitant costimulatory signal. Other CARs containing a binding domain, a hinge, a transmembrane and the signaling domain derived from CD3zeta or FcRgamma together with one or more costimulatory signaling domains (e.g., intracellular costimulatory domains derived from 4-1BB, CD28, CD134 and CD278) may more effectively direct antitumor activity as well as increased cytokine secretion, lytic activity, survival and proliferation in CAR expressing T cells in vitro, and in animal models and cancer patients (Milone et al., Molecular Therapy, 2009; 17: 1453-1464; Zhong et al., Molecular Therapy, 2010; 18: 413-420; Carpenito et al., PNAS, 2009; 106:3360-3365).

A "costimulatory signal" refers to a signal, which in combination with a primary signal, such as TCR/CD3 ligation, leads to a T cell response, such as, but not limited to, proliferation and/or upregulation or down regulation of key molecules.

A "costimulatory ligand" includes a molecule on an antigen presenting cell that specifically binds a cognate co-stimulatory molecule on a T cell. Binding of the costimulatory ligand provides a signal that mediates a T cell response, including, but not limited to, proliferation, activation, differentiation, and the like. A costimulatory ligand induces a signal that is in addition to the primary signal provided by a stimulatory molecule, for instance, by binding of a T cell receptor (TCR)/CD3 complex with a major histocompatibility complex (MHC) molecule loaded with peptide. A co-stimulatory ligand can include, but is not limited to, 3/TR6, 4-1BB ligand, agonist or antibody that binds Toll ligand receptor, B7-1 (CD80), B7-2 (CD86), CD30 ligand, CD40, CD7, CD70, CD83, herpes virus entry mediator (HVEM), human leukocyte antigen G (HLA-G), ILT4, immunoglobulin-like transcript (ILT) 3, inducible costimulatory ligand (ICOS-L), intercellular adhesion molecule (ICAM), ligand that specifically binds with B7-H3, lymphotoxin beta receptor, MHC class I chain-related protein A (MICA), MHC class I chain-related protein B (MICB), OX40 ligand, PD-L2, or programmed death (PD) L1. A co-stimulatory ligand includes, without limitation, an antibody that specifically binds with a co-stimulatory molecule present on a T cell, such as, but not limited to, 4-1BB, B7-H3, CD2, CD27, CD28, CD30, CD40, CD7, ICOS, ligand that specifically binds with CD83, lymphocyte function-associated antigen-1 (LFA-1), natural killer cell receptor C (NKG2C), OX40, PD-1, or tumor necrosis factor superfamily member 14 (TNFSF14 or LIGHT). A costimulatory ligand may also bind a cognate co-stimulatory molecule on a NK cell.

A "costimulatory molecule" is a cognate binding partner on a T cell (and in some cases an NK cell) that specifically binds with a costimulatory ligand, thereby mediating a costimulatory response by the T cell, such as, but not limited to, proliferation. Costimulatory molecules include, but are not limited to, A "costimulatory molecule" is a cognate binding partner on a T cell that specifically binds with a costimulatory ligand, thereby mediating a costimulatory response by the T cell, such as, but not limited to, proliferation. Costimulatory molecules include, but are not limited to, 4-1BB/CD137, B7-H3, BAFFR, BLAME (SLAMF8), BTLA, CD 33, CD 45, CD100 (SEMA4D), CD103, CD134, CD137, CD154, CD16, CD160 (BY55), CD18, CD19, CD19a, CD2, CD22, CD247, CD27, CD276 (B7-H3), CD28, CD29, CD3 (alpha; beta; delta; epsilon; gamma; zeta), CD30, CD37, CD4, CD4, CD40, CD49a, CD49D, CD49f, CD5, CD64, CD69, CD7, CD80, CD83 ligand, CD84, CD86, CD8alpha, CD8beta, CD9, CD96 (Tactile), CD1-1a, CD1-1b, CD1-1c, CD1-1d, CDS, CEACAM1, CRTAM, DAP-10, DNAM1 (CD226), Fc gamma receptor, GADS, GITR, HVEM (LIGHTR), IA4, ICAM-1, ICAM-1, ICOS, Ig alpha (CD79a), IL2R beta, IL2R gamma, IL7R alpha, integrin, ITGA4, ITGA4, ITGA6, ITGAD, ITGAE, ITGAL, ITGAM, ITGAX, ITGB2, ITGB7, ITGB1, KIRDS2, LAT, LFA-1, LFA-1, LIGHT, LIGHT (tumor necrosis factor superfamily member 14; TNFSF14), LTBR, Ly9 (CD229), lymphocyte function-associated antigen-1 (LFA-1 (CD1 la/CD18), MHC class I molecule, NKG2C, NKG2D, NKp30, NKp44, NKp46, NKp80 (KLRF1), OX40, PAG/Cbp, PD-1, PSGL1, SELPLG (CD162), signaling lymphocytic activation molecule, SLAM (SLAMF1; CD150; IPO-3), SLAMF4 (CD244; 2B4), SLAMF6 (NTB-A; Ly108), SLAMF7, SLP-76, TNF, TNFr, TNFR2, Toll ligand receptor, TRANCE/RANKL, VLA1, or VLA-6, or fragments, truncations, or combinations thereof.

A "conservative amino acid substitution" is one in which the amino acid residue is replaced with an amino acid residue having a similar side chain. Families of amino acid residues having side chains have been defined in the art. These families include amino acids with basic side chains (e.g., lysine, arginine, histidine), acidic side chains (e.g., aspartic acid, glutamic acid), uncharged polar side chains (e.g., glycine, asparagine, glutamine, serine, threonine, tyrosine, cysteine, tryptophan), nonpolar side chains (e.g., alanine, valine, leucine, isoleucine, proline, phenylalanine, methionine), beta-branched side chains (e.g., threonine, valine, isoleucine) and aromatic side chains (e.g., tyrosine, phenylalanine, tryptophan, histidine). In certain embodiments, one or more amino acid residues within a CDR(s) or within a framework region(s) of an antibody or antigen-binding molecule thereof can be replaced with an amino acid residue with a similar side chain. In general, two sequences are generally considered to be "substantially similar" if they contain a conservative amino acid substitution in corresponding positions. For example, certain amino acids are generally classified as "hydrophobic" or "hydrophilic" amino acids, and/or as having "polar" or "non-polar" side chains. Substitution of one amino acid for another of the same type may be considered a conservative substitution. Exemplary amino acid categorizations are summarized in Tables 2 and 3 below:

TABLE 2

| Amino Acid | 3-Letter | 1-Letter | Property | Property | Hydropathy Index |
|---|---|---|---|---|---|
| Alanine | Ala | A | nonpolar | neutral | 1.8 |
| Arginine | Arg | R | polar | positive | −4.5 |
| Asparagine | Asn | N | polar | neutral | −3.5 |
| Aspartic acid | Asp | D | polar | negative | −3.5 |
| Cysteine | Cys | C | nonpolar | neutral | 2.5 |
| Glutamic acid | Glu | E | polar | negative | −3.5 |
| Glutamine | Gln | Q | polar | neutral | −3.5 |
| Glycine | Gly | G | nonpolar | neutral | −0.4 |
| Histidine | His | H | polar | positive | −3.2 |
| Isoleucine | Ile | I | nonpolar | neutral | 4.5 |
| Leucine | Leu | L | nonpolar | neutral | 3.8 |
| Lysine | Lys | K | polar | positive | −3.9 |
| Methionine | Met | M | nonpolar | neutral | 1.9 |
| Phenylalanine | Phe | F | nonpolar | neutral | 2.8 |
| Proline | Pro | P | nonpolar | neutral | −1.6 |
| Serine | Ser | S | polar | neutral | −0.8 |
| Threonine | Thr | T | polar | neutral | −0.7 |
| Tryptophan | Trp | W | nonpolar | neutral | −0.9 |
| Tyrosine | Tyr | Y | polar | neutral | −1.3 |
| Valine | Val | V | nonpolar | neutral | 4.2 |

TABLE 3

| Ambiguous Amino Acids | 3-Letter | 1-Letter |
|---|---|---|
| Asparagine or aspartic acid | Asx | B |
| Glutamine or glutamic acid | Glx | Z |
| Leucine or Isoleucine | Xle | J |
| Unspecified or unknown amino acid | Xaa | X |

"Combination therapy" refers to those situations in which a subject is simultaneously exposed to two or more therapeutic regimens (e.g., two or more therapeutic moieties). In some embodiments, the two or more regimens may be administered simultaneously; in some embodiments, such regimens may be administered sequentially (e.g., all "doses" of a first regimen are administered prior to administration of any doses of a second regimen); in some embodiments, such agents are administered in overlapping dosing regimens. In some embodiments, "administration" of combination therapy may involve administration of one or more agent(s) or modality(ies) to a subject receiving the other agent(s) or modality(ies) in the combination. For clarity, combination therapy does not require that individual agents be administered together in a single composition (or even necessarily at the same time), although in some embodiments, two or more agents, or active moieties thereof, may be administered together in a combination composition, or even in a combination compound (e.g., as part of a single chemical complex or covalent entity).

"Corresponding to" may be used to designate the position/identity of a structural element in a molecule or composition through comparison with an appropriate reference molecule or composition. For example, in some embodiments, a monomeric residue in a polymer (e.g., an amino acid residue in a polypeptide or a nucleic acid residue in a polynucleotide) may be identified as "corresponding to" a residue in an appropriate reference polymer. For example, for purposes of simplicity, residues in a polypeptide may be designated using a canonical numbering system based on a reference related polypeptide, so that an amino acid "corresponding to" a residue at position 100, for example, need not actually be the 100th amino acid in an amino acid chain provided it corresponds to the residue found at position 100 in the reference polypeptide. Various sequence alignment strategies are available, comprising software programs such as, for example, BLAST, CS-BLAST, CUDASW++, DIAMOND, FASTA, GGSEARCH/GLSEARCH, Genoogle, HMMER, HHpred/HHsearch, IDF, Infernal, KLAST, USEARCH, parasail, PSI-BLAST, PSI-Search, ScalaBLAST, Sequilab, SAM, SSEARCH, SWAPHI, SWAPHI-LS, SWIMM, or SWIPE that may be utilized, for example, to identify "corresponding" residues in polypeptides and/or nucleic acids in accordance with the present disclosure.

An antigen binding molecule, such as an antibody, an antigen binding fragment thereof, CAR or TCR, "cross-competes" with a reference binding molecule, such as an antibody or an antigen binding fragment thereof, if the interaction between an antigen and the first antigen binding molecule blocks, limits, inhibits, or otherwise reduces the ability of the reference binding molecule to interact with the antigen. Cross competition can be complete, e.g., binding of the antigen binding molecule to the antigen completely blocks the ability of the reference binding molecule to bind the antigen, or it can be partial, e.g., binding of the antigen binding molecule to the antigen reduces the ability of the reference antigen binding molecule to bind the antigen. In certain embodiments, an antigen binding molecule that cross-competes with a reference antigen binding molecule binds the same or an overlapping epitope as the reference antigen binding molecule. In other embodiments, the antigen binding molecule that cross-competes with a reference antigen binding molecule binds a different epitope than the reference antigen binding molecule. Numerous types of competitive binding assays can be used to determine if one antigen binding molecule competes with another, for example: solid phase direct or indirect radioimmunoassay (RIA); solid phase direct or indirect enzyme immunoassay (EIA); sandwich competition assay (Stahli et al., 1983, Methods in Enzymology 9:242-253); solid phase direct biotin-avidin EIA (Kirkland et al., 1986, J. Immunol. 137: 3614-3619); solid phase direct labeled assay, solid phase direct labeled sandwich assay (Harlow and Lane, 1988, Antibodies, A Laboratory Manual, Cold Spring Harbor Press); solid phase direct label RIA using 1-125 label (Morel et al., 1988, Molec. Immunol. 25:7-15); solid phase direct biotin-avidin EIA (Cheung, et al., 1990, Virology 176:546-552); and direct labeled RIA (Moldenhauer et al., 1990, Scand. J. Immunol. 32:77-82).

A "cytokine," refers to a non-antibody protein that is released by one cell in response to contact with a specific antigen, wherein the cytokine interacts with a second cell to mediate a response in the second cell. A cytokine can be endogenously expressed by a cell or administered to a subject. Cytokines may be released by immune cells, including macrophages, B cells, T cells, and mast cells to propagate an immune response. Cytokines can induce various responses in the recipient cell. Cytokines can include homeostatic cytokines, chemokines, pro-inflammatory cytokines, effectors, and acute-phase proteins. For example, homeostatic cytokines, including interleukin (IL) 7 and IL-15, promote immune cell survival and proliferation, and pro-inflammatory cytokines can promote an inflammatory response. Examples of homeostatic cytokines include, but are not limited to, IL-2, IL-4, IL-5, IL-7, IL-10, IL-12p40, IL-12p70, IL-15, and interferon (IFN) gamma. Examples of pro-inflammatory cytokines include, but are not limited to, IL-1a, IL-1b, IL-6, IL-13, IL-17a, tumor necrosis factor (TNF)-alpha, TNF-beta, fibroblast growth factor (FGF) 2, granulocyte macrophage colony-stimulating factor (GM-CSF), soluble intercellular adhesion molecule 1 (sICAM-1), soluble vascular adhesion molecule 1 (sVCAM-1), vascular endothelial growth factor (VEGF), VEGF-C, VEGF-D, and placental growth factor (PLGF). Examples of effectors include, but are not limited to, granzyme A, granzyme B, soluble Fas ligand (sFasL), and perforin. Examples of acute phase-proteins include, but are not limited to, C-reactive protein (CRP) and serum amyloid A (SAA).

The term "domain" refers to a portion of an entity. In some embodiments, a "domain" is associated with a structural and/or functional feature of the entity, e.g., so that, when the domain is physically separated from the rest of its parent entity, it substantially or entirely retains the structural and/or functional feature. In some embodiments, a domain may comprise a portion of an entity that, when separated from that (parent) entity and linked or connected with a different (recipient) entity, substantially retains and/or imparts on the recipient entity one or more structural and/or functional features, e.g., that characterized it in the parent entity. In some embodiments, a domain is a portion of a molecule (e.g., a small molecule, carbohydrate, lipid, nucleic acid, or polypeptide). In some embodiments, a domain is a section of a polypeptide; in some such embodiments, a domain is characterized by a structural element (e.g., an amino acid sequence or sequence domain, α-helix character, β-sheet character, coiled-coil character, random coil character, etc.), and/or by a functional feature (e.g., binding activity, enzymatic activity, folding activity, signaling activity, etc.).

The term "dosage form" may be used to refer to a physically discrete unit of an active agent (e.g., an antigen binding system or antibody) for administration to a subject. Generally, each such unit contains a predetermined quantity of active agent. In some embodiments, such quantity is a unit dosage amount (or a whole fraction thereof) appropriate for administration in accordance with a dosing regimen that has been determined to correlate with a desired or beneficial outcome when administered to a relevant population. The total amount of a therapeutic composition or agent administered to a subject is determined by one or more medical practitioners and may involve administration of more than one dosage forms.

The term "dosing regimen" may be used to refer to a set of one or more unit doses that are administered individually to a subject. In some embodiments, a given therapeutic agent has a recommended dosing regimen, which may involve one or more doses. In some embodiments, a dosing regimen comprises a plurality of doses each of which is separated in time from other doses. In some embodiments, a dosing regimen comprises a plurality of doses and consecutive doses are separated from one another by time periods of equal length; in some embodiments, a dosing regimen comprises a plurality of doses and consecutive doses are separated from one another by time periods of at least two different lengths. In some embodiments, all doses within a dosing regimen are of the same unit dose amount. In some embodiments, different doses within a dosing regimen are of different amounts. In some embodiments, a dosing regimen comprises a first dose in a first dose amount, followed by one or more additional doses in a second dose amount different from the first dose amount. In some embodiments, a dosing regimen is periodically adjusted to achieve a desired or beneficial outcome.

"Effector cell" refers to a cell of the immune system that expresses one or more Fc receptors and mediates one or more effector functions. In some embodiments, effector cells may comprise, without limitation, one or more of monocytes, macrophages, neutrophils, dendritic cells, eosinophils, mast cells, platelets, large granular lymphocytes, Langerhans' cells, natural killer (NK) cells, T-lymphocytes, and B-lymphocytes. Effector cells may be of any organism comprising, without limitation, humans, mice, rats, rabbits, and monkeys.

"Effector function" refers to a biological result of interaction of an antibody Fc region with an Fc receptor or ligand. Effector functions comprise, without limitation, antibody-dependent cell-mediated cytotoxicity (ADCC), antibody-dependent cell-mediated phagocytosis (ADCP), and complement-mediated cytotoxicity (CMC). An effector function may be antigen binding dependent, antigen binding independent, or both. ADCC refers to lysis of antibody-bound target cells by immune effector cells. Without wishing to be bound by any theory, ADCC is generally understood to involve Fc receptor (FcR)-bearing effector cells recognizing and subsequently killing antibody-coated target cells (e.g., cells that express on their surface antigens to which an antibody is bound). Effector cells that mediate ADCC may comprise immune cells, comprising yet not limited to, one or more of natural killer (NK) cells, macrophages, neutrophils, eosinophils.

The term "engineered Autologous Cell Therapy," which can be abbreviated as "eACT™" also known as adoptive cell transfer, is a process by which a patient's own cells, such as T cells are collected and subsequently genetically altered to recognize and target one or more antigens expressed on the cell surface of one or more specific tumor cells or malignancies. Immune cells can be engineered to express, for example, chimeric antigen receptors (CAR) or T cell receptor (TCR). CAR positive (+) immune cells may be engineered to express an extracellular single chain variable fragment (scFv) with specificity for a particular tumor antigen linked to an intracellular signaling part comprising at least one costimulatory domain and at least one activating domain. The costimulatory domain can be derived from a naturally-occurring costimulatory domain, or a variant thereof, e.g., a variant having a truncated hinge domain ("THD"), and the activating domain can be derived from, e.g., CD3-zeta. In certain embodiments, the CAR is designed to have two, three, four, or more costimulatory domains. The CAR scFv can be designed to target, for example, GPC3, which is a transmembrane protein expressed on various cancer cells.

In some embodiments, the CAR is engineered such that the costimulatory domain is expressed as a separate polypeptide chain. Example CAR T cell therapies and constructs are described in U.S. Patent Publication Nos. 2013/0287748, 2014/0227237, 2014/0099309, and 2014/0050708, which are incorporated by reference in their entirety. "Adoptive cell therapy" or "ACT" involves transfer of immune cells with anti-tumor activity into a subject, e.g., a cancer patient. In some embodiments, ACT is a treatment approach that involves the use of lymphocytes (e.g., engineered lymphocytes) with anti-tumor activity.

An "epitope" refers to a localized region of an antigen to which an antibody can specifically bind. An epitope can be, for example, contiguous amino acids of a polypeptide (linear or contiguous epitope) or an epitope can, for example, come together from two or more non-contiguous regions of a polypeptide or polypeptides (conformational, non-linear, discontinuous, or non-contiguous epitope). In certain embodiments, the epitope to which an antibody binds can be determined by, e.g., NMR spectroscopy, X-ray diffraction crystallography studies, ELISA assays, hydrogen/deuterium exchange coupled with mass spectrometry (e.g., liquid chromatography electrospray mass spectrometry), array-based oligo-peptide scanning assays, and/or mutagenesis mapping (e.g., site-directed mutagenesis mapping). For X-ray crystallography, crystallization may be accomplished using any of the known methods in the art (e.g., Giegé R et al., (1994) Acta Crystallogr D Biol Crystallogr 50(Pt 4): 339-350; McPherson A (1990) Eur J Biochem 189: 1-23; Chayen N E (1997) Structure 5: 1269-1274; McPherson A (1976) J Biol Chem 251: 6300-6303). Antibody:antigen crystals may be studied using well known X-ray diffraction techniques and may be refined using computer software such as X-PLOR (Yale University, 1992, distributed by Molecular Simulations, Inc.; see e.g. Meth Enzymol (1985) volumes 114 & 115, eds Wyckoff H W et al.; U.S. 2004/0014194), and BUSTER (Bricogne G (1993) Acta Crystallogr D Biol Crystallogr 49(Pt 1): 37-60; Bricogne G (1997) Meth Enzymol 276A: 361-423, ed Carter C W; Roversi P et al., (2000) Acta Crystallogr D Biol Crystallogr 56(Pt 10): 1316-1323). Mutagenesis mapping studies may be accomplished using any method known to one of skill in the art. See, e.g., Champe M et al., (1995) J Biol Chem 270: 1388-1394 and Cunningham B C & Wells J A (1989) Science 244: 1081-1085 for a description of mutagenesis techniques, including alanine scanning mutagenesis techniques.

"Endogenous" with reference to a gene, protein, and/or nucleic acid refers to the natural presence of that gene, protein, and/or nucleic acid in a cell, such as an immune cell.

"Exogenous" refers to an introduced agent, such as a nucleic acid, gene, or protein, into a cell, for example from an outside source. A nucleic acid introduced into a cell is exogenous even if it encodes a protein which is naturally found in the cell. Such exogenous introduction of a nucleic acid encoding a protein can be used to increase the expression of the protein over the level that would naturally be found in the cell under similar conditions, e.g. without introduction of the exogenous nucleic acid.

The term "excipient" refers to an agent that may be comprised in a composition, for example to provide or contribute to a desired consistency or stabilizing effect. In some embodiments, a suitable excipient may comprise, for example, starch, glucose, lactose, sucrose, gelatin, malt, rice, flour, chalk, silica gel, sodium stearate, glycerol monostearate, talc, sodium chloride, dried skim milk, glycerol, propylene, glycol, water, ethanol, or the like.

A "fragment" or "portion" of a material or entity as described herein has a structure that comprises a discrete portion of the whole, e.g., of a physical entity or abstract entity. In some embodiments, a fragment lacks one or more moieties found in the whole. In some embodiments, a fragment consists of or comprises a characteristic structural element, domain or moiety found in the whole. In some embodiments, a polymer fragment comprises or consists of at least 3, 4, 5, 6, 7, 8, 9, 10, 11, 12, 13, 14, 15, 16, 17, 18, 19, 20, 25, 30, 35, 40, 45, 50, 55, 60, 65, 70, 75, 80, 85, 90, 95, 100, 110, 120, 130, 140, 150, 160, 170, 180, 190, 200, 210, 220, 230, 240, 250, 275, 300, 325, 350, 375, 400, 425, 450, 475, 500 or more monomeric units (e.g., residues) as found in the whole polymer. In some embodiments, a polymer fragment comprises or consists of at least about 5%, 10%, 15%, 20%, 25%, 30%, 25%, 40%, 45%, 50%, 55%, 60%, 65%, 70%, 75%, 80%, 85%, 90%, 95%, 96%, 97%, 98%, 99% or more of the monomeric units (e.g., residues) found in the whole polymer (e.g., 85-90%, 85-95%, 85-100%, 90-95%, 90-100%, or 95-100%). The whole material or entity may in some embodiments be referred to as the "parent" of the fragment.

The term "fusion polypeptide" or "fusion protein" generally refers to a polypeptide comprising at least two segments. Generally, a polypeptide containing at least two such segments is considered to be a fusion polypeptide if the two segments are moieties that (1) are not comprised in nature in the same peptide, and/or (2) have not previously been linked or connected to one another in a single polypeptide, and/or (3) have been linked or connected to one another through action of the hand of man. In embodiments, a CAR is a fusion protein. In embodiments, a TCR is a fusion protein. In embodiments, a TGFbeta dominant negative receptor is a fusion protein.

The term "gene product" or "expression product" generally refers to an RNA transcribed from the gene (pre- and/or post-processing) or a polypeptide (pre- and/or post-modification) encoded by an RNA transcribed from the gene.

The term "genetically engineered" or "engineered" refers to a method of modifying the genome of a cell, including, but not limited to, deleting a coding or non-coding region or a portion thereof or inserting a coding region or a portion thereof. In some embodiments, the cell that is modified is a lymphocyte, e.g., a T cell or NK cell, which can either be obtained from a patient or a donor. In some embodiments, the cell that is modified is an induced pluripotent stem cell (iPSC) which can be differentiated to a lymphocyte, such as a T cell or NK cell. The cell can be modified to express an exogenous construct, such as, e.g., a chimeric antigen receptor (CAR) or a T cell receptor (TCR), which is incorporated into the cell's genome. Other gene edits can also be done, for example to reduce rejection and/or enhance cell fitness. Engineering generally comprises manipulation by the hand of man. For example, a polynucleotide is considered to be "engineered" when two or more sequences, that are not linked or connected together in that order in nature, are manipulated by the hand of man to be directly linked or connected to one another in the engineered polynucleotide. In the context of manipulation of cells by techniques of molecular biology, a cell or organism is considered to be "engineered" if it has been manipulated so that its genetic information is altered (e.g., new genetic material not previously present has been introduced, for example by transformation, somatic hybridization, transfection, transduction, or other mechanism, or previously present genetic material is altered or removed, for example by substitution or deletion mutation, or by other protocols). In some embodiments, a binding agent is a modified lymphocyte, e.g., a T cell or NK cell, may be obtained from a patient or a donor. An engineered cell may be modified to express an exogenous construct, such as, e.g., a chimeric antigen receptor (CAR) or a T cell receptor (TCR), which is incorporated into the cell's genome. Progeny of an engineered polynucleotide or binding agent are generally referred to as "engineered" even though the actual manipulation was performed on a prior entity. In some embodiments, "engineered" refers to an entity that has been designed and produced. The term "designed" refers to an agent (i) whose structure is or was selected by the hand of man; (ii) that is produced by a process requiring the hand of man; and/or (iii) that is distinct from natural substances and other known agents.

A "T cell receptor" or "TCR" refers to antigen-recognition molecules present on the surface of T cells. During normal T cell development, each of the four TCR genes, $\alpha$, $\beta$, $\gamma$, and $\delta$, may rearrange leading to highly diverse TCR proteins.

The term "heterologous" means from any source other than naturally occurring sequences. For example, a heterologous sequence included as a part of a costimulatory protein is amino acids that do not naturally occur as, i.e., do not align with, the wild type human costimulatory protein. For example, a heterologous nucleotide sequence refers to a nucleotide sequence other than that of the wild type human costimulatory protein-encoding sequence.

Term "identity" refers to the overall relatedness between polymeric molecules, e.g., between nucleic acid molecules (e.g., DNA molecules and/or RNA molecules) and/or between polypeptide molecules. Methods for the calculation of a percent identity as between two provided polypeptide sequences are known. Calculation of the percent identity of two nucleic acid or polypeptide sequences, for example, may be performed by aligning the two sequences for optimal comparison purposes (e.g., gaps may be introduced in one or both of a first and a second sequences for optimal alignment and non-identical sequences may be disregarded for comparison purposes). The nucleotides or amino acids at corresponding positions are then compared. When a position in the first sequence is occupied by the same residue (e.g., nucleotide or amino acid) as the corresponding position in the second sequence, then the molecules are identical at that position. The percent identity between the two sequences is a function of the number of identical positions shared by the sequences, optionally taking into account the number of gaps, and the length of each gap, which may need to be introduced for optimal alignment of the two sequences. Comparison or alignment of sequences and determination of percent identity between two sequences may be accomplished using a mathematical algorithm, such as BLAST (basic local alignment search tool). In some embodiments, polymeric molecules are considered to be "homologous" to one another if their sequences are at least 25%, 30%, 35%, 40%, 45%, 50%, 55%, 60%, 65%, 70%, 75%, 80%, 85%, 90%, 95%, or 99% identical (e.g., 85-90%, 85-95%, 85-100%, 90-95%, 90-100%, or 95-100%).

To calculate percent identity, the sequences being compared are typically aligned in a way that gives the largest match between the sequences. One example of a computer program that can be used to determine percent identity is the GCG program package, which includes GAP (Devereux et al., 1984, Nucl. Acid Res. 12:387; Genetics Computer Group, University of Wisconsin, Madison, Wis.). The computer algorithm GAP is used to align the two polypeptides or polynucleotides for which the percent sequence identity is to be determined. The sequences are aligned for optimal matching of their respective amino acid or nucleotide (the "matched span," as determined by the algorithm). In certain embodiments, a standard comparison matrix (see, Dayhoff et al., 1978, Atlas of Protein Sequence and Structure 5:345-352 for the PAM 250 comparison matrix; Henikoff et al., 1992, Proc. Natl. Acad. Sci. U.S.A. 89:10915-10919 for the BLOSUM 62 comparison matrix) is also used by the algorithm. Other algorithms are also available for comparison of amino acid or nucleic acid sequences, comprising those available in commercial computer programs such as BLASTN for nucleotide sequences and BLASTP, gapped BLAST, and PSI-BLAST for amino acid sequences. Exemplary such programs are described in Altschul, et al., Basic local alignment search tool, J. Mol. Biol., 215(3): 403-410, 1990; Altschul, et al., Methods in Enzymology; Altschul, et al., "Gapped BLAST and PSI-BLAST: a new generation of protein database search programs," Nucleic Acids Res. 25:3389-3402, 1997; Baxevanis, et al., Bioinformatics: A Practical Guide to the Analysis of Genes and Proteins, Wiley, 1998; and Misener, et al., (eds.), Bioinformatics Methods and Protocols (Methods in Molecular Biology, Vol. 132), Humana Press, 1999. In addition to identifying similar sequences, the programs mentioned above generally provide an indication of the degree of similarity. In some embodiments, two sequences are considered to be substantially similar if at least 50%, at least 55%, at least 60%, at least 65%, at least 70%, at least 75%, at least 80%, at least 85%, at least 90%, at least 91%, at least 92%, at least 93%, at least 94%, at least 95%, at least 96%, at least 97%, at least 98%, at least 99% or more of their corresponding residues are similar and/or identical over a relevant stretch of residues (e.g., 85-90%, 85-95%, 85-100%, 90-95%, 90-100%, or 95-100%). In some embodiments, the relevant stretch is a complete sequence. In some embodiments, the relevant stretch is at least 10, at least 15, at least 20, at least 25, at least 30, at least 35, at least 40, at least 45, at least 50, at least 55, at least 60, at least 65, at least 70, at least 75, at least 80, at least 85, at least 90, at least 95, at least 100, at least 125, at least 150, at least 175, at least 200, at least 225, at least 250, at least 275, at least 300, at least 325, at least 350, at least 375, at least 400, at least 425, at least 450, at least 475, at least 500 or more residues. Sequences with substantial sequence similarity may be homologs of one another.

The term "substantial identity" or "substantially identical," when referring to a nucleic acid or fragment thereof, indicates that, when optimally aligned with appropriate nucleotide insertions or deletions with another nucleic acid (or its complementary strand), there is nucleotide sequence identity in at least about 95%, and more preferably at least about 96%, 97%, 98% or 99% of the nucleotide bases, as measured by any well-known algorithm of sequence identity, such as FASTA, BLAST or Gap, as discussed below. A nucleic acid molecule having substantial identity to a reference nucleic acid molecule may, in certain instances, encode a polypeptide having the same or substantially similar amino acid sequence as the polypeptide encoded by the reference nucleic acid molecule.

As applied to polypeptides, the term "substantial similarity" or "substantially similar" means that two peptide sequences, when optimally aligned, such as by the programs GAP or BESTFIT using default gap weights, share at least 95% sequence identity, even more preferably at least 98% or 99% sequence identity. Preferably, residue positions which are not identical differ by conservative amino acid substitutions.

The terms "improve," "increase," "inhibit," and "reduce" indicate values that are relative to a baseline or other reference measurement. In some embodiments, an appropriate reference measurement may comprise a measurement in certain system (e.g., in a single individual) under otherwise comparable conditions absent presence of (e.g., prior to and/or after) an agent or treatment, or in presence of an appropriate comparable reference agent. In some embodiments, an appropriate reference measurement may comprise a measurement in comparable system known or expected to respond in a comparable way, in presence of the relevant agent or treatment.

An "immune response" refers to the action of a cell of the immune system (for example, T lymphocytes, B lymphocytes, natural killer (NK) cells, macrophages, eosinophils, mast cells, dendritic cells and neutrophils) and soluble macromolecules produced by any of these cells or the liver (including Abs, cytokines, and complement) that results in selective targeting, binding to, damage to, destruction of, and/or elimination from a vertebrate's body of invading pathogens, cells or tissues infected with pathogens, cancerous or other abnormal cells, or, in cases of autoimmunity or pathological inflammation, normal human cells or tissues.

The term "immunotherapy" refers to the treatment of a subject afflicted with, or at risk of contracting or suffering a recurrence of, a disease by a method comprising inducing, enhancing, suppressing or otherwise modifying an immune response. Examples of immunotherapy include, but are not limited to, NK cells and T cell therapies. T cell therapy can include adoptive T cell therapy, tumor-infiltrating lymphocyte (TIL) immunotherapy, autologous cell therapy, engineered autologous cell therapy (eACT™), and allogeneic T cell transplantation. However, one of skill in the art would recognize that the conditioning methods disclosed herein would enhance the effectiveness of any transplanted T cell therapy. Examples of T cell therapies are described in U.S. Patent Publication Nos. 2014/0154228 and 2002/0006409, U.S. Pat. No. 5,728,388, and International Publication No. WO 2008/081035.

The T cells or NK cells of the immunotherapy can come from any source known in the art. For example, T cells and NK cells can be differentiated in vitro from a hematopoietic stem cell population (for example iPSCs) or can be obtained from a subject. T cells and NK cells can be obtained from, e.g., peripheral blood mononuclear cells (PBMCs), bone marrow, lymph node tissue, cord blood, thymus tissue, tissue from a site of infection, ascites, pleural effusion, spleen tissue, and tumors. In addition, the T cells can be derived from one or more T cell lines available in the art. T cells can also be obtained from a unit of blood collected from a subject using any number of techniques known to the skilled artisan, such as FICOLL™ separation and/or apheresis. Additional methods of isolating T cells for a T cell therapy are disclosed in U.S. Patent Publication No. 2013/0287748, which is herein incorporated by references in its entirety.

The term "in vitro" refers to events occurring in an artificial environment, e.g., in a test tube, reaction vessel, cell culture, etc., rather than within a multi-cellular organism. The term "in vitro cell" refers to any cell which is cultured ex vivo. In particular, an in vitro cell can include a T cell or an NK cell. The term "in vivo" refers to events that occur within a multi-cellular organism, such as a human or a non-human animal.

The term "isolated" refers to a substance that (1) has been separated from at least some components with which it was associated at an earlier time or with which the substance would otherwise be associated, and/or (2) is present in a composition that comprises a limited or defined amount or concentration of one or more known or unknown contaminants. An isolated substance, in some embodiments, may be separated from about 10%, about 20%, about 30%, about 40%, about 50%, about 60%, about 70%, about 80%, about 90%, about 91%, about 92%, about 93%, about 94%, about 95%, about 96%, about 97%, about 98%, about 99%, or more than about 99% (e.g., 85-90%, 85-95%, 85-100%, 90-95%, 90-100%, or 95-100%) of other non-substance components with which the substance was associated at an earlier time, e.g., other components or contaminants with which the substance was previously or otherwise would be associated. In certain instances, a substance is isolated if it is present in a composition that comprises a limited or reduced amount or concentration of molecules of a same or similar type. For instance, in certain instances, a nucleic acid, DNA, or RNA substance is isolated if it is present in a composition that comprises a limited or reduced amount or concentration of non-substance nucleic acid, DNA, or RNA molecules. For instance, in certain instances, a polypeptide substance is isolated if it is present in a composition that comprises a limited or reduced amount or concentration of non-substance polypeptide molecules. In certain embodiments, an amount may be, e.g., an amount measured relative to the amount of a desired substance present in a composition. In certain embodiments, a limited amount may be an amount that is no more than 100% of the amount of substance in a composition, e.g., no more than 1%, 5%, 10%, 20%, 30%, 40%, 50%, 60%, 70%, 80%, 90%, or 95% of the amount of substance in a composition (e.g., 85-90%, 85-95%, 85-100%, 90-95%, 90-100%, or 95-100%). In certain instances, a composition is pure or substantially pure with respect to a selected substance. In some embodiments, an isolated substance is about 80%, about 85%, about 90%, about 91%, about 92%, about 93%, about 94%, about 95%, about 96%, about 97%, about 98%, about 99%, or more than about 99% pure (e.g., 85-90%, 85-95%, 85-100%, 90-95%, 90-100%, or 95-100%). A substance is "pure" if it is substantially free of other components or of contaminants. In some embodiments, a substance may still be considered "isolated" or even "pure," after having been combined with certain other components such as, for example, one or more carriers or excipients (e.g., buffer, solvent, water, etc.); in such embodiments, percent isolation or purity of the substance is calculated without comprising such carriers or excipients.

"Linker" (L) or "linker domain" or "linker region" refers to an oligo- or polypeptide region from about 1 to 100 amino acids in length, for example linking together any of the domains/regions of a CAR, TCR, a Dominant Negative TGFβ receptor and/or scFv, or even one of more of those polypeptides together. Linkers may be composed of flexible residues like glycine and serine so that the adjacent protein domains are free to move relative to one another. Longer linkers may be used when it is desirable to ensure that two adjacent domains do not sterically interfere with one another. Linkers may be cleavable or non-cleavable. Examples of cleavable linkers include 2A linkers (for example T2A), 2A-like linkers or functional equivalents thereof and combinations thereof. In some embodiments, the linkers include the picornaviral 2A-like linker, CHYSEL sequences of porcine teschovirus (P2A), virus (T2A) or combinations, variants and functional equivalents thereof. In other embodiments, the linker sequences may comprise Asp-Val/Ile-Glu-X-Asn-Pro-Gly$^{(2A)}$-Pro$^{(2B)}$ domain (SEQ ID NO: 2), which results in cleavage between the 2A glycine and the 2B proline. In some examples, a cleavable linker is used to connect a CAR or TCR with a Dominant Negative TGFβ receptor. Other linkers will be apparent to those of skill in the art and may be used in connection with this disclosure. A linker may be a portion of a multi-element agent that connects different elements to one another. For example, a polypeptide comprises two or more functional or structural domains may comprise a stretch of amino acids between such domains that links them to one another. In some embodiments, a polypeptide comprising a linker element has an overall structure of the general form S1-L-S2, wherein S1 and S2 may be the same or different and represent two domains associated with one another by the linker. A linker may connect or link together any of the domains/regions of a CAR or TCR. In some embodiments, a polypeptide linker is at least 2, 3, 4, 5, 6, 7, 8, 9, 10, 11, 12, 13, 14, 15, 16, 17, 18, 19, 20, 21, 22, 23, 24, 25, 26, 27, 28, 29, 30, 35, 40, 45, 50, 55, 60, 65, 70, 75, 80, 85, 90, 95, 100 or more amino acids in length (e.g., 1 to 10, 1 to 20, 1 to 30, 1 to 40, 1 to 50, 1 to 60, 1 to 70, 1 to 80, 1 to 90, 1 to 100, 10 to 20, 10 to 30, 10 to 40, 10 to 50, 10 to 60, 10 to 70, 10 to 80, 10 to 90, or 10 to 100 amino acids in length). In some embodiments, a linker is characterized in that it tends not to adopt a rigid three-dimensional structure, and instead provides flexibility to the polypeptide. In another example it may be used to connect to or more polypeptides to be expressed, such as a CAR or TCR and a TGFβ-DNR. In some examples, the CAR, or and the TGFβ-DNR are connected by a cleavable linker.

Other linkers include non-cleavable linkers. A number of linkers are employed to realize the subject invention including "flexible linkers." The latter are rich in glycine. Klein et al., Protein Engineering, Design & Selection Vol. 27, No. 10, pp. 325-330, 2014; Priyanka et al., Protein Sci., 2013 February; 22(2): 153-167.

In some embodiments, the linker is a synthetic linker. A synthetic linker can have a length of from about 10 amino acids to about 200 amino acids, e.g., from 10 to 25 amino acids, from 25 to 50 amino acids, from 50 to 75 amino acids, from 75 to 100 amino acids, from 100 to 125 amino acids, from 125 to 150 amino acids, from 150 to 175 amino acids, or from 175 to 200 amino acids. A synthetic linker can have a length of from 10 to 30 amino acids, e.g., 10, 11, 12, 13, 14, 15, 16, 17, 18, 19, 20, 21, 22, 23, 24, 25, 26, 27, 28, 29, or 30 amino acids. A synthetic linker can have a length of from 30 to 50 amino acids, e.g., from 30 to 35 amino acids, from 35 to 40 amino acids, from 40 to 45 amino acids, or from 45 to 50 amino acids.

In some embodiments, the linker is a flexible linker. In some embodiments, the linker is rich in glycine (Gly or G) residues. In some embodiments, the linker is rich in serine (Ser or S) residues. In some embodiments, the linker is rich in glycine and serine residues.

The term "lymphocyte" includes natural killer (NK) cells, T cells, or B cells. NK cells are a type of cytotoxic (cell toxic) lymphocyte that represent a component of the inherent immune system. NK cells reject tumors and cells infected by viruses. It works through the process of apoptosis or programmed cell death. They were termed "natural killers" because they do not require activation in order to kill cells. T cells play a role in cell-mediated-immunity (no antibody involvement). Its T cell receptors (TCR) differentiate themselves from other lymphocyte types. The thymus, a specialized organ of the immune system, is primarily responsible for the T cell's maturation. There are six types of T cells, namely: Helper T cells (e.g., CD4+ cells), Cytotoxic T cells (also known as TC, cytotoxic T lymphocyte, CTL, T-killer cell, cytolytic T cell, CD8+T cells or killer T cell), Memory T cells ((i) stem memory $T_{SCM}$ cells, like naive cells, are CD45RO−, CCR7+, CD45RA+, CD62L+(L-selectin), CD27+, CD28+ and IL-7Rα+, but they also express large amounts of CD95, IL-2Rβ, CXCR3, and LFA-1, and show numerous functional attributes distinctive of memory cells); (ii) central memory $T_{CM}$ cells express L-selectin and the CCR7, they secrete IL-2, but not IFNγ or IL-4, and (iii) effector memory TEM cells, however, do not express L-selectin or CCR7 but produce effector cytokines like IFNγ and IL-4), Regulatory T cells (Tregs, suppressor T cells, or CD4+CD25+ regulatory T cells), Natural Killer T cells (NKT) and Gamma Delta T cells. B-cells, on the other hand, play a role in humoral immunity (with antibody involvement). It makes antibodies and antigens and performs the role of antigen-presenting cells (APCs) and turns into memory B-cells after activation by antigen interaction. In mammals, immature B-cells are formed in the bone marrow, where its name is derived from.

The term "neutralizing" refers to an antigen binding molecule, scFv, antibody, or a fragment thereof, that binds to a ligand and prevents or reduces the biological effect of that ligand. In some embodiments, the antigen binding molecule, scFv, antibody, or a fragment thereof, directly blocking a binding site on the ligand or otherwise alters the ligand's ability to bind through indirect means (such as structural or energetic alterations in the ligand). In some embodiments, the antigen binding molecule, scFv, antibody, or a fragment thereof prevents the protein to which it is bound from performing a biological function.

"Nucleic acid" refers to any polymeric chain of nucleotides. A nucleic acid may be DNA, RNA, or a combination thereof. In some embodiments, a nucleic acid comprises one or more natural nucleic acid residues. In some embodiments, a nucleic acid comprises of one or more nucleic acid analogs. In some embodiments, nucleic acids are prepared by one or more of isolation from a natural source, enzymatic synthesis by polymerization based on a complementary template (in vivo or in vitro), reproduction in a recombinant cell or system, and chemical synthesis. In some embodiments, a nucleic acid is at least 3, 4, 5, 6, 7, 8, 9, 10, 15, 20, 25, 30, 35, 40, 45, 50, 55, 60, 65, 70, 75, 80, 85, 90, 95, 100, 110, 120, 130, 140, 150, 160, 170, 180, 190, 20, 225, 250, 275, 300, 325, 350, 375, 400, 425, 450, 475, 500, 600, 700, 800, 900, 1000, 1500, 2000, 2500, 3000, 3500, 4000, 4500, 5000 or more residues long (e.g., 20 to 100, 20 to 500, 20 to 1000, 20 to 2000, or 20 to 5000 or more residues). In some embodiments, a nucleic acid is partly or wholly single stranded; in some embodiments, a nucleic acid is partly or wholly double stranded. In some embodiments a nucleic acid has a nucleotide sequence comprising at least one element that encodes, or is the complement of a sequence that encodes, a polypeptide.

"Operably linked" refers to a juxtaposition where the components described are in a relationship permitting them to function in their intended manner. For example, a control element "operably linked" to a functional element is associated in such a way that expression and/or activity of the functional element is achieved under conditions compatible with the control element. In embodiments, a promotor is operably linked to nucleic a.

A "patient" includes any human who is afflicted with a cancer (e.g., multiple myeloma). The terms "subject" and "patient" are used interchangeably herein.

The terms "peptide," "polypeptide," and "protein" are used interchangeably, and refer to a compound comprised of amino acid residues covalently linked by peptide bonds. A protein or peptide contains at least two amino acids, and no limitation is placed on the maximum number of amino acids that can comprise a protein's or peptide's sequence. Polypeptides include any peptide or protein comprising two or more amino acids joined to each other by peptide bonds. As used herein, the term refers to both short chains, which also commonly are referred to in the art as peptides, oligopeptides and oligomers, for example, and to longer chains, which generally are referred to in the art as proteins, of which there are many types. "Polypeptides" include, for example, biologically active fragments, substantially homologous polypeptides, oligopeptides, homodimers, heterodimers, variants of polypeptides, modified polypeptides, derivatives, analogs, fusion proteins, among others. The polypeptides include natural peptides, recombinant peptides, synthetic peptides, or a combination thereof.

The term "pharmaceutically acceptable" refers to a molecule or composition that, when administered to a recipient, is not deleterious to the recipient thereof, or that any deleterious effect is outweighed by a benefit to the recipient thereof. With respect to a carrier, diluent, or excipient used to formulate a composition as disclosed herein, a pharmaceutically acceptable carrier, diluent, or excipient must be compatible with the other ingredients of the composition and not deleterious to the recipient thereof, or any deleterious effect must be outweighed by a benefit to the recipient. The term "pharmaceutically acceptable carrier" means a pharmaceutically-acceptable material, composition or vehicle, such as a liquid or solid filler, diluent, excipient, or solvent encapsulating material, involved in carrying or transporting an agent from one portion of the body to another (e.g., from one organ to another). Each carrier present in a pharmaceutical composition must be "acceptable" in the sense of being compatible with the other ingredients of the formulation and not deleterious to the patient, or any deleterious effect must be outweighed by a benefit to the recipient. Some examples of materials which may serve as pharmaceutically acceptable carriers comprise: sugars, such as lactose, glucose and sucrose; starches, such as corn starch and potato starch; cellulose, and its derivatives, such as sodium carboxymethyl cellulose, ethyl cellulose and cellulose acetate; powdered tragacanth; malt; gelatin; talc; excipients, such as cocoa butter and suppository waxes; oils, such as peanut oil, cottonseed oil, safflower oil, sesame oil, olive oil, corn oil and soybean oil; glycols, such as propylene glycol; polyols, such as glycerin, sorbitol, mannitol and polyethylene glycol; esters, such as ethyl oleate and ethyl laurate; agar; buffering agents, such as magnesium hydroxide and aluminum hydroxide; alginic acid; pyrogen-free water; isotonic saline; Ringer's solution; ethyl alcohol; pH buffered solutions; polyesters, polycarbonates and/or polyanhydrides; and other non-toxic compatible substances employed in pharmaceutical formulations.

The term "pharmaceutical composition" refers to a composition in which an active agent is formulated together with one or more pharmaceutically acceptable carriers. In some embodiments, the active agent is present in a unit dose amount appropriate for administration in a therapeutic regimen that shows a statistically significant probability of achieving a predetermined therapeutic effect when administered to a relevant subject or population. In some embodiments, a pharmaceutical composition may be formulated for administration in solid or liquid form, comprising, without limitation, a form adapted for the following: oral administration, for example, drenches (aqueous or non-aqueous solutions or suspensions), tablets, e.g., those targeted for buccal, sublingual, and systemic absorption, boluses, powders, granules, pastes for application to the tongue; parenteral administration, for example, by subcutaneous, intramuscular, intravenous or epidural injection as, for example, a sterile solution or suspension, or sustained-release formulation; topical application, for example, as a cream, ointment, or a controlled-release patch or spray applied to the skin, lungs, or oral cavity; intravaginally or intrarectally, for example, as a pessary, cream, or foam; sublingually; ocularly; transdermally; or nasally, pulmonary, and to other mucosal surfaces.

The term "proliferation" refers to an increase in cell division, either symmetric or asymmetric division of cells. In some embodiments, "proliferation" refers to the symmetric or asymmetric division of T cells. "Increased proliferation" occurs when there is an increase in the number of cells in a treated sample compared to cells in a non-treated sample.

The term "reference" describes a standard or control relative to which a comparison is performed. For example, in some embodiments, an agent, animal, individual, population, sample, sequence, or value of interest is compared with a reference or control that is an agent, animal, individual, population, sample, sequence, or value. In some embodiments, a reference or control is tested, measured, and/or determined substantially simultaneously with the testing, measuring, or determination of interest. In some embodiments, a reference or control is a historical reference or control, optionally embodied in a tangible medium. Generally, a reference or control is determined or characterized under comparable conditions or circumstances to those under assessment. When sufficient similarities are present to justify reliance on and/or comparison to a selected reference or control.

"Regulatory T cells" ("Treg", "Treg cells", or "Tregs") refer to a lineage of CD4+T lymphocytes that participate in controlling certain immune activities, e.g., autoimmunity, allergy, and response to infection. Regulatory T cells may regulate the activities of T cell populations, and may also influence certain innate immune system cell types. Tregs may be identified by the expression of the biomarkers CD4, CD25 and Foxp3, and low expression of CD127. Naturally occurring Treg cells normally constitute about 5-10% of the peripheral CD4+T lymphocytes. However, Treg cells within a tumor microenvironment (i.e., tumor-infiltrating Treg cells), Treg cells may make up as much as 20-30% of the total CD4+T lymphocyte population.

The term "sample" generally refers to an aliquot of material obtained or derived from a source of interest. In some embodiments, a source of interest is a biological or environmental source. In some embodiments, a source of interest may comprise a cell or an organism, such as a cell population, tissue, or animal (e.g., a human). In some embodiments, a source of interest comprises biological tissue or fluid. In some embodiments, a biological tissue or fluid may comprise amniotic fluid, aqueous humor, ascites, bile, bone marrow, blood, breast milk, cerebrospinal fluid, cerumen, chyle, chime, ejaculate, endolymph, exudate, feces, gastric acid, gastric juice, lymph, mucus, pericardial fluid, perilymph, peritoneal fluid, pleural fluid, pus, rheum, saliva, sebum, semen, serum, smegma, sputum, synovial fluid, sweat, tears, urine, vaginal secretions, vitreous humor, vomit, and/or combinations or component(s) thereof. In some embodiments, a biological fluid may comprise an intracellular fluid, an extracellular fluid, an intravascular fluid (blood plasma), an interstitial fluid, a lymphatic fluid, and/or a transcellular fluid. In some embodiments, a biological fluid may comprise a plant exudate. In some embodiments, a biological tissue or sample may be obtained, for example, by aspirate, biopsy (e.g., fine needle or tissue biopsy), swab (e.g., oral, nasal, skin, or vaginal swab), scraping, surgery, washing or lavage (e.g., bronchoalveolar, ductal, nasal, ocular, oral, uterine, vaginal, or other washing or lavage). In some embodiments, a biological sample comprises cells obtained from an individual. In some embodiments, a sample is a "primary sample" obtained directly from a source of interest by any appropriate means. In some embodiments, as will be clear from context, the term "sample" refers to a preparation that is obtained by processing (e.g., by removing one or more components of and/or by adding one or more agents to) a primary sample. Such a "processed sample" may comprise, for example nucleic acids or proteins extracted from a sample or obtained by subjecting a primary sample to one or more techniques such as amplification or reverse transcription of nucleic acid, isolation and/or purification of certain components, etc.

"Single chain variable fragment", "single-chain antibody variable fragments" or "scFv" antibodies refer to forms of antibodies comprising the variable regions of only the heavy and light chains, connected by a linker peptide.

The term "stage of cancer" refers to a qualitative or quantitative assessment of the level of advancement of a cancer. In some embodiments, criteria used to determine the stage of a cancer may comprise, without limitation, one or more of where the cancer is located in a body, tumor size, whether the cancer has spread to lymph nodes, whether the cancer has spread to one or more different parts of the body, etc. In some embodiments, cancer may be staged using the so-called TNM System, according to which T refers to the size and extent of the main tumor, usually called the primary tumor; N refers to the number of nearby lymph nodes that have cancer; and M refers to whether the cancer has metastasized. In some embodiments, a cancer may be referred to as Stage 0 (abnormal cells are present without having spread to nearby tissue, also called carcinoma in situ, or CIS; CIS is not cancer, though could become cancer), Stage I-III (cancer is present; the higher the number, the larger the tumor and the more it has spread into nearby tissues), or Stage IV (the cancer has spread to distant parts of the body). In some embodiments, a cancer may be assigned to a stage selected from the group consisting of: in situ; localized (cancer is limited to the place where it started, with no sign that it has spread); regional (cancer has spread to nearby lymph nodes, tissues, or organs): distant (cancer has spread to distant parts of the body); and unknown (there is not enough information to determine the stage).

"Stimulation," refers to a primary response induced by binding of a stimulatory molecule with its cognate ligand, wherein the binding mediates a signal transduction event. A "stimulatory molecule" is a molecule on a T cell, e.g., the T cell receptor (TCR)/CD3 complex, that specifically binds with a cognate stimulatory ligand present on an antigen present cell. A "stimulatory ligand" is a ligand that when present on an antigen presenting cell (e.g., an APC, a dendritic cell, a B-cell, and the like) can specifically bind with a stimulatory molecule on a T cell, thereby mediating a primary response by the T cell, including, but not limited to, activation, initiation of an immune response, proliferation, and the like. Stimulatory ligands include, but are not limited to, an anti-CD3 antibody (such as OKT3), an MHC Class I molecule loaded with a peptide, a superagonist anti-CD2 antibody, and a superagonist anti-CD28 antibody.

The phrase "therapeutic agent" may refer to any agent that elicits a desired pharmacological effect when administered to an organism. In some embodiments, an agent is considered to be a therapeutic agent if it demonstrates a statistically significant effect across an appropriate population. In some embodiments, the appropriate population may be a population of model organisms or human subjects. In some embodiments, an appropriate population may be defined by various criteria, such as a certain age group, gender, genetic background, preexisting clinical conditions, in accordance with presence or absence of a biomarker, etc. In some embodiments, a therapeutic agent is a substance that may be used to alleviate, ameliorate, relieve, inhibit, prevent, delay onset of, reduce severity of, and/or reduce incidence of one or more symptoms or features of a disease, disorder, and/or condition. In some embodiments, a therapeutic agent is an agent that has been or is required to be approved by a government agency before it may be marketed for administration to humans. In some embodiments, a therapeutic agent is an agent for which a medical prescription is required for administration to humans.

A "therapeutically effective amount," "effective dose," "effective amount," or "therapeutically effective dosage" of a therapeutic agent, e.g., engineered CAR T cells or NK cells, is any amount that, when used alone or in combination with another therapeutic agent, protects a subject against the onset of a disease or promotes disease regression evidenced by a decrease in severity of disease symptoms, an increase in frequency and duration of disease symptom-free periods, or a prevention of impairment or disability due to the disease affliction. The ability of a therapeutic agent to promote disease regression can be evaluated using a variety of methods known to the skilled practitioner, such as in human subjects during clinical trials, in animal model systems predictive of efficacy in humans, or by assaying the activity of the agent in in vitro assays.

The terms "transduction" and "transduced" refer to the process whereby foreign DNA is introduced into a cell via viral vector (see Jones et al., "Genetics: principles and analysis," Boston: Jones & Bartlett Publ. (1998)). In some embodiments, the vector is a retroviral vector, a DNA vector, a RNA vector, an adenoviral vector, a baculoviral vector, an Epstein Barr viral vector, a papovaviral vector, a vaccinia viral vector, a herpes simplex viral vector, an adenovirus associated vector, a lentiviral vector, or any combination thereof.

"Transformation" refers to any process by which exogenous DNA is introduced into a host cell. Transformation may occur under natural or artificial conditions using various methods. Transformation may be achieved using any known method for the insertion of foreign nucleic acid sequences into a prokaryotic or eukaryotic host cell. In some embodiments, some transformation methodology is selected based on the host cell being transformed and/or the nucleic acid to be inserted. Methods of transformation may comprise, yet are not limited to, viral infection, electroporation, and lipofection. In some embodiments, a "transformed" cell is stably transformed in that the inserted DNA is capable of replication either as an autonomously replicating plasmid or as part of the host chromosome. In some embodiments, a transformed cell may express introduced nucleic acid.

"Treatment" or "treating" of a subject refers to any type of intervention or process performed on, or the administration of an active agent to, the subject with the objective of reversing, alleviating, ameliorating, inhibiting, slowing down or preventing the onset, progression, development, severity or recurrence of a symptom, complication or condition, or biochemical indicia associated with a disease. In one embodiment, "treatment" or "treating" includes a partial remission. In another embodiment, "treatment" or "treating" includes a complete remission. In some embodiments, treatment may be of a subject who does not exhibit signs of the relevant disease, disorder and/or condition and/or of a subject who exhibits only early signs of the disease, disorder, and/or condition. In some embodiments, such treatment may be of a subject who exhibits one or more established signs of the relevant disease, disorder and/or condition. In some embodiments, treatment may be of a subject who has been diagnosed as suffering from the relevant disease, disorder, and/or condition. In some embodiments, treatment may be of a subject known to have one or more susceptibility factors that are statistically correlated with increased risk of development of the relevant disease, disorder, and/or condition.

The term "vector" refers to a recipient nucleic acid molecule modified to comprise or incorporate a provided nucleic acid sequence. One type of vector is a "plasmid," which refers to a circular double stranded DNA molecule into which additional DNA may be ligated. Another type of vector is a viral vector, wherein additional DNA segments may be ligated into the viral genome. Certain vectors are capable of autonomous replication in a host cell into which they are introduced (e.g., bacterial vectors having a bacterial origin of replication and episomal mammalian vectors). Other vectors (e.g., non-episomal mammalian vectors) may be integrated into the genome of a host cell upon introduction into the host cell, and thereby are replicated along with the host genome. Moreover, certain vectors comprise sequences that direct expression of inserted genes to which they are operatively linked. Such vectors may be referred to herein as "expression vectors." Standard techniques may be used for engineering of vectors, e.g., as found in Sambrook et al., Molecular Cloning: A Laboratory Manual (2d ed., Cold Spring Harbor Laboratory Press, Cold Spring Harbor, N.Y. (1989)), which is incorporated herein by reference.

The term "sequence" refers to a nucleotide sequence of any length, which can be DNA or RNA; can be linear, circular or branched and can be either single-stranded or double stranded. The term "donor sequence" refers to a nucleotide sequence that is inserted into a genome. A donor sequence can be of any length, for example between 2 and 10,000 nucleotides in length (or any integer value therebetween or thereabove), preferably between about 100 and 1,000 nucleotides in length (or any integer therebetween), more preferably between about 200 and 500 nucleotides in length.

A "gene," for the purposes of the present disclosure, includes a DNA region encoding a gene product (see infra), as well as all DNA regions which regulate the production of the gene product, whether or not such regulatory sequences are adjacent to coding and/or transcribed sequences. Accordingly, a gene includes, but is not necessarily limited to, promoter sequences, terminators, translational regulatory sequences such as ribosome binding sites and internal ribosome entry sites, enhancers, silencers, insulators, boundary elements, replication origins, matrix attachment sites and locus control regions.

A "transmembrane domain" is a domain of a polypeptide that includes at least one contiguous amino acid sequence that traverses a lipid bilayer when present in the corresponding endogenous polypeptide when expressed in a mammalian cell. For example, a transmembrane domain can include one, two, three, four, five, six, seven, eight, nine, or ten contiguous amino acid sequences that each traverse a lipid bilayer when present in the corresponding endogenous polypeptide when expressed in a mammalian cell. A transmembrane domain can, e.g., include at least one (e.g., two, three, four, five, six, seven, eight, nine, or ten) contiguous amino acid sequence (that traverses a lipid bilayer when present in the corresponding endogenous polypeptide when expressed in a mammalian cell) that has α-helical secondary structure in the lipid bilayer. In some embodiments, a transmembrane domain can include two or more contiguous amino acid sequences (that each traverse a lipid bilayer when present in the corresponding endogenous polypeptide when expressed in a mammalian cell) that form a β-barrel secondary structure in the lipid bilayer. Non-limiting examples of transmembrane domains are described herein. Additional examples of transmembrane domains are known in the art.

The phrase "extracellular side of the plasma membrane" when used to describe the location of a polypeptide means that the polypeptide includes at least one transmembrane domain that traverses the plasma membrane and at least one domain (e.g., at least one antigen-binding domain) that is located in the extracellular space.

The disclosure may employ, unless indicated specifically to the contrary, methods of chemistry, biochemistry, organic chemistry, molecular biology, microbiology, recombinant DNA techniques, genetics, immunology, and cell biology that are within the skill of the art, many of which are described below for the purpose of illustration. Such techniques are explained fully in the literature. See, e.g., Sambrook, et al., *Molecular Cloning: A Laboratory Manual* (3rd Edition, 2001); Maniatis et al., *Molecular Cloning: A Laboratory Manual* (1982); Ausubel et al., *Current Protocols in Molecular Biology* (John Wiley and Sons, updated July 2008); *Short Protocols in Molecular Biology: A Compendium of Methods from Current Protocols in Molecular Biology*, Greene Pub. Associates and Wiley-Interscience; Glover, *DNA Cloning: A Practical Approach*, vol. I & II (IRL Press, Oxford, 1985); Anand, *Techniques for the Analysis of Complex Genomes*, (Academic Press, New York, 1992); *Transcription and Translation* (B. Hames & S. Higgins, Eds., 1984); Perbal, *A Practical Guide to Molecular Cloning* (1984); Harlow and Lane, *Antibodies*, (Cold Spring Harbor Laboratory Press, Cold Spring Harbor, N.Y., 1998) *Current Protocols in Immunology Q*. E. Coligan, A. M. Kruisbeek, D. H. Margulies, E. M. Shevach and W. Strober, eds., 1991); *Annual Review of Immunology*; as well as monographs in journals such as *Advances in Immunology*.

The present disclosure provides antigen binding agents, such as antibodies, chimeric antigen receptors (CARs) and T cell receptors (TCRs) comprising at least a single antigen binding domain that binds to glypican 3 (GPC3), referred to herein as a GPC3 binding domain. Among other things, the present disclosure provides methods and compositions useful for treatment of cancer and/or for initiating or modulating immune responses. In various embodiments, the GPC3 binding domain is an scFv. Exemplary GPC3 binding domain amino acid sequences, and nucleic acid sequences encoding the same, are provided herein, for example in Tables 4-8. In some embodiments, the GPC3 binding domain of the present disclosure is comprised by a chimeric antigen receptor (CAR). In some embodiments, the GPC3 binding domain of the present disclosure is comprised by a T cell receptor (TCR). In some embodiments, an antigen binding agent of the present disclosure is an engineered T cell receptor (TCR). In some embodiments, the CARs and/or TCRs are expressed with a dominant negative TFGβ Receptor (DN TFGβ R). In some embodiments, the CARs and/or TCRs are expressed with a membrane bound interleukin 15 (IL-15), IL-15Rα sushi-domain chimeric receptor. Disclosed are antibodies and fragments thereof that include a GPC3 binding domain, such as disclosed in Tables 4-8.

Various embodiments of the present disclosure provide a vector encoding a GPC3 binding domain or GPC3 binding agent provided herein, e.g., a vector encoding a GPC3 binding CAR or TCR. Various embodiments of the present disclosure provide a vector encoding a DN TFGβ R, e.g., a vector encoding GPC3 binding CAR and a DN TFGβ R. In some embodiments the DN TFGβ R is encoded in a separate vector from the vector encoding the GPC3 binding CAR or TCR. In some embodiments the DN TFGβ R is encoded in the same vector encoding the GPC3 binding CAR or TCR. Various embodiments of the present disclosure provide a vector encoding an IL-15- IL-15Rα sushi-domain chimeric receptor, e.g., a vector encoding a GPC3 binding CAR and an IL-15-IL-15Rα sushi-domain chimeric receptor. In some embodiments the IL-15-IL-15Rα sushi-domain chimeric receptor is encoded in a separate vector from the vector encoding the GPC3 binding CAR or TCR. In some embodiments the IL-15-IL-15Rα sushi-domain chimeric receptor is encoded in the same vector encoding the GPC3 binding CAR or TCR.

Various embodiments of the present disclosure provide a GPC3 binding agent that is a cell encoding or expressing a GPC3 binding CAR or TCR, e.g., a T cell or NK cell engineered to encode or express a GPC3 binding CAR or TCR. The present disclosure provides immune cells genetically modified with an integrated gene, e.g., a nucleotide sequence encoding a GPC3 binding CAR or TCR (e.g., a constitutive expression construct and/or an inducible expression construct that comprises such nucleotide sequence). In some embodiments, the immune cells are further engineered to express a DN TFGβ R. In embodiments, the immune cells are further engineered to express an IL-15-IL-15Rα sushi-domain chimeric receptor. In some embodiments, the present disclosure provides methods of treating a subject having a tumor, such as HCC, comprising administering to the subject a GPC3 binding agent therapy described herein and/or a protein therapeutic described herein. In some embodiments, methods further comprise administration of one or more additional therapies (e.g., a second binding agent (e.g., CAR T cell, CAR-NK cell, TCR-T cell, TIL cell, allogeneic NK cell, and autologous NK cell), an antibody-drug conjugate, an antibody, a bispecific antibody, a T cell-engaging bispecific antibody, an engineered antibody, and/or a polypeptide described herein).

A GPC3 binding domain of the present disclosure may comprise antigen-binding sequences as found in an antibody described herein, e.g. mAbs 1-5 as disclosed in Tables 4-8. In some instances, a GPC3 binding domain of the present disclosure comprises a GPC3 binding domain described herein, such as an scFv. Unless otherwise indicated, it is to be appreciated the references to GPC3 in the present disclosure relates to human GPC3.

Glypican 3 (GPC3, NCBI Gene ID No. 2719 as updated Apr. 10, 2021, which is hereby incorporated herein by reference in its entirety) is a member of the glypican-related integral membrane proteoglycan family (GRIPS). GPC3 contains a core protein anchored to the cytoplasmic membrane via a glycosyl phosphatidylinositol linkage. GPC3 is expressed in a number of cancer types, including hepatocellular carcinoma (HCC) and lung squamous cell carcinoma (SCC).

In various embodiments, a GPC3 binding domain of the present disclosure comprises at least one heavy chain CDR (HCDR) provided herein, e.g., at least one HCDR disclosed in Table 4. In various embodiments, a GPC3 binding domain of the present disclosure comprises two HCDRs provided herein, e.g., at least two HCDRs disclosed in Table 4. In various embodiments, a GPC3 binding domain of the present disclosure comprises three HCDRs provided herein, e.g., three HCDRs disclosed in Table 4. In various embodiments, a GPC3 binding domain of the present disclosure comprises at least one light chain CDR (LCDR) provided herein, e.g., at least one LCDR disclosed in Table 4. In various embodiments, a GPC3 binding domain of the present disclosure comprises two LCDRs provided herein, e.g., at least two LCDRs disclosed in Table 4. In various embodiments, a GPC3 binding domain of the present disclosure comprises three LCDRs provided herein, e.g., three LCDRs disclosed in Table 4.

In various embodiments, a GPC3 binding domain of the present disclosure comprises at least one HCDR provided herein, e.g., at least one HCDR disclosed in Table 4, and at least one LCDR provided herein, e.g., at least one LCDR disclosed in Table 4. In various embodiments, a GPC3 binding domain of the present disclosure comprises two HCDRs provided herein, e.g., at least two HCDRs disclosed in Table 4, and two LCDRs provided herein, e.g., at least two LCDRs disclosed in Table 4. In various embodiments, a GPC3 binding domain of the present disclosure comprises three HCDRs provided herein, e.g., three HCDRs disclosed in Table 4, and three LCDRs provided herein, e.g., three LCDRs disclosed in Table 4.

In various embodiments, a GPC3 binding domain of the present disclosure comprises at least one heavy chain framework region (heavy chain FR) of a heavy chain variable domain disclosed herein, e.g., at least one heavy chain FR of a heavy chain variable domain disclosed in any one of Tables 4-8. In various embodiments, a GPC3 binding domain of the present disclosure comprises two heavy chain FRs of a heavy chain variable domain disclosed herein, e.g., at least two heavy chain FRs of a heavy chain variable domain disclosed in any one of Tables 4-8. In various embodiments, a GPC3 binding domain of the present disclosure comprises three heavy chain FRs of a heavy chain variable domain disclosed herein, e.g., three heavy chain FRs of a heavy chain variable domain disclosed in any one of Tables 4-8.

In various embodiments, a GPC3 binding domain of the present disclosure comprises at least one light chain FR of a light chain variable domain disclosed herein, e.g., at least one light chain FR of a light chain variable domain disclosed in any one of Tables 4-8. In various embodiments, a GPC3 binding domain of the present disclosure comprises two light chain FRs of a light chain variable domain disclosed herein, e.g., at least two light chain FRs of a light chain variable domain disclosed in any one of Tables 4-8. In various embodiments, a GPC3 binding domain of the present disclosure comprises three light chain FRs of a light chain variable domain disclosed herein, e.g., three light chain FRs of a light chain variable domain disclosed in any one of Tables 4-8.

In various embodiments, a GPC3 binding domain of the present disclosure comprises at least one heavy chain FR of a heavy chain variable domain disclosed herein, e.g., at least one heavy chain FR of a heavy chain variable domain disclosed in any one of Tables 4-8, and at least one light chain FR of a light chain variable domain disclosed herein, e.g., at least one light chain FR of a light chain variable domain disclosed in any one of Tables 4-8. In various embodiments, a GPC3 binding domain of the present disclosure comprises one heavy chain FR of a heavy chain variable domain disclosed herein, e.g., at least one heavy chain FR of a heavy chain variable domain disclosed in any one of Tables 4-8, and one light chain FR of a light chain variable domain disclosed herein, e.g., derived from the same Table of Tables 4-8 as the heavy chain FR(s). In various embodiments, a GPC3 binding domain of the present disclosure comprises two heavy chain FRs of a heavy chain variable domain disclosed herein, e.g., at least two heavy chain FRs of a heavy chain variable domain disclosed in any one of Tables 4-8, and two light chain FRs of a light chain variable domain disclosed herein, e.g., at least two light chain FRs of a light chain variable domain disclosed in any one of Tables 4-8. In various embodiments, a GPC3 binding domain of the present disclosure comprises two heavy chain FRs of a heavy chain variable domain disclosed herein, e.g., at least two heavy chain FRs of a heavy chain variable domain disclosed in any one of Tables 4-8, and two light chain FRs of a light chain variable domain disclosed herein, e.g., derived from the same Table of Tables 4-8 as the heavy chain FR(s). In various embodiments, a GPC3 binding domain of the present disclosure comprises three heavy chain FRs of a heavy chain variable domain disclosed herein, e.g., three heavy chain FRs of a heavy chain variable domain disclosed in any one of Tables 4-8, and three light chain FRs of a light chain variable domain disclosed herein, e.g., three light chain FRs of a light chain variable domain disclosed in any one of Tables 4-8. In various embodiments, a GPC3 binding domain of the present disclosure comprises three heavy chain FRs of a heavy chain variable domain disclosed herein, e.g., three light chain FRs of a light chain variable domain disclosed in any one of Tables 4-8, and three light chain FRs derived from the same Table of Tables 4-8 as the heavy chain FR(s).

Exemplary antibody sequences provided in Tables 4-8 are suitable for use in any antibody format, comprising, e.g., a tetrameric antibody, a monospecific antibody, a bispecific antibody, an antigen binding fragment, or a binding domain. Heavy chain variable domains and light chain variable domains and portions thereof provided in Tables 4-8 may be comprised in a GPC3 binding domain.

In various embodiments, a GPC3 binding domain of the present disclosure comprises one, two, or three FRs that together or each individually have at least 75% identity (e.g., at least 75%, at least 80%, at least 90%, at least 95%, or 100%, e.g., 85-90%, 85-95%, 85-100%, 90-95%, 90-100%, or 95-100%) to corresponding FR(s) of a heavy chain variable domain of a heavy chain variable domain disclosed in in any one of Tables 4-8. In various embodiments, a GPC3 binding domain of the present disclosure comprises one, two, or three FRs that together or each individually have at least 75% identity (e.g., at least 75%, at least 80%, at least 90%, at least 95%, or 100%) to corresponding FR(s) of a light chain variable domain of a light chain variable domain disclosed in any one of Tables 4-8.

In various embodiments, a GPC3 binding domain of the present disclosure comprises at least one heavy chain variable domain having at least 75% sequence identity to a heavy chain variable domain disclosed in any one of Tables 4-8 (e.g., at least 75%, at least 80%, at least 90%, at least 95%, or 100% identity; e.g., 85-90%, 85-95%, 85-100%, 90-95%, 90-100%, or 95-100%). In various embodiments, a GPC3 binding domain of the present disclosure comprises two heavy chain variable domains each having at least 75% sequence identity to a heavy chain variable domain disclosed in Tables 4-8 (e.g., at least 75%, at least 80%, at least 90%, at least 95%, or 100% identity; e.g., 85-90%, 85-95%, 85-100%, 90-95%, 90-100%, or 95-100%), which heavy chain variable domains may be same or different.

In various embodiments, a GPC3 binding domain of the present disclosure comprises at least one light chain variable domain having at least 75% sequence identity to a light chain variable domain disclosed in any one of Tables 4-8 (e.g., at least 75%, at least 80%, at least 90%, at least 95%, or 100% identity; e.g., 85-90%, 85-95%, 85-100%, 90-95%, 90-100%, or 95-100%). In various embodiments, a GPC3 binding domain of the present disclosure comprises two light chain variable domains each having at least 75% sequence identity to a light chain variable domain disclosed in any one of Tables 4-8 (e.g., at least 75%, at least 80%, at least 90%, at least 95%, or 100% identity; e.g., 85-90%, 85-95%, 85-100%, 90-95%, 90-100%, or 95-100%), which light chain variable domains may be same or different.

In various embodiments, a GPC3 binding domain of the present disclosure comprises at least one heavy chain variable domain having at least 75% sequence identity to a heavy chain variable domain disclosed in any one of Tables 4-8 (e.g., at least 75%, at least 80%, at least 90%, at least 95%, or 100% identity; e.g., 85-90%, 85-95%, 85-100%, 90-95%, 90-100%, or 95-100%) and at least one light chain variable domain having at least 75% sequence identity to a light chain variable domain disclosed in any one of Tables 4-8 (e.g., at least 75%, at least 80%, at least 90%, at least 95%, or 100% identity; e.g., 85-90%, 85-95%, 85-100%, 90-95%, 90-100%, or 95-100%). In certain embodiments, a GPC3 binding domain of the present disclosure comprises one heavy chain variable domain having at least 75% sequence identity to a heavy chain variable domain disclosed in any one of Tables 4-8 (e.g., at least 75%, at least 80%, at least 90%, at least 95%, or 100% identity; e.g., 85-90%, 85-95%, 85-100%, 90-95%, 90-100%, or 95-100%) and one light chain variable domain having at least 75% sequence identity to a light chain variable domain disclosed in any one of Tables 4-8 (e.g., at least 75%, at least 80%, at least 90%, at least 95%, or 100% identity; e.g., 85-90%, 85-95%, 85-100%, 90-95%, 90-100%, or 95-100%), where the heavy chain variable domain and light chain variable domain are optionally derived from the same Table of Tables 4-8.

In various embodiments, a GPC3 binding domain of the present disclosure comprises two heavy chain variable domains each having at least 75% sequence identity to a heavy chain variable domain disclosed in Tables 4-8 (e.g., at least 75%, at least 80%, at least 90%, at least 95%, or 100% identity; e.g., 85-90%, 85-95%, 85-100%, 90-95%, 90-100%, or 95-100%) and two light chain variable domains each having at least 75% sequence identity to a light chain variable domain disclosed in Tables 4-8 (e.g., at least 75%, at least 80%, at least 90%, at least 95%, or 100% identity; e.g., 85-90%, 85-95%, 85-100%, 90-95%, 90-100%, or 95-100%), where, in various embodiments, (i) each of the heavy chain variable domains may be same or different; (ii) each of the light chain variable domains may be same or different; (iii) at least one heavy chain variable domain and at least one light chain variable domain may be derived from the same Table of Tables 4-8; or (iv) the two heavy chain variable domains and the two light chain variable domains are all derived from the same Table of Tables 4-8.

Each of Tables 4-8 represents the heavy chain variable domain and light chain variable domain sequences of an exemplary antibody, comprising (i) the heavy chain variable domain of the exemplary antibody; (ii) a DNA sequence encoding the heavy chain variable domain (iii) three heavy chain variable domain CDRs of the heavy chain variable domain, according to IMGT, Kabat, and Chothia numbering; (iv) the light chain variable domain of the exemplary antibody; (v) a DNA sequence encoding the light chain variable domain; and (vi) three light chain variable domain CDRs of the light chain variable domain, according to IMGT, Kabat, and Chothia numbering. Information provided in each table provides framework amino acid sequences, as well as nucleotide sequences encoding each CDR amino acid sequence and nucleotide sequences encoding corresponding FR amino acid sequence.

In various embodiments, a GPC3 binding domain may comprise a heavy chain variable domain of the present disclosure (e.g., having at least 75% sequence identity to a heavy chain variable domain of any one of Tables 4-8, e.g., at least 80%, 85%, 90%, 95%, or 100% identity; e.g., 85-90%, 85-95%, 85-100%, 90-95%, 90-100%, or 95-100%), a light chain variable domain of the present disclosure (e.g., having at least 75% sequence identity to a light chain variable domain of any one of Tables 4-8, e.g., at least 80%, 85%, 90%, 95%, or 100% identity; e.g., 85-90%, 85-95%, 85-100%, 90-95%, 90-100%, or 95-100%), and a linker (e.g., a linker according to SEQ ID NO: 59. In various embodiments a GPC3 binding domain may comprise a leader sequence, a heavy chain variable domain of the present disclosure (e.g., having at least 75% sequence identity to a heavy chain variable domain of any one of Tables 4-8, e.g., at least 80%, 85%, 90%, 95%, or 100% identity; e.g., 85-90%, 85-95%, 85-100%, 90-95%, 90-100%, or 95-100%), a light chain variable domain of the present disclosure (e.g., having at least 75% sequence identity to a light chain variable domain of any one of Tables 4-8, e.g., at least 80%, 85%, 90%, 95%, or 100% identity; e.g., 85-90%, 85-95%, 85-100%, 90-95%, 90-100%, or 95-100%), and a linker. If provided with an amino acid or nucleotide sequence of a GPC3 binding domain comprising a heavy chain variable domain of the present disclosure and a light chain variable domain of the present disclosure, the linker joining the two variable domains will be apparent from the sequence in view of the present disclosure. If provided with an amino acid or nucleotide sequence of a GPC3 binding domain comprising a heavy chain variable domain of the present disclosure and a light chain variable domain of the present disclosure, the leader sequence will be apparent in view of the present disclosure. For the avoidance of doubt, a heavy chain variable domain and a light chain variable domain of the present disclosure may be present in any orientation, e.g., an orientation in which the heavy chain variable domain is C terminal of the light chain variable domain or in which the heavy chain variable domain is N terminal of the light chain variable domain. In various embodiments a GPC3 binding domain may comprise a linker according to SEQ ID NO: 59.

In certain embodiments, a GPC3 binding domain of the present disclosure comprises an a GPC3 binding domain that comprises a heavy chain variable domain of the present disclosure, a light chain variable domain of the present disclosure, and a linker having at least 75% sequence identity to SEQ ID NO: 59 (e.g., at least 75%, at least 80%, at least 90%, at least 95%, or 100% identity; e.g., 85-90%, 85-95%, 85-100%, 90-95%, 90-100%, or 95-100%). In certain embodiments, a GPC3 binding domain of the present disclosure comprises a GPC3 binding domain that comprises a linker according to SEQ ID NO: 59. In certain embodiments, a GPC3 binding domain of the present disclosure comprises a GPC3 binding domain that comprises a heavy chain variable domain of the present disclosure, a light chain variable domain of the present disclosure, and a leader sequence having at least 75% sequence identity to SEQ ID NO: 79 (e.g., at least 75%, at least 80%, at least 90%, at least 95%, or 100% identity; e.g., 85-90%, 85-95%, 85-100%, 90-95%, 90-100%, or 95-100%). In certain embodiments, a GPC3 binding domain of the present disclosure comprises a GPC3 binding domain that comprises a CSF2RA leader sequence according to SEQ ID NO: 79

(MLLLVTSLLLCELPHPAFLLIP; SEQ ID NO: 79). In embodiments a leader sequence may be encoded by nucleic acid sequence at least 75% sequence identity to ATGCTGT-TATTAGTGACCTCTTTACTGCTGTGTGAGCTGCCC-CACCCCGCTTTCCTCCTCATCCCG (SEQ ID NO: 82) (e.g., at least 75%, at least 80%, at least 90%, at least 95%, or 100% identity; e.g., 85-90%, 85-95%, 85-100%, 90-95%, 90-100%, or 95-100%). In certain embodiments, a GPC3 binding domain of the present disclosure comprises a GPC3 binding domain that comprises a heavy chain variable domain of the present disclosure, a light chain variable domain of the present disclosure, a linker of the present disclosure, and a leader sequence of the present disclosure.

A binding agent of the present disclosure that is based on an exemplary antibody provided herein, such as for example Abs 1-5, may be provided in any fragment or format, comprising a heavy chain variable domain according to the indicated exemplary antibody and a light chain variable domain according to the indicated exemplary antibody.

TABLE 4

Exemplary Antibody Sequences 1 (mAb1-1)

| SEQ ID NO: | Description | Sequence |
|---|---|---|
| 3 | Heavy Chain Variable Domain | QVQLVQSGAEVKKPGASVKVSCKTSGYTFTDYYIHWVRQA PGQGLEWMGEIYPGSGNTYYAQKFQGRVTMTADTSTSTAY MELSSLRSEDTAVYYCARGNDYDAWFVYWGQGTLVTVSS |
| 4 | VH (DNA) | CAAGTCCAACTGGTGCAGTCCGGAGCCGAGGTCAAGAAGC CCGGAGCCAGCGTGAAAGTCTCATGTAAAACCAGCGGCTA CACCTTCACCGACTACTACATCCACTGGGTCCGACAAGCC CCCGGTCAAGGTTTAGAGTGGATGGGCGAGATCTACCCCG GCTCCGGCAACACCTACTACGCCCAGAAGTTCCAAGGTCG TGTGACCATGACAGCCGACACCAGCACCTCCACCGCCTAC ATGGAACTGTCCTCTCTGCGTTCTGAGGACACAGCCGTTT ACTACTGCGCCAGAGGCAACGACTACGACGCTTGGTTCGT GTACTGGGGCCAAGGAACATTAGTGACCGTGTCCTCC |
| 5 | CDRH1 IMGT (Prot) | GYTFTDYY |
| 6 | CDRH1 Kabat (Prot) | DYYIH |
| 7 | CDRH1 Chothia (Prot) | GYTFTD |
| 8 | CDRH2 IMGT (Prot) | IYPGSGNT |
| 9 | CDRH2 Kabat (Prot) | EIYPGSGNTYYAQKFQ |
| 10 | CDRH2 Chothia (Prot) | YPGSG |
| 11 | CDRH3 IMGT (Prot) | ARGNDYDAWFVY |
| 12 | CDRH3 Kabat (Prot) | GNDYDAWFVY |
| 13 | CDRH3 Chothia (Prot) | GNDYDAWFVY |
| 14 | Light Chain Variable Domain | DIVMTQSPDSLAVSLGERVTMNCKSSQSLLNSGTRKNYLA WYQQKPGQPPKLLIYWASIRESGVPDRFSGSGSGTDFTLT ISSVQAEDVAVYYCKQSYSLYTFGQGTKLEIK |
| 15 | VL (DNA) | GACATCGTCATGACCCAGAGCCCCGATTCTTTAGCCGTGT CTTTAGGCGAAAGAGTGACCATGAACTGCAAGTCCAGCCA GTCTTTACTGAATTCCGGCACTCGAAAAAACTATTTAGCT TGGTACCAGCAGAAACCCGGCCAGCCCCCTAAGCTGCTGA TCTACTGGGCTAGCATTCGAGAATCCGGCGTGCCCGATCG CTTTAGCGGCAGCGGTAGCGGCACCGACTTTACTTTAACC ATCAGCAGCGTGCAAGCTGAGGACGTGGCTGTGTACTATT GCAAGCAGTCCTACTCTTTATACACCTTCGGCCAAGGAAC AAAGCTGGAGATCAAG |
| 16 | CDRL1 IMGT (Prot) | QSLLNSGTRKNY |
| 17 | CDRL1 Kabat (Prot) | KSSQSLLNSGTRKNYLA |

TABLE 4-continued

Exemplary Antibody Sequences 1 (mAb1-1)

| SEQ ID NO: | Description | Sequence |
|---|---|---|
| 18 | CDRL1 Chothia (Prot) | KSSQSLLNSGTRKNYLA |
| 19 | CDRL2 IMGT (Prot) | WAS |
| 20 | CDRL2 Kabat (Prot) | WASIRES |
| 21 | CDRL2 Chothia (Prot) | WASIRES |
| 22 | CDRL3 IMGT (Prot) | KQSYSLYT |
| 23 | CDRL3 Kabat (Prot) | KQSYSLYT |
| 24 | CDRL3 Chothia (Prot) | KQSYSLYT |
| 25 | ScFv | QVQLVQSGAEVKKPGASVKVSCKTSGYTFTDYYIHWVRQAPGQGLEWMGEIYPGSGNTYYAQKFQGRVTMTADTSTSTAYMELSSLRSEDTAVYYCARGNDYDAWFVYWGQGTLVTVSSGSTSGSGKPGSGEGSTKGDIVMTQSPDSLAVSLGERVTMNCKSSQSLLNSGTRKNYLAWYQQKPGQPPKLLIYWASIRESGVPDRFSGSGSGTDFTLTISSVQAEDVAVYYCKQSYSLYTFGQGTKLEIK |
| 26 | ScFv | CAAGTCCAACTGGTGCAGTCCGGAGCCGAGGTCAAGAAGCCCGGAGCCAGCGTGAAAGTCTCATGTAAAACCAGCGGCTACACCTTCACCGACTACTACATCCACTGGGTCCGACAAGCCCCCGGTCAAGGTTTAGAGTGGATGGGCGAGATCTACCCCGGCTCCGGCAACACCTACTACGCCCAGAAGTTCCAAGGTCGTGTGACCATGACAGCCGACACCAGCACCTCCACCGCCTACATGGAACTGTCCTCTCTGCGTTCTGAGGACACAGCCGTTTACTACTGCGCCAGAGGCAACGACTACGACGCTTGGTTCGTGTACTGGGGCCAAGGAACATTAGTGACCGTGTCCTCCGGATCCACATCCGGCAGCGGAAAGCCCGGTAGCGGCGAGGGCAGCACCAAAGGAGACATCGTCATGACCCAGAGCCCCGATTCTTTAGCCGTGTCTTTAGGCGAAAGAGTGACCATGAACTGCAAGTCCAGCCAGTCTTTACTGAATTCCGGCACTCGAAAAAACTATTTAGCTTGGTACCAGCAGAAACCCGGCCAGCCCCCTAAGCTGCTGATCTACTGGGCTAGCATTCGAGAATCCGGCGTGCCCGATCGCTTTAGCGGCAGCGGTAGCGGCACCGACTTTACTTTAACCATCAGCAGCGTGCAAGCTGAGGACGTGGCTGTGTACTATTGCAAGCAGTCCTACTCTTTATACACCTTCGGCCAAGGAACAAAGCTGGAGATCAAG |

TABLE 5

Exemplary Antibody Sequences 2 (mAb1-2)

| SEQ ID NO: | Description | Sequence |
|---|---|---|
| 27 | Heavy Chain Variable Domain | QVQLVQSGAEVKKPGASVKVSCKASGYTFTDYYIHWVRQAPGQGLEWMGEIYPGSGNTYYAQKFQGRVTMTRDTSTSTVYMELSSLRSEDTAVYYCARGNDYDAWFVYWGQGTLVTVSS |
| 28 | VH (DNA) | CAAGTTCAGCTGGTGCAGAGCGGCGCCGAAGTGAAAAAGCCCGGCGCCAGCGTGAAAGTCTCATGCAAGGCCAGCGGCTATACCTTCACCGACTACTACATCCACTGGGTCCGACAAGCTCCCGGTCAAGGTTTAGAGTGGATGGGCGAGATCTACCCCGGCAGCGGCAACACCTACTACGCCCAGAAGTTCCAAGGACGTGTGACCATGACTCGTGACACCTCCACCTCCACCGTGTATATGGAGCTGAGCTCTTTAAGGTCCGAGGATACCGCTGTGTACTACTGCGCCAGAGGAAACGACTACGACGCTTGGTTCGTGTACTGGGGCCAAGGAACATTAGTGACCGTCAGCTCC |

TABLE 5-continued

Exemplary Antibody Sequences 2 (mAb1-2)

| SEQ ID NO: | Description | Sequence |
|---|---|---|
| 29 | Light Chain Variable Domain | DIVMTQSPDSLAVSLGERATINCKSSQSLLNSGTRKNYLA WYQQKPGQPPKLLIYWASIRESGVPDRFSGSGSGTDFTLT ISSLQAEDVAVYYCKQSYSLYTFGQGTKLEIK |
| 30 | VL (DNA) | GACATCGTGATGACCCAGAGCCCCGATTCTTTAGCTGTGT CTTTAGGCGAGAGAGCCACCATCAACTGCAAGTCCTCCCA GAGCTTATTAAATAGCGGCACTCGAAAAAACTATTTAGCT TGGTACCAACAGAAGCCCGGCCAGCCCCCCAAGCTGCTCA TCTACTGGGCTTCCATCAGAGAGAGCGGCGTGCCCGATAG ATTCAGCGGCAGCGGCTCCGGCACAGACTTCACTTTAACC ATCTCCTCTTTACAAGCTGAGGACGTGGCCGTGTATTACT GCAAGCAGTCCTACTCTTTATACACCTTCGGCCAAGGAAC AAAGCTGGAGATCAAA |
| 31 | ScFv | QVQLVQSGAEVKKPGASVKVSCKASGYTFTDYYIHWVRQA PGQGLEWMGEIYPGSGNTYYAQKFQGRVTMTRDTSTSTVY MELSSLRSEDTAVYYCARGNDYDAWFVYWGQGTLVTVSSG STSGSGKPGSGEGSTKGDIVMTQSPDSLAVSLGERATINC KSSQSLLNSGTRKNYLAWYQQKPGQPPKLLIYWASIRESG VPDRFSGSGSGTDFTLTISSLQAEDVAVYYCKQSYSLYTF GQGTKLEIK |
| 32 | ScFv | CAAGTTCAGCTGGTGCAGAGCGGCGCCGAAGTGAAAAAGC CCGGCGCCAGCGTGAAAGTCTCATGCAAGGCCAGCGGCTA TACCTTCACCGACTACTACATCCACTGGGTCCGACAAGCT CCCGGTCAAGGTTTAGAGTGGATGGGCGAGATCTACCCCG GCAGCGGCAACACCTACTACGCCCAGAAGTTCCAAGGACG TGTGACCATGACTCGTGACACCTCCACCTCCACCGTGTAT ATGGAGCTGAGCTCTTTAAGGTCCGAGGATACCGCTGTGT ACTACTGCGCCAGAGGAAACGACTACGACGCTTGGTTCGT GTACTGGGGCCAAGGAACATTAGTGACCGTCAGCTCCGGC TCCACAAGCGGATCCGGCAAACCCGGTAGCGGCGAAGGCA GCACCAAGGGCGACATCGTGATGACCCAGAGCCCCGATTC TTTAGCTGTGTCTTTAGGCGAGAGAGCCACCATCAACTGC AAGTCCTCCCAGAGCTTATTAAATAGCGGCACTCGAAAAA ACTATTTAGCTTGGTACCAACAGAAGCCCGGCCAGCCCCC CAAGCTGCTCATCTACTGGGCTTCCATCAGAGAGAGCGGC GTGCCCGATAGATTCAGCGGCAGCGGCTCCGGCACAGACT TCACTTTAACCATCTCCTCTTTACAAGCTGAGGACGTGGC CGTGTATTACTGCAAGCAGTCCTACTCTTTATACACCTTC GGCCAAGGAACAAAGCTGGAGATCAAA |

TABLE 6

Exemplary Antibody Sequences 3 (mAb1-3)

| SEQ ID NO: | Description | Sequence |
|---|---|---|
| 33 | Heavy Chain Variable Domain | QVQLVQSGAEVKKPGASVKVSCKTSGYTFTDYYIHWVRQA PGQGLEWMGEIYPGSGNTYYAQKFQGRVTMTADTSTSTAY MELSSLRSEDTAVYYCARGNDYDAWFVYWGQGTLVTVSS |
| 34 | VH (DNA) | CAAGTTCAGCTGGTGCAGAGCGGCGCCGAAGTGAAAAAGC CCGGCGCCAGCGTGAAAGTCTCATGCAAGACCTCCGGCTA CACCTTCACCGACTACTACATCCACTGGGTCCGACAAGCT CCCGGCCAAGGTCTGGAGTGGATGGGCGAGATCTACCCCG GCTCCGGCAACACCTATTACGCCCAGAAGTTCCAAGGACG TGTGACCATGACAGCCGACACCTCCACCAGCACCGCCTAC ATGGAACTGAGCAGCTTACGTAGCGAGGACACCGCTGTGT ACTACTGCGCTCGTGGCAACGACTACGACGCTTGGTTCGT GTACTGGGGCCAAGGAACTCTGGTGACCGTGTCCTCC |
| 35 | Light Chain Variable Domain | DIVMTQSPDSLAVSLGERATINCKSSQSLLNSGTRKNYLA WYQQKPGQPPKLLIYWASIRESGVPDRFSGSGSGTDFTLT ISSLQAEDVAVYYCKQSYSLYTFGQGTKLEIK |
| 36 | VL (DNA) | GACATCGTGATGACCCAGTCCCCCGATTCTTTAGCCGTCA GCCTTGGAGAGAGAGCCACCATCAACTGCAAGAGCAGCCA GAGCTTATTAAACTCCGGCACTCGAAAAAACTACCTCGCT TGGTACCAGCAGAAGCCCGGTCAGCCCCCTAAGCTGCTGA TCTACTGGGCCAGCATTCGTGAGAGCGGAGTGCCCGACAG |

TABLE 6-continued

Exemplary Antibody Sequences 3 (mAb1-3)

| SEQ ID NO: | Description | Sequence |
|---|---|---|
|  |  | ATTTAGCGGCTCCGGCAGCGGCACCGATTTCACTTTAACC ATCAGCTCTTTACAAGCTGAGGATGTGGCCGTGTATTACT GCAAGCAGTCCTACTCTTTATACACCTTCGGCCAAGGAAC AAAGCTGGAGATTAAG |
| 37 | ScFv | QVQLVQSGAEVKKPGASVKVSCKTSGYTFTDYYIHWVRQA PGQGLEWMGEIYPGSGNTYYAQKFQGRVTMTADTSTSTAY MELSSLRSEDTAVYYCARGNDYDAWFVYWGQGTLVTVSSG STSGSGKPGSGEGSTKGDIVMTQSPDSLAVSLGERATINC KSSQSLLNSGTRKNYLAWYQQKPGQPPKLLIYWASIRESG VPDRFSGSGSGTDFTLTISSLQAEDVAVYYCKQSYSLYTF GQGTKLEIK |
| 38 | ScFv | CAAGTTCAGCTGGTGCAGAGCGGCGCCGAAGTGAAAAAGC CCGGCGCCAGCGTGAAAGTCTCATGCAAGACCTCCGGCTA CACCTTCACCGACTACTACATCCACTGGGTCCGACAAGCT CCCGGCCAAGGTCTGGAGTGGATGGGCGAGATCTACCCCG GCTCCGGCAACACCTATTACGCCCAGAAGTTCCAAGGACG TGTGACCATGACAGCCGACACCTCCACCAGCACCGCCTAC ATGGAACTGAGCAGCTTACGTAGCGAGGACACCGCTGTGT ACTACTGCGCTCGTGGCAACGACTACGACGCTTGGTTCGT GTACTGGGGCCAAGGAACTCTGGTGACCGTGTCCTCCGGA AGCACCTCCGGAAGCGGCAAGCCCGGTAGCGGCGAAGGAT CCACCAAGGGCGACATCGTGATGACCCAGTCCCCCGATTC TTTAGCCGTCAGCCTTGGAGAGAGAGCCACCATCAACTGC AAGAGCAGCCAGAGCTTATTAAACTCCGGCACTCGAAAAA ACTACCTCGCTTGGTACCAGCAGAAGCCCGGTCAGCCCCC TAAGCTGCTGATCTACTGGGCCAGCATTCGTGAGAGCGGA GTGCCCGACAGATTTAGCGGCTCCGGCAGCGGCACCGATT TCACTTTAACCATCAGCTCTTTACAAGCTGAGGATGTGGC CGTGTATTACTGCAAGCAGTCCTACTCTTTATACACCTTC GGCCAAGGAACAAAGCTGGAGATTAAG |

TABLE 7

Exemplary Antibody Sequences 4 (mAb1-4)

| SEQ ID NO: | Description | Sequence |
|---|---|---|
| 39 | Heavy Chain Variable Domain | QVQLVQSGAEVKKPGASVKVSCKTSGYTFTDYYIHWVRQA PGQGLEWIGEIYPGSGNTYYAQKFQGRATLTADTSTSTAY MEFSSLRSEDTAVYYCARGNDYDAWFVYWGQGTLVTVSS |
| 40 | VH (DNA) | CAAGTTCAGCTGGTGCAGAGCGGCGCTGAGGTGAAGAAGC CCGGTGCCTCCGTGAAGGTGTCTTGTAAGACCAGCGGCTA CACCTTCACCGACTACTACATCCACTGGGTCCGACAAGCT CCCGGTCAAGGTTTAGAGTGGATTGGCGAGATCTATCCCG GCAGCGGCAACACCTACTACGCCCAGAAGTTCCAAGGACG TGCCACTTTAACCGCTGACACCAGCACCAGCACCGCCTAC ATGGAGTTCTCCTCTTTAAGGAGCGAGGACACCGCCGTGT ATTACTGCGCTCGTGGCAACGACTATGACGCTTGGTTCGT GTACTGGGGTCAAGGAACATTAGTGACAGTGAGCAGC |
| 41 | Light Chain Variable Domain | DIVMTQSPDSLAVSLGERATINCKSSQSLLNSGTRKNYLA WYQQKPGQPPKLLIYWASIRESGVPDRFSGSGSGTDFTLT ISSLQAEDVAVYYCKQSYSLYTFGQGTKLEIK |
| 42 | VL (DNA) | GACATCGTGATGACCCAGAGCCCCGATTCTTTAGCTGTGA GCCTTGGAGAGAGGGCCACCATCAACTGCAAGTCCTCCCA GTCTTTACTGAACAGCGGCACTCGAAAAAACTATTTAGCT TGGTACCAGCAGAAACCCGGCCAGCCCCCTAAGCTGCTGA TCTACTGGGCCTCCATTCGTGAAAGCGGCGTGCCCGATAG ATTCAGCGGCAGCGGCTCCGGAACCGACTTTACTTTAACC ATCTCCTCTTTACAAGCTGAGGACGTGGCTGTGTACTACT GCAAGCAGAGCTACTCTTTATACACCTTCGGCCAAGGAAC AAAGCTGGAAATCAAG |
| 43 | ScFv | QVQLVQSGAEVKKPGASVKVSCKTSGYTFTDYYIHWVRQA PGQGLEWIGEIYPGSGNTYYAQKFQGRATLTADTSTSTAY MEFSSLRSEDTAVYYCARGNDYDAWFVYWGQGTLVTVSSG STSGSGKPGSGEGSTKGDIVMTQSPDSLAVSLGERATINC |

TABLE 7-continued

Exemplary Antibody Sequences 4 (mAb1-4)

| SEQ ID NO: | Description | Sequence |
|---|---|---|
|  |  | KSSQSLLNSGTRKNYLAWYQQKPGQPPKLLIYWASIRESG VPDRFSGSGSGTDFTLTISSLQAEDVAVYYCKQSYSLYTF GQGTKLEIK |
| 44 | ScFv | CAAGTTCAGCTGGTGCAGAGCGGCGCTGAGGTGAAGAAGC CCGGTGCCTCCGTGAAGGTGTCTTGTAAGACCAGCGGCTA CACCTTCACCGACTACTACATCCACTGGGTCCGACAAGCT CCCGGTCAAGGTTTAGAGTGGATTGGCGAGATCTATCCCG GCAGCGGCAACACCTACTACGCCCAGAAGTTCCAAGGACG TGCCACTTTAACCGCTGACACCAGCACCAGCACCGCCTAC ATGGAGTTCTCCTCTTTAAGGAGCGAGGACACCGCCGTGT ATTACTGCGCTCGTGGCAACGACTATGACGCTTGGTTCGT GTACTGGGGTCAAGGAACATTAGTGACAGTGAGCAGCGGA TCCACCAGCGGATCCGGCAAGCCCGGTAGCGGAGAAGGCA GCACCAAGGGCGACATCGTGATGACCCAGAGCCCCGATTC TTTAGCTGTGAGCCTTGGAGAGAGGGCCACCATCAACTGC AAGTCCTCCCAGTCTTTACTGAACAGCGGCACTCGAAAAA ACTATTTAGCTTGGTACCAGCAGAAACCCGGCCAGCCCCC TAAGCTGCTGATCTACTGGGCCTCCATTCGTGAAAGCGGC GTGCCCGATAGATTCAGCGGCAGCGGCTCCGGAACCGACT TTACTTTAACCATCTCCTCTTTACAAGCTGAGGACGTGGC TGTGTACTACTGCAAGCAGAGCTACTCTTTATACACCTTC GGCCAAGGAACAAAGCTGGAAATCAAG |

TABLE 8

Exemplary Antibody Sequences 5 (mAb1-5)

| SEQ ID NO: | Description | Sequence |
|---|---|---|
| 45 | Heavy Chain Variable Domain | QVQLVQSGAEVKKPGASVKVSCKTSGYTFTDYYIHWVRQA PGQGLEWIGEIYPGSGNTYYAQKFQGRATLTADTSTSTAY MEFSSLRSEDTAVYYCARGNDYDAWFVYWGQGTLVTVSS |
| 46 | VH (DNA) | CAAGTTCAGCTGGTCCAGAGCGGCGCTGAAGTGAAGAAGC CCGGCGCTAGCGTCAAAGTCTCATGCAAAACCTCCGGCTA CACCTTTACCGACTACTACATCCACTGGGTCCGACAAGCT CCCGGTCAAGGTCTGGAGTGGATCGGCGAGATCTACCCCG GCAGCGGCAACACCTACTACGCCCAGAAGTTCCAAGGACG TGCCACTTTAACCGCTGACACCAGCACCTCCACCGCCTAC ATGGAGTTCAGCTCTTTAAGGTCCGAGGACACCGCCGTGT ACTACTGCGCTCGTGGCAACGATTACGACGCTTGGTTCGT GTACTGGGGACAAGGAACATTAGTGACCGTGTCCAGC |
| 47 | Light Chain Variable Domain | DIVMTQSPDSLAVSLGERVTMNCKSSQSLLNSGTRKNYLA WYQQKPGQPPKLLIYWASIRESGVPDRFSGSGSGTDFTLT ISSVQAEDVAVYYCKQSYSLYTFGQGTKLEIK |
| 48 | VL (DNA) | GATATCGTGATGACCCAGAGCCCCGATTCTTTAGCCGTGT CTTTAGGAGAGAGAGTGACCATGAACTGCAAGAGCAGCCA GTCTTTACTGAACAGCGGCACCAGAAAGAACTATTTAGCT TGGTACCAGCAGAAGCCCGGCCAGCCTCCCAAGCTGCTGA TCTACTGGGCCAGCATTCGTGAGAGCGGAGTGCCCGACAG ATTCAGCGGCAGCGGCTCCGGCACCGACTTTACTTTAACC ATCAGCAGCGTGCAAGCTGAGGATGTGGCCGTGTATTACT GCAAGCAGTCCTACTCTTTATACACCTTTGGCCAAGGAAC AAAGCTGGAGATCAAA |
| 49 | ScFv | QVQLVQSGAEVKKPGASVKVSCKTSGYTFTDYYIHWVRQA PGQGLEWIGEIYPGSGNTYYAQKFQGRATLTADTSTSTAY MEFSSLRSEDTAVYYCARGNDYDAWFVYWGQGTLVTVSSG STSGSGKPGSGEGSTKGDIVMTQSPDSLAVSLGERVTMNC KSSQSLLNSGTRKNYLAWYQQKPGQPPKLLIYWASIRESG VPDRFSGSGSGTDFTLTISSVQAEDVAVYYCKQSYSLYTF GQGTKLEIK |
| 50 | ScFv | CAAGTTCAGCTGGTCCAGAGCGGCGCTGAAGTGAAGAAGC CCGGCGCTAGCGTCAAAGTCTCATGCAAAACCTCCGGCTA CACCTTTACCGACTACTACATCCACTGGGTCCGACAAGCT CCCGGTCAAGGTCTGGAGTGGATCGGCGAGATCTACCCCG GCAGCGGCAACACCTACTACGCCCAGAAGTTCCAAGGACG |

TABLE 8-continued

Exemplary Antibody Sequences 5 (mAb1-5)

| SEQ ID NO: | Description | Sequence |
|---|---|---|
| | | TGCCACTTTAACCGCTGACACCAGCACCTCCACCGCCTAC
ATGGAGTTCAGCTCTTTAAGGTCCGAGGACACCGCCGTGT
ACTACTGCGCTCGTGGCAACGATTACGACGCTTGGTTCGT
GTACTGGGGACAAGGAACATTAGTGACCGTGTCCAGCGGC
AGCACAAGCGGAAGCGGCAAGCCCGGTAGCGGCGAGGGAA
GCACCAAGGGCGATATCGTGATGACCCAGAGCCCCGATTC
TTTAGCCGTGTCTTTAGGAGAGAGAGTGACCATGAACTGC
AAGAGCAGCCAGTCTTTACTGAACAGCGGCACCAGAAAGA
ACTATTTAGCTTGGTACCAGCAGAAGCCCGGCCAGCCTCC
CAAGCTGCTGATCTACTGGGCCAGCATTCGTGAGAGCGGA
GTGCCCGACAGATTCAGCGGCAGCGGCTCCGGCACCGACT
TTACTTTAACCATCAGCAGCGTGCAAGCTGAGGATGTGGC
CGTGTATTACTGCAAGCAGTCCTACTCTTTATACACCTTT
GGCCAAGGAACAAAGCTGGAGATCAAA |

Chimeric antigen receptors (CARs) are engineered receptors that may direct or redirect T cells or NK cells (e.g., patient or donor T or NK cells) to target a selected antigen. A CAR may be engineered to recognize an antigen and, when bound to that antigen, activate the immune cell to attack and destroy the cell bearing that antigen. When these antigens exist on tumor cells, an immune cell that expresses the CAR may target and kill the tumor cell. CARs generally comprise an extracellular binding domain that mediates antigen binding (e.g., a GPC3 binding domain), a transmembrane domain that spans, or is understood to span, the cell membrane when the CAR is present at a cell surface or cell membrane, and an intracellular (or cytoplasmic) signaling domain.

According to at least one non-limiting view, there have been at least three "generations" of CAR compositions. In a first generation of CARs, a binding domain (e.g., a single chain fragment variable, binding domain) is linked or connected to a signaling domain (e.g., CD3ζ) via a transmembrane domain, optionally comprising a hinge domain and one or more spacers. In a second generation of CARs, a costimulatory domain (CM1, such as CD28, 4-1BB, or OX-40) is introduced with the signaling domain (e.g., CD3ζ). In a third generation of CARs, a second costimulatory domain (CM2) is comprised.

TCRs are heterodimers composed of an α-chain and a β-chain. TCR signaling requires recruitment of signaling proteins that generate an immune synapse. In addition, TCR localization at the plasma membrane depends on CD3 complex, which is expressed in T cells. Engineered single chain TCRs may be generated, e.g., using transmembrane and signaling domains of CAR constructs, methods and constructs for which are known (e.g., sTCR and TCR-CAR molecules, e.g., fusion of a TCRβ chain with CD28 TM and CD28 and CD3ζ signaling modules).

A GPC3 binding system of the present disclosure may comprise one or more antigen binding domains that bind GPC3. In some embodiments, an antigen binding system further comprises a costimulatory domain, and/or an extracellular domain (e.g., a "hinge" or "spacer" region), and/or a transmembrane domain, and/or an intracellular (signaling) domain, and/or a CD3-zeta or CD3-epsilon activation domain. In some embodiments, a GPC3 binding system of the present disclosure comprises at least a binding domain that binds human GPC3, a costimulatory domain, an extracellular domain, a transmembrane domain, and a CD3-zeta or CD3-epsilon activating domain.

In some embodiments, a GPC3 binding CAR of the present disclosure may comprise an antigen binding system that comprises one or more, or all, of a leader peptide (P), GPC3 binding (B), a costimulatory protein's extracellular domain (E), a transmembrane domain (T), a costimulatory domain (C), a second costimulatory domain (C'), and an activation domain (A). In some instances, a GPC3 binding CAR is configured according to the following: B E T A. In some instances, a GPC3 binding CAR is configured according to the following: P B E T A. In some instances, a GPC3 binding CAR is configured according to the following: B E T C A. In some instances a GPC3 binding CAR is configured according to the following: P B E T C A. In some instances, a GPC3 binding CAR is configured according to the following: B E T C C' A. In some instances, a GPC3 binding CAR is configured according to the following: P B E T C C' A. In some embodiments, a GPC3 binding CAR comprises a VH and a VL, optionally wherein the CAR is configured according to the following: P-VH-VL-E-T-C-A or P-VL-VH-E-T-C-A. In some embodiments, the VH and the VL are connected by a linker (L), optionally wherein the CAR is configured according to the following, from N-terminus to C-terminus: P-VH-L-VL-E-T-C-A or P-VH-L-VL-E-T-C-A.

One or more antigen binding domains determine the target(s) of an antigen binding system. A binding domain of an antigen binding system may comprise any GPC3 binding domain, e.g., an antibody provided by the present disclosure, e.g., a binding domain of the present disclosure. Binding domain are used in chimeric antigen receptors at least in part because they may be engineered to be expressed as part of a single chain along with the other CAR components. See, for example, U.S. Pat. Nos. 7,741,465, and 6,319,494 as well as Eshhar et al., Cancer Immunol Immunotherapy (1997) 45: 131-136, Krause et al., J. Exp. Med., Volume 188, No. 4, 1998 (619-626); Finney et al., Journal of Immunology, 1998, 161: 2791-2797, each of which is incorporated herein by reference with respect to binding domains in CARs. A binding domain or scFv, is a single chain antigen binding fragment comprising a heavy chain variable domain and a light chain variable domain, which heavy chain variable domain and light chain variable domain are linked or connected together. See, for example, U.S. Pat. Nos. 7,741,465, and 6,319,494 as well as Eshhar et al., Cancer Immunol Immunotherapy (1997) 45: 131-136, each of which is incorporated herein by reference with respect to binding domain domains. When derived from a parent antibody, a binding domain may retain some of, retain all of, or essentially retain the parent antibody's binding of a target antigen. In some embodiments, a CAR contemplated herein comprises antigen-specific binding domain that may be a scFv (a murine, human or humanized scFv) that binds an antigen expressed on a cancer cell. In a certain embodiment, the scFv binds GPC3.

In certain embodiments, the CARs contemplated herein may comprise linker residues between the various domains, e.g., between VH and VL domains, added for appropriate spacing conformation of the molecule. CARs contemplated herein, may comprise one, two, three, four, or five or more linkers. In some embodiments, the length of a linker is about 1 to about 25 amino acids, about 5 to about 20 amino acids, or about 10 to about 20 amino acids, or any intervening length of amino acids. In some embodiments, the linker is 1, 2, 3, 4, 5, 6, 7, 8, 9, 10, 11, 12, 13, 14, 15, 16, 17, 18, 19, 20, 21, 22, 23, 24, 25, or more amino acids long.

Illustrative examples of linkers include glycine polymers (G)n; glycine-serine polymers $(G_{1-5}S_{1-5})n$ (SEQ ID NO: 120), where n is an integer of at least one, two, three, four, or five; glycine-alanine polymers; alanine-serine polymers; and other flexible linkers known in the art. Glycine and glycine-serine polymers are relatively unstructured, and therefore may be able to serve as a neutral tether between domains of fusion proteins such as the CARs described herein. Glycine accesses more phi-psi space than even alanine, and is much less restricted than residues with longer side chains (see Scheraga, *Rev. Computational Chem.* 11173-142 (1992)). Other linkers contemplated herein include Whitlow linkers (see Whitlow, *Protein Eng.* 6(8): 989-95 (1993)). The ordinarily skilled artisan will recognize that design of a CAR in some embodiments may include linkers that are all or partially flexible, such that the linker may include a flexible linker as well as one or more portions that confer less flexible structure to provide for a desired CAR structure. In one embodiment, any of the constructs described herein may comprise a "GS" linker (SEQ ID NO: 51). In another embodiment, any of the constructs described herein comprise a "GSG" linker (SEQ ID NO: 54). In an example a glycine-serine linker comprises or consists of the amino acid sequence GS (SEQ ID NO: 51), which may be encoded by the nucleic acid sequence according to GGATCC (SEQ ID NO: 52) or GGGTCC (SEQ ID NO: 53). In an example a glycine-serine linker comprises or consists of the amino acid sequence GSG (SEQ ID NO: 54), which may be encoded by the nucleic acid sequence according to GGCTCTGGA (SEQ ID NO: 55) or gggtcc (SEQ ID NO: 53). In an example a glycine-serine linker comprises or consists of the amino acid sequence GGGSGGGS (SEQ ID NO: 56), which may be encoded by the nucleic acid sequence according to GGCGGTGGAAGCGGAGGAGGTTCC (SEQ ID NO: 58). In another embodiment, the CARs described herein comprise the amino acid sequence having at least 75% sequence identity to (such as, at least 75%, at least 80%, at least 90%, at least 95%, or 100% identity; e.g., 85-90%, 85-95%, 85-100%, 90-95%, 90-100%, or 95-100%) of SEQ ID NO: 59 (GSTSGSGKPGSGEGSTKG (SEQ ID NO: 59). In an embodiment, a linker is encoded by a nucleic acid sequence having at least 75% sequence identity to (such as, at least 75%, at least 80%, at least 90%, at least 95%, or 100% identity; e.g., 85-90%, 85-95%, 85-100%, 90-95%, 90-100%, or 95-100%) to the nucleic acid sequence according to (SEQ ID NO: 60)
GGATCCACATCCGGCAGCGGAAAGCCCGGTAGCGGCGAGGGCAGCACCAA

AGGA, (SEQ ID NO: 61)
GGCTCCACAAGCGGATCCGGCAAACCCGGTAGCGGCGAAGGCAGCACCAA

GGGC,
or (SEQ ID NO: 62)
GGAAGCACCTCCGGAAGCGGCAAGCCCGGTAGCGGCGAAGGATCCACCAA

GGGC (SEQ ID NO: 63)
GGATCCACCAGCGGATCCGGCAAGCCCGGTAGCGGAGAAGGCAGCACCAA

GGGC (SEQ ID NO: 64)
GGCAGCACAAGCGGAAGCGGCAAGCCCGGTAGCGGCGAGGGAAGCACCAA

GGGC.

In embodiments, a CAR comprises a scFv that further comprises a variable region linking sequence. A "variable region linking sequence," is an amino acid sequence that connects a heavy chain variable region to a light chain variable region and provides a spacer function compatible with interaction of the two sub-binding domains so that the resulting polypeptide retains a specific binding affinity to the same target molecule as an antibody that comprises the same light and heavy chain variable regions. In one embodiment, the variable region linking sequence is 1, 2, 3, 4, 5, 6, 7, 8, 9, 10, 11, 12, 13, 14, 15, 16, 17, 18, 19, 20, 21, 22, 23, 24, 25, or more amino acids long.

In embodiments, the binding domain of the CAR is followed by one or more "spacer domains," which refers to the region that moves the antigen binding domain away from the effector cell surface to enable proper cell/cell contact, antigen binding and activation (Patel et al., *Gene Therapy*, 1999; 6: 412-419). The spacer domain may be derived either from a natural, synthetic, semi-synthetic, or recombinant source. In certain embodiments, a spacer domain is a portion of an immunoglobulin, including, but not limited to, one or more heavy chain constant regions, e.g., CH2 and CH3. The spacer domain may include the amino acid sequence of a naturally occurring immunoglobulin hinge region or an altered immunoglobulin hinge region.

The binding domain of the CAR may generally be followed by one or more "hinge domains," which plays a role in positioning the antigen binding domain away from the effector cell surface to enable proper cell/cell contact, antigen binding and activation. A CAR generally comprises one or more hinge domains between the binding domain and the transmembrane domain. The hinge domain may be derived either from a natural, synthetic, semi-synthetic, or recombinant source. The hinge domain may include the amino acid sequence of a naturally occurring immunoglobulin hinge region or an altered immunoglobulin hinge region.

In some embodiments, an Antigen binding system of the present disclosure may comprise a hinge that is, is from, or is derived from (e.g., comprises all or a fragment of) an immunoglobulin-like hinge domain. In some embodiments, a hinge domain is from or derived from an immunoglobulin. In some embodiments, a hinge domain is selected from the hinge of IgG1, IgG2, IgG3, IgG4, IgA, IgD, IgE, or IgM, or a fragment thereof. A hinge may be derived from a natural source or from a synthetic source. Hinge domains suitable for use in the CARs described herein include the hinge region derived from the extracellular regions of type 1 membrane proteins such as CD8α, CD4, CD28 and CD7, which may be wild-type hinge regions from these molecules or may be altered, for example a truncated CD28 hinge domain. A hinge may be derived from a natural source or from a synthetic source. In some embodiments, an Antigen binding system of the present disclosure may comprise a hinge that is, is from, or is derived from (e.g., comprises all or a fragment of) CD2, CD3 delta, CD3 epsilon, CD3 gamma, CD4, CD7, CD8a, CD80, CD11a (ITGAL), CD11b (ITGAM), CD11c (ITGAX), CD11d (ITGAD), CD18 (ITGB2), CD19 (B4), CD27 (TNFRSF7), CD28, CD28T, CD29 (ITGB1), CD30 (TNFRSF8), CD40 (TNFRSF5), CD48 (SLAMF2), CD49a (ITGA1), CD49d (ITGA4), CD49f (ITGA6), CD66a (CEACAM1), CD66b (CEACAM8), CD66c (CEACAM6), CD66d (CEACAM3), CD66e (CEACAM5), CD69 (CLEC2), CD79A (B-cell antigen receptor complex-associated alpha chain), CD79B (B-cell antigen receptor complex-associated beta chain), CD84 (SLAMF5), CD96 (Tactile), CD100 (SEMA4D), CD103 (ITGAE), CD134 (OX40), CD137 (4-1BB), CD150 (SLAMF1), CD158A (KIR2DL1), CD158B1 (KIR2DL2), CD158B2 (KIR2DL3), CD158C (KIR3DP1), CD158D (KIRDL4), CD158F1 (KIR2DL5A), CD158F2 (KIR2DL5B), CD158K (KIR3DL2), CD160 (BY55), CD162 (SELPLG), CD226 (DNAM1), CD229 (SLAMF3), CD244 (SLAMF4), CD247 (CD3-zeta), CD258 (LIGHT), CD268 (BAFFR), CD270 (TNFSF14), CD272 (BTLA), CD276 (B7-H3), CD279 (PD-1), CD314 (NKG2D), CD319 (SLAMF7), CD335 (NK-p46), CD336 (NK-p44), CD337 (NK-p30), CD352 (SLAMF6), CD353 (SLAMF8), CD355 (CRTAM), CD357 (TNFRSF18), inducible T cell co-stimulator (ICOS), LFA-1 (CD11a/CD18), NKG2C, DAP-10, ICAM-1, NKp80 (KLRF1), IL-2R beta, IL-2R gamma, IL-7R alpha, LFA1-1, SLAMF9, LAT, GADS (GrpL), SLP-76 (LCP2), PAG1/CBP, a CD83 ligand, Fc gamma receptor, MHC class 1 molecule, MHC class 2 molecule, a TNF receptor protein, an immunoglobulin protein, a cytokine receptor, an integrin, activating NK cell receptors, or Toll ligand receptor, or which is a fragment or combination thereof.

In embodiments, the hinge domain comprises a CD8α hinge region. In embodiments the CARs described herein comprise a hinge domain from CD8α having the amino acid sequence having at least 75% sequence identity to (such as, at least 75%, at least 80%, at least 90%, at least 95%, or 100% identity; e.g., 85-90%, 85-95%, 85-100%, 90-95%, 90-100%, or 95-100%) SEQ ID NO: 65 (TTTPAPRPPT-PAPTIASQPLSLRPEACRPAAGGAVHTRGLDFACD (SEQ ID NO: 65)). In embodiments, hinge domain from CD8α is encoded by a nucleic acid having at least 75% sequence identity to (such as, at least 75%, at least 80%, at least 90%, at least 95%, or 100% identity; e.g., 85-90%, 85-95%, 85-100%, 90-95%, 90-100%, or 95-100%) to the nucleic acid having the sequence according to:

```
                                          (SEQ ID NO: 66)
ACCACGACGCCAGCGCCGCGACCACCAACACCGGCGCCCACCATCGCGTC

GCAACCCCTGTCCCTGCGCCCCGAGGCGTGCCGGCCAGCGGCGGGGGGCG

CAGTGCACACGAGGGGGCTGGACTTCGCCTGTGAT.
```

In embodiments, the hinge domain comprises a truncated CD28 hinge region (CD28T) hinge region, such as disclosed in International Patent Application No: PCT/US2017/025351, filed Mar. 31, 2017, which is incorporated herein by reference in its entirety. In embodiments the CARs described herein comprise a CD28T hinge domain having the amino acid sequence having at least 75% sequence identity to (such as, at least 75%, at least 80%, at least 90%, at least 95%, or 100% identity; e.g., 85-90%, 85-95%, 85-100%, 90-95%, 90-100%, or 95-100%) SEQ ID NO: 67 (LD-NEKSNGTIIHVKGKHLCPSPLFPGPSKP (SEQ ID NO: 67)). In embodiments, a CD28T hinge domain is encoded by a nucleic acid having at least 75% sequence identity to (such as, at least 75%, at least 80%, at least 90%, at least 95%, or 100% identity; e.g., 85-90%, 85-95%, 85-100%, 90-95%, 90-100%, or 95-100%) to the nucleic acid having the sequence according to

```
                                          (SEQ ID NO: 68)
CTAGACAATGAGAAGAGCAATGGAACCATTATCCATGTGAAAGGGAAACA

CCTTTGTCCAAGTCCCCTATTTCCCGGACCTTCTAAGCCC.
```

Polynucleotide and polypeptide sequences of these hinge domains are known. In some embodiments, the polynucleotide encoding a hinge domain comprises a nucleotide sequence at least about 60%, at least about 65%, at least about 70%, at least about 75%, at least about 80%, at least about 85%, at least about 90%, at least about 95%, at least about 96%, at least about 97%, at least about 98%, at least about 99%, or about 100% (e.g., 85-90%, 85-95%, 85-100%, 90-95%, 90-100%, or 95-100%) identical to a nucleotide sequence known. In some embodiments, the polypeptide sequence of a hinge domain comprises a polypeptide sequence at least about 60%, at least about 65%, at least about 70%, at least about 75%, at least about 80%, at least about 85%, at least about 90%, at least about 95%, at least about 96%, at least about 97%, at least about 98%, at least about 99%, or about 100% (e.g., 85-90%, 85-95%, 85-100%, 90-95%, 90-100%, or 95-100%) identical to a known polypeptide sequence.

In general, a "transmembrane domain" (e.g., of an antigen binding system) refers to a domain having an attribute of being present in the membrane when present in a molecule at a cell surface or cell membrane (e.g., spanning a portion or all of a cellular membrane). A costimulatory domain for an antigen binding system of the present disclosure may further comprise a transmembrane domain and/or an intracellular signaling domain. It is not required that every amino acid in a transmembrane domain be present in the membrane. For example, in some embodiments, a transmembrane domain is characterized in that a designated stretch or portion of a protein is substantially located in the membrane. Amino acid or nucleic acid sequences may be analyzed using a variety of algorithms to predict protein subcellular localization (e.g., transmembrane localization). The programs psort (PSORT.org) and Prosite (prosite.expasy.org) are exemplary of such programs.

The type of transmembrane domain comprised in an antigen binding system described herein is not limited to any type. In some embodiments, a transmembrane domain is selected that is naturally associated with a binding domain and/or intracellular domain. In some instances, a transmembrane domain comprises a modification of one or more amino acids (e.g., deletion, insertion, and/or substitution), e.g., to avoid binding of such domains to a transmembrane domain of the same or different surface membrane proteins to minimize interactions with other members of the receptor complex.

A transmembrane domain may be derived either from a natural or from a synthetic source. Where the source is natural, a domain may be derived from any membrane-bound or transmembrane protein. Exemplary transmembrane domains may be derived from (e.g., may comprise at least a transmembrane domain of) an alpha, beta or zeta chain of a T-cell receptor, 2B4, CD28, CD3 epsilon, CD3 delta, CD3 gamma, CD45, CD4, CD5, CD7, CD8, CD8 alpha, CD8beta, CD9, CD11a, CD11b, CD11c, CD11d, CD16, CD22, CD27, CD33, CD37, CD64, CD80, CD86, CD134, CD137, TNFSFR25, CD154, 4-1BB/CD137, activating NK cell receptors, an Immunoglobulin protein, B7-H3, BAFFR, BLAME (SLAMF8), BTLA, CD100 (SEMA4D), CD103, CD160 (BY55), CD18, CD19, CD19a, CD2, CD247, CD276 (B7-H3), CD29, CD30, CD40, CD49a, CD49D, CD49f, CD69, CD84, CD96 (Tactile), CDS, CEACAM1, CRT AM, cytokine receptor, DAP-10, DAP-12, DNAM1 (CD226), Fc gamma receptor, GADS, GITR, HVEM (LIGHTR), IA4, ICAM-1, ICAM-1, Ig alpha (CD79a), IL-2R beta, IL-2R gamma, IL-7R alpha, inducible T cell costimulator (ICOS), integrins, ITGA4, ITGA4, ITGA6, ITGAD, ITGAE, ITGAL, ITGAM, ITGAX, ITGB2, ITGB7, ITGB1, KIRDS2, LAT, LFA-1, LFA-1, a ligand that binds with CD83, LIGHT, LIGHT, LTBR, Ly9 (CD229), lymphocyte function-associated antigen-1 (LFA-1; CD1-1a/CD18), MHC class 1 molecule, NKG2C, NKG2D, NKp30, NKp44, NKp46, NKp80 (KLRF1), OX-40, PAG/Cbp, programmed death-1 (PD-1), PSGL1, SELPLG (CD162), Signaling Lymphocytic Activation Molecules (SLAM proteins), SLAM (SLAMF1; CD150; IPO-3), SLAMF4 (CD244; 2B4), SLAMF6 (NTB-A; Ly108), SLAMF7, SLP-76, TNF receptor proteins, TNFR2, TNFSF14, a Toll ligand receptor, TRANCE/RANKL, VLA1, or VLA-6, or a fragment, truncation, or a combination thereof. In some embodiments, a transmembrane domain may be synthetic (and can, e.g., comprise predominantly hydrophobic residues such as leucine and valine). In some embodiments, a triplet of phenylalanine, tryptophan and valine are comprised at each end of a synthetic transmembrane domain. In some embodiments, a transmembrane domain is directly linked or connected to a cytoplasmic domain. In some embodiments, a short oligo- or polypeptide linker (e.g., between 2 and 10 amino acids in length) may form a linkage between a transmembrane domain and an intracellular domain. In some embodiments, a linker is a glycine-serine doublet.

In embodiments the CARs described herein comprise a TM domain from CD8α having the amino acid sequence having at least 75% sequence identity to (such as, at least 75%, at least 80%, at least 90%, at least 95%, or 100% identity; e.g., 85-90%, 85-95%, 85-100%, 90-95%, 90-100%, or 95-100%) SEQ ID NO: 69 (IYI-WAPLAGTCGVLLLSLVITLYC (SEQ ID NO: 69)). In embodiments, TM domain from CD8α is encoded by a nucleic acid having at least 75% sequence identity to (such as, at least 75%, at least 80%, at least 90%, at least 95%, or 100% identity; e.g., 85-90%, 85-95%, 85-100%, 90-95%, 90-100%, or 95-100%) to the nucleic acid having the sequence according to (SEQ ID NO: 70)
ATCTACATCTGGGCGCCCTTGGCCGGGACTTGTGGGGTCCTTCTCCTGTC ACTGGTTATCACCCTTTAtTGC.

In embodiments the CARs described herein comprise a TM domain from CD28 having the amino acid sequence having at least 75% sequence identity to (such as, at least 75%, at least 80%, at least 90%, at least 95%, or 100% identity; e.g., 85-90%, 85-95%, 85-100%, 90-95%, 90-100%, or 95-100%) SEQ ID NO: 71 (FWVLVVVGGV-LACYSLLVTVAFIIFWV (SEQ ID NO: 71)). In embodiments, TM domain from CD28 is encoded by a nucleic acid having at least 75% sequence identity to (such as, at least 75%, at least 80%, at least 90%, at least 95%, or 100% identity; e.g., 85-90%, 85-95%, 85-100%, 90-95%, 90-100%, or 95-100%) to the nucleic acid having the sequence according to (SEQ ID NO: 72)
TTTTGGGTGCTGGTGGTGGTTGGTGGAGTCCTGGCTTGCTATAGCTTGCT

AGTAACAGTGGCCTTTATTATTTTCTGGGTG.

Polynucleotide and polypeptide sequences of transmembrane domains provided herein are known. In some embodiments, the polynucleotide encoding a transmembrane domain comprises a nucleotide sequence at least about 60%, at least about 65%, at least about 70%, at least about 75%, at least about 80%, at least about 85%, at least about 90%, at least about 95%, at least about 96%, at least about 97%, at least about 98%, at least about 99%, or about 100% (e.g., 85-90%, 85-95%, 85-100%, 90-95%, 90-100%, or 95-100%) identical to a nucleotide sequence known. In some embodiments, the polypeptide sequence of a transmembrane domain comprises a polypeptide sequence at least about 60%, at least about 65%, at least about 70%, at least about 75%, at least about 80%, at least about 85%, at least about 90%, at least about 95%, at least about 96%, at least about 97%, at least about 98%, at least about 99%, or about 100% (e.g., 85-90%, 85-95%, 85-100%, 90-95%, 90-100%, or 95-100%) identical to a polypeptide sequence known. Optionally, short spacers may form linkages between any or some of the extracellular, transmembrane, and intracellular domains of the CAR.

Intracellular signaling domains that may transduce a signal upon binding of an antigen to an immune cell are known, any of which may be comprised in an antigen binding system of the present disclosure. For example, cytoplasmic sequences of a T cell receptor (TCR) are known to initiate signal transduction following TCR binding to an antigen (see, e.g., Brownlie et al., Nature Rev. Immunol. 13:257-269 (2013)).

In some embodiments, CARs contemplated herein comprise an intracellular signaling domain. An "intracellular signaling domain," refers to the part of a CAR that participates in transducing the message of effective CAR binding to a target antigen into the interior of the immune effector cell to elicit effector cell function, e.g., activation, cytokine production, proliferation and cytotoxic activity, including the release of cytotoxic factors to the CAR-bound target cell, or other cellular responses elicited with antigen binding to the extracellular CAR domain. In some embodiments, a signaling domain and/or activation domain comprises an immunoreceptor tyrosine-based activation domain (ITAM). Examples of ITAM containing cytoplasmic signaling sequences comprise those derived from TCR zeta, FcR gamma, FcR beta, CD3 zeta, CD3 gamma, CD3 delta, CD3 epsilon, CD5, CD22, CD79a, CD79b, and CD66d (see, e.g., Love et al., Cold Spring Harb. Perspect. Biol. 2:a002485 (2010); Smith-Garvin et al., Annu. Rev. Immunol. 27:591-619 (2009)). In certain embodiments, suitable signaling domains comprise, without limitation, 4-1BB/CD137, activating NK cell receptors, an Immunoglobulin protein, B7-H3, BAFFR, BLAME (SLAMF8), BTLA, CD100 (SEMA4D), CD103, CD160 (BY55), CD18, CD19, CD19a, CD2, CD247, CD27, CD276 (B7-H3), CD28, CD29, CD3 delta, CD3 epsilon, CD3 gamma, CD30, CD4, CD40, CD49a, CD49D, CD49f, CD69, CD7, CD84, CD8alpha, CD8beta, CD96 (Tactile), CD11a, CD11b, CD11c, CD11d, CDS, CEACAM1, CRT AM, cytokine receptor, DAP-10, DNAM1 (CD226), Fc gamma receptor, GADS, GITR, HVEM (LIGHTR), IA4, ICAM-1, ICAM-1, Ig alpha (CD79a), IL-2R beta, IL-2R gamma, IL-7R alpha, inducible T cell costimulator (ICOS), integrins, ITGA4, ITGA4, ITGA6, ITGAD, ITGAE, ITGAL, ITGAM, ITGAX, ITGB2, ITGB7, ITGB1, KIRDS2, LAT, LFA-1, LFA-1, ligand that binds with CD83, LIGHT, LIGHT, LTBR, Ly9 (CD229), Ly108), lymphocyte function-associated antigen-1 (LFA-1; CD1-1a/CD18), MHC class 1 molecule, NKG2C, NKG2D, NKp30, NKp44, NKp46, NKp80 (KLRF1), OX-40, PAG/Cbp, programmed death-1 (PD-1), PSGL1, SELPLG (CD162), Signaling Lymphocytic Activation Molecules (SLAM proteins), SLAM (SLAMF1; CD150; IPO-3), SLAMF4 (CD244; 2B4), SLAMF6 (NTB-A, SLAMF7, SLP-76, TNF receptor proteins, TNFR2, TNFSF14, a Toll ligand receptor, TRANCE/RANKL, VLA1, or VLA-6, or a fragment, truncation, or a combination thereof.

The term "effector function" refers to a specialized function of the cell. Effector function of the T cell, for example, may be cytolytic activity or help or activity including the secretion of a cytokine. Thus, the term "intracellular signaling domain" refers to the portion of a protein which transduces the effector function signal and that directs the cell to perform a specialized function. While usually the entire intracellular signaling domain may be employed, in many cases it is not necessary to use the entire domain. To the extent that a truncated portion of an intracellular signaling domain is used, such truncated portion may be used in place of the entire domain as long as it transduces the effector function signal. The term intracellular signaling domain is meant to include any truncated portion of the intracellular signaling domain sufficient to transducing effector function signal.

It is known that signals generated through the TCR alone are insufficient for full activation of the T cell and that a secondary or costimulatory signal may also be required. Thus, T cell activation may be said to be mediated by two distinct classes of intracellular signaling domains: primary signaling domains that initiate antigen-dependent primary activation through the TCR (e.g., a TCR/CD3 complex) and costimulatory signaling domains that act in an antigen independent manner to provide a secondary or costimulatory signal. In some embodiments, a CAR contemplated herein comprises an intracellular signaling domain that comprises one or more "costimulatory signaling domain" and a "primary signaling domain."

Illustrative examples of ITAM containing primary signaling domains that are useful in the present disclosure include those derived from TCRζ, FcRγ, FcRβ, DAP12, CD3γ, CD3δ, CD3ε, CD3ζ, CD22, CD79a, CD79b, and CD66d. In some embodiments, a CAR comprises a CD3ζ primary signaling domain and one or more costimulatory signaling domains. The intracellular primary signaling and costimulatory signaling domains may be linked in any order in tandem to the carboxyl terminus of the transmembrane domain. In one embodiment, the CARs have a CD3ζ domain having the amino acid sequence having at least 75% sequence identity to (such as, at least 75%, at least 80%, at least 90%, at least 95%, or 100% identity; e.g., 85-90%, 85-95%, 85-100%, 90-95%, 90-100%, or 95-100%) SEQ ID NO: 73. LRVKFSRSADAPAYQQGGQNQLYNELNLGR-REEYDVLDKRRGRDPEMGGKPRRKNPQE GLY-NELQKDKMAEAYSEIGMKGERRRGKGHDGLYQGL-STATKDTYDALHMQALPPR (SEQ ID NO: 73). In embodiments, a CD3ζ domain is encoded by a nucleic acid having at least 75% sequence identity to (such as, at least 75%, at least 80%, at least 90%, at least 95%, or 100% identity; e.g., 85-90%, 85-95%, 85-100%, 90-95%, 90-100%, or 95-100%) to the nucleic acid having the sequence according to:

(SEQ ID NO: 74)
ttgAGAGTGAAGTTCAGCAGGAGCGCAGACGCCCCCGCcTAtCAGCAaGG

CCAGAACCAGCTCTATAACGAGCTCAATtTAGGgCGAAGAGAGGAGTACG

ATGTTTTGGACAAGAGgCGTGGCCGGACCCcGAaATGGGGGGAAAGCCG

AGAAGGAAGAACCCTCAGGAAGGCtTGTACAATGAAtTGCAGAAgGATAA

GATGGCGGAGGCaTACAGTGAGATTGGGATGAAAGGCGAGCGCCGGAGGG

GCAAGGGGCACGATGGCCTTTAtCAGGGTCTCAGTACAGCCACCAAGGAC

ACCTACGACGCCCTTCACATGCAaGCCCTGCCCCCTCGC.

CARs contemplated herein comprise one or more costimulatory signaling domains to enhance the efficacy and expansion of T cells expressing CAR receptors. As used herein, the term, "costimulatory signaling domain," or "costimulatory domain", refers to an intracellular signaling domain of a costimulatory molecule. In some embodiments, costimulatory molecules may include DAP-10, DAP-12, CD27, CD28, CD137(4-IBB), OX40 (CD134), CD30, CD40, PD-I, ICOS (CD278), CTLA4, LFA-1, CD2, CD7, LIGHT, TRIM, LCK3, SLAM, DAPIO, LAG3, HVEM, B7-H3, NKD2C, GITR, CD5, ICAM-1, CD11a, Lck, TNFR-I, TNFR-II, FasR, NKG2C, and B7-H3, and CD83.

In embodiments, the CARs comprise a 4-IBB costimulatory domain having the amino acid sequence of having at least 75% sequence identity to (such as, at least 75%, at least 80%, at least 90%, at least 95%, or 100% identity; e.g., 85-90%, 85-95%, 85-100%, 90-95%, 90-100%, or 95-100%) SEQ ID NO: 75. RGRKKLLY-IFKQPFMRPVQTTQEEDGCSCRFPEEEEGGCE (SEQ ID NO: 75). In embodiments, a 4-IBB costimulatory domain is encoded by a nucleic acid having at least 75% sequence identity to (such as, at least 75%, at least 80%, at least 90%, at least 95%, or 100% identity; e.g., 85-90%, 85-95%, 85-100%, 90-95%, 90-100%, or 95-100%) to the nucleic acid having the sequence according to, which may be encoded by the nucleic acid sequence according to:

(SEQ ID NO: 76)
AAACGGGGCAGAAAGAAACTCCTGTATATATTCAAACAACCATTTATGAG

ACCAGTACAAACTACTCAAGAGGAAGATGGCTGTAGCTGCCGATTTCCAG

AAGAAGAAGAAGGAGGATGTGAA.

In embodiments, the CARs comprise a CD28 costimulatory domain having the amino acid sequence of having at least 75% sequence identity to (such as, at least 75%, at least 80%, at least 90%, at least 95%, or 100% identity; e.g., 85-90%, 85-95%, 85-100%, 90-95%, 90-100%, or 95-100%) SEQ ID NO: 77. RSKRSRLLHSDYMNMT-PRRPGPTRKHYQPYAPPRDFAAYRS (SEQ ID NO: 77). In embodiments, a CD28 costimulatory domain is encoded by a nucleic acid having at least 75% sequence identity to (such as, at least 75%, at least 80%, at least 90%, at least 95%, or 100% identity; e.g., 85-90%, 85-95%, 85-100%, 90-95%, 90-100%, or 95-100%) to the nucleic acid having the sequence according to, which may be encoded by the nucleic acid sequence according to (SEQ ID NO: 78)
AGGAGTAAGAGGAGCAGGCTCCTGCACAGTGACTACATGAACATGACTCC

CCGCCGCCCCGGGCCCACCCGCAAGCATTACCAGCCCTATGCCCCACCAC

GCGACTTCGCAGCCTATCGCTCC.

The engineered CARs described herein may also comprise an N-terminal signal peptide or tag at the N-terminus of the scFv or antigen binding domain. In one embodiment, a heterologous signal peptide may be used. The antigen binding domain or scFV may be fused to a leader or a signal peptide that directs the nascent protein into the endoplasmic reticulum and subsequent translocation to the cell surface. It is understood that, once a polypeptide containing a signal peptide is expressed at the cell surface, the signal peptide is generally proteolytically removed during processing of the polypeptide in the endoplasmic reticulum and translocation to the cell surface. Thus, a polypeptide such as the CAR constructs described herein, are generally expressed at the cell surface as a mature protein lacking the signal peptide, whereas the precursor form of the polypeptide includes the signal peptide. Any suitable signal sequence known in the art may be used. Similarly any known tag sequence known in the art may also be used. In one embodiment a signal sequence is a CSF2RA signal sequence. In embodiments, the CARs described herein comprise a CSF2RA signal sequence having the amino acid sequence of having at least 75% sequence identity to (such as, at least 75%, at least 80%, at least 90%, at least 95%, or 100% identity; e.g., 85-90%, 85-95%, 85-100%, 90-95%, 90-100%, or 95-100%) to;

(SEQ ID NO: 79)
MLLLVTSLLLCELPHPAFLLIP (SEQ ID NO: 80)
MEWTWVFLFLLSVTAGVHS,
or (SEQ ID NO: 81)
MALPVTALLLPLALLLHAARP.

Components of a CAR may be exchanged or "swapped" using routine techniques of biotechnology for equivalent components. To provide just a few non-limiting and partial examples, a CAR of the present disclosure may comprise a binding domain as provided herein in combination with a hinge provided herein and a costimulatory domain provided herein. In certain examples, a CAR of the present disclosure may comprise a leader sequence as provided herein together with a binding domain as provided herein in combination with a hinge provided herein and s costimulatory domain provided herein.

The present disclosure comprises conjugates in which an antibody of the present disclosure is associated with a therapeutic agent or a detectable moiety. In various embodiments, the therapeutic agent is an anti-cancer agent as provided herein. In certain embodiments, provided conjugate comprises one or more detectable moieties, i.e., is "labeled" with one or more such moieties. In some such embodiments, a conjugate of the present disclosure is useful in diagnostic or imaging applications, e.g., diagnosing or imaging cancer. Any of a wide variety of detectable moieties may be used in labeled antibody conjugates described herein. Suitable detectable moieties comprise, without limitation: various ligands, radionuclides; fluorescent dyes; chemiluminescent agents (such as, for example, acridinum esters, stabilized dioxetanes, and the like); bioluminescent agents; spectrally resolvable inorganic fluorescent semiconductors nanocrystals (i.e., quantum dots); microparticles; metal nanoparticles (e.g., gold, silver, copper, platinum, etc.); nanoclusters; paramagnetic metal ions; enzymes; colorimetric labels (such as, for example, dyes, colloidal gold, and the like); biotin; dioxigenin; haptens; and proteins for which antisera or monoclonal antibodies are available.

The present disclosure comprises nucleic acids encoding GPC3 binding domains provided herein. The present disclosure comprises nucleic acids encoding antibodies of the provided herein, comprising, without limitation, nucleic acids encoding GPC3 binding domains. The present disclosure comprises nucleic acids encoding antigen binding systems provided herein, comprising without limitation nucleic acids encoding GPC3 binding chimeric antigen receptors. The nucleic acid sequence of SEQ ID NO: 4 comprises and provides exemplary nucleic acid sequences corresponding to and encoding each of SEQ ID NOs: 3 and 5-13. The nucleic acid sequence of SEQ ID NO: 15 comprises and provides exemplary nucleic acid sequences corresponding to and encoding each of SEQ ID NOs: 12 and 16-24. The nucleic acid sequence of SEQ ID NO: 26 comprises and provides an exemplary nucleic acid sequence corresponding to and encoding SEQ ID NO: 25. The nucleic acid sequence of SEQ ID NO: 28 comprises and provides an exemplary nucleic acid sequence corresponding to and encoding SEQ ID NO: 27. The nucleic acid sequence of SEQ ID NO: 30 comprises and provides an exemplary nucleic acid sequence corresponding to and encoding SEQ ID NO: 29. The nucleic acid sequence of SEQ ID NO: 32 comprises and provides an exemplary nucleic acid sequence corresponding to and encoding SEQ ID NO: 31. The nucleic acid sequence of SEQ ID NO: 34 comprises and provides an exemplary nucleic acid sequence corresponding to and encoding SEQ ID NO: 33. The nucleic acid sequence of SEQ ID NO: 36 comprises and provides an exemplary nucleic acid sequence corresponding to and encoding SEQ ID NO: 35. The nucleic acid sequence of SEQ ID NO: 38 comprises and provides an exemplary nucleic acid sequence corresponding to and encoding SEQ ID NO: 37. The nucleic acid sequence of SEQ ID NO: 40 comprises and provides an exemplary nucleic acid sequence corresponding to and encoding SEQ ID NO: 39. The nucleic acid sequence of SEQ ID NO: 42 comprises and provides an exemplary nucleic acid sequence corresponding to and encoding SEQ ID NO: 41. The nucleic acid sequence of SEQ ID NO: 44 comprises and provides an exemplary nucleic acid sequence corresponding to and encoding SEQ ID NO: 43. The nucleic acid sequence of SEQ ID NO: 46 comprises and provides an exemplary nucleic acid sequence corresponding to and encoding SEQ ID NO: 45. The nucleic acid sequence of SEQ ID NO: 48 comprises and provides an exemplary nucleic acid sequence corresponding to and encoding SEQ ID NO: 47. The nucleic acid sequence of SEQ ID NO: 50 comprises and provides an exemplary nucleic acid sequence corresponding to and encoding SEQ ID NO: 49.

In one embodiment described herein, a GPC3 binding CAR construct has an amino acid sequence having at least 75% sequence identity to (such as, at least 75%, at least 80%, at least 90%, at least 95%, or 100% identity; e.g., 85-90%, 85-95%, 85-100%, 90-95%, 90-100%, or 95-100%) SEQ ID NO: 121. QVQLVQSGAEVKKP-GASVKVSCKASGYTFTDYYIHWVRQAPGQ-GLEWMGEIYPGSGN TYYAQKFQGRVTMTRDTST-STVYMELSSLRSEDTAVYYCARGNDY DAWFVYWGQGT LVTVSSGSTSGSGKPGSGEGSTKG-DIVMTQSPDSLAVSLGERATINCKSSQSLLNSGTRK NYLAWYQQKPGQPPKLLIYWA-SIRESGVPDRFSGSGSGTDFTLTISSLQAEDVAVYYCK QSYSLYTFGQGTKLEIKGSTTTPAPRPPTPAPTIA-SQPLSLRPEACRPAAGGAVHTRGLDF ACDIYI-WAPLAGTCGVLLLSLVITLYCKRGRKKLLY-IFKQPFMRPVQTTQEEDGCSCRFP EEEEGGCELRVKFSRSADAPAYQQGQNQLYNELNL-GRREEYDVLDKRRGRDPEMGGK PRRKNPQEGLY-NELQKDKMAEAYSEIGMKGERRRGKGHDGLYQGL-STATKDTYDALH MQALPPR (SEQ ID NO: 121). In embodiments a GPC3 binding CAR is encoded by a nucleic acid having at least 75% sequence identity to (such as, at least 75%, at least 80%, at least 90%, at least 95%, or 100% identity; e.g., 85-90%, 85-95%, 85-100%, 90-95%, 90-100%, or 95-100%) to the nucleic acid having the sequence according to:

(SEQ ID NO: 83)
CAAGTTCAGCTGGTGCAGAGCGGCGCCGAAGTGAAAAAGCCCGGCGCCAG

CGTGAAAGTCTCATGCAAGGCCAGCGGCTATACCTTCACCGACTACTACA

TCCACTGGGTCCGACAAGCTCCCGGTCAAGGTTTAGAGTGGATGGGCGAG

ATCTACCCCGGCAGCGGCAACACCTACTACGCCCAGAAGTTCCAAGGACG

TGTGACCATGACTCGTGACACCTCCACCTCCACCGTGTATATGGAGCTGA

GCTCTTTAAGGTCCGAGGATACCGCTGTGTACTACTGCGCCAGAGGAAAC

GACTACGACGCTTGGTTCGTGTACTGGGGCCAAGGAACATTAGTGACCGT

CAGCTCCGGCTCCACAAGCGGATCCGGCAAACCCGGTAGCGGCGAAGGCA

GCACCAAGGGCGACATCGTGATGACCCAGAGCCCCGATTCTTTAGCTGTG

TCTTTAGGCGAGAGAGCCACCATCAACTGCAAGTCCTCCCAGAGCTTATT

AAATAGCGGCACTCGAAAAAACTATTTAGCTTGGTACCAACAGAAGCCCG

GCCAGCCCCCAAGCTGCTCATCTACTGGGCTTCCATCAGAGAGAGCGGC

GTGCCCGATAGATTCAGCGGCAGCGGCTCCGGCACAGACTTCACTTTAAC

CATCTCCTCTTTACAAGCTGAGGACGTGGCCGTGTATTACTGCAAGCAGT

CCTACTCTTTATACACCTTCGGCCAAGGAACAAAGCTGGAGATCAAAggG tccACCACGACGCCAGCGCCGCGACCACCAACACCGGCGCCCACCATCGC GTCGCAGCCCCTGTCCCTGCGCCCAGAGGCGTGCCGGCCAgcggcggggg gcgcagTGCACACGAGGGGCTGGACTTCGCCTGTGATATCTACATCTGG

GCGCCCTTGGCCGGGACTTGTGGGGTCCTTCTCCTGTCACTGGTTATCAC

CCTTTACTGCAAACGGGGCAGAAAGAAACTCCTGTATATATTCAAACAAC

CATTTATGAGACCAGTACAAACTACTCAAGAGGAAGATGGCTGTAGCTGC

CGATTTCCAGAAGAAGAAGAAGGAGGATGTGAACTGAGAGTGAAGTTCAG

CAGGAGCGCAGACGCCCCCGCGTACCAGCAGGGCCAGAACCAGCTCTATA

ACGAGCTCAATCTAGGACGAAGAGAGGAGTACGATGTTTTGGACAAGAGg

CGTGGCCGGGACCCTGAGATGGGGGGAAAGCCGAGAAGGAAGAACCCTCA

-continued
GGAAGGCCTGTACAATGAACTGCAGAAAGATAAGATGGCGGAGGCCTACA

GTGAGATTGGGATGAAAGGCGAGCGCCGGAGGGGCAAGGGGCACGATGGC

CTTTACCAGGGTCTCAGTACAGCCACCAAGGACACCTACGACGCCCTTCA

CATGCAGGCCCTGCCCCCTCGC.

In one embodiment described herein, a GPC3 binding CAR construct has an amino acid sequence having at least 75% sequence identity to (such as, at least 75%, at least 80%, at least 90%, at least 95%, or 100% identity; e.g., 85-90%, 85-95%, 85-100%, 90-95%, 90-100%, or 95-100%) SEQ ID NO: 84. QVQLVQSGAEVKKP-GASVKVSCKTSGYTFTDYYIHWVRQAPGQ-GLEWMGEIYPGSGN TYYAQKFQGRVTMTADTST-STAYMELSSLRSEDTAVYYCARGNDYD AWFVYWGQGT LVTVSSGSTSGSGKPGSGEGSTKG-DIVMTQSPDSLAVSLGERATINCKSSQSLLNSGTRK NYLAWYQQKPGQPPKLLIYWA-SIRESGVPDRFSGSGSGTDFTLTISSLQAEDVAVYYCK QSYSLYTFGQGTKLEIKGSTTTPAPRPPTPAPTIA-SQPLSLRPEACRPAAGGAVHTRGLDF ACDIYI-WAPLAGTCGVLLLSLVITLYCKRGRKKLLY-IFKQPFMRPVQTTQEEDGCSCRFP EEEEGGCELRVKFSRSADAPAYQQGQNQLYNELNL-GRREEYDVLDKRRGRDPEMGGK PRRKNPQEGLY-NELQKDKMAEAYSEIGMKGERRRGKGHDGLYQGL-STATKDTYDALH MQALPPR (SEQ ID NO: 84). In embodiments a GPC3 binding CAR is encoded by a nucleic acid having at least 75% sequence identity to (such as, at least 75%, at least 80%, at least 90%, at least 95%, or 100% identity; e.g., 85-90%, 85-95%, 85-100%, 90-95%, 90-100%, or 95-100%) to the nucleic acid having the sequence according to:

(SEQ ID NO: 85)
CAAGTTCAGCTGGTGCAGAGCGGCGCCGAAGTGAAAAAGCCCGGCGCCAG

CGTGAAAGTCTCATGCAAGACCTCCGGCTACACCTTCACCGACTACTACA

TCCACTGGGTCCGACAAGCTCCCGGCCAAGGTCTGGAGTGGATGGGCGAG

ATCTACCCCGGCTCCGGCAACACCTATTACGCCCAGAAGTTCCAAGGACG

TGTGACCATGACAGCCGACACCTCCACCAGCACCGCCTACATGGAACTGA

GCAGCTTACGTAGCGAGGACACCGCTGTGTACTACTGCGCTCGTGGCAAC

GACTACGACGCTTGGTTCGTGTACTGGGGCCAAGGAACTCTGGTGACCGT

GTCCTCCGGAAGCACCTCCGGAAGCGGCAAGCCCGGTAGCGGCGAAGGAT

CCACCAAGGGCGACATCGTGATGACCCAGTCCCCCGATTCTTTAGCCGTC

AGCCTTGGAGAGAGAGCCACCATCAACTGCAAGAGCAGCCAGAGCTTATT

AAACTCCGGCACTCGAAAAAACTACCTCGCTTGGTACCAGCAGAAGCCCG

GTCAGCCCCCTAAGCTGCTGATCTACTGGGCCAGCATTCGTGAGAGCGGA

GTGCCCGACAGATTTAGCGGCTCCGGCAGCGGCACCGATTTCACTTTAAC

CATCAGCTCTTTACAAGCTGAGGATGTGGCCGTGTATTACTGCAAGCAGT

CCTACTCTTTATACACCTTCGGCCAAGGAACAAAGCTGGAGATTAAGggG tccACCACGACGCCAGCGCCGCGACCACCAACACCGGCGCCCACCATCGC GTCGCAGCCCCTGTCCCTGCGCCCAGAGGCGTGCCGGCCAgcggcggggg gcgcagTGCACACGAGGGGGCTGGACTTCGCCTGTGATATCTACATCTGG

```
GCGCCCTTGGCCGGGACTTGTGGGGTCCTTCTCCTGTCACTGGTTATCAC

CCTTTACTGCAAACGGGGCAGAAAGAAACTCCTGTATATATTCAAACAAC

CATTTATGAGACCAGTACAAACTACTCAAGAGGAAGATGGCTGTAGCTGC

CGATTTCCAGAAGAAGAAGAAGGAGGATGTGAACTGAGAGTGAAGTTCAG

CAGGAGCGCAGACGCCCCCGCGTACCAGCAGGGCCAGAACCAGCTCTATA

ACGAGCTCAATCTAGGACGAAGAGAGGAGTACGATGTTTTGGACAAGAGg

CGTGGCCGGGACCCTGAGATGGGGGGAAAGCCGAGAAGGAAGAACCCTCA

GGAAGGCCTGTACAATGAACTGCAGAAAGATAAGATGGCGGAGGCCTACA

GTGAGATTGGGATGAAAGGCGAGCGCCGGAGGGGCAAGGGGCACGATGGC

CTTTACCAGGGTCTCAGTACAGCCACCAAGGACACCTACGACGCCCTTCA

CATGCAGGCCCTGCCCCCTCGC.
```

In one embodiment described herein, a GPC3 binding CAR construct has an amino acid sequence having at least 75% sequence identity to (such as, at least 75%, at least 80%, at least 90%, at least 95%, or 100% identity; e.g., 85-90%, 85-95%, 85-100%, 90-95%, 90-100%, or 95-100%) SEQ ID NO: 86. QVQLVQSGAEVKKP-GASVKVSCKTSGYTFTDYYIHWVRQAPGQ-GLEWMGEIYPGSGN TYYAQKFQGRVTMTADTST-STAYMELSSLRSEDTAVYYCARGNDYDA WFVYWGQGT LVTVSSGSTSGSGKPGSGEGSTKGDI-VMTQSPDSLAVSLGERVTMNCKSSQSLLNSGTR KNYLAWYQQKPGQPPKLLIYWA-SIRESGVPDRFSGSGSGTDFTLTISSVQAEDVAVYYC KQSYSLYTFGQGTKLEIKGSTTTPAPRPPTPAPTIA-SQPLSLRPEACRPAAGGAVHTRGL DFACDIYI-WAPLAGTCGVLLLSLVITLYCKRGRKKLLY-IFKQPFMRPVQTTQEEDGCSCR FPEEEEGGCELRVKFSRSADAPAYQQGQNQLY-NELNLGRREEYDVLDKRRGRDPEMG GKPRRKNPQEGLYNELQKDKMAEAYSEI-GMKGERRRGKGHDGLYQGLSTATKDTYD ALHMQALPPR (SEQ ID NO: 86). In embodiments a GPC3 binding CAR is encoded by a nucleic acid having at least 75% sequence identity to (such as, at least 75%, at least 80%, at least 90%, at least 95%, or 100% identity; e.g., 85-90%, 85-95%, 85-100%, 90-95%, 90-100%, or 95-100%) to the nucleic acid having the sequence according to:

```
                                       (SEQ ID NO: 87)
CAAGTTCAGCTGGTGCAGTCCGGAGCCGAGGTCAAGAAGCCCGGAGCCAG

CGTGAAAGTCTCATGTAAAACCAGCGGCTACACCTTCACCGACTACTACA

TCCACTGGGTCCGACAAGCCCCCGGTCAAGGTTTAGAGTGGATGGCGAG

ATCTACCCCGGCTCCGGCAACACCTACTACGCCCAGAAGTTCCAAGGTCG

TGTGACCATGACAGCCGACACCAGCACCTCCACCGCCTACATGGAACTGT

CCTCTCTGCGTTCTGAGGACACAGCCGTTTACTACTGCGCCAGAGGCAAC

GACTACGACGCTTGGTTCGTGTACTGGGGCCAAGGAACATTAGTGACCGT

GTCCTCCGGATCCACATCCGGCAGCGGAAAGCCCGGTAGCGGCGAGGGCA

GCACCAAAGGAGACATCGTCATGACCCAGAGCCCCGATTCTTTAGCCGTG

TCTTTAGGCGAAAGAGTGACCATGAACTGCAAGTCCAGCCAGTCTTTACT

GAATTCCGGCACTCGAAAAAACTATTTAGCTTGGTACCAGCAGAAACCCG

GCCAGCCCCCTAAGCTGCTGATCTACTGGGCTAGCATTCGAGAATCCGGC

GTGCCCGATCGCTTTAGCGGCAGCGGTAGCGGCACCGACTTTACTTTAAC

CATCAGCAGCGTGCAAGCTGAGGACGTGGCTGTGTACTATTGCAAGCAGT

CCTACTCTTTATACACCTTCGGCCAAGGAACAAAGCTGGAGATCAAGggG tccACCACGACGCCAGCGCCGCGACCACCAACACCGGCGCCCACCATCGC GTCGCAGCCCCTGTCCCTGCGCCCAGAGGCGTGCCGGCCAgcggcggggg gcgcagTGCACACGAGGGGGCTGGACTTCGCCTGTGATATCTACATCTGG

GCGCCCTTGGCCGGGACTTGTGGGGTCCTTCTCCTGTCACTGGTTATCAC

CCTTTACTGCAAACGGGGCAGAAAGAAACTCCTGTATATATTCAAACAAC

CATTTATGAGACCAGTACAAACTACTCAAGAGGAAGATGGCTGTAGCTGC

CGATTTCCAGAAGAAGAAGAAGGAGGATGTGAACTGAGAGTGAAGTTCAG

CAGGAGCGCAGACGCCCCCGCGTACCAGCAGGGCCAGAACCAGCTCTATA

ACGAGCTCAATCTAGGACGAAGAGAGGAGTACGATGTTTTGGACAAGAGg

CGTGGCCGGGACCCTGAGATGGGGGGAAAGCCGAGAAGGAAGAACCCTCA

GGAAGGCCTGTACAATGAACTGCAGAAAGATAAGATGGCGGAGGCCTACA

GTGAGATTGGGATGAAAGGCGAGCGCCGGAGGGGCAAGGGGCACGATGGC

CTTTACCAGGGTCTCAGTACAGCCACCAAGGACACCTACGACGCCCTTCA

CATGCAGGCCCTGCCCCCTCGC.
```

In one embodiment described herein, a GPC3 binding CAR construct has an amino acid sequence having at least 75% sequence identity to (such as, at least 75%, at least 80%, at least 90%, at least 95%, or 100% identity; e.g., 85-90%, 85-95%, 85-100%, 90-95%, 90-100%, or 95-100%) SEQ ID NO: 88. QVQLVQSGAEVKKP-GASVKVSCKTSGYTFTDYYIHWVRQAPGQ-GLEWIGEIYPGSGNT YYAQKFQGRATLTADTST-STAYMEFSSLRSEDTAVYYCARGNDY DAWFVYWGQGTL VTVSSGSTSGSGKPGSGEGSTKG-DIVMTQSPDSLAVSLGERATINCKSSQSLLNSGTRKN YLAWYQQKPGQPPKLLIYWA-SIRESGVPDRFSGSGSGTDFTLTISSLQAEDVA-VYYCKQ SYSLYTFGQGTKLEIKGSTTTPAPRPPTPAP-TIASQPLSLRPEACRPAAGGAVHTRGLDFA CDIYIWAPLAGTCGVLLLSLVITLYCKRGRKKLLY-IFKQPFMRPVQTTQEEDGCSCRFPE EEEGGCELRVKFSRSADAPAYQQGQNQLYNELNL-GRREEYDVLDKRRGRDPEMGGKP RRKNPQEGLY-NELQKDKMAEAYSEIGMKGERRRGKGHDGLYQGL-STATKDTYDALH MQALPPR (SEQ ID NO: 88). In embodiments a GPC3 binding CAR is encoded by a nucleic acid having at least 75% sequence identity to (such as, at least 75%, at least 80%, at least 90%, at least 95%, or 100% identity; e.g., 85-90%, 85-95%, 85-100%, 90-95%, 90-100%, or 95-100%) to the nucleic acid having the sequence according to:

```
                                       (SEQ ID NO: 89)
CAAGTTCAGCTGGTGCAGAGCGGCGCTGAGGTGAAGAAGCCCGGTGCCTC

CGTGAAGGTGTCTTGTAAGACCAGCGGCTACACCTTCACCGACTACTACA

TCCACTGGGTCCGACAAGCTCCCGGTCAAGGTTTAGAGTGGATTGGCGAG
```

```
-continued
ATCTATCCCGGCAGCGGCAACACCTACTACGCCCAGAAGTTCCAAGGACG

TGCCACTTTAACCGCTGACACCAGCACCAGCACCGCCTACATGGAGTTCT

CCTCTTTAAGGAGCGAGGACACCGCCGTGTATTACTGCGCTCGTGGCAAC

GACTATGACGCTTGGTTCGTGTACTGGGGTCAAGGAACATTAGTGACAGT

GAGCAGCGGATCCACCAGCGGATCCGGCAAGCCCGGTAGCGGAGAAGGCA

GCACCAAGGGCGACATCGTGATGACCCAGAGCCCCGATTCTTTAGCTGTG

AGCCTTGGAGAGAGGGCCACCATCAACTGCAAGTCCTCCCAGTCTTTACT

GAACAGCGGCACTCGAAAAAACTATTTAGCTTGGTACCAGCAGAAACCCG

GCCAGCCCCCTAAGCTGCTGATCTACTGGGCCTCCATTCGTGAAAGCGGC

GTGCCCGATAGATTCAGCGGCAGCGGCTCCGGAACCGACTTTACTTTAAC

CATCTCCTCTTTACAAGCTGAGGACGTGGCTGTGTACTACTGCAAGCAGA

GCTACTCTTTATACACCTTCGGCCAAGGAACAAAGCTGGAAATCAAGggG tccACCACGACGCCAGCGCCGCGACCACCAACACCGGCGCCCACCATCGC GTCGCAGCCCCTGTCCCTGCGCCCAGAGGCGTGCCGGCCAgcggcggggg gcgcagTGCACACGAGGGGGCTGGACTTCGCCTGTGATATCTACATCTGG

GCGCCCTTGGCCGGGACTTGTGGGGTCCTTCTCCTGTCACTGGTTATCAC

CCTTTACTGCAAACGGGGCAGAAAGAAACTCCTGTATATATTCAAACAAC

CATTTATGAGACCAGTACAAACTACTCAAGAGGAAGATGGCTGTAGCTGC

CGATTTCCAGAAGAAGAAGAAGGAGGATGTGAACTGAGAGTGAAGTTCAG

CAGGAGCGCAGACGCCCCCGCGTACCAGCAGGGCCAGAACCAGCTCTATA

ACGAGCTCAATCTAGGACGAAGAGAGGAGTACGATGTTTTGGACAAGAGg

CGTGGCCGGGACCCTGAGATGGGGGGAAAGCCGAGAAGGAAGAACCCTCA

GGAAGGCCTGTACAATGAACTGCAGAAAGATAAGATGGCGGAGGCCTACA

GTGAGATTGGGATGAAAGGCGAGCGCCGGAGGGGCAAGGGGCACGATGGC

CTTTACCAGGGTCTCAGTACAGCCACCAAGGACACCTACGACGCCCTTCA

CATGCAGGCCCTGCCCCCTCGC.
```

In one embodiment described herein, a GPC3 binding CAR construct has an amino acid sequence having at least 75% sequence identity to (such as, at least 75%, at least 80%, at least 90%, at least 95%, or 100% identity; e.g., 85-90%, 85-95%, 85-100%, 90-95%, 90-100%, or 95-100%) SEQ ID NO: 90. VQLVQSGAEVKKP-GASVKVSCKTSGYTFTDYYIHWVRQAPGQ-GLEWIGEIYPGSGNTY YAQKFQGRATLTADTST-STAYMEFSSLRSEDTAVYYCARGN DYDAWFVYWGQGTLVT VSSGSTSGSGKPGSGEG-STKGDIVMTQSPDSLAVSLGERVTMNCK-SSQSLLNSGTRKNY LAWYQQKPGQPPKLLIYWA-SIRESGVPDRFSGSGSGTDFTLTISSVQAEDVAVYYCKQS YSLYTFGQGTKLEIKGSTTTPAPRPPTPAPTIA-SQPLSLRPEACRPAAGGAVHTRGLDFAC DIYI-WAPLAGTCGVLLLSLVITLYCKRGRKKLLY-IFKQPFMRPVQTTQEEDGCSCRFPEE EEGGCELRVKFSRSADAPAYQQGQNQLYNELNLGR-REEYDVLDKRRGRDPEMGGKPR RKNPQEGLY-NELQKDKMAEAYSEIGMKGERRRGKGHDGLYQGL-STATKDTYDALHM QALPPR (SEQ ID NO: 90). In embodiments a GPC3 binding CAR is encoded by a nucleic acid having at least 75% sequence identity to (such as, at least 75%, at least 80%, at least 90%, at least 95%, or 100% identity; e.g., 85-90%, 85-95%, 85-100%, 90-95%, 90-100%, or 95-100%) to the nucleic acid having the sequence according to:

```
                                    (SEQ ID NO: 91)
CAAGTTCAGCTGGTCCAGAGCGGCGCTGAAGTGAAGAAGCCCGGCGCTAG

CGTCAAAGTCTCATGCAAAACCTCCGGCTACACCTTTACCGACTACTACA

TCCACTGGGTCCGACAAGCTCCCGGTCAAGGTCTGGAGTGGATCGGCGAG

ATCTACCCCGGCAGCGGCAACACCTACTACGCCCAGAAGTTCCAAGGACG

TGCCACTTTAACCGCTGACACCAGCACCTCCACCGCCTACATGGAGTTCA

GCTCTTTAAGGTCCGAGGACACCGCCGTGTACTACTGCGCTCGTGGCAAC

GATTACGACGCTTGGTTCGTGTACTGGGGACAAGGAACATTAGTGACCGT

GTCCAGCGGCAGCACAAGCGGAAGCGGCAAGCCCGGTAGCGGCGAGGGAA

GCACCAAGGGCGATATCGTGATGACCCAGAGCCCCGATTCTTTAGCCGTG

TCTTTAGGAGAGAGTGACCATGAACTGCAAGAGCAGCCAGTCTTTACT

GAACAGCGGCACCAGAAAGAACTATTTAGCTTGGTACCAGCAGAAGCCCG

GCCAGCCTCCCAAGCTGCTGATCTACTGGGCCAGCATTCGTGAGAGCGGA

GTGCCCGACAGATTCAGCGGCAGCGGCTCCGGCACCGACTTTACTTTAAC

CATCAGCAGCGTGCAAGCTGAGGATGTGGCCGTGTATTACTGCAAGCAGT

CCTACTCTTTATACACCTTTGGCCAAGGAACAAAGCTGGAGATCAAAggG tccACCACGACGCCAGCGCCGCGACCACCAACACCGGCGCCCACCATCGC GTCGCAGCCCCTGTCCCTGCGCCCAGAGGCGTGCCGGCCAgcggcggggg gcgcagTGCACACGAGGGGGCTGGACTTCGCCTGTGATATCTACATCTGG

GCGCCCTTGGCCGGGACTTGTGGGGTCCTTCTCCTGTCACTGGTTATCAC

CCTTTACTGCAAACGGGGCAGAAAGAAACTCCTGTATATATTCAAACAAC

CATTTATGAGACCAGTACAAACTACTCAAGAGGAAGATGGCTGTAGCTGC

CGATTTCCAGAAGAAGAAGAAGGAGGATGTGAACTGAGAGTGAAGTTCAG

CAGGAGCGCAGACGCCCCCGCGTACCAGCAGGGCCAGAACCAGCTCTATA

ACGAGCTCAATCTAGGACGAAGAGAGGAGTACGATGTTTTGGACAAGAGg

CGTGGCCGGGACCCTGAGATGGGGGGAAAGCCGAGAAGGAAGAACCCTCA

GGAAGGCCTGTACAATGAACTGCAGAAAGATAAGATGGCGGAGGCCTACA

GTGAGATTGGGATGAAAGGCGAGCGCCGGAGGGGCAAGGGGCACGATGGC

CTTTACCAGGGTCTCAGTACAGCCACCAAGGACACCTACGACGCCCTTCA

CATGCAGGCCCTGCCCCCTCGC.
```

Both engineered T cell receptors (TCR) and chimeric antigen receptor (CAR) therapies harness the specificity and immunotherapeutic effect of T cells for the treatment of a wide variety of malignancies. Some studies suggest that these therapies may be susceptible to the suppressive factors in the TME that result from T cell suppression by TGF-β (Bendle et al., J Immunol, 191:3232-3239 (2013) and Vong et al., Blood, 130:1791 (2017)). The present disclosure contemplates the use of the DN TGF-β Receptors described herein in combination with either TCR or CAR therapies as a way to maintain, or in some cases, restore TCR and/or CAR expansion in the presence of TGF-β suppression.

Chimeric antigen receptor (CAR) T cell therapy provides another therapeutic approach against tumor progression. Clinically, investigators have demonstrated that CAR expansion and persistence is correlated with therapeutic efficacy. Without being bound by any theory, it is believed that TGF-β repressed T cell populations found in the TME may be limiting CAR T cell expansion and persistence in patients who do not respond to CAR therapy. The resulting inhibitory cytokines in the TME are believed to limit CAR cell function and expansion. Thus, TGF-β could limit the efficacy of therapeutic engineered T cells.

Combining any CAR constructs or TCRs as described herein with a DN TGF-β receptors may restore, maintain or enhance the therapeutic effect of CAR T therapy challenged by TGF-β suppression. Thus, in one embodiment described herein, the DN TGF-β receptors, for example DN TGF-βRI or RII, are co-expressed in a T cell or an NK cell with a GPC3 binding CAR, as described herein. In some embodiments, the DN TGF-β receptors, for example DN TGF-βRI or RII, are co-expressed in a T cell or NK cell with a GPC3 binding CAR, such as described herein. In some embodiments the DN TGF-β receptors, for example DN TGF-βRI or RII, are co-expressed in a T cell or NK cell with a GPC3 binding TCR. DN TGF-β receptors are described in International Patent Application No. PCT/US2020/070157, which is hereby incorporated herein by reference in its entirety.

The engineered TGF-β receptors may comprise an N-terminal signal peptide at the N-terminus, for example at the N-terminus of the extracellular ligand binding domain of DN TGF-βRI. In one embodiment, a heterologous signal peptide may be used. The extracellular domain of a DN TGF-βRI may be fused to a leader or a signal peptide that directs the nascent protein into the endoplasmic reticulum and subsequent translocation to the cell surface. It is understood that, once a polypeptide containing a signal peptide is expressed at the cell surface, the signal peptide is generally proteolytically removed during processing of the polypeptide in the endoplasmic reticulum and translocation to the cell surface. Thus, a polypeptide such as a DN TGF-βRI is generally expressed at the cell surface as a mature protein lacking the signal peptide, whereas the precursor form of the polypeptide includes the signal peptide. Any suitable signal sequence may be used. In one embodiment described herein, the DN TGF-βRI comprises the amino acid sequence having at least 75% sequence identity to (such as, at least 75%, at least 80%, at least 90%, at least 95%, or 100% identity; e.g., 85-90%, 85-95%, 85-100%, 90-95%, 90-100%, or 95-100%) of SEQ ID NO: 92 or a portion thereof.

(SEQ ID NO: 92)
MEAAVAAPRPRLLLLVLAAAAAAAAALLPGATA.

In the present disclosure, the signal peptide is joined to the N-terminus of the extracellular antigen-binding domain of the DN TGF-βRI as a fusion protein. In one embodiment, the DN TGF-βRI comprises an extracellular ligand binding domain having at least 75% sequence identity to (such as, at least 75%, at least 80%, at least 90%, at least 95%, or 100% identity; e.g., 85-90%, 85-95%, 85-100%, 90-95%, 90-100%, or 95-100%) the wild-type TGF-βRI and a signal peptide at the N-terminus of the extracellular domain TGF-βRI, having at least 75% sequence identity to (such as, at least 75%, at least 80%, at least 90%, at least 95%, or 100% identity; e.g., 85-90%, 85-95%, 85-100%, 90-95%, 90-100%, or 95-100%) the amino acid sequence of SEQ ID NO: 93.

(SEQ ID NO: 93)
MEAAVAAPRPRLLLLVLAAAAAAAAALLPGATALQCFCHLCTKDNFTCVT

DGLCFVSVTETTDKVIHNSMCIAEIDLIPRDRPFVCAPSSKTGSVTTTYC

CNQDHCNKIELPTTVKSSPGLGPVEL.

The engineered DN TGF-βRII constructs may also comprise an N-terminal signal peptide at the N-terminus of the extracellular ligand binding domain of TGF-βRII. In one embodiment, a heterologous signal peptide may be used. The extracellular domain of a DN TGF-βRII may be fused to a leader or a signal peptide that directs the nascent protein into the endoplasmic reticulum and subsequent translocation to the cell surface. It is understood that, once a polypeptide containing a signal peptide is expressed at the cell surface, the signal peptide is generally proteolytically removed during processing of the polypeptide in the endoplasmic reticulum and translocation to the cell surface. Thus, a polypeptide such as a DN TGF-βRII is generally found at the cell surface as a mature protein lacking the signal peptide, whereas the precursor form of the polypeptide includes the signal peptide. Any suitable signal sequence may be used. In one embodiment described herein, the DN TGF-βRII constructs described herein comprise a signal sequence having at least 75% sequence identity to (such as, at least 75%, at least 80%, at least 90%, at least 95%, or 100% identity; e.g., 85-90%, 85-95%, 85-100%, 90-95%, 90-100%, or 95-100%) the amino acid sequence of SEQ ID NO: 94 or a portion thereof. MGRGLLRGLWPLHIVLWTRIAS (SEQ ID NO: 94). In another embodiment, the signal sequence is derived from Colony Stimulating Factor 2 Receptor Alpha subunit (CSF2Rα) comprising the amino acid sequence at least 75% sequence identity to (such as, at least 75%, at least 80%, at least 90%, at least 95%, or 100% identity; e.g., 85-90%, 85-95%, 85-100%, 90-95%, 90-100%, or 95-100%) of SEQ ID NO: 79 or a portion thereof. MLLLVTSLLLCELPHPAFLLIP (SEQ ID NO: 79). The signal sequences described herein may also be optionally used with any suitable protein tag, including but not limited to: V5-tag, myc-tag, HA-tag, Spot-tag, NE-tag. In one embodiment described herein, the signal sequence and tag comprise the amino acid sequence having at least 75% sequence identity to (such as, at least 75%, at least 80%, at least 90%, at least 95%, or 100% identity; e.g., 85-90%, 85-95%, 85-100%, 90-95%, 90-100%, or 95-100%) SEQ ID NO: 95. MLLLVTSLLLCELPHPAFLLIPEQKLISEEDL (SEQ ID NO: 95). In embodiments, the signal sequence and tag may be encoded by nucleic acid sequence at least 75% sequence identity to ATGCTTCTCCTGGTGACAAGCCTTCTGCTCTGTGAGTTACCACACCCAGCATTCCTC CTGATTCCTGAACAGAAGCTGATAAGTGAGGAGGACTTG (SEQ ID NO: 96) (e.g., at least 75%, at least 80%, at least 90%, at least 95%, or 100% identity; e.g., 85-90%, 85-95%, 85-100%, 90-95%, 90-100%, or 95-100%).

It is understood that use of this signal peptide is exemplary. Any suitable signal peptide, as are well known in the art, may be applied to the DN TGF-βRI or RII to provide cell surface expression in an immune cell. Useful signal peptides may be derived from cell surface proteins naturally expressed in the T cell NK cell or precursor cell thereof, including any of the signal peptides of the polypeptides disclosed herein. Thus, any suitable signal peptide may be utilized to direct the DN TGF-βRI RII to be expressed at the cell surface of a T cell or NK cell.

In embodiments, a DN TGF-βRI comprises an amino acid sequence at least 75% sequence identity to (such as, at least 75%, at least 80%, at least 90%, at least 95%, or 100% identity; e.g., 85-90%, 85-95%, 85-100%, 90-95%, 90-100%, or 95-100%) the amino acid sequence of SEQ ID NO: 97.

(SEQ ID NO: 97)
MEAAVAAPRPRLLLLVLAAAAAAAAALLPGATALQCFCHLCTKDNFTCVT

DGLCFVSVTETTDKVIHNSMCIAEIDLIPRDRPFVCAPSSKTGSVTTTYC

CNQDHCNKIELPTTVKSSPGLGPVELAAVIAGPVCFVCISLMLMVYIRVN

RQ.

In one embodiment a DN TGF-βRII comprises an amino acid sequence at least 75% sequence identity to (such as, at least 75%, at least 80%, at least 90%, at least 95%, or 100% identity; e.g., 85-90%, 85-95%, 85-100%, 90-95%, 90-100%, or 95-100%) the amino acid sequence of SEQ ID NO: 98:

(SEQ ID NO: 98)
MGRGLLRGLWPLHIVLWTRIASTIPPHVQKSVNNDMIVTDNNGAVKFPQL

CKFCDVRFSTCDNQKSCMSNCSITSICEKPQEVCVAVWRKNDENITLETV

CHDPKLPYHDFILEDAASPKCIMKEKKKPGETFFMCSCSSDECNDNIIFS

EEYNTSNPDLLLVIFQVTGISLLPPLGVAISVIIIFYCYRVNRQ.

In an embodiment a DN TGF-βRII comprises an amino acid sequence at least 75% sequence identity to (such as, at least 75%, at least 80%, at least 90%, at least 95%, or 100% identity; e.g., 85-90%, 85-95%, 85-100%, 90-95%, 90-100%, or 95-100%) the amino acid sequence of SEQ ID NO: 99.

(SEQ ID NO: 99)
TIPPHVQKSVNNDMIVTDNNGAVKFPQLCKFCDVRFSTCDNQKSCMSNCS

ITSICEKPQEVCVAVWRKNDENITLETVCHDPKLPYHDFILEDAASPKCI

MKEKKKPGETFFMCSCSSDECNDNIIFSEEYNTSNPD.

In one embodiment described herein, the DN TGF-βRII comprises an amino acid sequence at least 75% sequence identity to (such as, at least 75%, at least 80%, at least 90%, at least 95%, or 100% identity; e.g., 85-90%, 85-95%, 85-100%, 90-95%, 90-100%, or 95-100%) the wild-type TGF-βRII as shown in the amino acid sequence of SEQ ID NO: 100.

(SEQ ID NO: 100)
TIPPHVQKSVNNDMIVTDNNGAVKFPQLCKFCDVRFSTCDNQKSCMSNCS

ITSICEKPQEVCVAVWRKNDENITLETVCHDPKLPYHDFILEDAASPKCI

MKEKKKPGETFFMCSCSSDECNDNIIFSEEYNTSNPDLLLVIFQVTGISL

LPPLGVAISVIIIFYCY.

In one embodiment described herein, the DN TGF-βRII comprises an amino acid sequence at least 75% sequence identity to (such as, at least 75%, at least 80%, at least 90%, at least 95%, or 100% identity; e.g., 85-90%, 85-95%, 85-100%, 90-95%, 90-100%, or 95-100%) the amino acid sequence of SEQ ID NO: 101.

(SEQ ID NO: 101)
TIPPHVQKSVNNDMIVTDNNGAVKFPQLCKFCDVRFSTCDNQKSCMSNCS

ITSICEKPQEVCVAVWRKNDENITLETVCHDPKLPYHDFILEDAASPKCI

MKEKKKPGETFFMCSCSSDECNDNIIFSEEYNTSNPDSGPILLTISILSF

FSVALLVIL.

In one embodiment described herein, the DN TGF-βRII comprises an amino acid sequence at least 75% sequence identity to (such as, at least 75%, at least 80%, at least 90%, at least 95%, or 100% identity; e.g., 85-90%, 85-95%, 85-100%, 90-95%, 90-100%, or 95-100%) as shown in the amino acid sequence of SEQ ID NO: 102.

(SEQ ID NO: 102)
TIPPHVQKSVNNDMIVTDNNGAVKFPQLCKFCDVRFSTCDNQKSCMSNCS

ITSICEKPQEVCVAVWRKNDENITLETVCHDPKLPYHDFILEDAASPKCI

MKEKKKPGETFFMCSCSSDECNDNIIFSEEYNTSNPDSGPILLTCPTISI

LSFFSVALLVIL.

T In one embodiment described herein, the DN TGF-βRII comprises an amino acid sequence at least 75% sequence identity to (such as, at least 75%, at least 80%, at least 90%, at least 95%, or 100% identity; e.g., 85-90%, 85-95%, 85-100%, 90-95%, 90-100%, or 95-100%) SEQ ID NO: 103.

(SEQ ID NO: 103)
ACVLWKKRIKPIVWPSLPDHKKTLEHLCKKPRKNLNVSFNPESFLDCQIH

RVDDIQARDEVEGFLQDTFPQQLEESEKQRLGGDVQSPNCPSEDVVITPE

SFGRDSSLTCLAGNVSACDAPILSSSRSLDCRESGKNGPHVYQDLLLSLG

TTNSTLPPPFSLQSGILTLNPVAQGQPILTSLGSNQEEAYVTMSSFYQN

Q.

In one embodiment described herein, the DN TGF-βRII comprises an amino acid sequence at least 75% sequence identity to (such as, at least 75%, at least 80%, at least 90%, at least 95%, or 100% identity e.g., 85-90%, 85-95%, 85-100%, 90-95%, 90-100%, or 95-100%) the amino acid sequence of SEQ ID NO: 104.

(SEQ ID NO: 104)
TIPPHVQKSVNNDMIVTDNNGAVKFPQLCKFCDVRFSTCDNQKSCMSNCS

ITSICEKPQEVCVAVWRKNDENITLETVCHDPKLPYHDFILEDAASPKCI

MKEKKKPGETFFMCSCSSDECNDNIIFSEEYNTSNPDSGPILLTISILSF

FSVALLVILACVLWKKRIKPIVWPSLPDHKKTLEHLCKKPRKNLNVSFNP

ESFLDCQIHRVDDIQARDEVEGFLQDTFPQQLEESEKQRLGGDVQSPNCP

SEDVVITPESFGRDSSLTCLAGNVSACDAPILSSSRSLDCRESGKNGPHV

YQDLLLSLGTTNSTLPPPFSLQSGILTLNPVAQGQPILTSLGSNQEEAYV

TMSSFYQNQ.

In one embodiment described herein, the DN TGF-βRII comprises an amino acid sequence at least 75% sequence identity to (such as, at least 75%, at least 80%, at least 90%, at least 95%, or 100% identity; e.g., 85-90%, 85-95%, 85-100%, 90-95%, 90-100%, or 95-100%) to the amino acid sequence of SEQ ID NO: 105.

(SEQ ID NO: 105)
TIPPHVQKSVNNDMIVTDNNGAVKFPQLCKFCDVRFSTCDNQKSCMSNCS

ITSICEKPQEVCVAVWRKNDENITLETVCHDPKLPYHDFILEDAASPKCI

MKEKKKPGETFFMCSCSSDECNDNIIFSEEYNTSNPDSGPILLTCPTISI

LSFFSVALLVILACVLWKKRIKPIVWPSLPDHKKTLEHLCKKPRKNLNVS

FNPESFLDCQIHRVDDIQARDEVEGFLQDTFPQQLEESEKQRLGGDVQSP

NCPSEDVVITPESFGRDSSLTCLAGNVSACDAPILSSSRSLDCRESGKNG

PHVYQDLLLSLGTTNSTLPPPFSLQSGILTLNPVAQGQPILTSLGSNQEE

AYVTMSSFYQNQ.

In an embodiment an engineered DN TGF-βRII comprises an amino acid sequence having at least 75% sequence identity to (such as, at least 75%, at least 80%, at least 90%, at least 95%, or 100% identity; e.g., 85-90%, 85-95%, 85-100%, 90-95%, 90-100%, or 95-100%) the amino acid sequence of SEQ ID NO: 106.

(SEQ ID NO: 106)
MLLLVTSLLLCELPHPAFLLIPTIPPHVQKSVNNDMIVTDNNGAVKFPQL

CKFCDVRFSTCDNQKSCMSNCSITSICEKPQEVCVAVWRKNDENITLETV

CHDPKLPYHDFILEDAASPKCIMKEKKKPGETFFMCSCSSDECNDNIIFS

EEYNTSNPD.

In an embodiment an engineered DN TGF-βRII comprises an amino acid sequence having at least 75% sequence identity to (such as, at least 75%, at least 80%, at least 90%, at least 95%, or 100% identity; e.g., 85-90%, 85-95%, 85-100%, 90-95%, 90-100%, or 95-100%) SEQ ID NO: 107.

(SEQ ID NO: 107)
MLLLVTSLLLCELPHPAFLLIPEQKLISEEDLTIPPHVQKSVNNDMIVTD

NNGAVKFPQLCKFCDVRFSTCDNQKSCMSNCSITSICEKPQEVCVAVWRK

NDENITLETVCHDPKLPYHDFILEDAASPKCIMKEKKKPGETFFMCSCSS

DECNDNIIFSEEYNTSNPD.

In an embodiment an engineered DN TGF-βRII comprises an amino acid sequence having at least 75% sequence identity to (such as, at least 75%, at least 80%, at least 90%, at least 95%, or 100% identity; e.g., 85-90%, 85-95%, 85-100%, 90-95%, 90-100%, or 95-100%) SEQ ID: 108.

(SEQ ID NO: 108)
MLLLVTSLLLCELPHPAFLLIPTIPPHVQKSVNNDMIVTDNNGAVKFPQL

CKFCDVRFSTCDNQKSCMSNCSITSICEKPQEVCVAVWRKNDENITLETV

CHDPKLPYHDFILEDAASPKCIMKEKKKPGETFFMCSCSSDECNDNIIFS

EEYNTSNPDSGPILLTISILSFFSVALLVILACVLWKKRIKPIVWPSLPD

HKKTLEHLCKKPRKNLNVSFNPESFLDCQIHRVDDIQARDEVEGFLQDTF

PQQLEESEKQRLGGDVQSPNCPSEDVVITPESFGRDSSLTCLAGNVSACD

APILSSSRSLDCRESGKNGPHVYQDLLLSLGTTNSTLPPPFSLQSGILTL

NPVAQGQPILTSLGSNQEEAYVTMSSFYQNQ.

In an embodiment an engineered DN TGF-βRII comprises an amino acid sequence having at least 75% sequence identity to (such as, at least 75%, at least 80%, at least 90%, at least 95%, or 100% identity; e.g., 85-90%, 85-95%, 85-100%, 90-95%, 90-100%, or 95-100%) SEQ ID: 109.

(SEQ ID NO: 109)
MLLLVTSLLLCELPHPAFLLIPEQKLISEEDLTIPPHVQKSVNNDMIVTD

NNGAVKFPQLCKFCDVRFSTCDNQKSCMSNCSITSICEKPQEVCVAVWRK

NDENITLETVCHDPKLPYHDFILEDAASPKCIMKEKKKPGETFFMCSCSS

DECNDNIIFSEEYNTSNPDSGPILLTISILSFFSVALLVILACVLWKKRI

KPIVWPSLPDHKKTLEHLCKKPRKNLNVSFNPESFLDCQIHRVDDIQARD

EVEGFLQDTFPQQLEESEKQRLGGDVQSPNCPSEDVVITPESFGRDSSLT

CLAGNVSACDAPILSSSRSLDCRESGKNGPHVYQDLLLSLGTTNSTLPPP

FSLQSGILTLNPVAQGQPILTSLGSNQEEAYVTMSSFYQNQ.

In an embodiment an engineered DN TGF-βRII comprises an amino acid sequence having at least 75% sequence identity to (such as, at least 75%, at least 80%, at least 90%, at least 95%, or 100% identity; e.g., 85-90%, 85-95%, 85-100%, 90-95%, 90-100%, or 95-100%) SEQ ID: 110.

(SEQ ID NO: 110)
MLLLVTSLLLCELPHPAFLLIPTIPPHVQKSVNNDMIVTDNNGAVKFPQL

CKFCDVRFSTCDNQKSCMSNCSITSICEKPQEVCVAVWRKNDENITLETV

CHDPKLPYHDFILEDAASPKCIMKEKKKPGETFFMCSCSSDECNDNIIFS

EEYNTSNPDSGPILLTISILSFFSVALLVILACVLWKKRIKPIVWPSLPD

HKKTLEHLCKKPRKNLNVSFNPESFLDCQIHRVDDIQARDEVEGFLQDTF

PPQQLEESEKQRLGGDVQSPNCPSEDVVITPESFGRDSSLTCLAGNVSAC

DAILSSSRSLDCRESGKNGPHVYQDLLLSLGTTNSTLPPPFSLQSGILTL

NPVAQGQPILTSLGSNQEEAYVTMSSFYQNQ.

In an embodiment an engineered DN TGF-βRII comprises an amino acid sequence having at least 75% sequence identity to (such as, at least 75%, at least 80%, at least 90%, at least 95%, or 100% identity; e.g., 85-90%, 85-95%, 85-100%, 90-95%, 90-100%, or 95-100%) SEQ ID: 111.

(SEQ ID NO: 111)
MLLLVTSLLLCELPHPAFLLIPEQKLISEEDLTIPPHVQKSVNNDMIVTD

NNGAVKFPQLCKFCDVRFSTCDNQKSCMSNCSITSICEKPQEVCVAVWRK

NDENITLETVCHDPKLPYHDFILEDAASPKCIMKEKKKPGETFFMCSCSS

DECNDNIIFSEEYNTSNPDSGPILLTCPTISILSFFSVALLVILACVLWK

KRIKPIVWPSLPDHKKTLEHLCKKPRKNLNVSFNPESFLDCQIHRVDDIQ

ARDEVEGFLQDTFPQQLEESEKQRLGGDVQSPNCPSEDVVITPESFGRDS

SLTCLAGNVSACDAPILSSSRSLDCRESGKNGPHVYQDLLLSLGTTNSTL

PPPFSLQSGILTLNPVAQGQPILTSLGSNQEEAYVTMSSFYQNQ.

In an embodiment an engineered DN TGF-βRII comprises an amino acid sequence having at least 75% sequence identity to (such as, at least 75%, at least 80%, at least 90%, at least 95%, or 100% identity; e.g., 85-90%, 85-95%, 85-100%, 90-95%, 90-100%, or 95-100%) SEQ ID: 112.

(SEQ ID NO: 112)
MLLLVTSLLLCELPHPAFLLIPTIPPHVQKSVNNDMIVTDNNGAVKFPQL

CKFCDVRFSTCDNQKSCMSNCSITSICEKPQEVCVAVWRKNDENITLETV

CHDPKLPYHDFILEDAASPKCIMKEKKKPGETFFMCSCSSDECNDNIIFS

EEYNTSNPDSGPILLTCPTISILSFFSVALLVILACVLWKKRIKPIVWPS

LPDHKKTLEHLCKKPRKNLNVSFNPESFLDCQIHRVDDIQARDEVEGFLQ

DTFPQQLEESEKQRLGGDVQSPNCPSEDVVITPESFGRDSSLTCLAGNVS

ACDAPILSSSRSLDCRESGKNGPHVYQDLLLSLGTTNSTLPPPFSLQSGI

LTLNPVAQGQPILTSLGSNQEEAYVTMSSFYQNQ.

The present disclosure contemplates, the expression of polynucleotides encoding the GPC3 CARs, and TCRs disclosed herein and the co-expression of polynucleotides comprising the engineered DN TGF-β Receptors with a GPC3 binding CARs, TCRs and fragments thereof, cells and compositions comprising the same, and vectors that express polypeptides.

In one embodiment described herein, a GPC3 binding CAR linked to a DN TGF-0 Receptor has an amino acid sequence having at least 75% sequence identity to (such as, at least 75%, at least 80%, at least 90%, at least 95%, or 100% identity; e.g., 85-90%, 85-95%, 85-100%, 90-95%, 90-100%, or 95-100%) SEQ ID NO: 113. QVQLVQS-GAEVKKPGASVKVSCK-
TSGYTFTDYYIHWVRQAPGQGLEWMGEIYPGSGN
TYYAQKFQGRVTMTADTSTSTAYMELSSLRSED-
TAVYYCARGNDYDAWFVYWGQGT LVTVSSGST-
SGSGKPGSGEGSTKGDIVMTQSPD-
SLAVSLGERVTMNCKSSQSLLNSGTR
KNYLAWYQQKPGQPPKLLIYWA-
SIRESGVPDRFSGSGSGTDFTLTISSVQAEDVAVYYC
KQSYSLYTFGQGTKLEIKGSTTTPAPRPPTPAPTIA-
SQPLSLRPEACRPAAGGAVHTRGL DFACDIYI-
WAPLAGTCGVLLLSLVITLYCKRGRKKLLY-
IFKQPFMRPVQTTQEEDGCSCR
FPEEEEGGCELRVKFSRSADAPAYQQGQNQLY-
NELNLGRREEYDVLDKRRGRDPEMG
GKPRRKNPQEGLYNELQKDKMAEAYSEI-
GMKGERRRGKGHDGLYQGLSTATKDTYD
ALHMQALPPRGSGEGRGSLLTCGDVEENPGPMGR-
GLLRGLWPLHIVLWTRIASTIPPHV QKSVNND-
MIVTDNNGAVKFPQLCKFCDVRF-
STCDNQKSCMSNCSITSICEKPQEVCVA
VWRKNDENITLETVCHDPKLPYHDFILEDAASPKCI-
MKEKKKPGETFFMCSCSSDECND NIIF-
SEEYNTSNPDLLLVIFQVTGISLLPPLGVAISVIIIFYCY
(SEQ ID NO: 113). In embodiments a GPC3 binding CAR is encoded by a nucleic acid having at least 75% sequence identity to (such as, at least 75%, at least 80%, at least 90%, at least 95%, or 100% identity; e.g., 85-90%, 85-95%, 85-100%, 90-95%, 90-100%, or 95-100%) to the nucleic acid having the sequence according to:

(SEQ ID NO: 114)
CAAGTCCAACTGGTGCAGTCCGGAGCCGAGGTCAAGAAGCCCGGAGCCAG

CGTGAAAGTCTCATGTAAAACCAGCGGCTACACCTTCACCGACTACTACA

TCCACTGGGTCCGACAAGCCCCCGGTCAAGGTTTAGAGTGGATGGGCGAG

ATCTACCCCGGCTCCGGCAACACCTACTACGCCCAGAAGTTCCAAGGTCG

TGTGACCATGACAGCCGACACCAGCACCTCCACCGCCTACATGGAACTGT

CCTCTCTGCGTTCTGAGGACACAGCCGTTTACTACTGCGCCAGAGGCAAC

GACTACGACGCTTGGTTCGTGTACTGGGGCCAAGGAACATTAGTGACCGT

GTCCTCCGGATCCACATCCGGCAGCGGAAAGCCCGGTAGCGGCGAGGGCA

GCACCAAAGGAGACATCGTCATGACCCAGAGCCCCGATTCTTTAGCCGTG

TCTTTAGGCGAAAGAGTGACCATGAACTGCAAGTCCAGCCAGTCTTTACT

GAATTCCGGCACTCGAAAAAACTATTTAGCTTGGTACCAGCAGAAACCCG

GCCAGCCCCCTAAGCTGCTGATCTACTGGGCTAGCATTCGAGAATCCGGC

GTGCCCGATCGCTTTAGCGGCAGCGGTAGCGGCACCGACTTTACTTTAAC

CATCAGCAGCGTGCAAGCTGAGGACGTGGCTGTGTACTATTGCAAGCAGT

CCTACTCTTTATACACCTTCGGCCAAGGAACAAAGCTGGAGATCAAGGGG

TCCACCACGACGCCAGCGCCGCGACCACCAACACCGGCGCCCACCATCGC

GTCGCAACCCCTGTCCCTGCGCCCCGAGGCGTGCCGGCCAGCGGCGGGGG

GCGCAGTGCACACGAGGGGGCTGGACTTCGCCTGTGATATCTACATCTGG

GCGCCCTTGGCCGGGACTTGTGGGGTCCTTCTCCTGTCACTGGTTATCAC

CCTTTATTGCAAACGGGGCAGAAAGAAACTCCTGTATATATTCAAACAAC

CATTTATGAGACCAGTACAAACTACTCAAGAGGAAGATGGCTGTAGCTGC

CGATTTCCAGAAGAAGAAGAAGGAGGATGTGAATTGAGAGTGAAGTTCAG

CAGGAGCGCAGACGCCCCCGCCTATCAGCAAGGCCAGAACCAGCTCTATA

ACGAGCTCAATTTAGGGCGAAGAGAGGAGTACGATGTTTTGGACAAGAGG

CGTGGCCGGGACCCCGAAATGGGGGGAAAGCCGAGAAGGAAGAACCCTCA

GGAAGGCTTGTACAATGAATTGCAGAAGGATAAGATGGCGGAGGCATACA

GTGAGATTGGGATGAAAGGCGAGCGCCGGAGGGGCAAGGGGCACGATGGC

CTTTATCAGGGTCTCAGTACAGCCACCAAGGACACCTACGACGCCCTTCA

CATGCAAGCCCTGCCCCCTCGCGGCTCTGGAGAGGGCAGAGGCTCTCTGC

TGACCTGCGGCGACGTGGAAGAGAACCCAGGCCCCATGGGAAGAGGTTTA

CTGAGAGGACTGTGGCCTTTACACATCGTGCTGTGGACTCGTATCGCCAG

CACCATCCCCCCCCATGTCCAAAAGAGCGTGAACAACGACATGATCGTGA

CCGACAACAATGGCGCCGTGAAGTTCCCCCAGCTGTGCAAGTTCTGCGAC

GTGAGGTTCAGCACTTGTGACAACCAGAAGAGCTGCATGAGCAACTGCAG

CATCACCTCCATCTGCGAGAAGCCCCAAGAAGTGTGCGTGGCCGTGTGGA

GGAAGAACGACGAGAACATCACTTTAGAGACAGTGTGCCACGACCCCAAG

CTGCCCTACCACGACTTCATTTTAGAAGATGCCGCCAGCCCCAAGTGCAT

CATGAAGGAGAAGAAGAAGCCCGGCGAGACCTTCTTCATGTGTTCTTGTT

CGTCTGATGAGTGCAACGATAACATCATCTTCAGCGAGGAGTACAACACC

AGCAACCCCGATTTACTGCTGGTGATCTTCCAAGTTACCGGCATTTCTTT

ACTGCCTCCGTTGGGCGTGGCTATCAGCGTGATCATCATCTTCTACTGCT

AT.

In one embodiment described herein, a GPC3 binding CAR linked to a DN TGF-0 Receptor has an amino acid sequence having at least 75% sequence identity to (such as, at least 75%, at least 80%, at least 90%, at least 95%, or 100% identity; e.g., 85-90%, 85-95%, 85-100%, 90-95%, 90-100%, or 95-100%) SEQ ID NO: 115. QVQLVQSGAEVKKPGASVKVSCKTSGYTFTDYYIHWVRQAPGQGLEWMGEIYPGSGNTYYAQKFQGRVTMTADTSTSTAYMELSSLRSEDTAVYYCARGNDYDAWFVYWGQGT LVTVSSGSTSGSGKPGSGEGSTKGDIVMTQSPDSLAVSLGERVTMNCKSSQSLLNSGTR KNYLAWYQQKPGQPPKLLIYWASIRESGVPDRFSGSGSGTDFTLTISSVQAEDVAVYYCKQSYSLYTFGQGTKLEIKGSTTTPAPRPPTPAPTIASQPLSLRPEACRPAAGGAVHTRGL DFACDIYIWAPLAGTCGVLLLSLVITLYCKRGRKKLLYIFKQPFMRPVQTTQEEDGCSCR FPEEEEGGCELRVKFSRSADAPAYQQGQNQLYNELNLGRREEYDVLDKRRGRDPEMG GKPRRKNPQEGLYNELQKDKMAEAYSEIGMKGERRRGKGHDGLYQGLSTATKDTYD ALHMQALPPRGSGEGRGSLLTCGDVEENPGPMGRGLLRGLWPLHIVLWTRIASTIPPHV QKSVNNDMIVTDNNGAVKFPQLCKFCDVRFSTCDNQKSCMSNCSITSICEKPQEVCVA VWRKNDENITLETVCHDPKLPYHDFILEDAASPKCIMKEKKKPGETFFMCSCSSDECND NIIFSEEYNTSNPDLLLVIFQVTGISLLPPLGVAISVIIIFYCY (SEQ ID NO: 115). In embodiments a GPC3 binding CAR is encoded by a nucleic acid having at least 75% sequence identity to (such as, at least 75%, at least 80%, at least 90%, at least 95%, or 100% identity; e.g., 85-90%, 85-95%, 85-100%, 90-95%, 90-100%, or 95-100%) to the nucleic acid having the sequence according to:

(SEQ ID NO: 114)
CAAGTCCAACTGGTGCAGTCCGGAGCCGAGGTCAAGAAGCCCGGAGCCAG

CGTGAAAGTCTCATGTAAAACCAGCGGCTACACCTTCACCGACTACTACA

TCCACTGGGTCCGACAAGCCCCCGGTCAAGGTTTAGAGTGGATGGGCGAG

ATCTACCCCGGCTCCGGCAACACCTACTACGCCCAGAAGTTCCAAGGTCG

TGTGACCATGACAGCCGACACCAGCACCTCCACCGCCTACATGGAACTGT

CCTCTCTGCGTTCTGAGGACACAGCCGTTTACTACTGCGCCAGAGGCAAC

GACTACGACGCTTGGTTCGTGTACTGGGGCCAAGGAACATTAGTGACCGT

GTCCTCCGGATCCACATCCGGCAGCGGAAAGCCCGGTAGCGGCGAGGGCA

GCACCAAAGGAGACATCGTCATGACCCAGAGCCCCGATTCTTTAGCCGTG

TCTTTAGGCGAAAGAGTGACCATGAACTGCAAGTCCAGCCAGTCTTTACT

GAATTCCGGCACTCGAAAAAACTATTTAGCTTGGTACCAGCAGAAACCCG

GCCAGCCCCCTAAGCTGCTGATCTACTGGGCTAGCATTCGAGAATCCGGC

GTGCCCGATCGCTTTAGCGGCAGCGGTAGCGGCACCGACTTTACTTTAAC

CATCAGCAGCGTGCAAGCTGAGGACGTGGCTGTGTACTATTGCAAGCAGT

CCTACTCTTTATACACCTTCGGCCAAGGAACAAAGCTGGAGATCAAGGGG

TCCACCACGACGCCAGCGCCGCGACCACCAACACCGGCGCCCACCATCGC

GTCGCAACCCCTGTCCCTGCGCCCCGAGGCGTGCCGGCCAGCGGCGGGGG

GCGCAGTGCACACGAGGGGCTGGACTTCGCCTGTGATATCTACATCTGG

GCGCCCTTGGCCGGGACTTGTGGGGTCCTTCTCCTGTCACTGGTTATCAC

CCTTTATTGCAAACGGGGCAGAAAGAAACTCCTGTATATATTCAAACAAC

CATTTATGAGACCAGTACAAACTACTCAAGAGGAAGATGGCTGTAGCTGC

CGATTTCCAGAAGAAGAAGAAGGAGGATGTGAATTGAGAGTGAAGTTCAG

CAGGAGCGCAGACGCCCCCGCCTATCAGCAAGGCCAGAACCAGCTCTATA

ACGAGCTCAATTTAGGGCGAAGAGAGGAGTACGATGTTTGGACAAGAGG

CGTGGCCGGGACCCCGAAATGGGGGAAAGCCGAGAAGGAAGAACCCTCA

GGAAGGCTTGTACAATGAATTGCAGAAGGATAAGATGGCGGAGGCATACA

GTGAGATTGGGATGAAAGGCGAGCGCCGGAGGGGCAAGGGGCACGATGGC

CTTTATCAGGGTCTCAGTACAGCCACCAAGGACACCTACGACGCCCTTCA

CATGCAAGCCCTGCCCCCTCGCGGCTCTGGAGAGGGCAGAGGCTCTCTGC

TGACCTGCGGCGACGTGGAAGAGAACCCAGGCCCCATGGGAAGAGGTTTA

CTGAGAGGACTGTGGCCTTTACACATCGTGCTGTGGACTCGTATCGCCAG

CACCATCCCCCCCATGTCCAAAAGAGCGTGAACAACGACATGATCGTGA

CCGACAACAATGGCGCCGTGAAGTTCCCCCAGCTGTGCAAGTTCTGCGAC

GTGAGGTTCAGCACTTGTGACAACCAGAAGAGCTGCATGAGCAACTGCAG

CATCACCTCCATCTGCGAGAAGCCCCAAGAAGTGTGCGTGGCCGTGTGGA

GGAAGAACGACGAGAACATCACTTTAGAGACAGTGTGCCACGACCCCAAG

CTGCCCTACCACGACTTCATTTTAGAAGATGCCGCCAGCCCCAAGTGCAT

CATGAAGGAGAAGAAGAAGCCCGGCGAGACCTTCTTCATGTGTTCTTGTT

CGTCTGATGAGTGCAACGATAACATCATCTTCAGCGAGGAGTACAACACC

AGCAACCCCGATTTACTGCTGGTGATCTTCCAAGTTACCGGCATTTCTTT

ACTGCCTCCGTTGGGCGTGGCTATCAGCGTGATCATCATCTTCTACTGCT

AT.

In one embodiment, a GPC3 binding CAR linked to a DN TGF-β Receptor has an amino acid sequence having at least 75% sequence identity to (such as, at least 75%, at least 80%, at least 90%, at least 95%, or 100% identity; e.g., 85-90%, 85-95%, 85-100%, 90-95%, 90-100%, or 95-100%) SEQ ID NO: 116. QVQLVQSGAEVKKPGASVKVSCKTSGYTFTDYYIHWVRQAPGQGLEWMGEIYPGSGN TYYAQKFQGRVTMTADTSTSTAYMELSSLRSEDTAVYYCARGN DYDAWFVYWGQGT LVTVSSGSTSGSGKPGSGEGSTKGDIVMTQSPDSLAVSLGERVTMNCKSSQSLLNSGTR KNYLAWYQQKPGQPPKLLIYWASIRESGVPDRFSGSGSGTDFTLTISSVQAEDVAVYYC KQSYSLYTFGQGTKLEIKGSLDNEKSNGTIIHVKGKHLCPSPLFPG PSKPFWVLVVVGGV LACYSLLVTVAFIIFWVRSKRSRLLHSDYMNMTPRRPGPTRKHYQPYAPPRDFAAYRSL RVKFSRSADAPAYQQGQNQLYNELNLGRREEYDVLDKRRGRDPEMGGKPRRKNPQEG LYNELQKDKMAEAYSEIGMKGERRRGKGHDGLYQGLSTATKDTYDALHMQALPPRGS GEGRGSLLTCGDVEENPGPMGRGLLRGLWPLHIVLWTRIASTIPPHVQKSVNNDMIVTD NNGAVKFPQLCKFCDVRFSTCDNQKSCMSNCSITSICEKPQEVCVAVWRKNDENITLET VCHDPKLPYHDFILEDAASPKCIMKEKKKPGETFFMCSCSSDECNDNIIFSEEYNTSNPD LLLVIFQVTGISLLPPLGVAISVIIIFYCY (SEQ ID NO: 116). In embodiments, a GPC3 binding CAR is encoded by a nucleic acid having at least 75% sequence identity to (such as, at least 75%, at least 80%, at least 90%, at least 95%, or 100% identity; e.g., 85-90%, 85-95%, 85-100%, 90-95%, 90-100%, or 95-100%) to the nucleic acid having the sequence according to:

(SEQ ID NO: 117)
CAAGTCCAACTGGTGCAGTCCGGAGCCGAGGTCAAGAAGCCCGGAGCCAG

CGTGAAAGTCTCATGTAAAACCAGCGGCTACACCTTCACCGACTACTACA

TCCACTGGGTCCGACAAGCCCCCGGTCAAGGTTTAGAGTGGATGGGCGAG

ATCTACCCCGGCTCCGGCAACACCTACTACGCCCAGAAGTTCCAAGGTCG

TGTGACCATGACAGCCGACACCAGCACCTCCACCGCCTACATGGAACTGT

CCTCTCTGCGTTCTGAGGACACAGCCGTTTACTACTGCGCCAGAGGCAAC

GACTACGACGCTTGGTTCGTGTACTGGGGCCAAGGAACATTAGTGACCGT

GTCCTCCGGATCCACATCCGGCAGCGGAAAGCCCGGTAGCGGCGAGGGCA

GCACCAAAGGAGACATCGTCATGACCCAGAGCCCCGATTCTTTAGCCGTG

TCTTTAGGCGAAAGAGTGACCATGAACTGCAAGTCCAGCCAGTCTTTACT

GAATTCCGGCACTCGAAAAAACTATTTAGCTTGGTACCAGCAGAAACCCG

GCCAGCCCCCTAAGCTGCTGATCTACTGGGCTAGCATTCGAGAATCCGGC

GTGCCCGATCGCTTTAGCGGCAGCGGTAGCGGCACCGACTTTACTTTAAC

CATCAGCAGCGTGCAAGCTGAGGACGTGGCTGTGTACTATTGCAAGCAGT

CCTACTCTTTATACACCTTCGGCCAAGGAACAAAGCTGGAGATCAAGGGG

TCCCTAGACAATGAGAAGAGCAATGGAACCATTATCCATGTGAAAGGGAA

ACACCTTTGTCCAAGTCCCTATTTCCCGGACCTTCTAAGCCCTTTTGGG

TGCTGGTGGTGGTTGGTGGAGTCCTGGCTTGCTATAGCTTGCTAGTAACA

GTGGCCTTTATTATTTTCTGGGTCCGATCAAAAAGGAGCAGGCTCCTGCA

CAGTGACTACATGAACATGACTCCCCGCCGCCCCGGGCCCACCCGCAAGC

ATTACCAGCCCTATGCCCACCACGCGACTTCGCAGCCTATCGCTCCCTG

AGAGTGAAGTTCAGCAGGAGCGCAGACGCCCCCGCGTACCAGCAAGGGCA

GAACCAGCTCTATAACGAGCTCAATCTAGGACGAAGAGAGGAGTACGATG

TTTTGGACAAGAGGCGTGGCCGGGACCCTGAGATGGGGGGAAAGCCGAGA

AGGAAGAACCCTCAGGAAGGCCTGTACAATGAACTGCAGAAAGATAAGAT

GGCGGAGGCCTACAGTGAGATTGGGATGAAAGGCGAGCGCCGGAGGGGCA

AGGGGCACGATGGCCTTTACCAGGGTCTCAGTACAGCCACCAAGGACACC

TACGACGCCCTTCACATGCAAGCTCTGCCCCCTCGCGGCTCTGGAGAGGG

CAGAGGCTCTCTGCTGACCTGCGGCGACGTGGAAGAGAACCCAGGCCCCA

TGGGAAGAGGTTTACTGAGAGGACTGTGGCCTTTACACATCGTGCTGTGG

ACTCGTATCGCCAGCACCATCCCCCCCCATGTCCAAAAGAGCGTGAACAA

CGACATGATCGTGACCGACAACAATGGCGCCGTGAAGTTCCCCCAGCTGT

GCAAGTTCTGCGACGTGAGGTTCAGCACTTGTGACAACCAGAAGAGCTGC

ATGAGCAACTGCAGCATCACCTCCATCTGCGAGAAGCCCCAAGAAGTGTG

CGTGGCCGTGTGGAGGAAGAACGACGAGAACATCACTTTAGAGACAGTGT

GCCACGACCCCAAGCTGCCCTACCACGACTTCATTTTAGAAGATGCCGCC

AGCCCCAAGTGCATCATGAAGGAGAAGAAGAAGCCCGGCGAGACCTTCTT

CATGTGTTCTTGTTCGTCTGATGAGTGCAACGATAACATCATCTTCAGCG

-continued

AGGAGTACAACACCAGCAACCCCGATTTACTGCTGGTGATCTTCCAAGTT

ACCGGCATTTCTTTACTGCCTCCGTTGGGCGTGGCTATCAGCGTGATCAT

CATCTTCTACTGCTAT.

"Polypeptide," "polypeptide fragment," "peptide" and "protein" are, unless specified to the contrary, and according to conventional meaning, i.e., as a sequence of amino acids. Polypeptides are not limited to a specific length, e.g., they may comprise a full length protein sequence or a fragment of a full length protein, and may include post-translational modifications of the polypeptide, for example, glycosylations, acetylations, phosphorylations and the like, as well as other modifications known in the art, both naturally occurring and non-naturally occurring. In various embodiments, the polypeptides contemplated herein comprise a signal (or leader) sequence at the N-terminal end of the protein, which co-translationally or post-translationally directs transfer of the protein.

Polypeptides include "polypeptide variants." Polypeptide variants may differ from a naturally occurring polypeptide in one or more substitutions, deletions, additions and/or insertions. Such variants may be naturally occurring or may be synthetically generated, for example, by modifying one or more of the above polypeptide sequences. For example, in some embodiments, it may be desirable to improve the binding affinity and/or other biological properties of the engineered DN TGF-β Receptors and engineered GPC3 binding CAR and TCRs. Receptors by introducing one or more substitutions, deletions, additions and/or insertions. Preferably, polypeptides of the disclosure include polypeptides having at least about 50%, 60%, 65%, 70%, 75%, 85%, 90%, 95%, 98%, or 99% amino acid identity thereto. Polypeptides of the disclosure include variants having at least about 50%, 55%, 60%, 65%, 70%, 75%, 80%, 85%, 90%, 95%, 96%, 97%, 98%, 99% or 100% sequence identity to any of the reference sequences described herein (see, e.g., Sequence Listing), typically where the variant maintains at least one biological activity of the reference sequence. Polypeptides include "polypeptide fragments." Polypeptide fragments refer to a polypeptide, which may be monomeric or multi-meric that has an amino-terminal deletion, a carboxyl-terminal deletion, and/or an internal deletion or substitution of a naturally-occurring or recombinantly-produced polypeptide. In certain embodiments, a polypeptide fragment may comprise an amino acid chain at least 5 to about 500 amino acids long. It will be appreciated that in certain embodiments, fragments are at least 5, 6, 7, 8, 9, 10, 11, 12, 13, 14, 15, 16, 17, 18, 19, 20, 22, 23, 24, 25, 26, 27, 28, 29, 30, 31, 32, 33, 34, 35, 36, 37, 38, 39, 40, 41, 42, 43, 44, 45, 46, 47, 48, 49, 50, 55, 60, 65, 70, 75, 80, 85, 90, 95, 100, 110, 150, 200, 250, 300, 350, 400, or 450 amino acids long.

The polypeptide may also be fused in-frame or conjugated to a linker or other sequence for ease of synthesis, purification or identification of the polypeptide (e.g., poly-His), or to enhance binding of the polypeptide to a solid support. As noted above, polypeptides of the present disclosure may be altered in various ways including amino acid substitutions, deletions, truncations, and insertions. Methods for such manipulations are generally known in the art. For example, amino acid sequence variants of a reference polypeptide may be prepared by mutations in the DNA. Methods for mutagenesis and nucleotide sequence alterations are well known in the art. See, for example, Kunkel (1985, *Proc. Natl. Acad. Sci. USA.* 82: 488-492), Kunkel et al., (1987,

*Methods in Enzymol,* 154: 367-382), U.S. Pat. No. 4,873,192, Watson, J. D. et al., (*Molecular Biology of the Gene,* Fourth Edition, Benjamin/Cummings, Menlo Park, Calif., 1987) and the references cited therein. Guidance as to appropriate amino acid substitutions that do not affect biological activity of the protein of interest may be found in the model of Dayhoff et al., (1978) Atlas of Protein Sequence and Structure (Natl. Biomed. Res. Found., Washington, D.C.).

In certain embodiments, a variant will contain conservative substitutions. A "conservative substitution" is one in which an amino acid is substituted for another amino acid that has similar properties, such that one skilled in the art of peptide chemistry would expect the secondary structure and hydropathic nature of the polypeptide to be substantially unchanged. Modifications may be made in the structure of the polynucleotides and polypeptides of the present disclosure and still obtain a functional molecule that encodes a variant or derivative polypeptide with desirable characteristics.

Polypeptide variants further include glycosylated forms, aggregative conjugates with other molecules, and covalent conjugates with unrelated chemical moieties (e.g., pegylated molecules). Covalent variants may be prepared by linking functionalities to groups which are found in the amino acid chain or at the N- or C-terminal residue, as is known in the art. Variants also include allelic variants, species variants, and muteins. Truncations or deletions of regions which do not affect functional activity of the proteins are also variants.

Where expression of two or more polypeptides is desired, the polynucleotide sequences encoding them may be separated by an IRES sequence. In another embodiment, two or more polypeptides may be expressed as a fusion protein that comprises one or more self-cleaving polypeptide sequences, such as a T2A polypeptide. In one embodiment, a self-cleaving polypeptide sequence has an amino acid sequence having at least 75% sequence identity to (such as, at least 75%, at least 80%, at least 90%, at least 95%, or 100% identity; e.g., 85-90%, 85-95%, 85-100%, 90-95%, 90-100%, or 95-100%) SEQ ID NO: 118. EGRGSLLTCGD-VEENPGP (EQ ID NO: 118). In embodiments, a self-cleaving polypeptide encoded by a nucleic acid having at least 75% sequence identity to (such as, at least 75%, at least 80%, at least 90%, at least 95%, or 100% identity; e.g., 85-90%, 85-95%, 85-100%, 90-95%, 90-100%, or 95-100%) to the nucleic acid having the sequence according to: GAGGGCAGAGGCTCTCTG CTGACCTGCGGCGACGTG-GAAGAGAACCCAGGCCCC (SEQ ID NO: 119). In other embodiments, two or more polypeptides expressed from different promoters and can be in two or more vectors. In some embodiments, a GPC3 binding CAR or TCR is encoded in the same vector as an engineered DN TGF-Receptor and is operably linked to the same promoter as the engineered DN TGF-B Receptor where the sequences are separated by an IRES sequence. In some embodiments, a GPC3 binding CAR or TCR is encoded in the same vector as an engineered DN TGF-β Receptor is operably linked to a different promoter than the promoter the engineered DN TGF-β Receptor. In certain embodiments, the GPC3 binding CAR or TCR is expressed on a cell that has also been engineered to express an engineered membrane bound IL-15-IL-15Rα sushi domain chimeric receptor, such as disclosed in U.S. Provisional Patent No. 63/159,610, filed on Mar. 11, 2021 which is specifically incorporated herein by reference in its entirety. In some embodiments, a GPC3 binding CAR or TCR is encoded in the same vector as an engineered membrane bound IL-15-IL-15Rα sushi domain chimeric receptor and is operably linked to the same promoter as the engineered membrane bound IL-15-IL-15Rα sushi domain chimeric receptor where the sequences are separated by an IRES sequence or a cleavable linker. In some embodiments, a GPC3 binding CAR or TCR is encoded in the same vector as an engineered membrane bound IL-15-IL-15Rα sushi domain chimeric receptor is operably linked to a different promoter than the promoter of the engineered membrane bound IL-15-IL-15Rα sushi domain chimeric receptor. In some embodiments, a GPC3 binding CAR is encoded in a different vector as an engineered membrane bound IL-15-IL-15Rα sushi domain chimeric receptor.

Polypeptides of the present disclosure include fusion polypeptides. In some embodiments, fusion polypeptides and polynucleotides encoding fusion polypeptides are provided. Fusion polypeptides and fusion proteins refer to a polypeptide having at least two, three, four, five, six, seven, eight, nine, or ten or more polypeptide segments. Fusion polypeptides are typically linked C-terminus to N-terminus, although they may also be linked C-terminus to C-terminus, N-terminus to N-terminus, or N-terminus to C-terminus. The polypeptides of the fusion protein may be in any order or a specified order. Fusion polypeptides or fusion proteins may also include conservatively modified variants, polymorphic variants, alleles, mutants, subsequences, and interspecies homologs, so long as the desired transcriptional activity of the fusion polypeptide is preserved. Fusion polypeptides may be produced by chemical synthetic methods or by chemical linkage between the two moieties or may generally be prepared using other common techniques. Ligated DNA sequences comprising the fusion polypeptide are operably linked to suitable transcriptional or translational control elements as discussed elsewhere herein.

In one embodiment, a fusion partner comprises a sequence that assists in expressing the protein (an expression enhancer) at higher yields than the native recombinant protein. Other fusion partners may be selected so as to increase the solubility of the protein or to enable the protein to be targeted to desired intracellular compartments or to facilitate transport of the fusion protein through the cell membrane.

Fusion polypeptides may further comprise a polypeptide cleavage signal between each of the polypeptide domains described herein. In addition, polypeptide site may be put into any linker peptide sequence. Exemplary polypeptide cleavage signals include polypeptide cleavage recognition sites such as protease cleavage sites, nuclease cleavage sites (e.g., rare restriction enzyme recognition sites, self-cleaving ribozyme recognition sites), and self-cleaving viral oligopeptides (see deFelipe and Ryan, 2004. *Traffic,* 5(8); 616-26).

Suitable protease cleavages sites and self-cleaving peptides are known to the skilled person (see, e.g., in Ryan et al., 1997. *J Gener. Viral.* 78, 699-722; Scymczak et al. (2004) *Nature Biotech.* 5, 589-594). Exemplary protease cleavage sites include, but are not limited to the cleavage sites of potyvirus Nia proteases (e.g., tobacco etch virus protease), potyvirus HC proteases, potyvirus P1 (P35) proteases, byovirus Nia proteases, byovirus RNA-2-encoded proteases, aphthovirus L proteases, enterovirus 2A proteases, rhinovirus 2A proteases, picoma 3C proteases, comovirus 24K proteases, nepovirus 24K proteases, RTSV (rice tungro spherical virus) 3C-like protease, PYVF (parsnip yellow fleck virus) 3C-like protease, heparin, thrombin, factor Xa and enterokinase. Due to its high cleavage stringency, TEV (tobacco etch virus) protease cleavage sites may be used. In other embodiments, self-cleaving peptides may include those polypeptide sequences obtained from potyvirus and cardiovirus 2A peptides, FMDV (foot-and-mouth disease virus), equine rhinitis A virus, Thosea asigna virus and porcine teschovirus. In other embodiments, the self-cleaving polypeptide site comprises a 2A or 2A-like site, sequence or domain (Donnelly et al., 2001. *J Gen. Viral.* 82:1027-1041).

Generally, it is understood that any appropriate viral vector or vectors may be used for transduction of the engineered constructs described herein. In one embodiment described herein, a cell (e.g., T cell or NK cell) is transduced with a retroviral vector, e.g., a lentiviral vector. As used herein, the term "retrovirus" refers to an RNA virus that reverse transcribes its genomic RNA into a linear double-stranded DNA copy and subsequently covalently integrates its genomic DNA into a host genome. Illustrative retroviruses suitable for use in some embodiments, include, but are not limited to: Moloney murine leukemia virus (M-MuLV), Moloney murine sarcoma virus (MoMSV), Harvey murine sarcoma virus (HaMuSV), murine mammary tumor virus (MuMTV), gibbon ape leukemia virus (GaLV), feline leukemia virus (FLV), spumavirus, Friend murine leukemia virus, Murine Stem Cell Virus (MSCV) and Rous Sarcoma Virus (RSV) and lentivirus.

As used herein, the term "lentivirus" refers to a group (or genus) of complex retroviruses. Illustrative lentiviruses include, but are not limited to: HIV (human immunodeficiency virus; including HIV type 1, and HIV type 2); visna-maedi virus (VMV) virus; the caprine arthritis encephalitis virus (CAEV); equine infectious anemia virus (EIAV); feline immunodeficiency virus (FIV); bovine immune deficiency virus (BIV); and simian immunodeficiency virus (SIV).

The term "vector" is used herein to refer to a nucleic acid molecule capable transferring or transporting another nucleic acid molecule. The transferred nucleic acid is generally linked to, e.g., inserted into, the vector nucleic acid molecule. A vector may include sequences that direct autonomous replication in a cell, or may include sequences sufficient to allow integration into host cell DNA. Useful vectors include, for example, plasmids (e.g., DNA plasmids or RNA plasmids), transposons, cosmids, bacterial artificial chromosomes, and viral vectors. Useful viral vectors include, e.g., replication defective retroviruses and lentiviruses.

As will be evident to one of skill in the art, the term "viral vector" is widely used to refer either to a nucleic acid molecule (e.g., a transfer plasmid) that includes virus-derived nucleic acid elements that typically facilitate transfer of the nucleic acid molecule or integration into the genome of a cell or to a viral particle that mediates nucleic acid transfer. Viral particles will typically include various viral components and sometimes also host cell components in addition to nucleic acid(s).

The term viral vector may refer either to a virus or viral particle capable of transferring a nucleic acid into a cell or to the transferred nucleic acid itself. Viral vectors and transfer plasmids contain structural and/or functional genetic elements that are primarily derived from a virus. The term "retroviral vector" refers to a viral vector or plasmid containing structural and functional genetic elements, or portions thereof, that are primarily derived from a retrovirus. The term "lentiviral vector" refers to a viral vector or plasmid containing structural and functional genetic elements, or portions thereof, including LTRs that are primarily derived from a lentivirus. The term "hybrid vector" refers to a vector, LTR or other nucleic acid containing both retroviral, e.g., lentiviral, sequences and non-retroviral viral sequences. In one embodiment, a hybrid vector refers to a vector or transfer plasmid comprising retroviral e.g., lentiviral, sequences for reverse transcription, replication, integration and/or packaging.

In some embodiments, the terms "lentiviral vector," "lentiviral expression vector" may be used to refer to lentiviral transfer plasmids and/or infectious lentiviral particles. Where reference is made herein to elements such as cloning sites, promoters, regulatory elements, heterologous nucleic acids, etc., it is to be understood that the sequences of these elements are present in RNA form in the lentiviral particles of the disclosure and are present in DNA form in the DNA plasmids of the disclosure. In one embodiment described herein, the expression vector is a lentivirus expression vector.

At each end of the provirus are structures called "long terminal repeats" or "LTRs." The term "long terminal repeat (LTR)" refers to domains of base pairs located at the ends of retroviral DNAs which, in their natural sequence context, are direct repeats and contain U3, R and U5 regions. LTRs generally provide functions fundamental to the expression of retroviral genes (e.g., promotion, initiation and polyadenylation of gene transcripts) and to viral replication. The LTR contains numerous regulatory signals including transcriptional control elements, polyadenylation signals and sequences needed for replication and integration of the viral genome. The viral LTR is divided into three regions called U3, R, and U5. The U3 region contains the enhancer and promoter elements. The U5 region is the sequence between the primer binding site and the R region and contains the polyadenylation sequence. The R (repeat) region is flanked by the U3 and U5 regions. The LTR is composed of U3, R and U5 regions and appears at both the 5' and 3' ends of the viral genome. Adjacent to the 5' LTR are sequences necessary for reverse transcription of the genome (the tRNA primer binding site) and for efficient packaging of viral RNA into particles (the Psi site).

As used herein, the term "packaging signal" or "packaging sequence" refers to sequences located within the retroviral genome which are required for insertion of the viral RNA into the viral capsid or particle, see e.g., Clever et al., 1995. J of Virology, Vol. 69, No. 4; pp. 2101-2109. Several retroviral vectors use the minimal packaging signal (also referred to as the psi ['P] sequence) needed for encapsidation of the viral genome. Thus, as used herein, the terms "packaging sequence," "packaging signal," "psi" and the symbol "'P," are used in reference to the non-coding sequence required for encapsidation of retroviral RNA strands during viral particle formation.

In various embodiments, vectors comprise modified 5' LTR and/or 3' LTRs. Either or both of the LTR may comprise one or more modifications including, but not limited to, one or more deletions, insertions, or substitutions. Modifications of the 3' LTR are often made to improve the safety of lentiviral or retroviral systems by rendering viruses replication-defective. As used herein, the term "replication-defective" refers to virus that is not capable of complete, effective replication such that infective virions are not produced (e.g., replication-defective lentiviral progeny). The term "replication-competent" refers to wild-type virus or mutant virus that is capable of replication, such that viral replication of the virus is capable of producing infective virions (e.g., replication-competent lentiviral progeny).

"Self-inactivating" (SIN) vectors refers to replication-defective vectors, e.g., retroviral or lentiviral vectors, in which the right (3') LTR enhancer-promoter region, known as the U3 region, has been modified (e.g., by deletion or substitution) to prevent viral transcription beyond the first round of viral replication. This is because the right (3') LTR U3 region is used as a template for the left (5') LTR U3 region during viral replication and, thus, the viral transcript cannot be made without the U3 enhancer-promoter. In a further embodiment of the disclosure, the 3'LTR is modified such that the U5 region is replaced, for example, with an ideal poly(A) sequence. It should be noted that modifications to the LTRs such as modifications to the 3'LTR, the 5'LTR, or both 3' and 5'LTRs, are also contemplated herein.

An additional safety enhancement is provided by replacing the U3 region of the 5'LTR with a heterologous promoter to drive transcription of the viral genome during production of viral particles. Examples of heterologous promoters which may be used include, for example, viral simian virus 40 (SV40) (e.g., early or late), cytomegalovirus (CMV) (e.g., immediate early), Moloney murine leukemia virus (MoMLV), Rous sarcoma virus (RSV), and herpes simplex virus (HSV) (thymidine kinase) promoters. Typical promoters are able to drive high levels of transcription in a Tat-independent manner. This replacement reduces the possibility of recombination to generate replication-competent virus because there is no complete U3 sequence in the virus production system. In certain embodiments, the heterologous promoter has additional advantages in controlling the manner in which the viral genome is transcribed. For example, the heterologous promoter may be inducible, such that transcription of all or part of the viral genome will occur only when the induction factors are present. Induction factors include, but are not limited to, one or more chemical compounds or the physiological conditions such as temperature or pH, in which the host cells are cultured.

In some embodiments, viral vectors comprise a TAR element. The term "TAR" refers to the "trans-activation response" genetic element located in the R region of lentiviral (e.g., HIV) LTRs. This element interacts with the lentiviral trans-activator (tat) genetic element to enhance viral replication.

The "R region" refers to the region within retroviral LTRs beginning at the start of the capping group (i.e., the start of transcription) and ending immediately prior to the start of the poly A tract. The R region is also defined as being flanked by the U3 and U5 regions. The R region plays a role during reverse transcription in permitting the transfer of nascent DNA from one end of the genome to the other.

As used herein, the term "FLAP element" refers to a nucleic acid whose sequence includes the central polypurine tract and central termination sequences (cPPT and CTS) of a includes the central polypurine tract and central termination sequences (cPPT and CTS) of a retrovirus, e.g., HIV-1 or HIV-2. Suitable FLAP elements are described in U.S. Pat. No. 6,682,907 and in Zennou, et al., 2000, Cell, 101: 173. During HIV-I reverse transcription, central initiation of the plus-strand DNA at the central polypurine tract (cPPT) and central termination at the central termination sequence (CTS) lead to the formation of a three-stranded DNA structure: the HIV-I central DNA flap. While not wishing to be bound by any theory, the DNA flap may act as a cis-active determinant of lentiviral genome nuclear import and/or may increase the titer of the virus.

In one embodiment, retroviral or lentiviral transfer vectors comprise one or more export elements. The term "export element" refers to a cis-acting post-transcriptional regulatory element which regulates the transport of an RNA transcript from the nucleus to the cytoplasm of a cell. Examples of RNA export elements include, but are not limited to, the human immunodeficiency virus (HIV) rev response element (RRE) (see e.g., Cullen et al., 1991. J Virol. 65: 1053; and Cullen et al., 1991. Cell 58: 423), and the hepatitis B virus post-transcriptional regulatory element (HPRE). Generally, the RNA export element is placed within the 3' UTR of a gene, and may be inserted as one or multiple copies.

In other embodiments, expression of heterologous sequences in viral vectors is increased by incorporating post-transcriptional regulatory elements, efficient polyadenylation sites, and optionally, transcription termination signals into the vectors. A variety of posttranscriptional regulatory elements may increase expression of a heterologous nucleic acid at the protein, e.g., woodchuck hepatitis virus post-transcriptional regulatory element (WPRE; Zufferey et al., 1999, J Virol., 73:2886); the post-transcriptional regulatory element present in hepatitis B virus (HPRE) (Huang et al., Mol. Cell. Biol., 5:3864); and the like (Liu et al., 1995, Genes Dev., 9:1766).

In some embodiments, vectors may include regulatory oligonucleotides having transcriptional or translational regulatory activity. Such an oligonucleotide can be used in a variety of gene expression configurations for regulating control of expression. A transcriptional regulatory oligonucleotide, can increase (enhance) or decrease (silence) the level of expression of a recombinant expression construct. Regulatory oligonucleotides may selectively regulate expression in a context specific manner, including, for example, for conferring tissue specific, developmental stage specific, or the like expression of the polynucleotide, including constitutive or inducible expression. A regulatory oligonucleotide of the disclosure also can be a component of an expression vector or of a recombinant nucleic acid molecule comprising the regulatory oligonucleotide operatively linked to an expressible polynucleotide. A regulatory element can be of various lengths from a few nucleotides to several hundred nucleotides.

Elements directing the efficient termination and polyadenylation of the heterologous nucleic acid transcripts increases heterologous gene expression. Transcription termination signals are generally found downstream of the polyadenylation signal. In some embodiments, vectors comprise a polyadenylation sequence 3' of a polynucleotide encoding a polypeptide to be expressed. The term "poly A site" or "poly A sequence" as used herein denotes a DNA sequence which directs both the termination and polyadenylation of the nascent RNA transcript by RNA polymerase II. Polyadenylation sequences may promote mRNA stability by addition of a poly A tail to the 3' end of the coding sequence and thus, contribute to increased translational efficiency. Efficient polyadenylation of the recombinant transcript is desirable as transcripts lacking a poly A tail are unstable and are rapidly degraded. Illustrative examples of poly A signals that may be used in a vector of the disclosure, includes an ideal poly A sequence (e.g., AATAAA, ATTAAA, AGTAAA), a bovine growth hormone poly A sequence (BGHpA), a rabbit β-globin poly A sequence (rβgpA), or another suitable heterologous or endogenous poly A sequence known in the art.

Also described herein are "codon-optimized" nucleic acids. A "codon-optimized" nucleic acid refers to a nucleic acid sequence that has been altered such that the codons are optimal for expression in a particular system (such as a particular species or group of species). For example, a nucleic acid sequence can be optimized for expression in mammalian cells or in a particular mammalian species (such as human cells) by replacing at least one, more than one, or a significant number, of codons of the native sequence with codons that are more frequently or most frequently used in the genes of that species. Codon optimization does not alter the amino acid sequence of the encoded protein.

The codon-optimized nucleotide sequences can present improved properties related to expression efficacy. In some embodiments, the DNA sequence to be transcribed may be optimized to facilitate more efficient transcription and/or translation. In some embodiments, the DNA sequence may be optimized regarding cis-regulatory elements (e.g., TATA box, termination signals, and protein binding sites), artificial recombination sites, chi sites, CpG dinucleotide content, negative CpG islands, GC content, polymerase slippage sites, and/or other elements relevant to transcription; the DNA sequence may be optimized regarding cryptic splice sites, mRNA secondary structure, stable free energy of mRNA, repetitive sequences, RNA instability domain, and/or other elements relevant to mRNA processing and stability; the DNA sequence may be optimized regarding codon usage bias, codon adaptability, internal chi sites, ribosomal binding sites (e.g., IRES), premature polyA sites, Shine-Dalgarno (SD) sequences, and/or other elements relevant to translation; and/or the DNA sequence may be optimized regarding codon context, codon-anticodon interaction, translational pause sites, and/or other elements relevant to protein folding.

The vectors may have one or more LTRs, wherein any LTR comprises one or more modifications, such as one or more nucleotide substitutions, additions, or deletions. The vectors may further comprise one of more accessory elements to increase transduction efficiency (e.g., a cPPT/FLAP), viral packaging (e.g., a Psi ('P) packaging signal, RRE), and/or other elements that increase therapeutic gene expression (e.g., poly (A) sequences), and may optionally comprise a WPRE or HPRE. The skilled artisan would appreciate that many other different embodiments may be fashioned from the existing embodiments of the disclosure.

A "host cell" includes cells transfected, infected, or transduced in vivo, ex vivo, or in vitro with a recombinant vector or a polynucleotide of the disclosure. Host cells may include packaging cells, producer cells, and cells infected with viral vectors. In some embodiments, host cells infected with viral vector of the disclosure are administered to a subject in need of therapy. In certain embodiments, the term "target cell" is used interchangeably with host cell and refers to transfected, infected, or transduced cells of a desired cell type. In some embodiments, the target cell is a T cell.

Large scale viral particle production is often necessary to achieve a reasonable viral titer. Viral particles are produced by transfecting a transfer vector into a packaging cell line that comprises viral structural and/or accessory genes, e.g., gag, pol, env, tat, rev, vif, vpr, vpu, vpx, or nef genes or other retroviral genes.

As used herein, the term "packaging vector" refers to an expression vector or viral vector that lacks a packaging signal and comprises a polynucleotide encoding one, two, three, four or more viral structural and/or accessory genes. Typically, the packaging vectors are included in a packaging cell, and are introduced into the cell via transfection, transduction or infection. Methods for transfection, transduction or infection are well known by those of skill in the art. A retroviral/lentiviral transfer vector of the present disclosure may be introduced into a packaging cell line, via transfection, transduction or infection, to generate a producer cell or cell line. The packaging vectors of the present disclosure may be introduced into human cells or cell lines by common methods including, e.g., calcium phosphate transfection, lipofection or electroporation. In some embodiments, the packaging vectors are introduced into the cells together with a dominant selectable marker, such as neomycin, hygromycin, puromycin, blastocidin, zeocin, thymidine kinase, DHFR, Gln synthetase or ADA, followed by selection in the presence of the appropriate drug and isolation of clones. A selectable marker gene may be linked physically to genes encoding by the packaging vector, e.g., by IRES or self-cleaving viral peptides.

Viral envelope proteins (env) determine the range of host cells which may ultimately be infected and transformed by recombinant retroviruses generated from the cell lines. In the case of lentiviruses, such as HIV-1, HIV-2, SIV, FIV and EIV, the env proteins include gp41 and gp120. In some embodiments, the viral env proteins expressed by packaging cells of the disclosure are encoded on a separate vector from the viral gag and pol genes, as has been previously described.

Illustrative examples of retroviral-derived env genes which may be employed in the embodiments described herein include, but are not limited to: MLV envelopes, IOAI envelope, BAEV, FeLV-B, RDI 14, SSAV, Ebola, Sendai, FPV (Fowl plague virus), and influenza virus envelopes. Similarly, genes encoding envelopes from RNA viruses (e.g., RNA virus families of Picornaviridae, Calciviridae, Astroviridae, Togaviridae, Flaviviridae, Coronaviridae, Paramyxoviridae, Rhabdoviridae, Filoviridae, Orthomyxoviridae, Bunyaviridae, Arenaviridae, Reoviridae, Birnaviridae, Retroviridae) as well as from the DNA viruses (families of Hepadnaviridae, Circoviridae, Parvoviridae, Papovaviridae, Adenoviridae, Herpesviridae, Poxviridae, and Iridoviridae) may be utilized. Representative examples include, FeLV, VEE, HFVW, WDSV, SFV, Rabies, ALV, BIV, BL V, EBV, CAEV, SNV, ChTL V, STLV, MPMV SMRV, RAV, FuSV, MH2, AEV, AMV, CTIO, and EIAV.

In other embodiments, envelope proteins for pseudotyping a virus of present disclosure include, but are not limited to any of the following virus: Influenza A such as H1N1, H1N2, H3N2 and H5N1 (bird flu), Influenza B, Influenza C virus, Hepatitis A virus, Hepatitis B virus, Hepatitis C virus, Hepatitis D virus, Hepatitis E virus, Rotavirus, any virus of the Norwalk virus group, enteric adenoviruses, parvovirus, Dengue fever virus, Monkey pox, Mononegavirales, Lyssavirus such as rabies virus, Lagos bat virus, Mokola virus, Duvenhage virus, European bat virus 1 & 2 and Australian bat virus, Ephemerovirus, Vesiculovirus, Vesicular Stomatitis Virus (VSV), Herpes viruses such as Herpes simplex virus types 1 and 2, varicella zoster, cytomegalovirus, Epstein-Barr virus (EBV), human herpesviruses (HHV), human herpesvirus type 6 and 8, Human immunodeficiency virus (HIV), papilloma virus, murine gamma herpes virus, Arenaviruses such as Argentine hemorrhagic fever virus, Bolivian hemorrhagic fever virus, Sabia-associated hemorrhagic fever virus, Venezuelan hemorrhagic fever virus, Lassa fever virus, Machupo virus, Lymphocytic choriomeningitis virus (LCMV), Bunyaviridiae such as Crimean-Congo hemorrhagic fever virus, Hantavirus, hemorrhagic fever with renal syndrome causing virus, Rift Valley fever virus, Filoviridae (filovirus) including Ebola hemorrhagic fever and Marburg hemorrhagic fever, Flaviviridae including Kaysanur Forest disease virus, Omsk hemorrhagic fever virus, Tick-borne encephalitis causing virus and Paramyxoviridae such as Hendra virus and Nipah virus, variola major and variola minor (smallpox), alphaviruses such as Venezuelan equine encephalitis virus, eastern equine encephalitis virus, western equine encephalitis virus, SARS-associated coronavirus (SARS-Co V), West Nile virus, or any encephalitis causing virus.

The terms "pseudotype" or "pseudotyping" as used herein, refer to a virus whose viral envelope proteins have been substituted with those of another virus possessing other characteristics. For example, HIV may be pseudotyped with vesicular stomatitis virus G-protein (VSV-G) envelope proteins, which allows HIV to infect a wider range of cells because HIV envelope proteins (encoded by the env gene) normally target the virus to CD4+ presenting cells.

As used herein, the term "packaging cell lines" is used in reference to cell lines that do not contain a packaging signal, but do stably or transiently express viral structural proteins and replication enzymes (e.g., gag, pol and env) which are necessary for the correct packaging of viral particles. Any suitable cell line may be employed to prepare packaging cells of the disclosure. Generally, the cells are mammalian cells. In another embodiment, the cells used to produce the packaging cell line are human cells. Suitable cell lines which may be used to produce the packaging cell line include, for example, CHO cells, BHK cells, MDCK cells, C3H 10T1/2 cells, FLY cells, Psi-2 cells, BOSC 23 cells, P A317 cells, WEHI cells, COS cells, BSC 1 cells, BSC 40 cells, BMT 10 cells, VERO cells, W138 cells, MRC5 cells, A549 cells, HTI080 cells, 293 cells, 293T cells, B-50 cells, 3T3 cells, NIH3T3 cells, HepG2 cells, Saos-2 cells, Huh7 cells, HeLa cells, W163 cells, 211 cells, and 211A cells.

As used herein, the term "producer cell line" refers to a cell line which is capable of producing recombinant retroviral particles, comprising a packaging cell line and a transfer vector construct comprising a packaging signal. The production of infectious viral particles and viral stock solutions may be carried out using conventional techniques. Methods of preparing viral stock solutions are known in the art and are illustrated by, e.g., Y. Soneoka et al. (1995) Nucl. Acids Res. 23:628-633, and N. R. Landau et al. (1992) J Virol. 66:5110-5113. Infectious virus particles may be collected from the packaging cells using conventional techniques. For example, the infectious particles may be collected by cell lysis, or collection of the supernatant of the cell culture, as is known in the art. Optionally, the collected virus particles may be purified if desired. Suitable purification techniques are well known to those skilled in the art.

The delivery of a gene(s) or other polynucleotide sequence using a retroviral or lentiviral vector by means of viral infection rather than by transfection is referred to as "transduction." In one embodiment, retroviral vectors are transduced into a cell through infection and provirus integration. In certain embodiments, a target cell, e.g., a T cell or NK cell, is "transduced" if it comprises a gene or other polynucleotide sequence delivered to the cell by infection using a viral or retroviral vector. In some embodiments, a transduced cell comprises one or more genes or other polynucleotide sequences delivered by a retroviral or lentiviral vector in its cellular genome.

Disclosed are host cells expressing one or more of the constructs of the disclosure. The host cells may be transduced with one or more viral vectors comprising nucleic acid sequences encoding one or more polypeptides expressing an engineered TCR and/or a CAR. Other methods relating to the use of viral vectors in gene therapy, which may be utilized according to certain embodiments of the present disclosure, may be found in, e.g., Kay, M. A. (1997) Chest 111(6 Supp.): 138S-142S; Ferry, N. and Heard, J. M. (1998) Hum. Gene Ther. 9:1975-81; Shiratory, Y. et al., (1999) Liver 19:265-74; Oka, K. et al., (2000) Curr. Opin. Lipidol. 11:179-86; Thule, P. M. and Liu, J. M. (2000) Gene Ther. 7:1744-52; Yang, N. S. (1992) Crit. Rev. Biotechnol. 12:335-56; Alt, M. (1995) J Hepatol. 23:746-58; Brody, S. L. and Crystal, R. G. (1994) Ann. NY Acad. Sci. 716:90-101; Strayer, D. S. (1999) Expert Opin. Investig. Drugs 8:2159-2172; Smith-Arica, J. R. and Bartlett, J. S. (2001) Curr. Cardiol. Rep. 3:43-49; and Lee, H. C. et al., (2000) Nature 408:483-8.

The compositions described herein may comprise one or more polynucleotides, polypeptides, vectors comprising same, and T cell composition and NK compositions, as contemplated herein. One embodiment described herein is a composition comprising a modified T cell that expresses a GPC3 binding TCR and/or CAR. Another embodiment described herein is a composition comprising a modified NK cell that expresses a d GPC3 binding TCR and/or CAR. Compositions include, but are not limited to pharmaceutical compositions. A "pharmaceutical composition" refers to a composition formulated in pharmaceutically-acceptable or physiologically-acceptable solutions for administration to a cell or an animal, either alone, or in combination with one or more other modalities of therapy. It will also be understood that, if desired, the compositions of the present disclosure may be administered in combination with other agents as well, such as, e.g., cytokines, growth factors, hormones, small molecules, chemotherapeutics, pro-drugs, drugs, antibodies, or other various pharmaceutically-active agents. There is virtually no limit to other components that may also be included in the compositions, provided that the additional agents do not adversely affect the ability of the composition to deliver the intended therapy.

The phrase "pharmaceutically acceptable" is employed herein to refer to those compounds, materials, compositions, and/or dosage forms which are, within the scope of sound medical judgment, suitable for use in contact with the tissues of human beings and animals without excessive toxicity, irritation, allergic response, or other problem or complication, commensurate with a reasonable benefit/risk ratio.

As used herein "pharmaceutically acceptable carrier, diluent or excipient" includes without limitation any adjuvant, carrier, excipient, glidant, sweetening agent, diluent, preservative, dye/colorant, flavor enhancer, surfactant, wetting agent, dispersing agent, suspending agent, stabilizer, isotonic agent, solvent, surfactant, or emulsifier which has been approved by the United States Food and Drug Administration as being acceptable for use in humans or domestic animals. Exemplary pharmaceutically acceptable carriers include, but are not limited to, to sugars, such as lactose, glucose and sucrose; starches, such as corn starch and potato starch; cellulose, and its derivatives, such as sodium carboxymethyl cellulose, ethyl cellulose and cellulose acetate; tragacanth; malt; gelatin; talc; cocoa butter, waxes, animal and vegetable fats, paraffins, silicones, bentonites, silicic acid, zinc oxide; oils, such as peanut oil, cottonseed oil, safflower oil, sesame oil, olive oil, corn oil and soybean oil; glycols, such as propylene glycol; polyols, such as glycerin, sorbitol, mannitol and polyethylene glycol; esters, such as ethyl oleate and ethyl laurate; agar; buffering agents, such as magnesium hydroxide and aluminum hydroxide; alginic acid; pyrogen-free water; isotonic saline; Ringer's solution; ethyl alcohol; phosphate buffer solutions; and any other compatible substances employed in pharmaceutical formulations.

In one embodiment described herein, compositions of the present disclosure comprise an amount of modified T cells or NK cells contemplated herein. It may generally be stated that a pharmaceutical composition comprising the T cells or NK cells contemplated herein may be administered at a dosage of $10^2$ to $10^{10}$ cells/kg body weight, $10^1$ to $10^9$ cells/kg body weight, $10^1$ to $10^8$ cells/kg body weight, $10^1$ to $10^7$ cells/kg body weight, $10^7$ to $10^9$ cells/kg body weight, or $10^7$ to $10^8$ cells/kg body weight, including all integer values within those ranges. The number of cells will depend upon the ultimate use for which the composition is intended as will the type of cells included therein. T cells or NK cells modified to express an engineered TCR or CAR may be administered multiple times at dosages within these ranges. The cells may be allogeneic, syngeneic, xenogeneic, or autologous to the patient undergoing therapy. If desired, the treatment may also include administration of mitogens (e.g., PHA) or lymphokines, cytokines, and/or chemokines (e.g., IFN-γ, IL-2, IL-7, IL-15, IL-12, TNF-alpha, IL-18, and TNF-beta, GM-CSF, IL-4, IL-13, Flt3-L, RANTES, MIP1α, etc.) as described herein to enhance engraftment and function of infused T cells.

Generally, compositions comprising the cells activated and expanded as described herein may be utilized in the treatment and prevention of diseases that arise in individuals who are immunocompromised or immunosuppressed. In some, compositions comprising the modified T cells or NK cells contemplated herein are used in the treatment of cancers. The modified T cells or NK cells described herein may be administered either alone, or as a pharmaceutical composition in combination with carriers, diluents, excipients, and/or with other components such as IL-2, IL-7, and/or IL-15 or other cytokines or cell populations. In some embodiments, pharmaceutical compositions contemplated herein comprise an amount of genetically modified T cells or NK cells, in combination with one or more pharmaceutically or physiologically acceptable carriers, diluents or excipients.

Pharmaceutical compositions comprising modified T cells or NK cells contemplated herein may further comprise buffers such as neutral buffered saline, phosphate buffered saline and the like; carbohydrates such as glucose, mannose, sucrose or dextrans, mannitol; proteins; polypeptides or amino acids such as glycine; antioxidants; chelating agents such as EDTA or glutathione; adjuvants (e.g., aluminum hydroxide); and preservatives. Compositions of the present disclosure may be formulated for parenteral administration, e.g., intravascular (intravenous or intra-arterial), intraperitoneal or intramuscular administration.

The liquid pharmaceutical compositions, whether they be solutions, suspensions or other like form, may include one or more of the following: sterile diluents such as water for injection, saline solution, such as physiological saline, Ringer's solution, isotonic sodium chloride, fixed oils such as synthetic mono or diglycerides which may serve as the solvent or suspending medium, polyethylene glycols, glycerin, propylene glycol or other solvents; antibacterial agents such as benzyl alcohol or methyl paraben; antioxidants such as ascorbic acid or sodium bisulfite; chelating agents such as ethylenediaminetetraacetic acid; buffers such as acetates, citrates or phosphates and agents for the adjustment of tonicity such as sodium chloride or dextrose. The parenteral preparation may be enclosed in ampoules, disposable syringes or multiple dose vials made of glass or plastic. Sterile injectable pharmaceutical composition are also included.

In some embodiments, compositions contemplated herein comprise an effective amount of an expanded modified T cell or NK cell composition, alone or in combination with one or more therapeutic agents. Thus, the T cell or NK cell compositions may be administered alone or in combination with other known cancer treatments, such as radiation therapy, chemotherapy, transplantation, immunotherapy, hormone therapy, photodynamic therapy, etc. The compositions may also be administered in combination with antibiotics and anti-viral agents. Such therapeutic agents may be accepted in the art as a treatment for a disease state as described herein, such as a cancer. In one embodiment the compositions contemplated herein may also be administered with inhibitors of TGF-β, for example the small molecule inhibitor LY55299. Exemplary therapeutic agents contemplated include cytokines, growth factors, steroids, NSAIDs, DMARDs, anti-inflammatories, chemotherapeutics, radiotherapeutics, therapeutic antibodies, or other active and ancillary agents.

In certain embodiments, compositions comprising T cells or NK cells contemplated herein may be administered in conjunction with any number of chemotherapeutic agents. Illustrative examples of chemotherapeutic agents include but are not limited to alkylating agents such as thiotepa and cyclophosphamide (CYTOXAN™); alkyl sulfonates such as busulfan, improsulfan and piposulfan; aziridines such as benzodopa, carboquone, meturedopa, and uredopa; ethylenimines and methylamelamines including altretamine, triethylenemelamine, trietylenephosphoramide, triethylenethiophosphaoramide and trimethylolomelamine resume; nitrogen mustards such as chlorambucil, chlomaphazine, cholophosphamide, estramustine, ifosfamide, mechlorethamine, mechlorethamine oxide hydrochloride, melphalan, novembichin, phenesterine, prednimustine, trofosfamide, uracil mustard; nitrosureas such as carmustine, chlorozotocin, fotemustine, lomustine, nimustine, ranimustine; antibiotics such as aclacinomysins, actinomycin, authramycin, azaserine, bleomycins, cactinomycin, calicheamicin, carabicin, carminomycin, carzinophilin, chromomycins, dactinomycin, daunorubicin, detorubicin, 6-diazo-5-oxo-L-norleucine, doxorubicin, epirubicin, esorubicin, idarubicin, marcellomycin, mitomycins, mycophenolic acid, nogalamycin, olivomycins, peplomycin, potfiromycin, puromycin, quelamycin, rodorubicin, streptonigrin, streptozocin, tubercidin, ubenimex, zinostatin, zorubicin; anti-metabolites such as methotrexate and 5-fluorouracil (5-FU); folic acid analogues such as denopterin, methotrexate, pteropterin, trimetrexate; purine analogs such as fludarabine, 6-mercaptopurine, thiamiprine, thioguanine; pyrimidine analogs such as ancitabine, azacitidine, 6-azauridine, carmofur, cytarabine, dideoxyuridine, doxifluridine, enocitabine, floxuridine, 5-FU; androgens such as calusterone, dromostanolone propionate, epitiostanol, mepitiostane, testolactone; anti-adrenals such as aminoglutethimide, mitotane, trilostane; folic acid replenisher such as frolinic acid; aceglatone; aldophosphamide glycoside; aminolevulinic acid; amsacrine; bestrabucil; bisantrene; edatraxate; defofamine; demecolcine; diaziquone; elformithine; elliptinium acetate; etoglucid; gallium nitrate; hydroxyurea; lentinan; lonidamine; mitoguazone; mitoxantrone; mopidamol; nitracrine; pentostatin; phenamet; pirarubicin; podophyllinic acid; 2-ethylhydrazide; procarbazine; PSK®; razoxane; sizofiran; spirogermanium; tenuazonic acid; triaziquone; 2, 2',2"trichlorotriethylamine; urethan; vindesine; dacarbazine; mannomustine; mitobronitol; mitolactol; pipobroman; gacytosine; arabinoside ("Ara-C"); cyclophosphamide; thiotepa; taxoids, e.g. paclitaxel (TAXOL®, Bristol-Myers Squibb Oncology, Princeton, N.J.) and doxetaxel (TAXOTERE®, Rhone-Poulenc Rorer, Antony, France); chlorambucil; gemcitabine; 6-thioguanine; mercaptopurine; methotrexate; platinum analogs such as cisplatin and carboplatin; vinblastine; platinum; etoposide (VP-16); ifosfamide; mitomycin C; mitoxantrone; vincristine; vinorelbine; navelbine; novantrone; teniposide; daunomycin; aminopterin; xeloda; ibandronate; CPT-11; topoisomerase inhibitor RPS 2000; difluoromethylomithine (DMFO); retinoic acid derivatives such as Targretin™ (bexarotene), Panretin™ (alitretinoin); ONTAK™ (denileukin diftitox); esperamicins; capecitabine; and pharmaceutically acceptable salts, acids or derivatives of any of the above. Also included in this definition are anti-hormonal agents that act to regulate or inhibit hormone action on tumors such as anti-estrogens including for example tamoxifen, raloxifene, aromatase inhibiting 4(5)-imidazoles, 4-hydroxytamoxifen, trioxifene, keoxifene, LY117018, onapristone, and toremifene (Fareston); and anti-androgens such as flutamide, nilutamide, bicalutamide, leuprolide, and goserelin; and pharmaceutically acceptable salts, acids or derivatives of any of the above.

A variety of other therapeutic agents may be used in conjunction with the compositions described herein. In one embodiment, the composition comprising T cells is administered with an anti-inflammatory agent. Anti-inflammatory agents or drugs include, but are not limited to, steroids and glucocorticoids (including betamethasone, budesonide, dexamethasone, hydrocortisone acetate, hydrocortisone, hydrocortisone, methylprednisolone, prednisolone, prednisone, triamcinolone), nonsteroidal anti-inflammatory drugs (NSAIDS) including aspirin, ibuprofen, naproxen, methotrexate, sulfasalazine, leflunomide, anti-TNF medications, cyclophosphamide and mycophenolate.

In some embodiments, NSAIDs are chosen from the group consisting of ibuprofen, naproxen, naproxen sodium, Cox-2 inhibitors such as VIOXX® (rofecoxib) and CELEBREX® (celecoxib), and sialylates. Exemplary analgesics are chosen from the group consisting of acetaminophen, oxycodone, tramadol or proporxyphene hydrochloride. Exemplary glucocorticoids are chosen from the group consisting of cortisone, dexamethasone, hydrocortisone, methylprednisolone, prednisolone, or prednisone. Exemplary biological response modifiers include molecules directed against cell surface markers (e.g., CD4, CD5, etc.), cytokine inhibitors, such as the TNF antagonists (e.g., etanercept (ENBREL®), adalimumab (HUMIRA®) and infliximab (REMICADE®), chemokine inhibitors and adhesion molecule inhibitors. The biological response modifiers include monoclonal antibodies as well as recombinant forms of molecules. Exemplary disease-modifying anti-rheumatic drugs (DMARDs) include azathioprine, cyclophosphamide, cyclosporine, methotrexate, penicillamine, leflunomide, sulfasalazine, hydroxychloroquine, Gold (oral (auranofin) and intramuscular) and minocycline.

In other embodiments, the therapeutic antibodies suitable for combination with the CAR or TCR modified T cells or NK cells contemplated herein, include but are not limited to, abagovomab, adecatumumab, afutuzumab, alemtuzumab, altumomab, amatuximab, anatumomab, arcitumomab, bavituximab, bectumomab, bevacizumab, bivatuzumab, blinatumomab, brentuximab, cantuzumab, catumaxomab, cetuximab, citatuzumab, cixutumumab, clivatuzumab, conatumumab, daratumumab, drozitumab, duligotumab, dusigitumab, detumomab, dacetuzumab, dalotuzumab, ecromeximab, elotuzumab, ensituximab, ertumaxomab, etaracizumab, farietuzumab, ficlatuzumab, figitumumab, flanvotumab, futuximab, ganitumab, gemtuzumab, girentuximab, glembatumumab, ibritumomab, igovomab, imgatuzumab, indatuximab, inotuzumab, intetumumab, ipilimumab, iratumumab, labetuzumab, lexatumumab, lintuzumab, lorvotumab, lucatumumab, mapatumumab, matuzumab, milatuzumab, minretumomab, mitumomab, moxetumomab, namatumab, naptumomab, necitumumab, nimotuzumab, nofetumomab, ocaratuzumab, ofatumumab, olaratumab, onartuzumab, oportuzumab, oregovomab, panitumumab, parsatuzumab, patritumab, pemtumomab, pertuzumab, pintumomab, pritumumab, racotumomab, radretumab, rilotumumab, rituximab, robatumumab, satumomab, sibrotuzumab, siltuximab, simtuzumab, solitomab, tacatuzumab, taplitumomab, tenatumomab, teprotumumab, tigatuzumab, tositumomab, trastuzumab, tucotuzumab, ublituximab, veltuzumab, vorsetuzumab, votumumab, zalutumumab, CC49 and 3F8.

In some embodiments, the compositions described herein are administered in conjunction with a cytokine. By "cytokine" as used herein is meant a generic term for proteins released by one cell population that act on another cell as intercellular mediators. Examples of such cytokines are lymphokines, monokines, chemokines, and traditional polypeptide hormones. Included among the cytokines are growth hormones such as human growth hormone, N-methionyl human growth hormone, and bovine growth hormone; parathyroid hormone; thyroxine; insulin; proinsulin; relaxin; prorelaxin; glycoprotein hormones such as follicle stimulating hormone (FSH), thyroid stimulating hormone (TSH), and luteinizing hormone (LH); hepatic growth factor; fibroblast growth factor; prolactin; placental lactogen; tumor necrosis factor-alpha and -beta; mullerian-inhibiting substance; mouse gonadotropin-associated peptide; inhibin; activin; vascular endothelial growth factor; integrin; thrombopoietin (TPO); nerve growth factors such as NGF-beta; platelet-growth factor; transforming growth factors (TGFs) such as TGF-alpha and TGF-beta; insulin-like growth factor-I and -II; erythropoietin (EPO); osteoinductive factors; interferons such as interferon-alpha, -beta, and -gamma; colony stimulating factors (CSFs) such as macrophage-CSF (M-CSF); granulocyte-macrophage-CSF (GM-CSF); and granulocyte-CSF (G-CSF); interleukins (ILs) such as IL-1, IL-1α, IL-2, IL-3, IL-4, IL-5, IL-6, IL-7, IL-8, IL-9, IL-10, IL-11, IL-12; IL-15, a tumor necrosis factor such as TNF-α or TNF-β; and other polypeptide factors including LIF and kit ligand (KL). As used herein, the term cytokine includes proteins from natural sources or from recombinant cell culture, and biologically active equivalents of the native sequence cytokines.

Any cell may be used as a host cell for the polynucleotides, the vectors, or the polypeptides of the present disclosure. In some embodiments, the cell can be a prokaryotic cell, fungal cell, yeast cell, or higher eukaryotic cells such as a mammalian cell. Suitable prokaryotic cells include, without limitation, eubacteria, such as Gram-negative or Gram-positive organisms, for example, Enterobacteriaceae such as *Escherichia Escherichia*, e.g., *E. coli; Enterobacter; Erwinia; Klebsiella; Proteus; Salmonella*, e.g., *Salmonella typhimurium; Serratia*, e.g., *Serratia marcescans*, and *Shigella*, Bacilli such as *B. subtilis* and *B. licheniformis; Pseudomonas* such as *P. aeruginosa*; and *Streptomyces*. In some embodiments, the cell is a human cell. In some embodiments, the cell is an immune cell. In some embodiments, the immune cell is selected from the group consisting of a T cell, a B cell, a tumor infiltrating lymphocyte (TIL), a TCR expressing cell, a natural killer (NK) cell, a dendritic cell, a granulocyte, an innate lymphoid cell, a megakaryocyte, a monocyte, a macrophage, a platelet, a thymocyte, and a myeloid cell. In one embodiment, the immune cell is a T cell. In another embodiment, the immune cell is an NK cell. In certain embodiments, the T cell is a tumor-infiltrating lymphocyte (TIL), autologous T cell, engineered autologous T cell (eACT™), an allogeneic T cell, a heterologous T cell, or any combination thereof. Unlike antibody therapies or standalone TCR or CAR modified T cells, T cells (or any cells as described above).

Another embodiment described herein is a method of treating a cancer in a subject in need thereof comprising administering an effective amount, e.g., therapeutically effective amount of a composition comprising T cells or NK cells expressing TCR or CAR as described herein. The quantity and frequency of administration will be determined by such factors as the condition of the patient, and the type and severity of the patient's disease, although appropriate dosages may be determined by clinical trials.

In other embodiments, methods comprising administering a therapeutically effective amount of modified T cells contemplated herein or a composition comprising the same, to a patient in need thereof, alone or in combination with one or more therapeutic agents, are provided. In certain embodiments, the cells of the disclosure are used in the treatment of patients at risk for developing a cancer. Thus, the present disclosure provides methods for the treatment or prevention of a cancer comprising administering to a subject in need thereof, a therapeutically effective amount of the modified T cells of the disclosure.

One of ordinary skill in the art would recognize that multiple administrations of the compositions of the disclosure may be required to affect the desired therapy. For example a composition may be administered 1, 2, 3, 4, 5, 6, 7, 8, 9, or 10 or more times over a span of 1 week, 2 weeks, 3 weeks, 1 month, 2 months, 3 months, 4 months, 5 months, 6 months, 1 year, 2 years, 5, years, 10 years, or more.

In certain embodiments, it may be desirable to administer activated T cells to a subject and then subsequently redraw blood (or have an apheresis performed), activate T cells therefrom according to the present disclosure, and reinfuse the patient with these activated and expanded T cells. This process may be carried out multiple times every few weeks. In certain embodiments, T cells may be activated from blood draws of from 10 cc to 400 cc. Not to be bound by theory, using this multiple blood draw/multiple reinfusion protocol may serve to select out certain populations of T cells.

The administration of the compositions contemplated herein may be carried out in any convenient manner, including by aerosol inhalation, injection, ingestion, transfusion, implantation or transplantation. In some embodiments, compositions are administered parenterally. The phrases "parenteral administration" and "administered parenterally" as used herein refers to modes of administration other than enteral and topical administration, usually by injection, and includes, without limitation, intravascular, intravenous, intramuscular, intraarterial, intrathecal, intracapsular, intraorbital, intratumoral, intracardiac, intradermal, intraperitoneal, transtracheal, subcutaneous, subcuticular, intraarticular, subcapsular, subarachnoid, intraspinal and intrasternal injection and infusion. In one embodiment, the compositions contemplated herein are administered to a subject by direct injection into a tumor, lymph node, or site of infection.

In one embodiment, a subject in need thereof is administered an effective amount of a composition to increase a cellular immune response to a cancer in the subject. The immune response may include cellular immune responses mediated by cytotoxic T cells capable of killing infected cells, regulatory T cells, and helper T cell responses. Humoral immune responses, mediated primarily by helper T cells capable of activating B cells thus leading to antibody production, may also be induced. A variety of techniques may be used for analyzing the type of immune responses induced by the compositions of the present disclosure, which are well described in the art; e.g., Current Protocols in Immunology, Edited by: John E. Coligan, Ada M. Kruisbeek, David H. Margulies, Ethan M. Shevach, Warren Strober (2001) John Wiley & Sons, NY, N.Y.

In the case of T cell-mediated killing, CAR-ligand binding initiates CAR signaling to the T cell, resulting in activation of a variety of T cell signaling pathways that induce the T cell to produce or release proteins capable of inducing target cell apoptosis by various mechanisms. These T cell-mediated mechanisms include (but are not limited to) the transfer of intracellular cytotoxic granules from the T cell into the target cell, T cell secretion of proinflammatory cytokines that may induce target cell killing directly (or indirectly via recruitment of other killer effector cells), and up regulation of death receptor ligands (e.g. FasL) on the T cell surface that induce target cell apoptosis following binding to their cognate death receptor (e.g. Fas) on the target cell.

In embodiments described herein is a method of treating a subject diagnosed with a cancer, comprising removing T cells from the subject, genetically modifying said T cells with a vector comprising a nucleic acid encoding a GPC3 binding CAR as contemplated herein, thereby producing a population of modified T cells, and administering the population of modified T cells to the same subject.

In certain embodiments, the present disclosure also provides methods for stimulating an effector cell mediated immune modulator response to a target cell population in a subject comprising the steps of administering to the subject an immune effector cell population expressing a nucleic acid construct encoding a GPC3 binding CAR molecule.

The methods for administering the cell compositions described herein includes any method which is effective to result in reintroduction of ex vivo genetically modified immune effector cells that either directly express an engineered CAR in the subject or on reintroduction of the genetically modified progenitors of immune effector cells that on introduction into a subject differentiate into mature immune effector cells that express the GPC3 binding CAR molecule. One method comprises transducing peripheral blood T cells ex vivo with a nucleic acid construct in accordance with the present disclosure and returning the transduced cells into the subject.

Although the foregoing disclosure has been described in some detail by way of illustration and example for purposes of clarity of understanding, it will be readily apparent to one of ordinary skill in the art in light of the teachings of this disclosure that certain changes and modifications may be made thereto without departing from the spirit or scope of the appended claims. The following examples are provided by way of illustration only and not by way of limitation. Those skilled in the art will readily recognize a variety of noncritical parameters that could be changed or modified to yield essentially similar results.

EXAMPLES

Example 1

Anti-GPC3 Antibodies

Mice were immunized with GPC3 protein to generate candidate hybridomas. Hybridomas were tested for their binding to different target cells. Target cells used in this Example and the Examples below were acquired from American Type Culture Collection (ATCC) (Hep3B, SkHep1, K562) or Japanese Collection of Research Bioresources (JCRB) (Huh7, JHH5). These lines, with the exception of K562 cells, were cultured in DMEM medium (Gibco) or William's E medium, each supplemented with 10% fetal bovine serum (Corning) and Penicillin Streptomycin antibiotics (Gibco). Hep3B cells express high levels of human GPC3. Hep3B GPC3 negative cells (GPC3KO) were engineered through CRISPR KO of GPC3 exon 2 and clonally selected. Efficient knock out of GPC3 and minimal off target effects were verified through sequencing and functional assays. SkHep1 cells are a GPC3-negative cell line. Huh7 cells have medium/low expression of GPC3. Parental K562 cells are GPC3-negative. K562 GPC3-positive cells were engineered to overexpress (using an EF1a promoter) full human GPC3 (sequence available at Uniport ID NO; P51654-1) though lentiviral vector mediated transduction and puromycin resistance selection. Mouse GPC3 and human GPC5 proteins were overexpressed in a similar manner in K562 cells as controls to test for human GPC3 selectivity/specificity. K562 cells were cultured in IMDM medium (Gibco) supplemented with 10% fetal bovine serum (Corning) and Penicillin Streptomycin antibiotics (Gibco), with or without puromycin at 1 ug/mL (Sigma). Parental K562, K562-GPC3 and K562-GPC5 cells were harvested as suspension cells. while Hep3B cells were harvested with TrypLE express (Gibco), or enzyme free Cell Dissociation Buffer (Gibco), following manufacturer's instructions.

To determine binding of supernatants form hybridomas, target cells, as shown in Table 9, were plated on a U bottom 96-well plate and washed in PBS, incubated with Fc Block (BD Pharmingen), 1:50 dilution of human serum and LIVE/DEAD™ Fixable Near-IR Dead Cell Stain reagent (Invitrogen™) for 15 minutes, then washed in PBS. Cells were then incubated for 30 minutes at 4° C. with either hybridoma supernatant diluted 4 times in PBS, or control antibody (HN3, Genescript; GPC3-PE, ABIN230197, Antibody Online) or PBS. After 2 washes in PBS, all but the direct conjugated antibody condition were stained for 30 minutes at 4° C. with a secondary Goat-anti-Mouse antibody conjugated to PE (Jackson ImmunoResearch) diluted 300 times in PBS. After two final washes in PBS, cells were resuspended in cold PBS and immediately analyzed by flow cytometry on a Fortessa cytometer (Becton Dickinson). Table 9 shows percentage of live cells staining positive for PE as gated based on the negative control PBS staining. Binders were classified by similarity into 3 categories, binders of partially cleaved GPC3, binders of intact GPC3 and binders of Hep3B cells only.

TABLE 9 hybridoma binding profiles

| | Hybridoma or primary antibody | K562 parental (control) | K562 GPC3+ | Hep3B TrypLE | Hep3B CDB |
|---|---|---|---|---|---|
| Negative control | PBS | 0.1 | 0.1 | 1.5 | 2.1 |
| Binders of partially cleaved GPC3 | mAb1 | 0.8 | 96.2 | 73.7 | 99.2 |
| | HN3 | 1.9 | 89.8 | 50.6 | 99.5 |
| | mAb2 | 0.4 | 94.1 | 46.8 | 99.2 |
| | mAb4 | 0.1 | 94.1 | 45.7 | 99.0 |
| | mAb6 | 0.1 | 94.5 | 49.1 | 99.4 |
| | mAb7 | 0.1 | 94.4 | 45.8 | 99.3 |
| | mAb8 | 0.3 | 95.1 | 45.5 | 99.6 |
| | mAb9 | 0.4 | 94.4 | 46.7 | 99.6 |

TABLE 9-continued hybridoma binding profiles

| | Hybridoma or primary antibody | K562 parental (control) | K562 GPC3+ | Hep3B TrypLE | Hep3B CDB |
|---|---|---|---|---|---|
| | mAb11 | 0.5 | 93.4 | 44.2 | 99.4 |
| | mAb12 | 8.8 | 95.9 | 51.4 | 99.5 |
| | mAb16 | 0.2 | 95.5 | 46.1 | 98.6 |
| | mAb17 | 0.1 | 94.6 | 47.8 | 98.8 |
| Binders of intact GPC3 | mAb5 | 0.1 | 60.4 | 3.7 | 98.0 |
| | mAb10 | 0.1 | 56.3 | 2.8 | 98.2 |
| | mAb18 | 0.1 | 27.3 | 4.1 | 21.7 |
| Binders of HeP3B only | mAb3 | 0.9 | 2.3 | 9.7 | 23.2 |
| | mAb14 | 0.2 | 0.6 | 8.9 | 19.0 |
| | mAb19 | 0.3 | 0.4 | 7.6 | 17.8 |
| Commercial control | AbOnline-PE | 22.1 | 92.7 | 1.8 | 2.2 |

The hybridomas producing antibody able to bind the three non-control cell types were selected for further evaluation. The variable domains of the immunoglobulins of these hybridomas were sequenced and six were identified unique sequences, the remainder being redundant to the six identified as unique.

Example 2

Chimeric Antigen Receptor (CAR) T Cells

The sequences of the light and heavy variable regions of the six unique pairs of heavy and light chains identified in Example 1 and subsequent sequencing, mAb1, mAb2, mAb10, mAb14, mAb18 and mAb19, were cloned as single chain variable fragments (scFvs) into CAR constructs with the following architecture; scFv—CD8 hinge domain—CD8 transmembrane domain—4 1BB costimulatory domain—CD3zeta signaling domain, using standard molecular biology techniques known in the art. The CAR constructs were cloned into lentiviral vectors that were used for T-cell transduction. An EF1A promoter was used with all constructs and tested. Two different orientations of variable heavy (VH) and variable light (VL) chains were tested, the "VH" suffix designates a construct where VH comes just after signal peptide, while the "VL" suffix designates a construct where VH comes just after signal peptide (see, for example, Table 10).

Chimeric Antigen Receptor (CAR) T cells were manufactured with mAb2, mAb10, mAb1, mAb14, mAb19 and mAb18-based scFvs, along with control constructs utilizing scFvs derived from publicly available YP7 and codrituzumab antibody sequences. For CAR T cell manufacturing, CD3+ T cells were isolated from peripheral blood mononuclear cells obtained from healthy donors by negative selection and frozen down in CryoStor® cell cryopreservation media (Sigma Aldrich®). Before lentivirus transduction, CD3 pan T cells were thawed, rested for two hours, activated with CD3/CD28 Dynabeads® (ThermoFisher Scientific), and then rested overnight in T cell media (X-VIVO™ (Lonza) with 5% human serum (Valley Biomedical), and Glutamax (Gibco)) supplemented with 100 IU/ml of Interleukin-2 (IL2) (Miltenyi Biotech). The following day cells were transduced with polybrene and lentivirus containing CAR constructs with and without dominant-negative TGFbeta receptors (TGFbeta-DNRs) as described herein. Cells were centrifuged for 90 minutes at 1000 g, then placed in incubator. The following day culture media was replaced. Cells were de-beaded after additional two days, and expanded for eight days. Media was refreshed three times per week with addition of IL-2 for the whole volume. At the end of manufacturing, cells were frozen in CryoStor® cell cryopreservation media (Sigma Aldrich®). In all manufacturing cells were approximately 40-90% positive for the transgene as measured by flow cytometry, with an average vector copy number of approximately 0.5-4. Cells used in the functional assays and in vivo experiments described below were performed after thawing and overnight rest with 100 US/mL IL2.

Example 3

Cytotoxicity

The cytotoxicity of CAR T cells manufactured as described in Example 2 was evaluated in a xCELLigence RTCA assay on an MP instrument (Agilent). 10,000 live target cells (Hep3B cells) were plated the day prior to the assay, and on the next day, 500 CAR+ T cells (or untransduced (UT)) (for an Effector-to-Target (E:T) ratio of 1:5 and 1:20) were plated in a 96-well E-plate in target cell culture media, following the manufacturer's recommendations. Cytotoxicity was followed over 6-7 days using the RTCA Pro software provided and is reported as % cytolysis. Table 10 shows the represented the endpoint % cytolysis against Hep3B cells at 143 h. Data is shown for 2 donors, Donor 1 and Donor 2, manufactured as described in Example 2.

TABLE 10 cytotoxicity determination

| | CAR+ T:target cell ratio | | | |
|---|---|---|---|---|
| | E:T ratio 1:5 | | E:T ratio 1:20 | |
| Short name | Donor 1 | Donor 2 | Donor 1 | Donor 2 |
| mAb2_VH | 100.0 | 100.0 | 100.0 | 81.8 |
| mAb10_VH | 24.8 | 52.2 | 9.5 | 12.7 |
| mAb1_VH | 100.0 | 100.0 | 100.0 | 98.1 |
| mAb14_VH | 100.0 | 100.0 | 82.4 | 61.3 |
| mAb19_VH | 3.4 | 1.6 | 8.8 | 7.9 |
| mAb18_VH | 4.9 | 1.4 | 4.2 | 6.9 |
| mAb2_VL | 4.3 | 3.3 | 6.7 | 7.8 |
| mAb10_VL | 5.4 | 3.6 | 5.5 | 5.4 |
| mAb19_VL | 4.5 | 3.7 | 1.8 | 1.5 |
| mAb18_VL | 0.7 | 1.4 | 5.8 | 3.0 |
| hYP7 | 100.0 | 100.0 | 99.9 | 98.1 |
| Codrituzumab | 100.0 | 100.0 | 99.9 | 90.2 |
| Non transduced | 0.0 | 0.0 | 3.6 | 0.0 |
| Target cells only | 0.0 | 0.0 | 0.0 | 0.0 |

All CAR constructs expressed well in T cells: between 53-76% T cells were CAR+, with an average vector copy number between 0.9-1.6. Manufactured CAR+ and non transduced T cells had comparable memory phenotypes, except mAb14-based CAR T cells which had higher non-specific activation/exhaustion markers.

TABLE 11

| | % CAR at day 14 | | VCN | | % CD25 in CD8+ cells | | % CD39 in CD8+ cells | | % CD69 in CD8+ cells | | % LAG3+ in CD8+ cells | | % PD1 in CD8+ cells | |
|---|---|---|---|---|---|---|---|---|---|---|---|---|---|---|
| | Donor 1 | Donor 2 | Donor 1 | Donor 2 | Donor 1 | Donor 2 | Donor 1 | Donor 2 | Donor 1 | Donor 2 | Donor 1 | Donor 2 | Donor 1 | Donor 2 |
| mAb2_VH | 74.3 | 74.9 | 1.21 | 1.62 | 13.3 | 10.1 | 43.7 | 71.8 | 9.62 | 9.38 | 10.1 | 10.8 | 1.05 | 1.27 |
| mAb10_VH | 61.8 | 60.1 | 1.16 | 0.95 | 10.7 | 8.76 | 36 | 70.4 | 8.37 | 8.22 | 6.29 | 8.4 | 0.56 | 1.09 |
| mAb1_VH | 71.6 | 65.1 | 1.39 | 1.31 | 12.6 | 6.39 | 51.4 | 74.9 | 7.88 | 6.21 | 7 | 6.07 | 0.78 | 1.27 |
| mAb14_VH | 62.2 | 58.6 | 1.22 | 1.28 | 29.7 | 19.1 | 58.1 | 80.9 | 14.5 | 14.4 | 15.7 | 16.1 | 0.95 | 1.44 |
| mAb19_VH | 71.3 | 66.1 | 0.97 | 1.02 | 17.3 | 11.5 | 46.7 | 74.5 | 9.13 | 11.8 | 9.59 | 12.5 | 0.79 | 1.55 |
| mAb18_VH | 62.4 | 58.3 | 1.26 | 1.18 | 9.26 | 7.68 | 36 | 72.2 | 3.78 | 7.7 | 4.03 | 7.81 | 0.39 | 1.36 |
| mAb2_VL | 53.8 | 55.8 | 1.05 | 1.24 | 7.63 | 3.61 | 34 | 63.3 | 4.93 | 4.46 | 3.55 | 2.82 | 0.57 | 1.48 |
| mAb10_VL | 75.8 | 72.1 | 1.27 | 1.20 | 9.82 | 6.48 | 38.4 | 68.4 | 7.65 | 7.31 | 6.98 | 6.74 | 0.65 | 1.06 |
| mAb19_VL | 75.2 | 71.4 | 1.15 | 1.05 | 13.5 | 8.11 | 41.7 | 72.8 | 10.8 | 9.93 | 8.98 | 7.71 | 0.99 | 1.3 |
| mAb18_VL | 69.9 | 67.6 | 1.44 | 1.39 | 7.92 | 4.11 | 38.9 | 68.7 | 4.76 | 6.19 | 3.57 | 3.58 | 0.54 | 1.17 |
| hYP7 | 69.9 | 64.3 | 1.42 | 1.36 | 12.7 | 6.64 | 50.3 | 77.1 | 9 | 8.41 | 7.4 | 7.32 | 0.62 | 1.2 |
| Codrituzumab | 77 | 71 | 1.35 | 1.50 | 11.5 | 7.2 | 42.1 | 71.7 | 11.3 | 9.42 | 9.34 | 9.39 | 0.99 | 1.37 |
| Non transduced | 0.05 | 0.05 | 0.00 | 0.00 | 6.17 | 3.98 | 16.7 | 42.7 | 3.67 | 2.87 | 2.55 | 3.34 | 0.62 | 2.21 |

Example 4

Flow Cytometry Cytotoxicity

The cytotoxicity of CAR T cells was further evaluated by flow cytometry. Cytotoxicity was measured by end of assay % dead target cells (Hep3B, JHH5. K562-mouseGPC3, K562-human GPC5, K562parental and SKHep1). The assay was run with T cells from 2 healthy donors manufactured as described in Example 2. For this assay, 100,000 CellTrace Violet-stained target cells and 100,000 CAR+ T cells (or non transduced (NTD) cells) were plated in a U bottom 96-well plate and in target cell culture media. After 48 h, cocultures were washed and stained with an antibody panel staining for viability (Live/Dead Near Infra-RedJInvitrogen™)), and T cell markers CD3-BV786, CD8-FITC, CD69-PECy7 (Biolegend), Myc-AF647 (Cell Signaling), and samples acquired on an iQue flow cytometer (Intellicyt). Cytotoxicity was measured as % Dead targets evaluated by % of Live/Dead-high cells in CellTrace Violet-positive CD3-negative cells. The mAb14-based CARs had cytotoxic activity against the GPC3-negative target cell, Sk-Hep1 (see Table 11). In addition, the mAb19_VL-, YP7- and codrituzumab-based CARs, had cytotoxic activity against K562 target cells overexpressing human GPC5 (see Table 12). In contrast, the mAb2 and mAb1-based CARs did not have similar levels of cytotoxicity against Sk-Hep1, or K562 target cells overexpressing human GPC5. mAb2 and mAb1-based CARs were selected for further evaluation.

TABLE 12 cytotoxicity determination

| Short name | Donor 1 | | | | | | Donor 2 | | | | | |
|---|---|---|---|---|---|---|---|---|---|---|---|---|
| | Hep3B | JHH5 | K562 - mouse GPC3 | K562 - human GPC5 | K562 parental | SkHep1 | Hep3B | JHH5 | K562 - mouse GPC3 | K562 - human GPC5 | K562 parental | SkHep1 |
| mAb2_VH | 87.5 | 74.2 | 79.5 | 26.2 | 13.3 | 29 | 72.9 | 65.2 | 88.5 | 25.2 | 13.5 | 26.5 |
| mAb10_VH | 84.3 | 38.6 | 33.1 | 25.5 | 15.2 | 28.1 | 77 | 41.2 | 49.8 | 29.7 | 15.6 | 27.2 |
| mAb1_VH | 88.8 | 70.5 | 80.4 | 23.4 | 13.9 | 23.8 | 75.6 | 72.3 | 87.8 | 25.3 | 13 | 29.7 |
| mAb14_VH | 85.7 | 27.9 | 29.2 | 29.6 | 18.8 | 82.9 | 78.5 | 26 | 31.9 | 34.1 | 19.2 | 73.1 |
| mAb19_VH | 41.8 | 24.6 | 19.3 | 23.6 | 12.9 | 23.7 | 51.1 | 19.4 | 25.6 | 27.1 | 14.7 | 28.1 |
| mAb18_VH | 39.8 | 22.8 | 21.3 | 24 | 14.6 | 24.3 | 49.8 | 22.3 | 28.6 | 29.4 | 16.3 | 23 |
| mAb2_VL | 85.2 | 47 | 29.2 | 24.8 | 14.6 | 32.1 | 81.5 | 43.8 | 31 | 26.9 | 13.6 | 22.8 |
| mAb10_VL | 61 | 33.5 | 26.5 | 23.9 | 14.4 | 24.9 | 69.6 | 32.9 | 29.8 | 25.1 | 13.4 | 23.8 |
| mAb19_VL | 69.2 | 40.2 | 38.2 | 38.8 | 31.8 | 22.4 | 74.5 | 45.4 | 69.7 | 69.8 | 28 | 38.8 |
| mAb18_VL | 41.5 | 21.5 | 18.7 | 22.1 | 11.6 | 23.4 | 38.4 | 19.6 | 21.3 | 23.3 | 13 | 21.7 |
| hYP7 | 88.9 | 83 | 63.6 | 64.5 | 13.4 | 23.8 | 89.5 | 81 | 68.1 | 71.2 | 15.1 | 26 |
| Codrituz | 90 | 90.6 | 22.3 | 94.6 | 12.4 | 27 | 90.7 | 72.6 | 24.8 | 95.1 | 13.9 | 22.2 |

Example 5

Cytotoxicity of Humanized CARs

Humanized versions of mAb2 and mAb1 scFvs each were constructed by cloning the CDRs from each mAb onto human framework regions selected for homology to the parental murine sequence. Additional humanized versions were made by reversion of select amino acids to their murine counterparts. The resulting 10 humanized scFvs were cloned into lentiviral vector containing CAR constructs as described in Example 1. The humanized mAb2-1-mAb2-5 and mAb1-1-mAb1-5-based CAR constructs were then tested functionally in vitro in coculture with GPC3 expressing target cells. CAR T cells that include the mAb2-1-mAb2-5 and mAb1-1- mAb1-5-based CAR constructs were manufactured as described in Example 2.

Cytotoxicity of these CAR T cells was evaluated in a xCELLigence RTCA assay on an MP instrument (Agilent). 10,000 live target cells (Hep3B cells) were plated the day prior to the assay, and on the next day, 500 or 2000 CAR+ T cells (or untransduced (UT)) (for an Effector-to-Target (E:T) ratio of 1:20 or 1:5 respectively) were plated in a 96-well E-plate in target cell culture media, following manufacturer's recommendations. Cytotoxicity was followed over 6-7 days using the RTCA Pro software provided and reported as % cytolysis. Table 13 shows the represented the endpoint % cytolysis against Hep3B cells at 164 h. Data is shown for 2 donors, Donor 1 and Donor 2. As shown in Table 12 the mAb1 family (parental mAb1 and humanized mAb1-1 to mAb1-5) of CAR T cells had higher specific cytolysis than mAb2 family of CARs.

TABLE 13 cytotoxicity determination

| Target cell number seeded | 10,000 | 10,000 |
|---|---|---|
| Target Cell | Hep3B | SkHep1 |
| (CAR) T cell number added | 500 | 2000 |

| | Donor T cells | | | | | | | |
|---|---|---|---|---|---|---|---|---|
| | DONOR 1 | | DONOR 2 | | DONOR 1 | | DONOR 2 | |
| Short name | % Cytolysis | SD | % Cytolysis | SD | % Cytolysis | SD | % Cytolysis | SD |
| hmAb2-1 | 36.2 | 5.2 | 0.0 | 5.5 | 4.8 | 4.1 | 9.2 | 12.6 |
| hmAb2-2 | 28.9 | 6.8 | 0.0 | 3.5 | 0.0 | 6.1 | 12.5 | 3.6 |
| hmAb2-3 | 19.3 | 11.7 | 0.0 | 8.7 | 0.0 | 5.1 | 6.8 | 4.8 |
| hmAb2-4 | 29.3 | 3.9 | 0.0 | 0.7 | 0.0 | 2.7 | 5.9 | 7.2 |
| hmAb2-5 | 29.6 | 5.2 | 0.0 | 14.2 | 0.0 | 5.8 | 5.7 | 1.2 |
| hmAb1-2 | 95.7 | 2.9 | 91.3 | 4.8 | 0.0 | 3.7 | 3.4 | 4.5 |
| hmAb1-3 | 97.1 | 0.1 | 89.4 | 4.7 | 0.0 | 7.3 | 9.9 | 3.7 |
| hmAb1-1 | 96.4 | 2.1 | 93.4 | 4.7 | 0.0 | 5.5 | 5.1 | 8.3 |
| hmAb1-4 | 94.9 | 1.4 | 89.6 | 10.5 | 0.0 | 2.3 | 3.0 | 7.3 |
| hmAb1-5 | 99.3 | 1.3 | 95.0 | 2.6 | 0.0 | 5.7 | 5.7 | 6.4 |
| mmAb2 | 81.1 | 5.2 | 71.0 | 8.8 | 0.0 | 2.8 | 5.6 | 15.6 |
| mmAb1 | 96.1 | 1.5 | 86.7 | 0.7 | 0.0 | 5.6 | 0.0 | 13.3 |
| hYP7 | 86.2 | 16.8 | 46.9 | 10.0 | 0.0 | 0.2 | 0.3 | 8.1 |
| NTD | 0.0 | 12.5 | 0.0 | 4.8 | 0.0 | 5.5 | 0.0 | 10.0 |

Example 6

Flow Cytometry Cytotoxicity of Humanized CARs

Cytotoxicity of T cells containing Humanized CARs was further evaluated by flow cytometry. Cytotoxicity was measured by end of assay % dead target cells (Hep3B, JHH5, KS62-mouseGPC3, K562-human GPC, K562parental and SKHep1). CAR T cells were manufactured as described in Example 2. For this assay, 100,000 CellTrace Violet-stained target cells and 100,000 CAR+ T cells (or non transduced (NTD) cells) were plated in a U bottom 96-well plate and in target cell culture media. After 48 h, cocultures were washed and stained with an antibody panel staining for viability (Live/Dead Near Infra-Red), and T cell markers CD3-BV786, CD8-FITC, CD69-PECy7 (Biolegend), Myc-AF647 (Cell Signaling), and samples acquired on an iQue flow cytometer (Intellicyt). Cytotoxicity was measured as % Dead targets evaluated by % of LiveDead-high cells in CellTrace Violet-positive CD3-negative cells. As shown in Table 14, the flow cytometry-based cytotoxicity assay confirmed that humanized hmAb1 CAR T cells were more cytotoxic than humanized mAb2-based CAR T cells against Hep3B and JHH5 target cells. It was further observed that hmAb1-based CAR T cells were more specific than YP7-based CAR T cells, which display slight reactivity to GPC5. mAb1 was selected for further evaluation.

TABLE 14 cytotoxicity determination

| Short name | Hep3B | JHH5 | K562 2353-mouse GPC3 | K562 2355-human GPC5 | K562 parental | SkHep1 |
|---|---|---|---|---|---|---|
| amAb2-1 | 65.8 | 28.9 | 24.2 | 16.2 | 26.0 | 27.1 |
| amAb2-2 | 70.8 | 41.3 | 23.6 | 16.9 | 25.2 | 31.0 |
| hmAb2-3 | 75.9 | 35.8 | 21.6 | 16.6 | 27.5 | 27.6 |
| hmAb2-4 | 73.7 | 47.1 | 22.5 | 17.3 | 28.4 | 30.3 |
| hmAb2-5 | 71.7 | 46.1 | 25.5 | 15.3 | 29.3 | 30.0 |
| hmAb1-2 | 89.4 | 75.7 | 48.3 | 18.2 | 35.3 | 32.0 |
| hmAb1-3 | 89.9 | 72.6 | 50.5 | 16.3 | 27.4 | 28.9 |
| hmAb1-1 | 91.1 | 76.6 | 53.9 | 17.7 | 30.6 | 33.8 |

TABLE 14-continued cytotoxicity determination

| Short name | Hep3B | JHH5 | K562 2353-mouse GPC3 | K562 2355-human GPC5 | K562 parental | SkHep1 |
|---|---|---|---|---|---|---|
| hmAb1-4 | 89.8 | 73.4 | 52.7 | 16.4 | 29.1 | 27.3 |
| hmAb1-5 | 90.5 | 76.7 | 52.9 | 18.5 | 30.4 | 33.4 |
| mmAb2 | 86.7 | 68.2 | 48.5 | 15.2 | 26.2 | 30.1 |
| mmAb1 | 89.1 | 72.0 | 50.7 | 17.9 | 30.6 | 45.8 |
| hYP7 | 75.2 | 75.8 | 28.3 | 42.2 | 27.7 | 29.4 |
| NTD | 37.0 | 17.9 | 15.3 | 14.3 | 22.8 | 17.6 |
| Tumors only | 20.0 | 9.0 | 13.8 | 13.1 | 17.7 | 13.3 |

Example 7

In Vivo Evaluation

T cells transduced with various CAR constructs or untransduced (UT), as shown in Tables 15A-15C and 16, were manufactured as described above and tested in vivo in a Hep3B xenograft model in NSG mice. $2\times10^6$ Hep3B cells were resuspended in 25% Matrigel and were implanted into the high axilla of NSG mice on day 0. Every three to four days thereafter tumor volume was measured using calipers based on tumor width and length. On day 14, when tumors reached mean size of ~150 mm$^3$, animals were divided into groups of 8 mice (4 for vehicle control) such that average tumor volumes were comparable between groups, and treated with either a PBS vehicle, or untransduced T cells, or GPC3 CAR T cells, at $1\times10^6$ CAR+ T cells via intravenous injection. T cell infusion was normalized with addition of untransduced cells such that total T cell dose was equal between all groups. The percentage complete response was calculated by dividing number of mice in which the tumor volume was decreased to 0 for two or more consecutive timepoints, by the number of mice in the group. In the subcutaneous Hep3B xenograft mouse model the humanized mAb1-1 CAR was more potent than other CARs including mAb2-based CARs, as it was able to decrease tumor volume (Tables 15A-15C) and produced more complete responses than other tested CARs (Table 16).

TABLE 15A

Treatment Controls

| Days post-tumor | Treatment with Vehicle (PBS) Tumor volume (mm$^3$) | | | | | Treatment with untransduced T cells Tumor volume (mm$^3$) | | | | | |
|---|---|---|---|---|---|---|---|---|---|---|---|
| 14 | 108 | 126 | 126 | 196 | 196 | 108 | 172 | 196 | 126 | 108 | 108 | 126 |
| 15 | 126 | 126 | 126 | 196 | 196 | 108 | 196 | 288 | 126 | 172 | 108 | 221 |
| 18 | 245 | 320 | 288 | 446 | 320 | 172 | 245 | 446 | 288 | 365 | 256 | 320 |
| 20 | 486 | 550 | 550 | 650 | 650 | 320 | 527 | 936 | 446 | 500 | 365 | 446 |
| 22 | 527 | 787 | 666 | 787 | 1008 | 405 | 787 | 1183 | 650 | 550 | 500 | 600 |
| 25 | 847 | 1268 | 1099 | 1008 | 1268 | 726 | 936 | 1470 | 1008 | 1099 | 864 | 1008 |
| 27 | 908 | 1470 | 1372 | 1352 | 1688 | 936 | 1008 | 1470 | 1268 | 1268 | 1099 | 1268 |
| 29 | 1224 | 1470 | 1688 | 1437 | 1800 | 1008 | 1080 | | 1268 | 1568 | 1099 | 1268 |
| 32 | 2025 | 1800 | 2746 | 2025 | 2432 | 1470 | | | 2025 | 1470 | 2304 |
| 34 | | 2176 | | | | 2176 | | | | | 2304 |

TABLE 15B treatment groups

| Days post-tumor | Treatment with 1e6 YP7 CAR T cells Tumor volume (mm³) | | | | | | | | | Treatment with 1e6 mAb1-1 CAR T cells Tumor volume (mm³) | | | | | | |
|---|---|---|---|---|---|---|---|---|---|---|---|---|---|---|---|---|
| 14 | 196 | 126 | 88 | 196 | 126 | 126 | 126 | 108 | 126 | 196 | 196 | 126 | 108 | 108 | 88 | 172 |
| 15 | 288 | 144 | 88 | 288 | 126 | 172 | 221 | 172 | 320 | 288 | 320 | 126 | 108 | 108 | 126 | 172 |
| 18 | 666 | 320 | 172 | 600 | 446 | 288 | 446 | 405 | 550 | 486 | 527 | 288 | 288 | 126 | 172 | 256 |
| 20 | 864 | 446 | 256 | 787 | 650 | 405 | 600 | 600 | 600 | 787 | 650 | 550 | 365 | 196 | 256 | 256 |
| 22 | 1183 | 600 | 500 | 1268 | 1080 | 600 | 787 | 787 | 600 | 847 | 908 | 600 | 550 | 288 | 405 | 405 |
| 25 | 864 | 221 | 75 | 650 | 446 | 126 | 288 | 365 | 787 | 1008 | 847 | 600 | | 320 | 405 | 288 |
| 27 | 726 | 75 | 0 | 527 | 320 | 0 | 126 | 172 | 787 | 1268 | 847 | 600 | | 221 | 256 | 108 |
| 29 | 936 | 0 | 0 | 384 | 108 | 0 | 108 | 108 | 787 | 1268 | 1268 | 288 | | 196 | 196 | 75 |
| 32 | 936 | 0 | 0 | 384 | 0 | 0 | 108 | 63 | 1183 | 1666 | 1568 | 550 | | 108 | 196 | 0 |
| 34 | 1268 | 0 | 0 | 700 | 0 | 0 | 172 | 63 | 1666 | 2025 | 2025 | 936 | | 75 | 196 | 0 |
| 36 | 1568 | 0 | 0 | 700 | 0 | 0 | 172 | 63 | 1764 | | | 936 | | 0 | 196 | 0 |
| 39 | 2176 | 0 | 0 | 847 | 0 | 0 | 256 | 196 | 2560 | | | 1470 | | 0 | 108 | 0 |
| 41 | | 0 | 0 | 908 | 0 | 0 | 256 | 288 | | | | 1688 | | 0 | 0 | 0 |
| 43 | | 0 | 0 | 650 | 0 | 0 | 288 | 288 | | | | 1800 | | 0 | 0 | 0 |
| 46 | | 100 | 0 | 446 | 0 | 88 | 405 | 288 | | | | 2457 | | 0 | 0 | 0 |
| 49 | | 113 | 0 | 446 | 0 | 126 | 405 | 288 | | | | | | 0 | 0 | 0 |
| 53 | | 198 | 75 | 221 | 0 | 352 | 666 | 405 | | | | | | 126 | 63 | 88 |
| 55 | | 416 | 144 | 75 | 0 | 600 | 666 | 550 | | | | | | 126 | 108 | 144 |
| 57 | | 750 | 144 | 126 | 0 | 787 | 864 | 550 | | | | | | 221 | 126 | 162 |
| 60 | | 1224 | 320 | 172 | 0 | 787 | 1099 | 787 | | | | | | 320 | 196 | 162 |
| 62 | | 1521 | 405 | 172 | 0 | 1008 | 1183 | 936 | | | | | | 352 | 221 | 270 |
| 64 | | 1960 | 550 | 172 | 0 | 1268 | 1372 | 1183 | | | | | | 384 | 288 | 384 |
| 67 | | 2138 | 787 | 196 | 0 | 1568 | 1470 | 1568 | | | | | | 700 | 405 | 567 |
| 69 | | | 1268 | 221 | 0 | 1764 | 1568 | 2176 | | | | | | 847 | 550 | 800 |
| 71 | | | 1688 | 320 | 0 | 2432 | 2176 | | | | | | | 1470 | 787 | 1089 |
| 74 | | | 1913 | 320 | 0 | | | | | | | | | 1568 | 1008 | 1521 |

TABLE 15C treatment groups

| Days post-tumor | Treatment with 1e6 mAb1-5 CAR T cells Tumor volume (mm³) | | | | | | | | | Treatment with 1e6 mAb2 CAR T cells Tumor volume (mm³) | | | | | | |
|---|---|---|---|---|---|---|---|---|---|---|---|---|---|---|---|---|
| 14 | 196 | 108 | 144 | 196 | 88 | 108 | 144 | 108 | 196 | 126 | 126 | 126 | 196 | 108 | 144 | 144 |
| 15 | 288 | 126 | 196 | 320 | 144 | 172 | 288 | 108 | 288 | 196 | 126 | 126 | 288 | 126 | 221 | 288 |
| 18 | 550 | 256 | 405 | 650 | 446 | 256 | 600 | 172 | 600 | 288 | 126 | 288 | 550 | 256 | 352 | 550 |
| 20 | 864 | 288 | 600 | 700 | 550 | 288 | 787 | 256 | 650 | 288 | 172 | 405 | 550 | 365 | 486 | 666 |
| 22 | 1372 | 550 | 864 | 1152 | 726 | 405 | 1008 | 256 | 1008 | 405 | 256 | 600 | 787 | 550 | 650 | 864 |
| 25 | 1372 | 600 | 864 | 1224 | 787 | 500 | 1183 | 365 | 1008 | 446 | 256 | 650 | 1008 | 666 | 787 | 1183 |
| 27 | 2048 | 650 | 1008 | 1764 | 847 | 666 | 1372 | 550 | 1183 | 446 | 365 | 787 | 1268 | 936 | 1352 | 1183 |
| 29 | | 847 | 1470 | 2025 | 1080 | 864 | 1800 | 726 | 1352 | 600 | 550 | 1183 | 1568 | 1183 | | 1800 |
| 32 | | 1080 | | | 1268 | 1099 | 2176 | 1099 | 1666 | 787 | 864 | 1568 | 1800 | 1372 | | 2457 |
| 34 | | 1352 | | | 2048 | 2048 | | 1372 | 2304 | 1008 | 1099 | 2176 | 2176 | 2048 | | |
| 36 | | 1568 | | | | | | 1688 | | 1268 | 1372 | | | | | |
| 39 | | 2250 | | | | | | 2457 | | | 2176 | | | | | |

TABLE 16

| | % Complete Response |
|---|---|
| Treatment with Vehicle (PBS) | 0 |
| Treatment with untransduced T cells | 0 |
| Treatment with 1e6 YP7 CAR T cells | 50 |
| Treatment with 1e6 mAb1-1 CAR T cells | 37.5 |
| Treatment with 1e6 mAb1-5 CAR T cells | 0 |
| Treatment with 1e6 mAb2 CAR T cells | 0 |

Example 8

CAR T+TGFbeta Dominant Negative Receptor

Lentiviral vector constructs were engineered to overexpress, in addition to the CAR, a truncated version of TGF-beta receptor 2 that doesn't possess the internal signaling domain and acts as a dominant negative TGFbeta receptor and is termed TGFbDNR2. The mAb1-1, and YP7-based CAR constructs were both tested with this TGFbDNR2 enhancement. Manufacturing of CAR-T cells was carried out as described in Example 2. The CAR T constructs expressed well in T cells (between 60 and 86% CD3+ T cells were CAR+ at the end of manufacturing; with vector copy number values between 0.8 and 2). (see Table 17).

TABLE 17

| | % CAR+ | Vector Copy Number |
|---|---|---|
| mAb1-1_DNR2 | 86 | 2.03 |
| hYP7_DNR2 | 60.3 | 0.79 |
| UTD | 0.6 | 0 |

Specific cytotoxicity was assessed in an xCELLigence assay against target cells expressing different levels of GPC3, including 2 cell lines that were GPC3-negative as described in Example 2. The CAR T cells exhibited cytotoxicity against GPC3-expressing targets Hep3B and Huh7. mAb1-1 was found to be more specific than YP7-based CAR since it had minimal cytolysis against GPC3-negative target cells Hep3B-GPCKO and Sk-Hep1 (Table 18).

TABLE 18 cytotoxicity

| | Effector:Target ratio | | | | | | | |
|---|---|---|---|---|---|---|---|---|
| | High E:T | | | | Low E:T | | | |
| | Target cell number seeded | | | | | | | |
| | 10,000 | 10,000 | 10,000 | 10,000 | 10,000 | 10,000 | 10,000 | 10,000 |
| Target Cell | Hep3B | Huh7 | Hep3B GPC3KO | Sk-Hep1 | Hep3B | Huh7 | Hep3B GPC3KO | Sk-Hep1 |
| (CAR) T cell number added | 1,000 | 10,000 | 10,000 | 10,000 | 500 | 500 | 500 | 500 |
| Short name | % Cytolysis | | | | | | | |
| mAb1-1_DNR2 | 100 | 100 | 10 | 1 | 99 | 44 | 0 | 0 |
| hYP7_DNR2 | 100 | 100 | 100 | 100 | 100 | 31 | 95 | 3 |
| Untransduced | 4 | 0 | 9 | 0 | 2 | 0 | 2 | 0 |
| Target | 0 | 0 | 0 | 0 | 0 | 0 | 0 | 0 |

Example 9

CAR T+TGFbeta Dominant Negative Receptor

Cytokine secretion by TGFbDNR-enhanced GPC3-specific CAR T cells was evaluated after a coculture assay. 25,000 target cells and 25,000 CAR+T or untransduced (UTD) cells were plated in a flat bottom 96-well plate and in target cell culture media. After 24 h, supernatants were collected, diluted 50 or 2 times, and IFNg was measured by Luminex platform and Milliplex MAP kit (EMD Millipore Sigma) according to manufacturer's directions. Hep3B cells express human GPC3, whereas Hep3B-GPC3KO are GPC3 negative. The control "T cells only" is a control where no target were present. Experiment was run with cells from 1 healthy donor. As shown in Table 19, IFNg concentration is reported in pg/mL. mAb1-1_DNR CAR was found to be more specific than YP7_DNR-based CAR since it had less IFNg secretion against GPC3-negative target cells Hep3B-GPC3KO and in absence of targets.

TABLE 19

| | Short name | | | | | | | | |
|---|---|---|---|---|---|---|---|---|---|
| | Hep3B | | | Hep3B-GPC3KO | | | T cells only | | |
| UTD | 30.5 | 30.5 | 30.5 | 30.5 | 30.5 | 30.5 | 7.5 | 7.8 | 8.1 |
| mAb1-1_DNR | 37710.3 | 39360.6 | 44536.0 | 59.2 | 30.5 | 30.5 | 38.6 | 30.6 | 45.5 |
| hYP7_DNR | 120842.8 | 105712.5 | 101816.5 | 77435.0 | 72569.6 | 66045.7 | 9805.2 | 9794.2 | 9903.2 |

Example 10

CAR T+TGFbeta Dominant Negative Receptor In Vivo

T cells transduced with mAb1-1_TGFbDNR-based CAR construct or untransduced (UT), were produced from leukapheresis of 3 healthy donors. T cells were then tested in a subcutaneous Hep3B xenograft mouse model as described in Example 7: day 19 post tumor implant for donor 1, day 17 post tumor implant for donors 2 and 3; CAR T cell dose: 2e6/mouse for donor 1, or 1e6/mouse for donors 2 and 3; and UT cell dose: 5e6/mouse for donor 1, 4e6/mouse for donor 2.

The tumor volume follow up (Table 20 for donor 1 and Table 21 for donors 2-3) shows that the mAb1-1-DNR CAR T cells were able to efficiently control the tumor growth at low doses (2e6 or 1e6 CAR T cells/mouse).

TABLE 20

| Days post-tumor | Treatment with 5e6 UT T cells - donor 1 Tumor volume (mm3) | | | | | | | | | | Treatment with 2e6 mAb1-1-DNR CAR T cells - donor 1 Tumor volume (mm3) | | | | | | | | | |
|---|---|---|---|---|---|---|---|---|---|---|---|---|---|---|---|---|---|---|---|---|
| 14 | 107 | 207 | 108 | 138 | 123 | 189 | 149 | 86 | 120 | 82 | 117 | 127 | 106 | 125 | 183 | 135 | 115 | 87 | 108 | 151 |
| 21 | 219 | 423 | 197 | 268 | 263 | 420 | 159 | 368 | 309 | 188 | 213 | 251 | 192 | 252 | 424 | 390 | 351 | 181 | 223 | 438 |
| 27 | 693 | 904 | 449 | 559 | 464 | 1036 | 849 | 295 | 619 | 400 | 200 | 198 | 362 | 311 | 580 | 600 | 252 | 186 | 295 | 547 |
| 30 | 868 | 1297 | 716 | 863 | 761 | 1350 | 982 | 472 | 861 | 725 | 170 | 96 | 133 | 256 | 610 | 497 | 150 | 40 | 274 | 448 |
| 34 | 1098 | 1934 | 986 | 1295 | 1108 | 1764 | 1421 | 693 | 1111 | 926 | 67 | 0 | 65 | 144 | 428 | 337 | 83 | 18 | 174 | 187 |
| 38 | 1600 | 2491 | 1263 | 1583 | 1495 | 2059 | 1652 | 878 | 1324 | 1205 | 79 | 8 | 51 | 80 | 531 | 271 | 63 | 18 | 174 | 121 |
| 42 | 2149 | | 1558 | 2263 | 2026 | 2578 | 2306 | 1086 | 2176 | 2158 | 39 | 14 | 23 | 77 | 570 | 112 | 20 | 0 | 113 | 73 |
| 45 | | 2123 | | | | | | 1459 | | | 36 | 0 | 18 | 63 | 453 | 144 | 0 | 0 | 113 | 68 |
| 52 | | | | | | | | 1495 | | | 0 | 0 | 0 | 108 | 274 | 141 | 0 | 0 | 0 | 75 |
| 56 | | | | | | | | | | | 0 | 0 | 0 | 126 | 172 | 150 | 0 | 0 | 0 | 0 |
| 59 | | | | | | | | | | | 0 | 0 | 0 | 0 | 63 | 144 | 0 | 0 | 0 | 0 |

TABLE 21

| Days post-tumor | Tumor volume (mm3) | | | | | | | |
|---|---|---|---|---|---|---|---|---|
| Treatment with 4e6 UT T cells - donor 2 | | | | | | | | |
| 16 | 72 | 76 | 79 | 91 | 93 | 113 | 116 | 188 |
| 22 | 95 | 176 | 104 | 133 | 284 | 190 | 242 | 293 |
| 28 | 144 | 303 | 204 | 329 | 425 | 474 | 737 | 852 |
| 31 | 265 | 587 | 327 | 481 | 753 | 767 | 856 | 1144 |
| 35 | 426 | 816 | 392 | 814 | 1252 | 888 | 1136 | 1423 |
| 39 | 729 | 1330 | 538 | 1229 | 1885 | 1099 | 1159 | 2138 |
| 42 | 1000 | 1570 | 709 | 1637 | 2312 | 1375 | 1283 | |
| 49 | | | | | | | | |
| 52 | | | | | | | | |
| 56 | | | | | | | | |
| 58 | | | | | | | | |
| 62 | | | | | | | | |
| 66 | | | | | | | | |
| Treatment with 1e6 mAb1-1-DNR CAR T cells - donor 2 | | | | | | | | |
| 16 | 72 | 76 | 81 | 89 | 96 | 110 | 121 | 169 |
| 22 | 63 | 170 | 174 | 239 | 239 | 191 | 290 | 226 |
| 28 | 51 | 214 | 277 | 235 | 318 | 559 | 436 | 328 |
| 31 | 0 | 155 | 250 | 145 | 290 | 419 | 392 | 396 |
| 35 | 0 | 188 | 108 | 0 | 172 | 420 | 363 | 389 |
| 39 | 0 | 250 | 165 | 0 | 172 | 588 | 544 | 414 |
| 42 | 0 | 237 | 229 | 0 | 243 | 545 | 564 | 451 |
| 49 | 0 | 315 | 88 | 0 | 117 | 259 | 325 | 231 |
| 52 | 0 | 410 | 86 | 0 | 131 | 352 | 256 | 340 |
| 56 | 0 | 337 | 18 | 0 | 65 | 86 | 112 | 70 |
| 58 | 14 | 285 | 14 | 0 | 63 | 81 | 86 | 69 |
| 62 | 0 | 225 | 0 | 0 | 0 | 0 | 72 | 85 |
| 66 | 0 | 262 | 0 | 0 | 0 | | 0 | 63 |
| Treatment with 1e6 mAb1-1-DNR CAR T cells - donor 3 | | | | | | | | |
| 16 | 74 | 75 | 83 | 86 | 99 | 108 | 131 | 151 |
| 22 | 136 | 169 | 129 | 252 | 291 | 348 | 217 | 286 |
| 28 | 243 | 224 | 366 | 364 | 667 | 492 | 368 | 468 |
| 31 | 256 | 492 | 363 | 458 | 757 | 215 | 436 | 459 |
| 35 | 298 | 173 | 228 | 210 | 984 | 139 | 334 | 266 |
| 39 | 69 | 256 | 83 | 186 | 1498 | 83 | 415 | 314 |
| 42 | 163 | 263 | 63 | 83 | 1800 | 63 | 500 | 442 |
| 49 | 359 | 484 | 0 | 108 | | 63 | 857 | 552 |
| 52 | 510 | 795 | 0 | 172 | | 63 | 1022 | 805 |
| 56 | 598 | 932 | 0 | 0 | | 69 | 1197 | 1051 |
| 58 | | | 0 | 172 | | 93 | | |
| 62 | | | 0 | 194 | | 227 | | |
| 66 | | | 81 | 451 | | 438 | | |

Example 11

CAR T+TGFbeta Dominant Negative Receptor in a GPC3 Low In Vivo Model

T cells transduced with mAb1-1_TGFbDNR-based CAR construct or untransduced (UT), were produced. T cells were then tested in a subcutaneous Huh7 xenograft mouse model. Briefly, 5e6 Huh7 tumor cells were prepared with 50% Matrigel and implanted on day 0 in dorsal flank of NSG MHC_I and MHC-II double knock-out mice. On day 10, mice with tumor volume between 63 and 110 mm3 were enrolled and distributed in groups, such that average tumor volume at T cell dosing would be 80 mm3. On day 10, mice received a total of 1.57e7 total T cell/mouse, and in CAR T treated mouse, this represented 1e7 CAR T cell/mouse. A control group in which mice received PBS as vehicle control was followed as well.

The tumor volume follow-up (Table 22) shows that the mAb1-1-DNR CAR T cells were able to efficiently control the tumor growth of GPC3-low expressing tumor cells.

TABLE 22

| Days post-tumor | Tumor volume (mm3) | | | | | | | | | |
|---|---|---|---|---|---|---|---|---|---|---|
| Treatment with PBS | | | | | | | | | | |
| 7 | 70 | 70 | 70 | 71 | 71 | 71 | 72 | 72 | 73 | 73 |
| 14 | 85 | 70 | 218 | 111 | 86 | 111 | 63 | 70 | 93 | 108 |
| 19 | 141 | 63 | 699 | 578 | 91 | 411 | 83 | 135 | 174 | 235 |
| 21 | 256 | 75 | 868 | 721 | 74 | 292 | 186 | 261 | 319 | 396 |
| 25 | 776 | 224 | 1631 | 1423 | 138 | 613 | 441 | 515 | 578 | 518 |
| 30 | 1244 | 448 | 2378 | 2712 | 325 | 837 | 565 | 875 | 796 | 877 |
| 33 | 1507 | 745 | | | 604 | 1088 | 614 | 1160 | 1185 | 1298 |
| 35 | 2304 | 1310 | | | 1016 | 1569 | 1183 | 1468 | 1856 | 1470 |
| 39 | | | | | 1435 | 1684 | 1524 | 1738 | 1906 | 2772 |
| 43 | | | | | 1724 | 2377 | 2202 | 2721 | | |
| 47 | | | | | | | | | | |
| 50 | | | | | | | | | | |
| Treatment with 1e7 matching UT cells | | | | | | | | | | |
| 7 | 73 | 74 | 74 | 74 | 75 | 76 | 77 | 77 | 79 | |
| 14 | 83 | 72 | 76 | 131 | 83 | 63 | 108 | 205 | 307 | |
| 19 | 129 | 108 | 91 | 411 | 117 | 69 | 99 | 397 | 499 | |
| 21 | 295 | 183 | 118 | 717 | 186 | 108 | 127 | 598 | 677 | |
| 25 | 599 | 519 | 548 | 969 | 405 | 219 | 318 | 1194 | 1310 | |
| 30 | 1081 | 1027 | 671 | 1932 | 598 | 387 | 596 | 1309 | 1719 | |
| 33 | 1476 | 1349 | 926 | | 818 | 624 | 819 | 1621 | 2282 | |
| 35 | 1806 | 1913 | 1186 | | 1105 | 1028 | 1407 | 2016 | | |
| 39 | | 1963 | 1783 | | 1549 | 1430 | 1704 | | | |
| 43 | | | | | | | | | | |
| 47 | | | | | | | | | | |
| 50 | | | | | | | | | | |
| Treatment with 1e7 mAb1-1-DNR CAR T cells | | | | | | | | | | |
| 7 | 80 | 82 | 83 | 83 | 83 | 85 | 88 | 90 | 94 | |
| 14 | 154 | 175 | 203 | 130 | 127 | 398 | 189 | 120 | 144 | |
| 19 | 300 | 262 | 225 | 275 | 137 | 573 | 426 | 141 | 403 | |
| 21 | 350 | 270 | 267 | 377 | 196 | 660 | 432 | 164 | 449 | |
| 25 | 198 | 281 | 180 | 211 | 137 | 609 | 286 | 144 | 230 | |
| 30 | 63 | 176 | 63 | 108 | 108 | 278 | 147 | 75 | 113 | |
| 33 | 36 | 109 | 0 | 63 | 36 | 174 | 146 | 51 | 75 | |
| 35 | 32 | 0 | 0 | 0 | 18 | 137 | 282 | 63 | 63 | |
| 39 | 0 | 115 | 0 | 63 | 137 | 126 | 473 | 108 | 108 | |
| 43 | 0 | 211 | 0 | 108 | 324 | 207 | 824 | 139 | 137 | |
| 47 | 0 | 172 | 0 | 119 | 458 | 219 | 1195 | 173 | 213 | |
| 50 | 0 | 108 | 0 | 224 | 832 | 460 | 1367 | 200 | 321 | |

Example 12

Epitope Mapping for mAb1-1

The epitope for mAb1-1 was determined by high-mass matrix-assisted laser desorption/ionization (MALDI) mass spectrometric (MS) analyses. Briefly, recombinant, human GPC3 (rhGPC3) and a single chain variable fragment fused to a murine IgG2A fragment crystallizable domain (scFv-Fc) were analyzed individually by high-mass MALDI spectrometry using an Autoflex II MALDI Time-of-flight (ToF) ToF mass spectrometer (Bruker) with a specialized detector designed to detect large molecular complexes with high sensitivity. Samples were diluted and mixed 1:1 with sinapinic acid matrix (10 mg/mL) in acetonitrile:water (1:1, v/v), TFA 0.1% (K200 MALDI kit) and spotted on a MALDI plate (SCOUT 384). After room temperature crystallization, the sample was introduced in the spectrometer analyzed.

RhGPC3 and mAb1-1 scFv were mixed with a large molar excess of the scFv to GPC3 and then cross-linked with a mixture of chemical cross-linking agents. The samples were incubated for 3 hours with the crosslinking reagent. The cross-linked samples were prepared as above and characterized by high-mass MALDI MS.

Next, rhGPC3 was digested using a set of proteases (i.e. trypsin, chymotrypsin, Asp-N, elastase and thermolysin) and analyzed by nLC-LTQ-Orbitrap MS/MS analysis. The resulting peptides were analyzed. Finally, the rhGPC3-scFv-Fc complex was subjected to multi-enzymatic cleavage by the same set of proteases and analyzed using high-resolution liquid chromatography mass spectrometry (nLC-LTQ-Orbitrap MS). Nine cross-linked peptides were identified between rhGPC3 and the mAb1-1 scFv-Fc, which indicated that mAb1-1 binds to an epitope on rhGPC3, including the amino acids Thr55, Lys68, Ser74, Arg75, Lys80, Thr84, Arg258, and Ser263, where the amino acid positions are numbered as in the Uniprot database for entry Q8IYG2 (Q8IYG2_HUMAN) (UniProt Consortium, 2021).

Example 13

Measurement of mAb1-1 GPC3 Affinity

A kinetics constant for mAb1-1 scFv mFec binding to its target, GPC3, was determined using a Sartorius Octet Red96 with AMC biosensors. mAb1-1 scFv-Fc was diluted to 2 ug/mL and captured onto 7 AMC biosensor tips under agitation. One biosensor was left blank as a reference. Two lots of recombinant human GPC3(Q25-H559)-6×His (rhGPC3) at 464.3, 154.8, 51.59, 17.2, 5.73, 1.911 and 0 nM were used as analytes. The association phase was measured for 90 sec and the dissociation was measured for 120 sec. All measurements were corrected for baseline drift by subtracting a control sensor exposed to running buffer only. The data were analyzed using a 1:1 interaction model with global fitting for each analyte lot separately, using Octet analysis software.

For the YP7 scFv mFec assay, YP7 scFv mFc was captured onto a single AMC biosensor tip and binding to rhGPC3 was assessed at a single 500 nM concentration. The association phase was measured for 90 sec and the dissociation was measured for 120 sec. The data for YP7 was analyzed using a 1:1 interaction model, using individual fitting for the single concentration.

The KD values of mAb1-1 scFv-Fc to lots 1 and 2 of rhGPC3 were determined to be 32.7 and 35.2 nM, respectively. While these values show good reproducibility, the fitting indicated that there may be some complex binding in the interaction measured. From a single concentration of analyte the KD value of YP7 to rhGPC3 was 8.73 nM.

TABLE 23

| scFv-Fc | rhGPC3 | $K_D$ (nM) | $k_{on}$ (1/Ms) | $k_{off}$ (1/s) |
|---|---|---|---|---|
| mAb1-1 | lot 1 | 32.7 | 2.18 E+05 | 7.12 E−03 |
|  | lot 2 | 35.2 | 2.23 E+05 | 7.85 E−03 |
| YP7 | lot 2 | 8.73 | 7.73 E+04 | 6.75 E−04 |

Example 14

Binding of mAb1-1 and YP7 to Off-Target Proteins Expressed on Plasma Membrane mAb1-1 and YP7 scFv-Fcs were screened for binding to a library of plasma membrane proteins individually expressed HEK293 cells. HEK293 cells were reverse transfected in duplicate on microarray slides spotted with expression vectors encoding ZsGreen followed by one of 5484 human plasma membrane proteins or cell surface-tethered secreted proteins. Additional slides were coarrayed with vectors encoding 371 heterodimers. As a positive control to ensure that the minimal level of transfection was achieved, each slide included cells reverse transfected with hEGFR-IRES-ZsGreen1 in quadruplicate. Microarrays were fixed and stained with the scFvs and anti-EGFR and binding was detected with a fluorescent secondary antibody. Primary hits identified in the initial screen were confirmed in a secondary screen alongside additional controls; Vectors encoding the primary hits were re-arrayed and expressed in HEK293 cells on new slides and screening was performed on fixed and unfixed cells. Medium-strong binding to GPC3 was detected for both targets. Off-target weak binding of YP7 to CSPG5 (isoforms 1 and 2) was detected and confirmed. Off-target weak binding of mAb1-1 to CDH1 was detected and confirmed in the secondary screen and by flowcytometry analysis of transfected HEK293 cells.

TABLE 24

| | | Primary screen (fixed cells) | | Confirmation screen (fixed cells) | | Confirmation screen |
|---|---|---|---|---|---|---|
| Sample | Gene ID | Rep 1 | Rep 2 | Rep 1 | Rep 2 | (live cells) |
| mAb1-1 (2 ug/ml) | GPC3 | Strong | Strong | Strong | Strong | Strong |
|  | CDH1 | V. Weak | V. weak | Weak | Weak | Weak |
| YP7 (10 ug/ml) | GPC3 | Strong | Med/Strong | Med/Strong | Med/Strong | N/A |
|  | CSPG5 (isoform 1) | Weak | Weak | Weak | Weak | N/A |
|  | CSPG5 (isoform 2) | Weak | Weak/Med | Weak | Weak/Med | N/A |

Example 15

Cross Reactivity of mAb1-1 with Normal Human Tissues

Methods were developed to detect specific staining of GPC3 expressing tissues with mAb1-1 scFv-Fc (test article) using cryosectioned human placenta, Huh7 and Hep3B cells as positive controls and SK-HEP1 cells as a negative control. Binding of mAb1-1 to a panel of normal human tissues was then assessed on cryosections from at least 3 donors at two concentrations. Negative controls included mouse monoclonal IgG2a of different specificity (control article) as well as a condition without staining reagent (assay control). As a positive control, tissues were stained with a polyclonal rabbit antibody that binds to $\beta_2$-microglobulin (tissue validation). Table 25 summarizes the results. mAb1-1 does not bind to cell membranes in normal healthy tissues except for basal mucosal epithelium cells in the stomach where GPC3 expression has been reported.

TABLE 25

| Tissue | Source | Run | Test Article (mAb1-1) | | Control Article (MsIgG2a) | | Assay Control | Tissue Validation (Tissue Staining) Control | Tissue Comments/ Nonspecific Findings |
|---|---|---|---|---|---|---|---|---|---|
| | | | 2 µg/mL | 0.5 µg/mL | 2 µg/mL | 0.5 µg/mL | | | |
| Positive Control Material | | | | | | | | | |
| Cryosections of Tep3B cells | CM1543-1 | 1, 2, 4 | 1-3+ (freq) | 1-3+ (freq) | Neg | Neg | Neg | NS | Weak to strong membrane and cytoplasmic staining of Frequent positive control Hep3B cells with both concentrations of GS-1138451. No staining of positive control cells with either concentration of MsIgG2a or in the assay control slides. |
| Negative Control Material | | | | | | | | | |
| Cryosections of SK-HEP-1 cells | CM1545-1 | 1, 2, 4 | Neg | Neg | Neg | Neg | Neg | NS | No staining of negative control SK-HEP-1 cells with either concentration of GS-1138451 or MsIgG2a or in the assay control slides. |
| Ancillary Control Material | | | | | | | | | |
| Cryosections of human placenta (trophoblasts) | HT2652-1 | 1, 2, 4 | 1-3+ (occas) | 1-2+ (rare to occas) | Neg | Neg | Neg | NS | Weak to strong membrane and cytoplasmic staining of occasional trophoblasts with 2 µg/mL GS-1138451. Staining reduced to weak to moderate and rare to occasional with 0.5 µg/mL GS-1138451. No staining of any human placenta tissue elements with either concentration of MsIgG2a or in the assay control slides. |
| Cryosections of Huh-7 cells | CM1544-1 | 1, 2, 4 | 1-3+ (freq) | 1-3+ (occas to freq) | Neg | Neg | Neg | NS | Weak to strong membrane and cytoplasmic staining of frequent Huh-7 cells with 2 µg/mL GS-1138451. Staining frequency reduced to occasional to frequent with 0.5 µg/mL GS-1138451. No staining of Huh-7 cells with either concentration of MsIgG2a or in the assay control slides. General Comments: All tissue specimens judged adequate for interpretation unless otherwise specified. Background staining due to incompletely quenched endogenous myeloperoxidase or |

TABLE 25-continued

| Tissue | Source | Run | Test Article (mAb1-1) | | Control Article (MsIgG2a) | | Assay Control | Tissue Validation (Tissue Staining) Control | Tissue Comments/ Nonspecific Findings |
|---|---|---|---|---|---|---|---|---|---|
| | | | 2 μg/mL | 0.5 μg/mL | 2 μg/mL | 0.5 μg/mL | | | |
| | | | | | | | | | endogenous/exogenous pigments described for individual tissues. Slides were numbered according to the following scheme: Slide 1 mAb1-1, 2 μg/mL), Slide 2 (mAb1-1, 0.5 μg/mL), Slide 3 (MsIgG2a, 2 μg/mL), Slide 4 (MsIgG2a, 0.5 μg/mL), Slide 5 (Assay Control [omit primary antibody]), Slide 6 (Anti-β2-microglobulin [tissue staining control]). |
| Adrenal | HT 2342-2 | 1, 3, 4 | Neg | Neg | Neg | Neg | Neg | Pos | Tissue missing in slide 3 in run 1. Staining repeated in run 4 and interpretation based on evaluation of slides stained in run 4. |
| Adrenal | HT 2924-1 | 1, 3 | Neg | Neg | Neg | Neg | Neg | Pos | Staining of occasional nuclei in slides 1 and 2; judged of uncertain specificity. |
| Adrenal | HT 2478-1 | 1, 3, 4 | Neg | Neg | Neg | Neg | Neg | Pos | Tissue missing in slide 3 in run 1. Staining repeated in run 4 and interpretation based on evaluation of slides stained in run 4. |
| Bladder (urinary) | HT 1316-3 | 1, 3 | Neg | Neg | Neg | Neg | Neg | Pos | No tissue comments. |
| Bladder (urinary) | HT 1328-4 | 1, 3 | NE | NE | NE | NE | NE | NE | Mucosa not present in sections. Tissue recorded as not evaluated (NE). Replaced with HT 3128-1 in run 4. |
| Bladder (urinary) | HT 3128-1 | 4, 5 | Neg | Neg | Neg | Neg | Neg | Pos | Replacement for HT 1328-4. Scant mucosa present. Staining of occasional nuclei in slides 1 and 2; judged of uncertain specificity. |
| Bladder (urinary) | HT 1244-13 | 1, 3 | Neg | Neg | Neg | Neg | Neg | Pos | No tissue comments. |
| Blood Cells | HT 3257 | 1, 3 | Neg | Neg | Neg | Neg | Neg | Pos | Residual endogenous peroxidase (granulocytes). |
| Blood Cells | HT 3014 | 1, 3 | Neg | Neg | Neg | Neg | Neg | Pos | Residual endogenous peroxidase (granulocytes). Sparse cellularity in slide 4. |
| Blood Cells | HT 3015 | 1, 3 | Neg | Neg | Neg | Neg | Neg | Pos | Residual endogenous peroxidase (granulocytes). |
| Blood Vessels (endothelium) Table 1 | All tissues | | Detailed Under Individual Tissues | | | | | | |
| Bone Marrow | HT 2173-2 | 1, 3 | Neg | Neg | Neg | Neg | Neg | Pos | Staining of rare to occasional nuclei in slides 1 and 2; judged of uncertain specificity. |

TABLE 25-continued

| Tissue | Source | Run | Test Article (mAb1-1) 2 µg/mL | Test Article (mAb1-1) 0.5 µg/mL | Control Article (MsIgG2a) 2 µg/mL | Control Article (MsIgG2a) 0.5 µg/mL | Assay Control | Tissue Validation (Tissue Staining) Control | Tissue Comments/ Nonspecific Findings |
|---|---|---|---|---|---|---|---|---|---|
| Bone Marrow | HT 2194-2 | 1, 3, 4 | Neg | Neg | Neg | Neg | Neg | Pos | No staining in slide 1 in run 1. Staining repeated in run 4 and interpretation based on evaluation of slides stained in run 4. |
| Bone Marrow | HT 2207-1 | 1, 3 | Neg | Neg | Neg | Neg | Neg | Pos | Staining of rare to occasional nuclei in slides 1 and 2; judged of uncertain specificity. |
| Cerebellum | HT 3065-1 | 1, 3 | Neg | Neg | Neg | Neg | Neg | Pos | Staining of rare nuclei in slides 1 and 2; judged of uncertain specificity. |
| Cerebellum | HT 2277-6 | 1, 3 | Neg | Neg | Neg | Neg | Neg | Pos | Staining of rare nuclei in slides 1 and 2; judged of uncertain specificity. |
| Cerebellum | HT 2117-1 | 1, 3 | Neg | Neg | Neg | Neg | Neg | Pos | No tissue comments. |
| Cerebral cortex | HT 614-12 | 1, 3 | Neg | Neg | Neg | Neg | Neg | Pos | Staining of occasional to frequent nuclei in slide 1 and rare nuclei in slide 2. Nuclear staining sometimes included the nuclear membrane. |
| Cerebral cortex | HT 3143-1 | 1,3 | Neg | Neg | Neg | Neg | Neg | Pos | Staining of rare nuclei in slides 1 and 2; judged of uncertain specificity. |
| Cerebral cortex | HT 2297-1 | 1, 3 | Neg | Neg | Neg | Neg | Neg | Pos | Staining of rare nuclei in slide 1; judged of uncertain specificity. |
| Cervix | HT 2970-1 | 1, 3 | Neg | Neg | Neg | Neg | Neg | Pos | External ostium. |
| Cervix | HT 2974-1 | 1, 3 | Neg | Neg | Neg | Neg | Neg | Pos | Internal ostium and endocervical glands. Nonspecific staining of mucus in multiple slides; did not preclude interpretation. |
| Cervix | HT 2910-1 | 1, 3 | Neg | Neg | Neg | Neg | Neg | Pos | Internal ostium and endocervical glands. |
| Esophagus | HT 2110-1 | 1, 3 | Neg | Neg | Neg | Neg | Neg | Pos | Nonspecific staining of mucus in multiple slides; did not preclude interpretation. Staining of rare nuclei in slides 1 and 2; judged of uncertain specificity. |
| Esophagus | HT 2277-7 | 1, 3 | Neg | Neg | Neg | Neg | Neg | Pos | No tissue comments. |
| Esophagus | HT 2580-1 | 1, 3 | Neg | Neg | Neg | Neg | Neg | Pos | No tissue comments. |
| Eye | HT 3048-1 | 1, 3 | Neg | Neg | Neg | Neg | Neg | Pos | Retina, choroid, sclera. Endogenous melanin pigment. |
| Eye | HT 2383-4 | 1, 3 | Neg | Neg | Neg | Neg | Neg | Pos | Retina, choroid, sclera. Endogenous melanin pigment. |
| Eye | HT 3041-1 | 1, 3 | Neg | Neg | Neg | Neg | Neg | Pos | Retina, choroid, sclera, cornea, conjunctiva. Endogenous melanin pigment. |
| Fallopian Tube (oviduct) | HT 2974-1 | 1, 3 | Neg | Neg | Neg | Neg | Neg | Pos | Staining of occasional to frequent nuclei in mucosa and rare nuclei in stromal cells in slides 1 and 2; judged of uncertain specificity. |
| Fallopian Tube (oviduct) | HT 2573-1 | 1, 3 | M | M | M | M | M | M | No Fallopian tube present in sections. Tissue recorded as missing (M). Replaced with HT 2970-1 in run 4. |
| Fallopian Tube (oviduct) | HT 2970-1 | 4, 5 | Neg | Neg | Neg | Neg | Neg | Pos | Replacement for HT 2573-1. Staining of occasional to frequent nuclei in mucosa and |

TABLE 25-continued

| Tissue | Source | Run | Test Article (mAb1-1) 2 µg/mL | 0.5 µg/mL | Control Article (MsIgG2a) 2 µg/mL | 0.5 µg/mL | Assay Control | Tissue Validation (Tissue Staining) Control | Tissue Comments/ Nonspecific Findings |
|---|---|---|---|---|---|---|---|---|---|
| Fallopian Tube (oviduct) | HT 1953-1 | 1, 3 | M | M | M | M | M | M | rare nuclei in stromal cells in slides 1 and 2; judged of uncertain specificity. No Fallopian tube present in sections. Tissue recorded as missing (M). Replaced with HT 2941-1 in run 4. |
| Fallopian Tube (oviduct) | HT 2941-1 | 4, 5 | Neg | Neg | Neg | Neg | Neg | Pos | Replacement for HT 1953-1. Staining of occasional to frequent nuclei in mucosa and rare nuclei in stromal cells in slides 1 and 2; judged of uncertain specificity. |
| Heart | HT 2791-1 | 1, 3 | Neg | Neg | Neg | Neg | Neg | Pos | Staining of rare nuclei in slides 1 and 2; judged of uncertain specificity. |
| Heart | HT 1270-1 | 1, 3 | Neg | Neg | Neg | Neg | Neg | Pos | No tissue comments. |
| Heart | HT 2789-2 | 1, 3 | Neg | Neg | Neg | Neg | Neg | Pos | Staining of rare nuclei in slide 1; judged of uncertain specificity. |
| Kidney (glomerulus, tubule) | HT 2276-12 | 1, 3 | Neg | Neg | Neg | Neg | Neg | Pos | Nonspecific staining of tubular lumen contents in multiple slides; did not preclude interpretation. |
| Kidney (glomerulus, tubule) | HT 1188-6 | 1, 3 | Neg | Neg | Neg | Neg | Neg | Pos | No tissue comments. |
| Kidney (glomerulus, tubule) | HT 2114-1 | 1, 3 | Neg | Neg | Neg | Neg | Neg | Pos | Staining of rare nuclei in slides 1 and 2; judged of uncertain specificity. |
| Large Intestine (colon) | HT 2169-1 | 1, 3 | Neg | Neg | Neg | Neg | Neg | Pos | Nonspecific staining of mucus in multiple slides; did not preclude interpretation. Residual endogenous peroxidase (rare resident leukocytes). |
| Large Intestine (colon) | HT 2051-1 | 1, 3 | Neg | Neg | Neg | Neg | Neg | Pos | Nonspecific staining of mucus in multiple slides; did not preclude interpretation. Residual endogenous peroxidase (rare resident leukocytes). |
| Large Intestine (colon) | HT 2149-1 | 1, 3 | NE | NE | NE | NE | NE | NE | Mucosa not adequately represented in sections. Tissue recorded as not evaluated (NE). Replaced with HT 2170-1 in run 4. |
| Large Intestine (colon) | HT 2170-1 | 4, 5 | Neg | Neg | Neg | Neg | Neg | Pos | Replacement for HT 2149-1. Nonspecific staining of mucus in multiple slides; did not preclude interpretation. Residual endogenous peroxidase (rare resident leukocytes). |

TABLE 25-continued

| Tissue | Source | Run | Test Article (mAb1-1) | | Control Article (MsIgG2a) | | Assay Control | Tissue Validation (Tissue Staining) Control | Tissue Comments/ Nonspecific Findings |
| --- | --- | --- | --- | --- | --- | --- | --- | --- | --- |
| | | | 2 µg/mL | 0.5 µg/mL | 2 µg/mL | 0.5 µg/mL | | | |
| Liver | HT 1243-9 | 1, 3 | Neg | Neg | Neg | Neg | Neg | Pos | Endogenous bile/bilirubin pigment. |
| Liver | HT 3057-1 | 1, 3 | Neg | Neg | Neg | Neg | Neg | Pos | Endogenous bile/bilirubin pigment. Residual endogenous peroxidase (rare resident leukocytes). Staining of occasional nuclei in slides 1 and 2; judged of uncertain specificity. |
| Liver | HT 3065-1 | 1, 3 | Neg | Neg | Neg | Neg | Neg | Pos | Endogenous bile/bilirubin pigment. Staining of rare nuclei in slides 1 and 2; judged of uncertain specificity. |
| Lymph Node | HT 2182-1 | 1, 3 | Neg | Neg | Neg | Neg | Neg | Pos | Residual endogenous peroxidase (rare resident leukocytes). |
| Lymph Node | HT 2165-1 | 1, 3 | Neg | Neg | Neg | Neg | Neg | Pos | Small sample; judged adequate. Exogenous carbon pigment. |
| Lymph Node | HT 2252-1 | 1, 3 | M | M | M | M | M | M | No lymph node present in sections. Tissue recorded as missing (M). Replaced with HT 2406-1 in run 4. |
| Lymph Node | HT 2406-1 | 4, 5 | Neg | Neg | Neg | Neg | Neg | Pos | Replacement for HT 2252-1. Residual endogenous peroxidase (rare resident leukocytes). Exogenous carbon pigment. Staining of occasional nuclei in slides 1 and 2; judged of uncertain specificity. |
| Lung | HT 3056-1 | 1, 3 | | | | | | Pos | Exogenous carbon pigment. |
| Epithelial cells, bronchiolar (cytoplasm, cytoplasmic granules) | | | 1-2+ (rare) | 1+ (very rare) | Neg | Neg | Neg | | |
| Other elements | | | Neg | Neg | Neg | Neg | Neg | | |
| Lung | HT 3131-1 | 1, 3 | Neg | Neg | Neg | Neg | Neg | Pos | Exogenous carbon pigment. Staining of occasional nuclei in slide 1; judged of uncertain specificity. |
| Lung | HT 3130-1 | 1, 3 | Neg | Neg | Neg | Neg | Neg | Pos | Exogenous carbon pigment. Staining of occasional to frequent nuclei in slide 1; judged of uncertain specificity. |
| Mammary Gland (Breast) | HT 2345-2 | 1, 3 | Neg | Neg | Neg | Neg | Neg | Pos | Minor nonspecific staining of extracellular material in ductal glandular lumens in multiple slides; did not preclude interpretation. |
| Mammary Gland (Breast) | HT 654-6 | 1, 3 | Neg | Neg | Neg | Neg | Neg | Pos | Minor nonspecific staining of extracellular material in ductal glandular lumens in multiple slides; did not preclude interpretation. |
| Mammary Gland (Breast) | HT 2349-4 | 1, 3 | Neg | Neg | Neg | Neg | Neg | Pos | Minor nonspecific staining of extracellular material in ductal glandular lumens in multiple slides; did not preclude interpretation. |

TABLE 25-continued

| Tissue | Source | Run | Test Article (mAb1-1) 2 µg/mL | 0.5 µg/mL | Control Article (MsIgG2a) 2 µg/mL | 0.5 µg/mL | Assay Control | Tissue Validation (Tissue Staining) Control | Tissue Comments/ Nonspecific Findings |
|---|---|---|---|---|---|---|---|---|---|
| Muscle, Striated (Skeletal) | HT 1909-11 | 1, 3 | Neg | Neg | Neg | Neg | Neg | Pos | No tissue comments. |
| Muscle, Striated (Skeletal) | HT1974-1 | 1, 3 | Neg | Neg | Neg | Neg | Neg | Pos | No tissue comments. |
| Muscle, Striated (Skeletal) | HT 1975-2 | 1, 3 | Neg | Neg | Neg | Neg | Neg | Pos | Sections also contained peripheral nerve. |
| Nerve, Peripheral | HT 3159-1 | 1, 3 | Neg | Neg | Neg | Neg | Neg | Pos | No tissue comments. |
| Nerve, Peripheral | HT 3147-1 | 1, 3 | Neg | Neg | Neg | Neg | Neg | Pos | No tissue comments. |
| Nerve, Peripheral | HT 1179-2 | 1, 3 | Neg | Neg | Neg | Neg | Neg | Pos | Small sample; judged adequate. |
| Ovary | HT 2431-1 | 2, 3 | Neg | Neg | Neg | Neg | Neg | Pos | Small sample; judged adequate. |
| Ovary | HT 2435-1 | 2, 3 | Neg | Neg | Neg | Neg | Neg | Pos | No tissue comments. |
| Ovary | HT 2443-1 | 2, 3 | Neg | Neg | Neg | Neg | Neg | Pos | No tissue comments. |
| Pancreas | HT 2248-2 | 2, 3 | Neg | Neg | Neg | Neg | Neg | Pos | Staining of occasional to frequent nuclei in slides 1 and 2; judged of uncertain specificity |
| Pancreas | HT 2049-2 | 2, 3 | Neg | Neg | Neg | Neg | Neg | Pos | Staining of occasional nuclei in slides 1 and 2; judged of uncertain specificity. |
| Pancreas | HT 2039-2 | 2, 3 | Neg | Neg | Neg | Neg | Neg | Pos | Nonspecific staining of cytoplasm of occasional acinar epithelial cells in multiple slides; hampered but did not preclude interpretation. Staining of occasional nuclei in slide 1; judged of uncertain specificity. |
| Placenta | HT 2919-1 | 2, 3 | | | | | | Pos | No tissue comments. |
| Trophoblasts (membrane, cytoplasm) | | | 1-3+ (occas) | 1-3+ (rare) | Neg | Neg | Neg | | |
| Other elements | | | Neg | Neg | Neg | Neg | Neg | | |
| Placenta | HT 2392-1 | 2, 3 | | | | | | Pos | No tissue comments. |
| Trophoblasts (membrane, cytoplasm) | | | 1-3+ (freq) | 1-3+ (occas to freq) | Neg | Neg | Neg | | |
| Other elements | | | Neg | Neg | Neg | Neg | Neg | | |
| Placenta | HT 1702-1 | 2, 3 | | | | | | Pos | No tissue comments. |
| Trophoblasts (membrane, cytoplasm) | | | 1-3+ (occas) | 1-3+ (rare to occas) | Neg | Neg | Neg | | |
| Other elements | | | Neg | Neg | Neg | Neg | Neg | | |
| Prostate | HT 562-7 | 2, 3 | Neg | Neg | Neg | Neg | Neg | Pos | Staining of occasional nuclei in slides 1 and 2; judged of uncertain specificity. |
| Prostate | HT 1730-3 | 2, 3 | Neg | Neg | Neg | Neg | Neg | Pos | No tissue comments. |
| Prostate | HT 1926-1 | 2, 3 | Neg | Neg | Neg | Neg | Neg | Pos | No tissue comments. |
| Pituitary | HT 3112-1 | 2, 3 | Neg | Neg | Neg | Neg | Neg | Pos | Adenohypophysis. Staining of occasional nuclei in slides 1 and 2; judged of uncertain specificity. |
| Pituitary | HT 3114-1 | 2, 3 | Neg | Neg | Neg | Neg | Neg | Pos | Adenohypophysis and neurohypophysis. Staining of occasional nuclei in slides 1 and 2; judged of uncertain specificity. |
| Pituitary | HT 3199-1 | 2, 3 | | | | | | Pos | Adenohypophysis and neurohypophysis. |
| Epithelial cells, adenohypophysis (cytoplasm) | | | 1-3+ (rare to occas) | 1-3+ (rare to occas) | Neg | Neg | Neg | | |
| Other elements | | | Neg | Neg | Neg | Neg | Neg | | |

TABLE 25-continued

| Tissue | Source | Run | Test Article (mAb1-1) 2 µg/mL | Test Article (mAb1-1) 0.5 µg/mL | Control Article (MsIgG2a) 2 µg/mL | Control Article (MsIgG2a) 0.5 µg/mL | Assay Control | Tissue Validation (Tissue Staining) Control | Tissue Comments/ Nonspecific Findings |
|---|---|---|---|---|---|---|---|---|---|
| Parathyroid | HT 3012-1 | 2, 3 | Neg | Neg | Neg | Neg | Neg | Pos | No tissue comments. |
| Parathyroid | HT 3153-1 | 2, 3 | Neg | Neg | Neg | Neg | Neg | Pos | No tissue comments. |
| Parathyroid | HT 3152-1 | 2, 3 | Neg | Neg | Neg | Neg | Neg | Pos | No tissue comments. |
| Salivary Gland | HT 3061-1 | 2, 3 | Neg | Neg | Neg | Neg | Neg | Pos | Exogenous pigment from tissue marking ink. |
| Salivary Gland | HT 3057-1 | 2, 3 | Neg | Neg | Neg | Neg | Neg | Pos | No tissue comments. |
| Salivary Gland | HT 1226-6 | 2, 3 | M | M | M | M | M | M | No salivary gland present in sections. Tissue recorded as missing (M). Replaced with HT 2297-1 in run 4. |
| Salivary Gland | HT 2297-1 | 4, 5 | Neg | Neg | Neg | Neg | Neg | Pos | Replacement for HT 1226-6. Staining of occasional nuclei in slides 1 and 2; judged of uncertain specificity. |
| Skin | HT 2842-3 | 2, 3 | Neg | Neg | Neg | Neg | Neg | Pos | No tissue comments. |
| Skin | HT 2930-1 | 2, 3 | Neg | Neg | Neg | Neg | Neg | Pos | Endogenous melanin pigment. |
| Skin | HT 2936-1 | 2, 3 | Neg | Neg | Neg | Neg | Neg | Pos | Endogenous melanin pigment. |
| Small intestine | HT 2965-1 | 2, 3 | Neg | Neg | Neg | Neg | Neg | Pos | Nonspecific staining of mucus in multiple slides; did not preclude interpretation. Residual endogenous peroxidase (rare resident leukocytes). |
| Small intestine | HT 2662-1 | 2, 3 | NE | NE | NE | NE | NE | NE | Mucosa not present in sections. Tissue recorded as not evaluated (NE). Replaced with HT 2859-1 in run 4. |
| Small intestine | HT 2859-1 | 4, 5 | Neg | Neg | Neg | Neg | Neg | Pos | Replacement for HT 2662-1. Nonspecific staining of mucus in multiple slides; did not preclude interpretation. Residual endogenous peroxidase (rare resident leukocytes). Staining of occasional nuclei in slides 1 and 2; judged of uncertain specificity. |
| Small intestine | HT 2697-1 | 2, 3 | Neg | Neg | Neg | Neg | Neg | Pos | Nonspecific staining of mucus in multiple slides; did not preclude interpretation. Residual endogenous peroxidase (rare resident leukocytes). Staining of occasional nuclei in slides 1 and 2; judged of uncertain specificity. |
| Spleen | HT 1910-11 | 2, 3 | Neg | Neg | Neg | Neg | Neg | Pos | Residual endogenous peroxidase (rare resident leukocytes). Staining of occasional to frequent nuclei in slide 1 and occasional nuclei in slide 2; judged of uncertain specificity. |
| Spleen | HT 2342-1 | 2, 3 | Neg | Neg | Neg | Neg | Neg | Pos | Residual endogenous peroxidase (rare resident leukocytes). |
| Spleen | HT 2336-1 | 2, 3 | Neg | Neg | Neg | Neg | Neg | Pos | Residual endogenous peroxidase (rare resident leukocytes). Staining of rare to occasional nuclei in slides 1 and 2; judged of uncertain specificity. |

TABLE 25-continued

| Tissue | Source | Run | Test Article (mAb1-1) 2 µg/mL | Test Article (mAb1-1) 0.5 µg/mL | Control Article (MsIgG2a) 2 µg/mL | Control Article (MsIgG2a) 0.5 µg/mL | Assay Control | Tissue Validation (Tissue Staining) Control | Tissue Comments/ Nonspecific Findings |
|---|---|---|---|---|---|---|---|---|---|
| Spinal Cord | HT 1047-3 | 2, 3 | Neg | Neg | Neg | Neg | Neg | Pos | Endogenous melanin pigment. Staining of rare to occasional nuclei in slides 1 and 2; judged of uncertain specificity. Nuclear staining sometimes included the nuclear membrane. |
| Spinal Cord | HT 2118-1 | 2, 3 | Neg | Neg | Neg | Neg | Neg | Pos | Staining of occasional to frequent nuclei in slide 1 and rare to occasional nuclei in slide 2; judged of uncertain specificity. Nuclear staining sometimes included the nuclear membrane. |
| Spinal Cord | HT 2884-1 | 2, 3 | Neg | Neg | Neg | Neg | Neg | Pos | Staining of occasional to frequent nuclei in slides 1 and 2; judged of uncertain specificity. Nuclear staining sometimes included the nuclear membrane. |
| Stomach | HT 2939-1 | 2, 3 | | | | | | Pos | Sample consisted of mucosa only. Nonspecific staining of mucus in multiple slides; did not preclude interpretation. |
| Epithelial cells, mucosa (basal membrane, basal cytoplasm) | | | 1-2+ (rare to occas) | 1-2+ (rare) | Neg | Neg | Neg | | |
| Other elements Stomach | HT 3162-1 | 2, 3, 4 | Neg | Neg | Neg | Neg | Neg | Pos | No staining in slide 1 in run 2. Staining repeated in run 4 and interpretation based on evaluation of slides stained in run 4. |
| Epithelial cells, mucosa (basal membrane, basal cytoplasm) | | | 1-2+ (rare to occas) | 1-2+ (rare) | Neg | Neg | Neg | | |
| Other elements Stomach | HT 3018-1 | 2, 3 | Neg | Neg | Neg | Neg | Neg | Pos | Nonspecific staining of mucus in multiple slides; did not preclude interpretation. |
| Epithelial cells, mucosa (basal membrane, basal cytoplasm) | | | 1-2+ (rare to occas) | 1-2+ (rare to occas) | Neg | Neg | Neg | | |
| Other elements Testis | HT 1316-3 | 2, 3 | Neg | Neg | Neg | Neg | Neg | Pos | No tissue comments. |
| Testis | HT 2276-1 | 2, 3 | Neg | Neg | Neg | Neg | Neg | Pos | No tissue comments. |
| Testis | HT 3064-1 | 2, 3 | Neg | Neg | Neg | Neg | Neg | Pos | No tissue comments. |
| Thyroid | HT 682-4A | 2, 3 | Neg | Neg | Neg | Neg | Neg | Pos | No tissue comments. |
| Thyroid | HT 483 | 2, 3 | Neg | Neg | Neg | Neg | Neg | Pos | Staining of rare nuclei in slide 1; judged of uncertain specificity. |
| Thyroid | HT 478 | 2, 3 | Neg | Neg | Neg | Neg | Neg | Pos | Staining of frequent nuclei in slides 1 and 2; judged of uncertain specificity. |
| Thymus | HT 1405-3 | 2, 3 | Neg | Neg | Neg | Neg | Neg | Pos | Minor nonspecific staining of Hassall's corpuscles in multiple slides; did not preclude interpretation. Residual endogenous peroxidase (rare resident leukocytes). |

TABLE 25-continued

| Tissue | Source | Run | Test Article (mAb1-1) 2 µg/mL | Test Article (mAb1-1) 0.5 µg/mL | Control Article (MsIgG2a) 2 µg/mL | Control Article (MsIgG2a) 0.5 µg/mL | Assay Control | Tissue Validation (Tissue Staining) Control | Tissue Comments/ Nonspecific Findings |
|---|---|---|---|---|---|---|---|---|---|
| Thymus | HT 1495-12 | 2, 3 | Neg | Neg | Neg | Neg | Neg | Pos | No tissue comments. |
| Thymus | HT 1404-3 | 2, 3 | Neg | Neg | Neg | Neg | Neg | Pos | Minor nonspecific staining of Hassall's corpuscles in multiple slides; did not preclude interpretation. Residual endogenous peroxidase (rare resident leukocytes). |
| Tonsil | HT 2962-2 | 2, 3 | Neg | Neg | Neg | Neg | Neg | Pos | Residual endogenous peroxidase (rare resident leukocytes). |
| Tonsil | HT 3122-1 | 2, 3 | Neg | Neg | Neg | Neg | Neg | Pos | Residual endogenous peroxidase (rare resident leukocytes). |
| Tonsil | HT 3171-1 | 2, 3 | Neg | Neg | Neg | Neg | Neg | Pos | Endogenous heme pigment. |
| Ureter | HT 2765-1 | 2, 3 | Neg | Neg | Neg | Neg | Neg | Pos | No tissue comments. |
| Ureter | HT 2726-1 | 2, 3 | Neg | Neg | Neg | Neg | Neg | Pos | No tissue comments. |
| Ureter | HT 1763-1 | 2, 3 | Neg | Neg | Neg | Neg | Neg | Pos | Endogenous heme pigment. Staining of rare nuclei in slide 1; judged of uncertain specificity. |
| Uterus (endometrium) | Table 2 HT 3075-1 | 2, 3 | Neg | Neg | Neg | Neg | Neg | Pos | Staining of rare nuclei in slide 1; judged of uncertain specificity. |
| Uterus (endometrium) | HT 2910-1 | 2, 3 | Neg | Neg | Neg | Neg | Neg | Pos | Staining of rare nuclei in slide 1; judged of uncertain specificity. |
| Uterus (endometrium) | HT 3074-1 | 2, 3 | Neg | Neg | Neg | Neg | Neg | Pos | No tissue comments. |

± = equivocal, 1+ = weak, 2+ = moderate, 3+ = strong, 4+ = intense, Neg = Negative, Pos = Positive, M = Missing, NE = Not Evaluated, NS = Not Stained, occas = occasional, freq = frequent.
Frequency modifiers were included to provide the approximate percentage staining of expected numbers of that cell type or tissue element at that location.
The frequency of cells with staining was identified as follows: very rare (<1% of cells of a particular cell type); rare (1-5% of cells of a particular cell type); rare to occasional (>5-25% of cells of a particular cell type); occasional (>25-50% of cells of a particular type); occasional to frequent (>50-75% of cells of a particular cell type); frequent (>75-100% of cells of a particular cell type).

In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. An antibody that binds to human Glypican 3 (GPC3), wherein the antibody comprises a heavy chain variable domain (VH) and a light chain variable domain (VL), wherein the VH comprises a VH complementarity determining region (CDR) 1, a VH CDR2, and a VH CDR3 of the sequence set forth in SEQ ID NO: 3, and the VL comprises a VL CDR1, a VL CDR2, and a VL CDR3 of the sequence set forth in SEQ ID NO: 14.

2. The antibody of claim 1, wherein the antibody is a monospecific antibody, a bispecific antibody, a scFv, a Fab, or a F(ab')$_2$.

3. The antibody of claim 1, wherein the antibody is a scFv.

4. The antibody of claim 2, wherein the VH CDR1, VH CDR2, VH CDR3, VL CDR1, VL CDR2, and the VL CDR3 comprise the sequences set forth, respectively in:
   (i) SEQ ID NOs.: 5, 8, 11, 16, 19, and 22;
   (ii) SEQ ID NOs.: 6, 9, 12, 17, 20, and 23; or
   (iii) SEQ ID NOs.: 7, 10, 13, 18, 21, and 24.

5. The antibody of claim 3, wherein the VH CDR1, VH CDR2, VH CDR3, VL CDR1, VL CDR2, and the VL CDR3 comprise the sequences set forth, respectively in:
   (i) SEQ ID NOs.: 5, 8, 11, 16, 19, and 22;
   (ii) SEQ ID NOs.: 6, 9, 12, 17, 20, and 23; or
   (iii) SEQ ID NOs.: 7, 10, 13, 18, 21, and 24.

6. The antibody of claim 2, wherein:
   (i) the VH comprises an amino acid sequence that is at least 80% identical to the sequence set forth in SEQ ID NO: 3 and the VL comprises an amino acid sequence that is at least 80% identical to the sequence set forth in SEQ ID NO: 14;
   (ii) the VH comprises an amino acid sequence that is at least 80% identical to the sequence set forth in SEQ ID NO: 27 and the VL comprises an amino acid sequence that is at least 80% identical to the sequence set forth in SEQ ID NO: 29;
   (iii) the VH comprises an amino acid sequence that is at least 80% identical to the sequence set forth in SEQ ID NO: 33 and the VL comprises an amino acid sequence that is at least 80% identical to the sequence set forth in SEQ ID NO: 35;
   (iv) the VH comprises an amino acid sequence that is at least 80% identical to the sequence set forth in SEQ ID NO: 39 and the VL comprises an amino acid sequence that is at least 80% identical to the sequence set forth in SEQ ID NO: 41; or
   (v) the VH comprises an amino acid sequence that is at least 80% identical to the sequence set forth in SEQ ID NO: 45 and the VL comprises an amino acid sequence that is at least 80% identical to the sequence set forth in SEQ ID NO: 47.

7. The antibody of claim 3, wherein:
   (i) the VH comprises an amino acid sequence that is at least 80% identical to the sequence set forth in SEQ ID NO: 3 and the VL comprises an amino acid sequence that is at least 80% identical to the sequence set forth in SEQ ID NO: 14;
   (ii) the VH comprises an amino acid sequence that is at least 80% identical to the sequence set forth in SEQ ID NO: 27 and the VL comprises an amino acid sequence that is at least 80% identical to the sequence set forth in SEQ ID NO: 29;
   (iii) the VH comprises an amino acid sequence that is at least 80% identical to the sequence set forth in SEQ ID NO: 33 and the VL comprises an amino acid sequence that is at least 80% identical to the sequence set forth in SEQ ID NO: 35;
   (iv) the VH comprises an amino acid sequence that is at least 80% identical to the sequence set forth in SEQ ID NO: 39 and the VL comprises an amino acid sequence that is at least 80% identical to the sequence set forth in SEQ ID NO: 41; or
   (v) the VH comprises an amino acid sequence that is at least 80% identical to the sequence set forth in SEQ ID NO: 45 and the VL comprises an amino acid sequence that is at least 80% identical to the sequence set forth in SEQ ID NO: 47.

8. The antibody of claim 5, wherein:
   (i) the VH comprises an amino acid sequence that is at least 80% identical to the sequence set forth in SEQ ID NO: 3 and the VL comprises an amino acid sequence that is at least 80% identical to the sequence set forth in SEQ ID NO: 14;

(ii) the VH comprises an amino acid sequence that is at least 80% identical to the sequence set forth in SEQ ID NO: 27 and the VL comprises an amino acid sequence that is at least 80% identical to the sequence set forth in SEQ ID NO: 29;
(iii) the VH comprises an amino acid sequence that is at least 80% identical to the sequence set forth in SEQ ID NO: 33 and the VL comprises an amino acid sequence that is at least 80% identical to the sequence set forth in SEQ ID NO: 35;
(iv) the VH comprises an amino acid sequence that is at least 80% identical to the sequence set forth in SEQ ID NO: 39 and the VL comprises an amino acid sequence that is at least 80% identical to the sequence set forth in SEQ ID NO: 41; or
(v) the VH comprises an amino acid sequence that is at least 80% identical to the sequence set forth in SEQ ID NO: 45 and the VL comprises an amino acid sequence that is at least 80% identical to the sequence set forth in SEQ ID NO: 47.

9. The antibody of claim 2, wherein:
(i) the VH comprises an amino acid sequence that is at least 95% identical to the sequence set forth in SEQ ID NO: 3 and the VL comprises an amino acid sequence that is at least 95% identical to the sequence set forth in SEQ ID NO: 14;
(ii) the VH comprises an amino acid sequence that is at least 95% identical to the sequence set forth in SEQ ID NO: 27 and the VL comprises an amino acid sequence that is at least 95% identical to the sequence set forth in SEQ ID NO: 29;
(iii) the VH comprises an amino acid sequence that is at least 95% identical to the sequence set forth in SEQ ID NO: 33 and the VL comprises an amino acid sequence that is at least 95% identical to the sequence set forth in SEQ ID NO: 35;
(iv) the VH comprises an amino acid sequence that is at least 95% identical to the sequence set forth in SEQ ID NO: 39 and the VL comprises an amino acid sequence that is at least 95% identical to the sequence set forth in SEQ ID NO: 41; or
(v) the VH comprises an amino acid sequence that is at least 95% identical to the sequence set forth in SEQ ID NO: 45 and the VL comprises an amino acid sequence that is at least 95% identical to the sequence set forth in SEQ ID NO: 47.

10. The antibody of claim 3, wherein:
(i) the VH comprises an amino acid sequence that is at least 95% identical to the sequence set forth in SEQ ID NO: 3 and the VL comprises an amino acid sequence that is at least 95% identical to the sequence set forth in SEQ ID NO: 14;
(ii) the VH comprises an amino acid sequence that is at least 95% identical to the sequence set forth in SEQ ID NO: 27 and the VL comprises an amino acid sequence that is at least 95% identical to the sequence set forth in SEQ ID NO: 29;
(iii) the VH comprises an amino acid sequence that is at least 95% identical to the sequence set forth in SEQ ID NO: 33 and the VL comprises an amino acid sequence that is at least 95% identical to the sequence set forth in SEQ ID NO: 35;
(iv) the VH comprises an amino acid sequence that is at least 95% identical to the sequence set forth in SEQ ID NO: 39 and the VL comprises an amino acid sequence that is at least 95% identical to the sequence set forth in SEQ ID NO: 41; or
(v) the VH comprises an amino acid sequence that is at least 95% identical to the sequence set forth in SEQ ID NO: 45 and the VL comprises an amino acid sequence that is at least 95% identical to the sequence set forth in SEQ ID NO: 47.

11. The antibody of claim 5, wherein:
(i) the VH comprises an amino acid sequence that is at least 95% identical to the sequence set forth in SEQ ID NO: 3 and the VL comprises an amino acid sequence that is at least 95% identical to the sequence set forth in SEQ ID NO: 14;
(ii) the VH comprises an amino acid sequence that is at least 95% identical to the sequence set forth in SEQ ID NO: 27 and the VL comprises an amino acid sequence that is at least 95% identical to the sequence set forth in SEQ ID NO: 29;
(iii) the VH comprises an amino acid sequence that is at least 95% identical to the sequence set forth in SEQ ID NO: 33 and the VL comprises an amino acid sequence that is at least 95% identical to the sequence set forth in SEQ ID NO: 35;
(iv) the VH comprises an amino acid sequence that is at least 95% identical to the sequence set forth in SEQ ID NO: 39 and the VL comprises an amino acid sequence that is at least 95% identical to the sequence set forth in SEQ ID NO: 41; or
(v) the VH comprises an amino acid sequence that is at least 95% identical to the sequence set forth in SEQ ID NO: 45 and the VL comprises an amino acid sequence that is at least 95% identical to the sequence set forth in SEQ ID NO: 47.

12. The antibody of claim 2, wherein:
(i) the VH comprises the sequence set forth in SEQ ID NO: 3 and the VL comprises the sequence set forth in SEQ ID NO: 14;
(ii) the VH comprises the sequence set forth in SEQ ID NO: 27 and the VL comprises the sequence set forth in SEQ ID NO: 29;
(iii) the VH comprises the sequence set forth in SEQ ID NO: 33 and the VL comprises the sequence set forth in SEQ ID NO: 35;
(iv) the VH comprises the sequence set forth in SEQ ID NO: 39 and the VL comprises the sequence set forth in SEQ ID NO: 41; or
(v) the VH comprises the sequence set forth in SEQ ID NO: 45 and the VL comprises the sequence set forth in SEQ ID NO:47.

13. The antibody of claim 3, wherein:
(i) the VH comprises the sequence set forth in SEQ ID NO: 3 and the VL comprises the sequence set forth in SEQ ID NO: 14;
(ii) the VH comprises the sequence set forth in SEQ ID NO: 27 and the VL comprises the sequence set forth in SEQ ID NO: 29;
(iii) the VH comprises the sequence set forth in SEQ ID NO: 33 and the VL comprises the sequence set forth in SEQ ID NO: 35;
(iv) the VH comprises the sequence set forth in SEQ ID NO: 39 and the VL comprises the sequence set forth in SEQ ID NO: 41; or
(v) the VH comprises the sequence set forth in SEQ ID NO: 45 and the VL comprises the sequence set forth in SEQ ID NO:47.

14. The antibody of claim 5, wherein:
(i) the VH comprises the sequence set forth in SEQ ID NO: 3 and the VL comprises the sequence set forth in SEQ ID NO: 14;

(ii) the VH comprises the sequence set forth in SEQ ID NO: 27 and the VL comprises the sequence set forth in SEQ ID NO: 29;

(iii) the VH comprises the sequence set forth in SEQ ID NO: 33 and the VL comprises the sequence set forth in SEQ ID NO: 35;

(iv) the VH comprises the sequence set forth in SEQ ID NO: 39 and the VL comprises the sequence set forth in SEQ ID NO: 41; or (v) the VH comprises the sequence set forth in SEQ ID NO: 45 and the VL comprises the sequence set forth in SEQ ID NO:47.

15. The antibody of claim 2, wherein the VH comprises the sequence set forth in SEQ ID NO: 3 and the VL comprises the sequence set forth in SEQ ID NO: 14.

16. The antibody of claim 3, wherein the VH comprises the sequence set forth in SEQ ID NO: 3 and the VL comprises the sequence set forth in SEQ ID NO: 14.

17. The antibody of claim 5, wherein the VH comprises the sequence set forth in SEQ ID NO: 3 and the VL comprises the sequence set forth in SEQ ID NO: 14.

18. The antibody of claim 3, wherein the scFv comprises an amino acid sequence that is at least 85% identical to the sequence set forth in any one of SEQ ID NOs.: 25, 31, 37, 43, or 49.

19. The antibody of claim 3, wherein the scFv comprises an amino acid sequence that is at least 90% identical to the sequence set forth in any one of SEQ ID NOs.: 25, 31, 37, 43, or 49.

20. The antibody of claim 3, wherein the scFv comprises an amino acid sequence that is at least 95% identical to the sequence set forth in any one of SEQ ID NOs.: 25, 31, 37, 43, or 49.

21. The antibody of claim 3, wherein the scFv comprises the amino acid sequence set forth in any one of SEQ ID NOs.: 25, 31, 37, 43, or 49.

22. The antibody of claim 5, wherein the scFv comprises the amino acid sequence set forth in any one of SEQ ID NOs.: 25, 31, 37, 43, or 49.

23. The antibody of claim 3, wherein the scFv comprises an amino acid sequence that is at least 95% identical to the sequence set forth in SEQ ID NO.: 25.

24. The antibody of claim 3, wherein the scFv comprises the amino acid sequence set forth in SEQ ID NO.: 25.

25. The antibody of claim 5, wherein the scFv comprises an amino acid sequence that is at least 95% identical to the sequence set forth in SEQ ID NO.: 25.

26. The antibody of claim 5, wherein the scFv comprises the amino acid sequence set forth in SEQ ID NO.: 25.

27. A nucleic acid or nucleic acids encoding the antibody of claim 2.

28. A nucleic acid encoding the antibody of claim 3.

29. A nucleic acid encoding the antibody of claim 5.

30. A nucleic acid encoding the antibody of claim 26.

31. A vector or vectors comprising the nucleic acid or nucleic acids of claim 27.

32. A vector comprising the nucleic acid of claim 28.

33. A vector comprising the nucleic acid of claim 29.

34. A vector comprising the nucleic acid of claim 30.

35. A host cell comprising the vector or vectors of claim 31.

36. A host cell comprising the vector of claim 32.

37. A host cell comprising the vector of claim 33.

38. A host cell comprising the vector of claim 34.

39. A method of making an scFv that binds to human GPC3, the method comprising culturing the host cell of claim 38 under conditions that lead to the expression of the scFv and isolating the scFv.

40. A chimeric antigen receptor comprising the antibody of claim 3, a transmembrane domain, a costimulatory domain, and a signaling domain.

41. The chimeric antigen receptor of claim 40, wherein the transmembrane domain is from one of 4-1BB/CD137, an alpha chain of a T cell receptor, a beta chain of a T cell receptor, 2B4, CD3 epsilon, CD4, CD5, CD8 alpha, CD9, CD16, CD19, CD22, CD28, CD33, CD37, CD45, CD64, CD80, CD86, CD134, CD137, CD154, NKG2D, or a zeta chain of a T cell receptor, or any combination thereof.

42. The chimeric antigen receptor of claim 40, comprising from N terminal to C-terminal, the antibody, a linker, a hinge domain, the transmembrane domain, the costimulatory domain, and the signaling domain.

43. The chimeric antigen receptor of claim 42, wherein the hinge domain is a CD8a hinge domain, the transmembrane domain is a CD8a transmembrane domain, the costimulatory domain is a 4-1BB costimulatory domain, and the signaling domain is a CD3ζ signaling domain.

44. A chimeric antigen receptor comprising the antibody of claim 5, a transmembrane domain, a costimulatory domain, and a signaling domain.

45. The chimeric antigen receptor of claim 44, wherein the transmembrane domain is from one of 4-1BB/CD137, an alpha chain of a T cell receptor, a beta chain of a T cell receptor, 2B4, CD3 epsilon, CD4, CD5, CD8 alpha, CD9, CD16, CD19, CD22, CD28, CD33, CD37, CD45, CD64, CD80, CD86, CD134, CD137, CD154, NKG2D, or a zeta chain of a T cell receptor, or any combination thereof.

46. The chimeric antigen receptor of claim 44, comprising from N terminal to C-terminal, the antibody, a linker, a hinge domain, the transmembrane domain, the costimulatory domain, and the signaling domain.

47. The chimeric antigen receptor of claim 46, wherein the hinge domain is a CD8α hinge domain, the transmembrane domain is a CD8α transmembrane domain, the costimulatory domain is a 4-1BB costimulatory domain, and the signaling domain is a CD3ζ signaling domain.

48. A chimeric antigen receptor comprising the antibody of claim 26, a transmembrane domain, a costimulatory domain, and a signaling domain.

49. The chimeric antigen receptor of claim 48, wherein the transmembrane domain is from one of 4-1BB/CD137, an alpha chain of a T cell receptor, a beta chain of a T cell receptor, 2B4, CD3 epsilon, CD4, CD5, CD8 alpha, CD9, CD16, CD19, CD22, CD28, CD33, CD37, CD45, CD64, CD80, CD86, CD134, CD137, CD154, NKG2D, or a zeta chain of a T cell receptor, or any combination thereof.

50. The chimeric antigen receptor of claim 48, comprising from N terminal to C-terminal, the antibody, a linker, a hinge domain, the transmembrane domain, the costimulatory domain, and the signaling domain.

51. The chimeric antigen receptor of claim 50, wherein the hinge domain is a CD8α hinge domain, the transmembrane domain is a CD8α transmembrane domain, the costimulatory domain is a 4-1BB costimulatory domain, and the signaling domain is a CD3ζ signaling domain.

52. The chimeric antigen receptor of claim 51, wherein the CD8α hinge domain comprises an amino acid sequence that is at least 90% identical to the sequence of SEQ ID NO: 65, the CD8α transmembrane domain comprises an amino acid sequence that is at least 90% identical to the sequence of SEQ ID NO: 69, the 4-1BB costimulatory domain comprises an amino acid sequence that is at least 90% identical to the sequence of SEQ ID NO: 75, and the CD3ζ signaling domain comprises an amino acid sequence that is at least 90% identical to the sequence of SEQ ID NO: 73.

53. The chimeric antigen receptor of claim 51, wherein the linker is GS (SEQ ID NO:51), the CD8a hinge domain comprises the sequence of SEQ ID NO:65, the CD8a transmembrane domain comprises the sequence of SEQ ID NO: 69, the 4-IBB costimulatory domain comprises the sequence of SEQ ID NO: 75, and the CD37 signaling domain comprises the sequence of SEQ ID NO: 73.

54. The chimeric antigen receptor of claim 48, comprising an amino acid sequence that is at least 85% identical to a sequence set forth in any one of SEQ ID NOs.: 121, 84, 86, 88, or 90.

55. The chimeric antigen receptor of claim 48, comprising the amino acid sequence of a sequence set forth in any one of SEQ ID NOs.: 121, 84, 86, 88, or 90.

56. The chimeric antigen receptor of claim 48, comprising an amino acid sequence that is at least 90% identical to a sequence set forth in SEQ ID NO.: 86.

57. The chimeric antigen receptor of claim 48, comprising the amino acid sequence of SEQ ID NO.: 86.

58. A nucleic acid comprising a nucleic acid sequence encoding the chimeric antigen receptor of claim 52.

59. A nucleic acid comprising a nucleic acid sequence encoding the chimeric antigen receptor of claim 53.

60. A nucleic acid comprising a nucleic acid sequence encoding the chimeric antigen receptor of claim 57.

61. The nucleic acid of claim 60, wherein the nucleic acid further comprises to the C-terminus of the nucleic acid sequence encoding the chimeric antigen receptor a nucleic acid sequence encoding for a dominant negative TGFB Receptor (DN TGFBR), wherein the DN TGFBR comprises from N to C-terminus:
an extracellular domain (ECD) from TGFβ receptor II;
a transmembrane domain (TMD) from TGFβ receptor II, and
an intracellular domain from TGFβ receptor II lacking amino acid residues responsible for signaling and phosphorylation present in a wild type TGFβ receptor.

62. The nucleic acid of claim 61, further comprising a linker comprising a nucleic acid encoding a 2A peptide that links the nucleic acid sequence encoding the chimeric antigen receptor to the nucleic acid sequence encoding the DN TGFBR.

63. The nucleic acid of claim 62, wherein the linker comprises the sequence set forth in SEQ ID NO:118.

64. The nucleic acid of claim 63, wherein the DN TGFβR consists of amino acids 23 to 194 of SEQ ID NO: 98.

65. The nucleic acid of claim 64, comprising a nucleic acid sequence that encodes a polypeptide that is at least 95% identical to the amino acid sequence set forth in SEQ ID NO: 90.

66. The nucleic acid of claim 64, comprising a nucleic acid sequence that encodes the amino acid sequence set forth in SEQ ID NO.: 113.

67. The nucleic acid of claim 61, wherein the nucleic acid further comprises to the C-terminus of the nucleic acid sequence encoding the DN TGFβR a nucleotide sequence encoding a membrane bound IL15-IL-15Rα sushi domain chimeric receptor.

68. The nucleic acid of claim 67, wherein the nucleotide sequence encoding the membrane bound IL15-IL-15Rα sushi domain chimeric receptor is separated from the nucleic acid sequence encoding for the DN TGFβR by an IRES.

69. The nucleic acid of claim 66, wherein the nucleic acid further comprises to the C-terminus of the nucleic acid sequence encoding the DN TGFBR a nucleotide sequence encoding a membrane bound IL15-IL-15Rα sushi domain chimeric receptor.

70. The nucleic acid of claim 69, wherein the nucleotide sequence encoding the membrane bound IL15-IL-15Rα sushi domain chimeric receptor is separated from the nucleic acid sequence encoding for the DN TGFβ by an IRES.

71. A vector comprising the nucleic acid of claim 60.
72. A vector comprising the nucleic acid of claim 61.
73. A vector comprising the nucleic acid of claim 63.
74. A vector comprising the nucleic acid of claim 64.
75. A vector comprising the nucleic acid of claim 66.
76. A vector comprising the nucleic acid of claim 69.
77. A vector comprising the nucleic acid of claim 70.
78. A host cell comprising the vector of claim 71.
79. A host cell comprising the vector of claim 72.
80. A host cell comprising the vector of claim 73.
81. A host cell comprising the vector of claim 74.
82. A host cell comprising the vector of claim 75.
83. A host cell comprising the vector of claim 76.
84. A host cell comprising the vector of claim 77.
85. The host cell of claim 78, where the host cell is a T cell or a NK cell.
86. The host cell of claim 82, where the host cell is a T cell or a NK cell.
87. The host cell of claim 83, where the host cell is a T cell or a NK cell.
88. The host cell of claim 84, where the host cell is a T cell or a NK cell.
89. A pharmaceutical composition comprising the host cell of claim 85 and a pharmaceutically acceptable carrier.
90. A pharmaceutical composition comprising the host cell of claim 86 and a pharmaceutically acceptable carrier.
91. A pharmaceutical composition comprising the host cell of claim 87 and a pharmaceutically acceptable carrier.
92. A pharmaceutical composition comprising the host cell of claim 88 and a pharmaceutically acceptable carrier.
93. A method of treating hepatocellular carcinoma in a human subject in need of thereof, the method comprising administering a therapeutically effective amount of the pharmaceutical composition of claim 89 to the human subject.
94. A method of treating hepatocellular carcinoma in a human subject in need of thereof, the method comprising administering a therapeutically effective amount of the pharmaceutical composition of claim 90 to the human subject.
95. A method of treating hepatocellular carcinoma in a human subject in need of thereof, the method comprising administering a therapeutically effective amount of the pharmaceutical composition of claim 91 to the human subject.
96. A method of treating hepatocellular carcinoma in a human subject in need of thereof, the method comprising administering a therapeutically effective amount of the pharmaceutical composition of claim 92 to the human subject.
97. A method of inducing an immune response in a human subject presenting with hepatocellular carcinoma, the method comprising administering to the human subject the host cell of claim 85.
98. The method of claim 97, wherein the host cell is a T cell or NK cell that is autologous to the human subject.
99. A method of inducing an immune response in a human subject presenting with hepatocellular carcinoma, the method comprising administering to the human subject the host cell of claim 87.
100. The method of claim 99, wherein the host cell is a T cell or NK cell that is autologous to the human subject.

101. A method of inducing an immune response in a human subject presenting with hepatocellular carcinoma, the method comprising administering to the human subject the host cell of claim 88.

102. The method of claim 101, wherein the host cell is a T cell or NK cell that is autologous to the human subject.

103. A method of treating squamous cell carcinoma in a human subject in need of thereof, the method comprising administering a therapeutically effective amount of the pharmaceutical composition of claim 89 to the human subject.

104. The method of claim 103, wherein the squamous cell carcinoma is non-small- cell lung carcinoma (NSCLC).

105. A method of treating squamous cell carcinoma in a human subject in need of thereof, the method comprising administering a therapeutically effective amount of the pharmaceutical composition of claim 90 to the human subject.

106. The method of claim 105, wherein the squamous cell carcinoma is NSCLC.

107. A method of treating squamous cell carcinoma in a human subject in need of thereof, the method comprising administering a therapeutically effective amount of the pharmaceutical composition of claim 91 to the human subject.

108. The method of claim 107, wherein the squamous cell carcinoma is NSCLC.

109. A method of treating squamous cell carcinoma in a human subject in need of thereof, the method comprising administering a therapeutically effective amount of the pharmaceutical composition of claim 92 to the human subject.

110. The method of claim 109, wherein the squamous cell carcinoma is NSCLC.

111. A method of inducing an immune response in a human subject presenting with squamous cell carcinoma, the method comprising administering to the human subject the host cell of claim 85.

112. The method of claim 111, wherein the host cell is a T cell or NK cell that is autologous to the human subject.

113. A method of inducing an immune response in a human subject presenting with squamous cell carcinoma, the method comprising administering to the human subject the host cell of claim 87.

114. The method of claim 113, wherein the host cell is a T cell or NK cell that is autologous to the human subject.

115. A method of inducing an immune response in a human subject presenting with squamous cell carcinoma, the method comprising administering to the human subject the host cell of claim 88.

116. The method of claim 115, wherein the host cell is a T cell or NK cell that is autologous to the human subject.

* * * * *

SEQUENCE LISTING

```
<160> NUMBER OF SEQ ID NOS: 121

<210> SEQ ID NO 1

<400> SEQUENCE: 1

000

<210> SEQ ID NO 2
<211> LENGTH: 8
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<221> NAME/KEY: MOD_RES
<222> LOCATION: (2)..(2)
```

```
<223> OTHER INFORMATION: V or I
<220> FEATURE:
<221> NAME/KEY: MOD_RES
<222> LOCATION: (4)..(4)
<223> OTHER INFORMATION: Any amino acid

<400> SEQUENCE: 2

Asp Xaa Glu Xaa Asn Pro Gly Pro
1               5

<210> SEQ ID NO 3
<211> LENGTH: 119
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 3

Gln Val Gln Leu Val Gln Ser Gly Ala Glu Val Lys Lys Pro Gly Ala
1               5                   10                  15

Ser Val Lys Val Ser Cys Lys Thr Ser Gly Tyr Thr Phe Thr Asp Tyr
            20                  25                  30

Tyr Ile His Trp Val Arg Gln Ala Pro Gly Gln Gly Leu Glu Trp Met
        35                  40                  45

Gly Glu Ile Tyr Pro Gly Ser Gly Asn Thr Tyr Ala Gln Lys Phe
    50                  55                  60

Gln Gly Arg Val Thr Met Thr Ala Asp Thr Ser Thr Ser Thr Ala Tyr
65                  70                  75                  80

Met Glu Leu Ser Ser Leu Arg Ser Glu Asp Thr Ala Val Tyr Tyr Cys
                85                  90                  95

Ala Arg Gly Asn Asp Tyr Asp Ala Trp Phe Val Tyr Trp Gly Gln Gly
            100                 105                 110

Thr Leu Val Thr Val Ser Ser
        115

<210> SEQ ID NO 4
<211> LENGTH: 357
<212> TYPE: DNA
<213> ORGANISM: Artificial Sequence
<220> FEATURE:
<223> OTHER INFORMATION: Description of Artificial Sequence: Synthetic
      polynucleotide

<400> SEQUENCE: 4
caagtccaac tggtgcagtc cggagccgag gtcaagaagc ccggagccag cgtgaaagtc      60
tcatgtaaaa ccagcggcta caccttcacc gactactaca tccactgggt ccgacaagcc    120
cccggtcaag gtttagagtg gatgggcgag atctaccccg gctccggcaa cacctactac    180
gcccagaagt tccaaggtcg tgtgaccatg acagccgaca ccagcacctc caccgcctac    240
atggaactgt cctctctgcg ttctgaggac acagccgttt actactgcgc cagaggcaac    300
gactacgacg cttggttcgt gtactggggc caaggaacat tagtgaccgt gtcctcc       357

<210> SEQ ID NO 5
<211> LENGTH: 8
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 5
```

```
Gly Tyr Thr Phe Thr Asp Tyr Tyr
1               5

<210> SEQ ID NO 6
<211> LENGTH: 5
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 6

Asp Tyr Tyr Ile His
1               5

<210> SEQ ID NO 7
<211> LENGTH: 6
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 7

Gly Tyr Thr Phe Thr Asp
1               5

<210> SEQ ID NO 8
<211> LENGTH: 8
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 8

Ile Tyr Pro Gly Ser Gly Asn Thr
1               5

<210> SEQ ID NO 9
<211> LENGTH: 16
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 9

Glu Ile Tyr Pro Gly Ser Gly Asn Thr Tyr Tyr Ala Gln Lys Phe Gln
1               5                   10                  15

<210> SEQ ID NO 10
<211> LENGTH: 5
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 10

Tyr Pro Gly Ser Gly
1               5

<210> SEQ ID NO 11
<211> LENGTH: 12
<212> TYPE: PRT
<213> ORGANISM: Artificial Sequence
```

```
<220> FEATURE:
<223> OTHER INFORMATION: Description of Artificial Sequence: Synthetic
      peptide

<400> SEQUENCE: 11

Ala Arg Gly Asn Asp Tyr Asp Ala Trp Phe Val Tyr
1               5                   10

<210> SEQ ID NO 12
<211> LENGTH: 10
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 12

Gly Asn Asp Tyr Asp Ala Trp Phe Val Tyr
1               5                   10

<210> SEQ ID NO 13
<211> LENGTH: 10
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 13

Gly Asn Asp Tyr Asp Ala Trp Phe Val Tyr
1               5                   10

<210> SEQ ID NO 14
<211> LENGTH: 112
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 14

Asp Ile Val Met Thr Gln Ser Pro Asp Ser Leu Ala Val Ser Leu Gly
1               5                   10                  15

Glu Arg Val Thr Met Asn Cys Lys Ser Ser Gln Ser Leu Leu Asn Ser
            20                  25                  30

Gly Thr Arg Lys Asn Tyr Leu Ala Trp Tyr Gln Gln Lys Pro Gly Gln
        35                  40                  45

Pro Pro Lys Leu Leu Ile Tyr Trp Ala Ser Ile Arg Glu Ser Gly Val
    50                  55                  60

Pro Asp Arg Phe Ser Gly Ser Gly Ser Gly Thr Asp Phe Thr Leu Thr
65                  70                  75                  80

Ile Ser Ser Val Gln Ala Glu Asp Val Ala Val Tyr Tyr Cys Lys Gln
                85                  90                  95

Ser Tyr Ser Leu Tyr Thr Phe Gly Gln Gly Thr Lys Leu Glu Ile Lys
            100                 105                 110

<210> SEQ ID NO 15
<211> LENGTH: 336
<212> TYPE: DNA
<213> ORGANISM: Artificial Sequence
<220> FEATURE:
<223> OTHER INFORMATION: Description of Artificial Sequence: Synthetic
      polynucleotide

<400> SEQUENCE: 15
```

```
gacatcgtca tgacccagag ccccgattct ttagccgtgt ctttaggcga aagagtgacc    60
atgaactgca agtccagcca gtctttactg aattccggca ctcgaaaaaa ctatttagct   120
tggtaccagc agaaacccgg ccagccccct aagctgctga tctactgggc tagcattcga   180
gaatccggcg tgcccgatcg ctttagcggc agcggtagcg gcaccgactt tactttaacc   240
atcagcagcg tgcaagctga ggacgtggct gtgtactatt gcaagcagtc ctactcttta   300
tacaccttcg gccaaggaac aaagctggag atcaag                             336
```

```
<210> SEQ ID NO 16
<211> LENGTH: 12
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 16

Gln Ser Leu Leu Asn Ser Gly Thr Arg Lys Asn Tyr
1               5                   10

<210> SEQ ID NO 17
<211> LENGTH: 17
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 17

Lys Ser Ser Gln Ser Leu Leu Asn Ser Gly Thr Arg Lys Asn Tyr Leu
1               5                   10                  15
Ala

<210> SEQ ID NO 18
<211> LENGTH: 17
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 18

Lys Ser Ser Gln Ser Leu Leu Asn Ser Gly Thr Arg Lys Asn Tyr Leu
1               5                   10                  15
Ala

<210> SEQ ID NO 19
<211> LENGTH: 3
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 19

Trp Ala Ser
1

<210> SEQ ID NO 20
<211> LENGTH: 7
<212> TYPE: PRT
<213> ORGANISM: Artificial Sequence
<220> FEATURE:
```

```
<223> OTHER INFORMATION: Description of Artificial Sequence: Synthetic
      peptide

<400> SEQUENCE: 20

Trp Ala Ser Ile Arg Glu Ser
1               5

<210> SEQ ID NO 21
<211> LENGTH: 7
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 21

Trp Ala Ser Ile Arg Glu Ser
1               5

<210> SEQ ID NO 22
<211> LENGTH: 8
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 22

Lys Gln Ser Tyr Ser Leu Tyr Thr
1               5

<210> SEQ ID NO 23
<211> LENGTH: 8
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 23

Lys Gln Ser Tyr Ser Leu Tyr Thr
1               5

<210> SEQ ID NO 24
<211> LENGTH: 8
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 24

Lys Gln Ser Tyr Ser Leu Tyr Thr
1               5

<210> SEQ ID NO 25
<211> LENGTH: 249
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 25

Gln Val Gln Leu Val Gln Ser Gly Ala Glu Val Lys Lys Pro Gly Ala
1               5                   10                  15

Ser Val Lys Val Ser Cys Lys Thr Ser Gly Tyr Thr Phe Thr Asp Tyr
```

```
                 20                  25                  30
Tyr Ile His Trp Val Arg Gln Ala Pro Gly Gln Gly Leu Glu Trp Met
             35                  40                  45

Gly Glu Ile Tyr Pro Gly Ser Gly Asn Thr Tyr Tyr Ala Gln Lys Phe
 50                  55                  60

Gln Gly Arg Val Thr Met Thr Ala Asp Thr Ser Thr Ser Thr Ala Tyr
 65                  70                  75                  80

Met Glu Leu Ser Ser Leu Arg Ser Glu Asp Thr Ala Val Tyr Tyr Cys
                 85                  90                  95

Ala Arg Gly Asn Asp Tyr Asp Ala Trp Phe Val Tyr Trp Gly Gln Gly
            100                 105                 110

Thr Leu Val Thr Val Ser Ser Gly Ser Thr Gly Ser Gly Lys Pro
            115                 120                 125

Gly Ser Gly Glu Gly Ser Thr Lys Gly Asp Ile Val Met Thr Gln Ser
        130                 135                 140

Pro Asp Ser Leu Ala Val Ser Leu Gly Glu Arg Val Thr Met Asn Cys
145                 150                 155                 160

Lys Ser Ser Gln Ser Leu Leu Asn Ser Gly Thr Arg Lys Asn Tyr Leu
                165                 170                 175

Ala Trp Tyr Gln Gln Lys Pro Gly Gln Pro Pro Lys Leu Leu Ile Tyr
            180                 185                 190

Trp Ala Ser Ile Arg Glu Ser Gly Val Pro Asp Arg Phe Ser Gly Ser
        195                 200                 205

Gly Ser Gly Thr Asp Phe Thr Leu Thr Ile Ser Ser Val Gln Ala Glu
    210                 215                 220

Asp Val Ala Val Tyr Tyr Cys Lys Gln Ser Tyr Ser Leu Tyr Thr Phe
225                 230                 235                 240

Gly Gln Gly Thr Lys Leu Glu Ile Lys
                245

<210> SEQ ID NO 26
<211> LENGTH: 747
<212> TYPE: DNA
<213> ORGANISM: Artificial Sequence
<220> FEATURE:
<223> OTHER INFORMATION: Description of Artificial Sequence: Synthetic
      polynucleotide

<400> SEQUENCE: 26
caagtccaac tggtgcagtc cggagccgag gtcaagaagc ccggagccag cgtgaaagtc      60
tcatgtaaaa ccagcggcta caccttcacc gactactaca tccactgggt ccgacaagcc     120
cccggtcaag gtttagagtg gatgggcgag atctaccccg gctccggcaa cacctactac     180
gcccagaagt tccaaggtcg tgtgaccatg acagccgaca ccagcacctc caccgcctac     240
atggaactgt cctctctgcg ttctgaggac acagccgttt actactgcgc cagaggcaac     300
gactacgacg cttggttcgt gtactggggc caaggaacat agtgaccgt gtcctccgga      360
tccacatccg gcagcggaaa gcccggtagc ggcgagggca gcaccaaagg agacatcgtc     420
atgacccaga gccccgattc tttagccgtg tctttaggcg aaagagtgac catgaactgc     480
aagtccagcc agtctttact gaattccggc actcgaaaaa actatttagc ttggtaccag     540
cagaaacccg gccagccccc taagctgctg atctactggg ctagcattcg agaatccggc     600
gtgcccgatc gctttagcgg cagcggtagc ggcaccgact ttactttaac catcagcagc     660
gtgcaagctg aggacgtggc tgtgtactat tgcaagcagt cctactcttt atacaccttc     720
```
ggccaaggaa caaagctgga gatcaag                                               747

<210> SEQ ID NO 27
<211> LENGTH: 119
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 27

Gln Val Gln Leu Val Gln Ser Gly Ala Glu Val Lys Lys Pro Gly Ala
1               5                   10                  15

Ser Val Lys Val Ser Cys Lys Ala Ser Gly Tyr Thr Phe Thr Asp Tyr
            20                  25                  30

Tyr Ile His Trp Val Arg Gln Ala Pro Gly Gln Gly Leu Glu Trp Met
        35                  40                  45

Gly Glu Ile Tyr Pro Gly Ser Gly Asn Thr Tyr Tyr Ala Gln Lys Phe
    50                  55                  60

Gln Gly Arg Val Thr Met Thr Arg Asp Thr Ser Thr Ser Thr Val Tyr
65                  70                  75                  80

Met Glu Leu Ser Ser Leu Arg Ser Glu Asp Thr Ala Val Tyr Tyr Cys
                85                  90                  95

Ala Arg Gly Asn Asp Tyr Asp Ala Trp Phe Val Tyr Trp Gly Gln Gly
            100                 105                 110

Thr Leu Val Thr Val Ser Ser
        115

<210> SEQ ID NO 28
<211> LENGTH: 357
<212> TYPE: DNA
<213> ORGANISM: Artificial Sequence
<220> FEATURE:
<223> OTHER INFORMATION: Description of Artificial Sequence: Synthetic
      polynucleotide

<400> SEQUENCE: 28
caagttcagc tggtgcagag cggcgccgaa gtgaaaaagc cggcgccag cgtgaaagtc       60 tcatgcaagg ccagcggcta ccttcacc gactactaca tccactgggt ccgacaagct      120
cccggtcaag gtttagagtg gatgggcgag atctaccccg gcagcggcaa cacctactac    180
gcccagaagt tccaaggacg tgtgaccatg actcgtgaca cctccacctc caccgtgtat    240
atggagctga gctctttaag gtccgaggat accgctgtgt actactgcgc cagaggaaac    300
gactacgacg cttggttcgt gtactggggc caaggaacat tagtgaccgt cagctcc       357

<210> SEQ ID NO 29
<211> LENGTH: 112
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 29

Asp Ile Val Met Thr Gln Ser Pro Asp Ser Leu Ala Val Ser Leu Gly
1               5                   10                  15

Glu Arg Ala Thr Ile Asn Cys Lys Ser Ser Gln Ser Leu Leu Asn Ser
            20                  25                  30

Gly Thr Arg Lys Asn Tyr Leu Ala Trp Tyr Gln Gln Lys Pro Gly Gln
        35                  40                  45

```
Pro Pro Lys Leu Leu Ile Tyr Trp Ala Ser Ile Arg Glu Ser Gly Val
    50                  55                  60

Pro Asp Arg Phe Ser Gly Ser Gly Ser Gly Thr Asp Phe Thr Leu Thr
65                  70                  75                  80

Ile Ser Ser Leu Gln Ala Glu Asp Val Ala Val Tyr Tyr Cys Lys Gln
                85                  90                  95

Ser Tyr Ser Leu Tyr Thr Phe Gly Gln Gly Thr Lys Leu Glu Ile Lys
            100                 105                 110
```

<210> SEQ ID NO 30
<211> LENGTH: 336
<212> TYPE: DNA
<213> ORGANISM: Artificial Sequence
<220> FEATURE:
<223> OTHER INFORMATION: Description of Artificial Sequence: Synthetic polynucleotide

<400> SEQUENCE: 30

```
gacatcgtga tgacccagag ccccgattct ttagctgtgt ctttaggcga gagagccacc      60
atcaactgca agtcctccca gagcttatta aatagcggca ctcgaaaaaa ctatttagct     120
tggtaccaac agaagcccgg ccagcccccc aagctgctca tctactgggc ttccatcaga     180
gagagcggcg tgcccgatag attcagcggc agcggctccg gcacagactt cactttaacc     240
atctcctctt tacaagctga ggacgtggcc gtgtattact gcaagcagtc ctactcttta     300
tacaccttcg gccaaggaac aaagctggag atcaaa                               336
```

<210> SEQ ID NO 31
<211> LENGTH: 249
<212> TYPE: PRT
<213> ORGANISM: Artificial Sequence
<220> FEATURE:
<223> OTHER INFORMATION: Description of Artificial Sequence: Synthetic polypeptide

<400> SEQUENCE: 31

```
Gln Val Gln Leu Val Gln Ser Gly Ala Glu Val Lys Lys Pro Gly Ala
1               5                   10                  15

Ser Val Lys Val Ser Cys Lys Ala Ser Gly Tyr Thr Phe Thr Asp Tyr
                20                  25                  30

Tyr Ile His Trp Val Arg Gln Ala Pro Gly Gln Gly Leu Glu Trp Met
            35                  40                  45

Gly Glu Ile Tyr Pro Gly Ser Gly Asn Thr Tyr Tyr Ala Gln Lys Phe
        50                  55                  60

Gln Gly Arg Val Thr Met Thr Arg Asp Thr Ser Thr Ser Thr Val Tyr
65                  70                  75                  80

Met Glu Leu Ser Ser Leu Arg Ser Glu Asp Thr Ala Val Tyr Tyr Cys
                85                  90                  95

Ala Arg Gly Asn Asp Tyr Asp Ala Trp Phe Val Tyr Trp Gly Gln Gly
            100                 105                 110

Thr Leu Val Thr Val Ser Ser Gly Ser Thr Gly Ser Gly Lys Pro
        115                 120                 125

Gly Ser Gly Glu Gly Ser Thr Lys Gly Asp Ile Val Met Thr Gln Ser
    130                 135                 140

Pro Asp Ser Leu Ala Val Ser Leu Gly Glu Arg Ala Thr Ile Asn Cys
145                 150                 155                 160

Lys Ser Ser Gln Ser Leu Leu Asn Ser Gly Thr Arg Lys Asn Tyr Leu
                165                 170                 175
```

Ala Trp Tyr Gln Gln Lys Pro Gly Gln Pro Pro Lys Leu Leu Ile Tyr
            180                 185                 190

Trp Ala Ser Ile Arg Glu Ser Gly Val Pro Asp Arg Phe Ser Gly Ser
        195                 200                 205

Gly Ser Gly Thr Asp Phe Thr Leu Thr Ile Ser Ser Leu Gln Ala Glu
    210                 215                 220

Asp Val Ala Val Tyr Tyr Cys Lys Gln Ser Tyr Ser Leu Tyr Thr Phe
225                 230                 235                 240

Gly Gln Gly Thr Lys Leu Glu Ile Lys
                245

<210> SEQ ID NO 32
<211> LENGTH: 747
<212> TYPE: DNA
<213> ORGANISM: Artificial Sequence
<220> FEATURE:
<223> OTHER INFORMATION: Description of Artificial Sequence: Synthetic
      polynucleotide

<400> SEQUENCE: 32
caagttcagc tggtgcagag cggcgccgaa gtgaaaaagc cggcgccag cgtgaaagtc      60 tcatgcaagg ccagcggcta ccttcacc gactactaca tccactgggt ccgacaagct     120
cccggtcaag gtttagagtg gatgggcgag atctacccccg gcagcggcaa cacctactac    180
gcccagaagt tccaaggacg tgtgaccatg actcgtgaca cctccacctc caccgtgtat    240
atggagctga gctctttaag gtccgaggat accgctgtgt actactgcgc cagaggaaac    300
gactacgacg cttggttcgt gtactggggc caaggaacat tagtgaccgt cagctccggc    360
tccacaagcg gatccggcaa acccggtagc ggcgaaggca gcaccaaggg cgacatcgtg    420
atgacccaga gccccgattc tttagctgtg tctttaggcg agagagccac catcaactgc    480
aagtcctccc agagcttatt aaatagcggc actcgaaaaa actatttagc ttggtaccaa    540
cagaagcccg gccagccccc caagctgctc atctactggg cttccatcag agagagcggc    600
gtgcccgata gattcagcgg cagcggctcc ggcacagact tcactttaac catctcctct    660
ttacaagctg aggacgtggc cgtgtattac tgcaagcagt cctactcttt atacaccttc    720
ggccaaggaa caaagctgga gatcaaa                                        747

<210> SEQ ID NO 33
<211> LENGTH: 119
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 33

Gln Val Gln Leu Val Gln Ser Gly Ala Glu Val Lys Lys Pro Gly Ala
1               5                   10                  15

Ser Val Lys Val Ser Cys Lys Thr Ser Gly Tyr Thr Phe Thr Asp Tyr
            20                  25                  30

Tyr Ile His Trp Val Arg Gln Ala Pro Gly Gln Gly Leu Glu Trp Met
        35                  40                  45

Gly Glu Ile Tyr Pro Gly Ser Gly Asn Thr Tyr Tyr Ala Gln Lys Phe
    50                  55                  60

Gln Gly Arg Val Thr Met Thr Ala Asp Thr Ser Thr Ser Thr Ala Tyr
65                  70                  75                  80

```
Met Glu Leu Ser Ser Leu Arg Ser Glu Asp Thr Ala Val Tyr Tyr Cys
                85                  90                  95

Ala Arg Gly Asn Asp Tyr Asp Ala Trp Phe Val Tyr Trp Gly Gln Gly
            100                 105                 110

Thr Leu Val Thr Val Ser Ser
        115
```

<210> SEQ ID NO 34
<211> LENGTH: 357
<212> TYPE: DNA
<213> ORGANISM: Artificial Sequence
<220> FEATURE:
<223> OTHER INFORMATION: Description of Artificial Sequence: Synthetic
      polynucleotide

<400> SEQUENCE: 34

```
caagttcagc tggtgcagag cggcgccgaa gtgaaaaagc ccggcgccag cgtgaaagtc    60
tcatgcaaga cctccggcta caccttcacc gactactaca tccactgggt ccgacaagct   120
cccggccaag gtctggagtg gatgggcgag atctaccccg ctccggcaa cacctattac    180 gcccagaagt tccaaggacg tgtgaccatg acagccgaca cctccaccag caccgcctac   240
atggaactga gcagcttacg tagcgaggac accgctgtgt actactgcgc tcgtggcaac   300
gactacgacg cttggttcgt gtactggggc caaggaactc tggtgaccgt gtcctcc      357
```

<210> SEQ ID NO 35
<211> LENGTH: 112
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 35

```
Asp Ile Val Met Thr Gln Ser Pro Asp Ser Leu Ala Val Ser Leu Gly
1               5                   10                  15

Glu Arg Ala Thr Ile Asn Cys Lys Ser Ser Gln Ser Leu Leu Asn Ser
            20                  25                  30

Gly Thr Arg Lys Asn Tyr Leu Ala Trp Tyr Gln Gln Lys Pro Gly Gln
        35                  40                  45

Pro Pro Lys Leu Leu Ile Tyr Trp Ala Ser Ile Arg Glu Ser Gly Val
    50                  55                  60

Pro Asp Arg Phe Ser Gly Ser Gly Ser Gly Thr Asp Phe Thr Leu Thr
65                  70                  75                  80

Ile Ser Ser Leu Gln Ala Glu Asp Val Ala Val Tyr Tyr Cys Lys Gln
                85                  90                  95

Ser Tyr Ser Leu Tyr Thr Phe Gly Gln Gly Thr Lys Leu Glu Ile Lys
            100                 105                 110
```

<210> SEQ ID NO 36
<211> LENGTH: 336
<212> TYPE: DNA
<213> ORGANISM: Artificial Sequence
<220> FEATURE:
<223> OTHER INFORMATION: Description of Artificial Sequence: Synthetic
      polynucleotide

<400> SEQUENCE: 36

```
gacatcgtga tgacccagtc ccccgattct ttagccgtca gccttggaga gagagccacc    60
atcaactgca agagcagcca gagcttatta aactccggca ctcgaaaaaa ctacctcgct   120
```

```
tggtaccagc agaagcccgg tcagccccct aagctgctga tctactgggc cagcattcgt    180
gagagcggag tgcccgacag atttagcggc tccggcagcg gcaccgattt cactttaacc    240
atcagctctt tacaagctga ggatgtggcc gtgtattact gcaagcagtc ctactcttta    300
tacaccttcg gccaaggaac aaagctggag attaag                              336
```

<210> SEQ ID NO 37
<211> LENGTH: 249
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 37

```
Gln Val Gln Leu Val Gln Ser Gly Ala Glu Val Lys Lys Pro Gly Ala
1               5                   10                  15

Ser Val Lys Val Ser Cys Lys Thr Ser Gly Tyr Thr Phe Thr Asp Tyr
            20                  25                  30

Tyr Ile His Trp Val Arg Gln Ala Pro Gly Gln Gly Leu Glu Trp Met
        35                  40                  45

Gly Glu Ile Tyr Pro Gly Ser Gly Asn Thr Tyr Tyr Ala Gln Lys Phe
    50                  55                  60

Gln Gly Arg Val Thr Met Thr Ala Asp Thr Ser Thr Ser Thr Ala Tyr
65                  70                  75                  80

Met Glu Leu Ser Ser Leu Arg Ser Glu Asp Thr Ala Val Tyr Tyr Cys
                85                  90                  95

Ala Arg Gly Asn Asp Tyr Asp Ala Trp Phe Val Tyr Trp Gly Gln Gly
            100                 105                 110

Thr Leu Val Thr Val Ser Ser Gly Ser Thr Ser Gly Ser Gly Lys Pro
        115                 120                 125

Gly Ser Gly Glu Gly Ser Thr Lys Gly Asp Ile Val Met Thr Gln Ser
    130                 135                 140

Pro Asp Ser Leu Ala Val Ser Leu Gly Glu Arg Ala Thr Ile Asn Cys
145                 150                 155                 160

Lys Ser Ser Gln Ser Leu Leu Asn Ser Gly Thr Arg Lys Asn Tyr Leu
                165                 170                 175

Ala Trp Tyr Gln Gln Lys Pro Gly Gln Pro Pro Lys Leu Leu Ile Tyr
            180                 185                 190

Trp Ala Ser Ile Arg Glu Ser Gly Val Pro Asp Arg Phe Ser Gly Ser
        195                 200                 205

Gly Ser Gly Thr Asp Phe Thr Leu Thr Ile Ser Ser Leu Gln Ala Glu
    210                 215                 220

Asp Val Ala Val Tyr Tyr Cys Lys Gln Ser Tyr Ser Leu Tyr Thr Phe
225                 230                 235                 240

Gly Gln Gly Thr Lys Leu Glu Ile Lys
                245
```

<210> SEQ ID NO 38
<211> LENGTH: 747
<212> TYPE: DNA
<213> ORGANISM: Artificial Sequence
<220> FEATURE:
<223> OTHER INFORMATION: Description of Artificial Sequence: Synthetic
      polynucleotide

<400> SEQUENCE: 38

```
caagttcagc tggtgcagag cggcgccgaa gtgaaaaagc ccggcgccag cgtgaaagtc    60
```

```
tcatgcaaga cctccggcta caccttcacc gactactaca tccactgggt ccgacaagct    120
cccggccaag gtctggagtg gatgggcgag atctaccccg gctccggcaa cacctattac    180
gcccagaagt tccaaggacg tgtgaccatg acagccgaca cctccaccag caccgcctac    240
atggaactga gcagcttacg tagcgaggac accgctgtgt actactgcgc tcgtggcaac    300
gactacgacg cttggttcgt gtactggggc caaggaactc tggtgaccgt gcctccgga    360 agcacctccg aagcggcaa gcccggtagc ggcgaaggat ccaccaaggg cgacatcgtg    420
atgacccagt cccccgattc tttagccgtc agccttggag agagagccac catcaactgc    480
aagagcagcc agagcttatt aaactccggc actcgaaaaa actacctcgc ttggtaccag    540
cagaagcccg gtcagccccc taagctgctg atctactggg ccagcattcg tgagagcgga    600
gtgcccgaca gatttagcgg ctccggcagc ggcaccgatt tcactttaac catcagctct    660
ttacaagctg aggatgtggc cgtgtattac tgcaagcagt cctactcttt atacaccttc    720
ggccaaggaa caaagctgga gattaag                                       747
```

<210> SEQ ID NO 39
<211> LENGTH: 119
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 39

```
Gln Val Gln Leu Val Gln Ser Gly Ala Glu Val Lys Lys Pro Gly Ala
1               5                   10                  15

Ser Val Lys Val Ser Cys Lys Thr Ser Gly Tyr Thr Phe Thr Asp Tyr
            20                  25                  30

Tyr Ile His Trp Val Arg Gln Ala Pro Gly Gln Gly Leu Glu Trp Ile
        35                  40                  45

Gly Glu Ile Tyr Pro Gly Ser Gly Asn Thr Tyr Tyr Ala Gln Lys Phe
    50                  55                  60

Gln Gly Arg Ala Thr Leu Thr Ala Asp Thr Ser Thr Ser Thr Ala Tyr
65                  70                  75                  80

Met Glu Phe Ser Ser Leu Arg Ser Glu Asp Thr Ala Val Tyr Tyr Cys
                85                  90                  95

Ala Arg Gly Asn Asp Tyr Asp Ala Trp Phe Val Tyr Trp Gly Gln Gly
            100                 105                 110

Thr Leu Val Thr Val Ser Ser
        115
```

<210> SEQ ID NO 40
<211> LENGTH: 357
<212> TYPE: DNA
<213> ORGANISM: Artificial Sequence
<220> FEATURE:
<223> OTHER INFORMATION: Description of Artificial Sequence: Synthetic
      polynucleotide

<400> SEQUENCE: 40

```
caagttcagc tggtgcagag cggcgctgag gtgaagaagc ccggtgcctc cgtgaaggtg     60
tcttgtaaga ccagcggcta caccttcacc gactactaca tccactgggt ccgacaagct    120
cccggtcaag gtttagagtg gattggcgag atctatcccg gcagcggcaa cacctactac    180
gcccagaagt tccaaggacg tgccactttta accgctgaca ccagcaccag caccgcctac    240
```

```
atggagttct cctctttaag gagcgaggac accgccgtgt attactgcgc tcgtggcaac      300
gactatgacg cttggttcgt gtactggggt caaggaacat tagtgacagt gagcagc         357
```

<210> SEQ ID NO 41
<211> LENGTH: 112
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 41

```
Asp Ile Val Met Thr Gln Ser Pro Asp Ser Leu Ala Val Ser Leu Gly
1               5                   10                  15

Glu Arg Ala Thr Ile Asn Cys Lys Ser Ser Gln Ser Leu Leu Asn Ser
            20                  25                  30

Gly Thr Arg Lys Asn Tyr Leu Ala Trp Tyr Gln Gln Lys Pro Gly Gln
        35                  40                  45

Pro Pro Lys Leu Leu Ile Tyr Trp Ala Ser Ile Arg Glu Ser Gly Val
    50                  55                  60

Pro Asp Arg Phe Ser Gly Ser Gly Ser Gly Thr Asp Phe Thr Leu Thr
65                  70                  75                  80

Ile Ser Ser Leu Gln Ala Glu Asp Val Ala Val Tyr Tyr Cys Lys Gln
                85                  90                  95

Ser Tyr Ser Leu Tyr Thr Phe Gly Gln Gly Thr Lys Leu Glu Ile Lys
            100                 105                 110
```

<210> SEQ ID NO 42
<211> LENGTH: 336
<212> TYPE: DNA
<213> ORGANISM: Artificial Sequence
<220> FEATURE:
<223> OTHER INFORMATION: Description of Artificial Sequence: Synthetic
      polynucleotide

<400> SEQUENCE: 42

```
gacatcgtga tgacccagag ccccgattct ttagctgtga gccttggaga gagggccacc      60
atcaactgca agtcctccca gtctttactg aacagcggca ctcgaaaaaa ctatttagct      120
tggtaccagc agaaacccgg ccagccccct aagctgctga tctactgggc ctccattcgt      180
gaaagcggcg tgcccgatag attcagcggc agcggctccg gaaccgactt tactttaacc      240
atctcctctt tacaagctga ggacgtggct gtgtactact gcaagcagag ctactcttta      300
tacaccttcg gccaaggaac aaagctggaa atcaag                                336
```

<210> SEQ ID NO 43
<211> LENGTH: 249
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 43

```
Gln Val Gln Leu Val Gln Ser Gly Ala Glu Val Lys Lys Pro Gly Ala
1               5                   10                  15

Ser Val Lys Val Ser Cys Lys Thr Ser Gly Tyr Thr Phe Thr Asp Tyr
            20                  25                  30

Tyr Ile His Trp Val Arg Gln Ala Pro Gly Gln Gly Leu Glu Trp Ile
        35                  40                  45
```

Gly Glu Ile Tyr Pro Gly Ser Gly Asn Thr Tyr Tyr Ala Gln Lys Phe
    50                  55                  60
Gln Gly Arg Ala Thr Leu Thr Ala Asp Thr Ser Thr Ser Thr Ala Tyr
65                  70                  75                  80
Met Glu Phe Ser Ser Leu Arg Ser Glu Asp Thr Ala Val Tyr Tyr Cys
                85                  90                  95
Ala Arg Gly Asn Asp Tyr Asp Ala Trp Phe Val Tyr Trp Gly Gln Gly
            100                 105                 110
Thr Leu Val Thr Val Ser Ser Gly Ser Thr Ser Gly Ser Gly Lys Pro
        115                 120                 125
Gly Ser Gly Glu Gly Ser Thr Lys Gly Asp Ile Val Met Thr Gln Ser
    130                 135                 140
Pro Asp Ser Leu Ala Val Ser Leu Gly Glu Arg Ala Thr Ile Asn Cys
145                 150                 155                 160
Lys Ser Ser Gln Ser Leu Leu Asn Ser Gly Thr Arg Lys Asn Tyr Leu
                165                 170                 175
Ala Trp Tyr Gln Gln Lys Pro Gly Gln Pro Pro Lys Leu Leu Ile Tyr
            180                 185                 190
Trp Ala Ser Ile Arg Glu Ser Gly Val Pro Asp Arg Phe Ser Gly Ser
        195                 200                 205
Gly Ser Gly Thr Asp Phe Thr Leu Thr Ile Ser Ser Leu Gln Ala Glu
    210                 215                 220
Asp Val Ala Val Tyr Tyr Cys Lys Gln Ser Tyr Ser Leu Tyr Thr Phe
225                 230                 235                 240
Gly Gln Gly Thr Lys Leu Glu Ile Lys
                245

<210> SEQ ID NO 44
<211> LENGTH: 747
<212> TYPE: DNA
<213> ORGANISM: Artificial Sequence
<220> FEATURE:
<223> OTHER INFORMATION: Description of Artificial Sequence: Synthetic
      polynucleotide

<400> SEQUENCE: 44
caagttcagc tggtgcagag cggcgctgag gtgaagaagc ccggtgcctc cgtgaaggtg      60
tcttgtaaga ccagcggcta caccttcacc gactactaca tccactgggt ccgacaagct     120
cccggtcaag gtttagagtg gattggcgag atctatcccg gcagcggcaa cacctactac     180
gcccagaagt tccaaggacg tgccactttta ccgctgaca ccagcaccag caccgcctac     240
atggagttct cctctttaag gagcgaggac accgccgtgt attactgcgc tcgtggcaac     300
gactatgacg cttggttcgt gtactgggt caaggaacat tagtgacagt gagcagcgga     360
tccaccagcg gatccggcaa gcccggtagc ggagaaggca gcaccaaggg cgacatcgtg     420
atgacccaga gcccccgattc tttagctgtg agccttggag agagggccac catcaactgc     480
aagtcctccc agtctttact gaacagcggc actcgaaaaa actatttagc ttggtaccag     540
cagaaacccg gccagccccc taagctgctg atctactggg cctccattcg tgaaagcggc     600
gtgcccgata gattcagcgg cagcggctcc ggaaccgact ttacttttaac catctcctct     660 ttacaagctg aggacgtggc tgtgtactac tgcaagcaga gctactcttt ataccttc       720 ggccaaggaa caaagctgga aatcaag                                         747

<210> SEQ ID NO 45
<211> LENGTH: 119

<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 45

Gln Val Gln Leu Val Gln Ser Gly Ala Glu Val Lys Lys Pro Gly Ala
1               5                   10                  15

Ser Val Lys Val Ser Cys Lys Thr Ser Gly Tyr Thr Phe Thr Asp Tyr
            20                  25                  30

Tyr Ile His Trp Val Arg Gln Ala Pro Gly Gln Gly Leu Glu Trp Ile
        35                  40                  45

Gly Glu Ile Tyr Pro Gly Ser Gly Asn Thr Tyr Tyr Ala Gln Lys Phe
    50                  55                  60

Gln Gly Arg Ala Thr Leu Thr Ala Asp Thr Ser Thr Ser Thr Ala Tyr
65                  70                  75                  80

Met Glu Phe Ser Ser Leu Arg Ser Glu Asp Thr Ala Val Tyr Tyr Cys
                85                  90                  95

Ala Arg Gly Asn Asp Tyr Asp Ala Trp Phe Val Tyr Trp Gly Gln Gly
            100                 105                 110

Thr Leu Val Thr Val Ser Ser
        115

<210> SEQ ID NO 46
<211> LENGTH: 357
<212> TYPE: DNA
<213> ORGANISM: Artificial Sequence
<220> FEATURE:
<223> OTHER INFORMATION: Description of Artificial Sequence: Synthetic
      polynucleotide

<400> SEQUENCE: 46
caagttcagc tggtccagag cggcgctgaa gtgaagaagc ccggcgctag cgtcaaagtc     60
tcatgcaaaa cctccggcta cacctttacc gactactaca tccactgggt ccgacaagct    120
cccggtcaag gtctggagtg gatcggcgag atctaccccg gcagcggcaa cacctactac    180
gcccagaagt tccaaggacg tgccacttta accgctgaca ccagcacctc caccgcctac    240
atggagttca gctctttaag gtccgaggac accgccgtgt actactgcgc tcgtggcaac    300
gattacgacg cttggttcgt gtactgggga caaggaacat tagtgaccgt gtccagc       357

<210> SEQ ID NO 47
<211> LENGTH: 112
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 47

Asp Ile Val Met Thr Gln Ser Pro Asp Ser Leu Ala Val Ser Leu Gly
1               5                   10                  15

Glu Arg Val Thr Met Asn Cys Lys Ser Ser Gln Ser Leu Leu Asn Ser
            20                  25                  30

Gly Thr Arg Lys Asn Tyr Leu Ala Trp Tyr Gln Gln Lys Pro Gly Gln
        35                  40                  45

Pro Pro Lys Leu Leu Ile Tyr Trp Ala Ser Ile Arg Glu Ser Gly Val
    50                  55                  60

Pro Asp Arg Phe Ser Gly Ser Gly Ser Gly Thr Asp Phe Thr Leu Thr

```
                65                  70                  75                  80
Ile Ser Ser Val Gln Ala Glu Asp Val Ala Val Tyr Tyr Cys Lys Gln
                    85                  90                  95

Ser Tyr Ser Leu Tyr Thr Phe Gly Gln Gly Thr Lys Leu Glu Ile Lys
                100                 105                 110

<210> SEQ ID NO 48
<211> LENGTH: 336
<212> TYPE: DNA
<213> ORGANISM: Artificial Sequence
<220> FEATURE:
<223> OTHER INFORMATION: Description of Artificial Sequence: Synthetic
      polynucleotide

<400> SEQUENCE: 48
gatatcgtga tgacccagag ccccgattct ttagccgtgt ctttaggaga gagagtgacc       60
atgaactgca agagcagcca gtctttactg aacagcggca ccagaaagaa ctatttagct      120
tggtaccagc agaagcccgg ccagcctccc aagctgctga tctactgggc cagcattcgt      180
gagagcggag tgcccgacag attcagcggc agcggctccg gcaccgactt tactttaacc      240
atcagcagcg tgcaagctga ggatgtggcc gtgtattact gcaagcagtc ctactcttta      300
tacacctttg gccaaggaac aaagctggag atcaaa                                336

<210> SEQ ID NO 49
<211> LENGTH: 249
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 49

Gln Val Gln Leu Val Gln Ser Gly Ala Glu Val Lys Lys Pro Gly Ala
1               5                   10                  15

Ser Val Lys Val Ser Cys Lys Thr Ser Gly Tyr Thr Phe Thr Asp Tyr
                20                  25                  30

Tyr Ile His Trp Val Arg Gln Ala Pro Gly Gln Gly Leu Glu Trp Ile
            35                  40                  45

Gly Glu Ile Tyr Pro Gly Ser Gly Asn Thr Tyr Tyr Ala Gln Lys Phe
        50                  55                  60

Gln Gly Arg Ala Thr Leu Thr Ala Asp Thr Ser Thr Ser Thr Ala Tyr
65                  70                  75                  80

Met Glu Phe Ser Ser Leu Arg Ser Glu Asp Thr Ala Val Tyr Tyr Cys
                85                  90                  95

Ala Arg Gly Asn Asp Tyr Asp Ala Trp Phe Val Tyr Trp Gly Gln Gly
                100                 105                 110

Thr Leu Val Thr Val Ser Ser Gly Ser Thr Gly Ser Gly Lys Pro
            115                 120                 125

Gly Ser Gly Glu Gly Ser Thr Lys Gly Asp Ile Val Met Thr Gln Ser
        130                 135                 140

Pro Asp Ser Leu Ala Val Ser Leu Gly Glu Arg Val Thr Met Asn Cys
145                 150                 155                 160

Lys Ser Ser Gln Ser Leu Leu Asn Ser Gly Thr Arg Lys Asn Tyr Leu
                165                 170                 175

Ala Trp Tyr Gln Gln Lys Pro Gly Gln Pro Pro Lys Leu Leu Ile Tyr
            180                 185                 190

Trp Ala Ser Ile Arg Glu Ser Gly Val Pro Asp Arg Phe Ser Gly Ser
```

-continued

```
              195                 200                 205
Gly Ser Gly Thr Asp Phe Thr Leu Thr Ile Ser Ser Val Gln Ala Glu
        210                 215                 220

Asp Val Ala Val Tyr Tyr Cys Lys Gln Ser Tyr Ser Leu Tyr Thr Phe
225                 230                 235                 240

Gly Gln Gly Thr Lys Leu Glu Ile Lys
                245
```

<210> SEQ ID NO 50
<211> LENGTH: 747
<212> TYPE: DNA
<213> ORGANISM: Artificial Sequence
<220> FEATURE:
<223> OTHER INFORMATION: Description of Artificial Sequence: Synthetic polynucleotide

<400> SEQUENCE: 50

| | |
|---|---|
| caagttcagc tggtccagag cggcgctgaa gtgaagaagc ccggcgctag cgtcaaagtc | 60 |
| tcatgcaaaa cctccggcta cacctttacc gactactaca tccactgggt ccgacaagct | 120 |
| cccggtcaag gtctggagtg gatcggcgag atctaccccg gcagcggcaa cacctactac | 180 |
| gcccagaagt tccaaggacg tgccactttta accgctgaca ccagcacctc caccgcctac | 240 |
| atggagttca gctctttaag gtccgaggac accgccgtgt actactgcgc tcgtggcaac | 300 |
| gattacgacg cttggttcgt gtactgggga caaggaacat tagtgaccgt gtccagcggc | 360 |
| agcacaagcg gaagcggcaa gcccggtagc ggcgagggaa gcaccaaggg cgatatcgtg | 420 |
| atgacccaga gccccgattc tttagccgtg tctttaggag agagagtgac catgaactgc | 480 |
| aagagcagcc agtctttact gaacagcggc accagaaaga actatttagc ttggtaccag | 540 |
| cagaagcccg gccagcctcc caagctgctg atctactggg ccagcattcg tgagagcgga | 600 |
| gtgcccgaca gattcagcgg cagcggctcc ggcaccgact ttactttaac catcagcagc | 660 |
| gtgcaagctg aggatgtggc cgtgtattac tgcaagcagt cctactcttt atacaccttt | 720 |
| ggccaaggaa caaagctgga gatcaaa | 747 |

<210> SEQ ID NO 51
<211> LENGTH: 2
<212> TYPE: PRT
<213> ORGANISM: Artificial Sequence
<220> FEATURE:
<223> OTHER INFORMATION: Description of Artificial Sequence: Synthetic peptide

<400> SEQUENCE: 51

Gly Ser
1

<210> SEQ ID NO 52
<211> LENGTH: 6
<212> TYPE: DNA
<213> ORGANISM: Artificial Sequence
<220> FEATURE:
<223> OTHER INFORMATION: Description of Artificial Sequence: Synthetic oligonucleotide

<400> SEQUENCE: 52 ggatcc                                                                6

<210> SEQ ID NO 53
<211> LENGTH: 6
<212> TYPE: DNA

```
<213> ORGANISM: Artificial Sequence
<220> FEATURE:
<223> OTHER INFORMATION: Description of Artificial Sequence: Synthetic
      oligonucleotide

<400> SEQUENCE: 53 gggtcc                                                                   6

<210> SEQ ID NO 54
<211> LENGTH: 3
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 54

Gly Ser Gly
1

<210> SEQ ID NO 55
<211> LENGTH: 9
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 55 ggctctgga                                                                9

<210> SEQ ID NO 56
<211> LENGTH: 8
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 56

Gly Gly Gly Ser Gly Gly Gly Ser
1               5

<210> SEQ ID NO 57
<400> SEQUENCE: 57

000

<210> SEQ ID NO 58
<211> LENGTH: 24
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 58
ggcggtggaa gcggaggagg ttcc                                              24

<210> SEQ ID NO 59
<211> LENGTH: 18
<212> TYPE: PRT
<213> ORGANISM: Artificial Sequence
<220> FEATURE:
<223> OTHER INFORMATION: Description of Artificial Sequence: Synthetic
      peptide
```

```
<400> SEQUENCE: 59

Gly Ser Thr Ser Gly Ser Gly Lys Pro Gly Ser Gly Glu Gly Ser Thr
1               5                   10                  15

Lys Gly

<210> SEQ ID NO 60
<211> LENGTH: 54
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 60
ggatccacat ccggcagcgg aaagcccggt agcggcgagg cagcaccaa agga            54

<210> SEQ ID NO 61
<211> LENGTH: 54
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 61
ggctccacaa gcggatccgg caaacccggt agcggcgaag gcagcaccaa gggc            54

<210> SEQ ID NO 62
<211> LENGTH: 54
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 62
ggaagcacct ccggaagcgg caagcccggt agcggcgaag gatccaccaa gggc            54

<210> SEQ ID NO 63
<211> LENGTH: 54
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 63
ggatccacca gcggatccgg caagcccggt agcggagaag gcagcaccaa gggc            54

<210> SEQ ID NO 64
<211> LENGTH: 54
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 64
ggcagcacaa gcggaagcgg caagcccggt agcggcgagg gaagcaccaa gggc            54

<210> SEQ ID NO 65
<211> LENGTH: 45
<212> TYPE: PRT
<213> ORGANISM: Artificial Sequence
<220> FEATURE:
<223> OTHER INFORMATION: Description of Artificial Sequence: Synthetic
``` polypeptide

<400> SEQUENCE: 65

Thr Thr Thr Pro Ala Pro Arg Pro Pro Thr Pro Ala Pro Thr Ile Ala
1               5                   10                  15

Ser Gln Pro Leu Ser Leu Arg Pro Glu Ala Cys Arg Pro Ala Ala Gly
            20                  25                  30

Gly Ala Val His Thr Arg Gly Leu Asp Phe Ala Cys Asp
        35                  40                  45

<210> SEQ ID NO 66
<211> LENGTH: 135
<212> TYPE: DNA
<213> ORGANISM: Artificial Sequence
<220> FEATURE:
<223> OTHER INFORMATION: Description of Artificial Sequence: Synthetic
      polynucleotide

<400> SEQUENCE: 66
accacgacgc cagcgccgcg accaccaaca ccggcgccca ccatcgcgtc gcaacccctg      60
tccctgcgcc ccgaggcgtg ccggccagcg gcggggggcg cagtgcacac gagggggctg     120
gacttcgcct gtgat                                                      135

<210> SEQ ID NO 67
<211> LENGTH: 30
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 67

Leu Asp Asn Glu Lys Ser Asn Gly Thr Ile Ile His Val Lys Gly Lys
1               5                   10                  15

His Leu Cys Pro Ser Pro Leu Phe Pro Gly Pro Ser Lys Pro
            20                  25                  30

<210> SEQ ID NO 68
<211> LENGTH: 90
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 68
ctagacaatg agaagagcaa tggaaccatt atccatgtga agggaaaaca cctttgtcca      60
agtcccctat tcccggacc ttctaagccc                                        90

<210> SEQ ID NO 69
<211> LENGTH: 24
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 69

Ile Tyr Ile Trp Ala Pro Leu Ala Gly Thr Cys Gly Val Leu Leu Leu
1               5                   10                  15

Ser Leu Val Ile Thr Leu Tyr Cys
            20

<210> SEQ ID NO 70
<211> LENGTH: 72
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 70
atctacatct gggcgccctt ggccgggact tgtggggtcc ttctcctgtc actggttatc    60 acccttatt gc                                                        72

<210> SEQ ID NO 71
<211> LENGTH: 27
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 71

Phe Trp Val Leu Val Val Val Gly Gly Val Leu Ala Cys Tyr Ser Leu
1               5                  10                  15

Leu Val Thr Val Ala Phe Ile Ile Phe Trp Val
            20                  25

<210> SEQ ID NO 72
<211> LENGTH: 81
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 72
ttttgggtgc tggtggtggt tgtggagtc ctggcttgct atagcttgct agtaacagtg    60
gcctttatta ttttctgggt g                                             81

<210> SEQ ID NO 73
<211> LENGTH: 113
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 73

Leu Arg Val Lys Phe Ser Arg Ser Ala Asp Ala Pro Ala Tyr Gln Gln
1               5                  10                  15

Gly Gln Asn Gln Leu Tyr Asn Glu Leu Asn Leu Gly Arg Arg Glu Glu
            20                  25                  30

Tyr Asp Val Leu Asp Lys Arg Arg Gly Arg Asp Pro Glu Met Gly Gly
        35                  40                  45

Lys Pro Arg Arg Lys Asn Pro Gln Glu Gly Leu Tyr Asn Glu Leu Gln
    50                  55                  60

Lys Asp Lys Met Ala Glu Ala Tyr Ser Glu Ile Gly Met Lys Gly Glu
65                  70                  75                  80

Arg Arg Arg Gly Lys Gly His Asp Gly Leu Tyr Gln Gly Leu Ser Thr
                85                  90                  95

Ala Thr Lys Asp Thr Tyr Asp Ala Leu His Met Gln Ala Leu Pro Pro
            100                 105                 110

Arg

<210> SEQ ID NO 74
<211> LENGTH: 339
<212> TYPE: DNA
<213> ORGANISM: Artificial Sequence
<220> FEATURE:
<223> OTHER INFORMATION: Description of Artificial Sequence: Synthetic
      polynucleotide

<400> SEQUENCE: 74
ttgagagtga agttcagcag gagcgcagac gcccccgcct atcagcaagg ccagaaccag     60
ctctataacg agctcaattt agggcgaaga gaggagtacg atgttttgga caagaggcgt    120
ggccgggacc ccgaaatggg gggaaagccg agaaggaaga accctcagga aggcttgtac    180
aatgaattgc agaaggataa gatggcgag gcatacagtg agattgggat gaaaggcgag    240
cgccggaggg gcaaggggca cgatggcctt tatcagggtc tcagtacagc caccaaggac    300
acctacgacg cccttcacat gcaagccctg ccccctcgc                           339

<210> SEQ ID NO 75
<211> LENGTH: 40
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 75

Arg Gly Arg Lys Lys Leu Leu Tyr Ile Phe Lys Gln Pro Phe Met Arg
1               5                   10                  15

Pro Val Gln Thr Thr Gln Glu Glu Asp Gly Cys Ser Cys Arg Phe Pro
            20                  25                  30

Glu Glu Glu Glu Gly Gly Cys Glu
        35                  40

<210> SEQ ID NO 76
<211> LENGTH: 123
<212> TYPE: DNA
<213> ORGANISM: Artificial Sequence
<220> FEATURE:
<223> OTHER INFORMATION: Description of Artificial Sequence: Synthetic
      polynucleotide

<400> SEQUENCE: 76
aaacggggca gaaagaaact cctgtatata ttcaaacaac catttatgag accagtacaa     60
actactcaag aggaagatgg ctgtagctgc cgatttccag aagaagaaga aggaggatgt    120
gaa                                                                  123

<210> SEQ ID NO 77
<211> LENGTH: 41
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 77

Arg Ser Lys Arg Ser Arg Leu Leu His Ser Asp Tyr Met Asn Met Thr
1               5                   10                  15

Pro Arg Arg Pro Gly Pro Thr Arg Lys His Tyr Gln Pro Tyr Ala Pro
            20                  25                  30

```
Pro Arg Asp Phe Ala Ala Tyr Arg Ser
        35                  40
```

<210> SEQ ID NO 78
<211> LENGTH: 123
<212> TYPE: DNA
<213> ORGANISM: Artificial Sequence
<220> FEATURE:
<223> OTHER INFORMATION: Description of Artificial Sequence: Synthetic
      polynucleotide

<400> SEQUENCE: 78

```
aggagtaaga ggagcaggct cctgcacagt gactacatga acatgactcc ccgccgcccc      60
gggcccaccc gcaagcatta ccagccctat gccccaccac gcgacttcgc agcctatcgc     120
tcc                                                                   123
```

<210> SEQ ID NO 79
<211> LENGTH: 22
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 79

```
Met Leu Leu Leu Val Thr Ser Leu Leu Leu Cys Glu Leu Pro His Pro
1               5                   10                  15

Ala Phe Leu Leu Ile Pro
            20
```

<210> SEQ ID NO 80
<211> LENGTH: 19
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 80

```
Met Glu Trp Thr Trp Val Phe Leu Phe Leu Leu Ser Val Thr Ala Gly
1               5                   10                  15

Val His Ser
```

<210> SEQ ID NO 81
<211> LENGTH: 21
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 81

```
Met Ala Leu Pro Val Thr Ala Leu Leu Leu Pro Leu Ala Leu Leu Leu
1               5                   10                  15

His Ala Ala Arg Pro
            20
```

<210> SEQ ID NO 82
<211> LENGTH: 66
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 82

```
atgctgttat tagtgacctc tttactgctg tgtgagctgc cccacccgc tttcctcctc    60
atcccg                                                              66
```

<210> SEQ ID NO 83
<211> LENGTH: 1422
<212> TYPE: DNA
<213> ORGANISM: Artificial Sequence
<220> FEATURE:
<223> OTHER INFORMATION: Description of Artificial Sequence: Synthetic polynucleotide

<400> SEQUENCE: 83

```
caagttcagc tggtgcagag cggcgccgaa gtgaaaaagc ccggcgccag cgtgaaagtc    60
tcatgcaagg ccagcggcta ccttcacc gactactaca tccactgggt ccgacaagct   120
cccggtcaag gtttagagtg gatgggcgag atctaccccg gcagcggcaa cacctactac   180
gcccagaagt tccaaggacg tgtgaccatg actcgtgaca cctccacctc caccgtgtat   240
atggagctga gctcttttaag gtccgaggat accgctgtgt actactgcgc cagaggaaac   300
gactacgacg cttggttcgt gtactggggc caaggaacat tagtgaccgt cagctccggc   360
tccacaagcg gatccggcaa acccggtagc ggcgaaggca gcaccaaggg cgacatcgtg   420
atgacccaga gccccgattc tttagctgtg tctttaggcg agagagccac catcaactgc   480
aagtcctccc agagcttatt aaatagcggc actcgaaaaa actatttagc ttggtaccaa   540
cagaagcccg gccagccccc caagctgctc atctactggg cttccatcag agagagcggc   600
gtgcccgata gattcagcgg cagcggctcc ggcacagact tcactttaac catctcctct   660
ttacaagctg aggacgtggc cgtgtattac tgcaagcagt cctactcttt ataccccttc   720
ggccaaggaa caaagctgga gatcaaaggg tccaccacga cgccagcgcc gcgaccacca   780
acaccggcgc ccaccatcgc gtcgcagccc ctgtccctgc gcccagaggc gtgccggcca   840
gcggcgggggg gcgcagtgca cacgagggggg ctggacttcg cctgtgatat ctacatctgg   900
gcgcccttgg ccgggacttg tggggtcctt ctcctgtcac tggttatcac cctttactgc   960
aaacggggca gaaagaaact cctgtatata ttcaaacaac catttatgag accagtacaa  1020
actactcaag aggaagatgg ctgtagctgc cgatttccag aagaagaaga aggaggatgt  1080
gaactgagag tgaagttcag caggagcgca gacgcccccg cgtaccagca gggccagaac  1140
cagctctata cgagctcaa tctaggacga agagaggagt acgatgtttt ggacaagagg  1200
cgtggccggg accctgagat gggggaaag ccgagaagga agaaccctca ggaaggcctg  1260
tacaatgaac tgcagaaaga taagatggcg gaggcctaca gtgagattgg gatgaaaggc  1320
gagcgccgga ggggcaaggg gcacgatggc ctttaccagg gtctcagtac agccaccaag  1380
gacacctacg acgcccttca catgcaggcc ctgccccctc gc                    1422
```

<210> SEQ ID NO 84
<211> LENGTH: 474
<212> TYPE: PRT
<213> ORGANISM: Artificial Sequence
<220> FEATURE:
<223> OTHER INFORMATION: Description of Artificial Sequence: Synthetic polypeptide

<400> SEQUENCE: 84

```
Gln Val Gln Leu Val Gln Ser Gly Ala Glu Val Lys Lys Pro Gly Ala
1               5                   10                  15
```

-continued

```
Ser Val Lys Val Ser Cys Lys Thr Ser Gly Tyr Thr Phe Thr Asp Tyr
             20                  25                  30
Tyr Ile His Trp Val Arg Gln Ala Pro Gly Gln Gly Leu Glu Trp Met
         35                  40                  45
Gly Glu Ile Tyr Pro Gly Ser Gly Asn Thr Tyr Tyr Ala Gln Lys Phe
 50                  55                  60
Gln Gly Arg Val Thr Met Thr Ala Asp Thr Ser Thr Ser Thr Ala Tyr
 65                  70                  75                  80
Met Glu Leu Ser Ser Leu Arg Ser Glu Asp Thr Ala Val Tyr Tyr Cys
             85                  90                  95
Ala Arg Gly Asn Asp Tyr Asp Ala Trp Phe Val Tyr Trp Gly Gln Gly
            100                 105                 110
Thr Leu Val Thr Val Ser Ser Gly Ser Thr Ser Gly Ser Gly Lys Pro
            115                 120                 125
Gly Ser Gly Glu Gly Ser Thr Lys Gly Asp Ile Val Met Thr Gln Ser
130                 135                 140
Pro Asp Ser Leu Ala Val Ser Leu Gly Glu Arg Ala Thr Ile Asn Cys
145                 150                 155                 160
Lys Ser Ser Gln Ser Leu Leu Asn Ser Gly Thr Arg Lys Asn Tyr Leu
                165                 170                 175
Ala Trp Tyr Gln Gln Lys Pro Gly Gln Pro Pro Lys Leu Leu Ile Tyr
            180                 185                 190
Trp Ala Ser Ile Arg Glu Ser Gly Val Pro Asp Arg Phe Ser Gly Ser
            195                 200                 205
Gly Ser Gly Thr Asp Phe Thr Leu Thr Ile Ser Ser Leu Gln Ala Glu
210                 215                 220
Asp Val Ala Val Tyr Tyr Cys Lys Gln Ser Tyr Ser Leu Tyr Thr Phe
225                 230                 235                 240
Gly Gln Gly Thr Lys Leu Glu Ile Lys Gly Ser Thr Thr Thr Pro Ala
                245                 250                 255
Pro Arg Pro Pro Thr Pro Ala Pro Thr Ile Ala Ser Gln Pro Leu Ser
            260                 265                 270
Leu Arg Pro Glu Ala Cys Arg Pro Ala Ala Gly Gly Ala Val His Thr
            275                 280                 285
Arg Gly Leu Asp Phe Ala Cys Asp Ile Tyr Ile Trp Ala Pro Leu Ala
290                 295                 300
Gly Thr Cys Gly Val Leu Leu Leu Ser Leu Val Ile Thr Leu Tyr Cys
305                 310                 315                 320
Lys Arg Gly Arg Lys Lys Leu Leu Tyr Ile Phe Lys Gln Pro Phe Met
                325                 330                 335
Arg Pro Val Gln Thr Thr Gln Glu Glu Asp Gly Cys Ser Cys Arg Phe
            340                 345                 350
Pro Glu Glu Glu Glu Gly Gly Cys Glu Leu Arg Val Lys Phe Ser Arg
            355                 360                 365
Ser Ala Asp Ala Pro Ala Tyr Gln Gln Gly Gln Asn Gln Leu Tyr Asn
370                 375                 380
Glu Leu Asn Leu Gly Arg Arg Glu Glu Tyr Asp Val Leu Asp Lys Arg
385                 390                 395                 400
Arg Gly Arg Asp Pro Glu Met Gly Gly Lys Pro Arg Arg Lys Asn Pro
                405                 410                 415
Gln Glu Gly Leu Tyr Asn Glu Leu Gln Lys Asp Lys Met Ala Glu Ala
            420                 425                 430
Tyr Ser Glu Ile Gly Met Lys Gly Glu Arg Arg Arg Gly Lys Gly His
```

```
                435                 440                 445
Asp Gly Leu Tyr Gln Gly Leu Ser Thr Ala Thr Lys Asp Thr Tyr Asp
    450                 455                 460

Ala Leu His Met Gln Ala Leu Pro Pro Arg
465                 470
```

<210> SEQ ID NO 85
<211> LENGTH: 1422
<212> TYPE: DNA
<213> ORGANISM: Artificial Sequence
<220> FEATURE:
<223> OTHER INFORMATION: Description of Artificial Sequence: Synthetic
      polynucleotide

<400> SEQUENCE: 85

| | | |
|---|---|---|
| caagttcagc tggtgcagag cggcgccgaa gtgaaaaagc ccggcgccag cgtgaaagtc | 60 |
| tcatgcaaga cctccggcta ccttcacc gactactaca tccactgggt ccgacaagct | 120 |
| cccggccaag gtctggagtg gatgggcgag atctaccccg ctccggcaa cacctattac | 180 |
| gcccagaagt tccaaggacg tgtgaccatg acagccgaca cctccaccag caccgcctac | 240 |
| atggaactga gcagcttacg tagcgaggac accgctgtgt actactgcgc tcgtggcaac | 300 |
| gactacgacg cttggttcgt gtactgggc caaggaactc tggtgaccgt gtcctccgga | 360 |
| agcacctccg gaagcggcaa gcccggtagc ggcgaaggat ccaccaaggg cgacatcgtg | 420 |
| atgacccagt cccccgattc tttagccgtc agccttggag agagagccac catcaactgc | 480 |
| aagagcagcc agagcttatt aaactccggc actcgaaaaa actacctcgc ttggtaccag | 540 |
| cagaagcccg gtcagccccc taagctgctg atctactggg ccagcattcg tgagagcgga | 600 |
| gtgcccgaca gatttagcgg ctccggcagc ggcaccgatt tcactttaac catcagctct | 660 |
| ttacaagctg aggatgtggc cgtgtattac tgcaagcagt cctactcttt ataccccttc | 720 |
| ggccaaggaa caaagctgga gattaagggg tccaccacga cgccagcgcc gcgaccacca | 780 |
| acaccggcgc ccaccatcgc gtcgcagccc ctgtccctgc gcccagaggc gtgccggcca | 840 |
| gcggcggggg gcgcagtgca cacgagggg ctggacttcg cctgtgatat ctacatctgg | 900 |
| gcgcccttgg ccgggacttg tggggtcctt ctcctgtcac tggttatcac cctttactgc | 960 |
| aaacgggca gaaagaaact cctgtatata ttcaaacaac catttatgag accagtacaa | 1020 |
| actactcaag aggaagatgg ctgtagctgc cgatttccag aagaagaaga aggaggatgt | 1080 |
| gaactgagag tgaagttcag caggagcgca gacgccccg cgtaccagca gggccagaac | 1140 |
| cagctctata acgagctcaa tctaggacga agagaggagt acgatgtttt ggacaagagg | 1200 |
| cgtggccggg accctgagat ggggggaaag ccgagaagga agaaccctca ggaaggcctg | 1260 |
| tacaatgaac tgcagaaaga taagatggcg gaggcctaca gtgagattgg gatgaaaggc | 1320 |
| gagcgccgga ggggcaaggg gcacgatggc ctttaccagg gtctcagtac agccaccaag | 1380 |
| gacacctacg acgcccttca catgcaggcc ctgcccctc gc | 1422 |

<210> SEQ ID NO 86
<211> LENGTH: 474
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 86

Gln Val Gln Leu Val Gln Ser Gly Ala Glu Val Lys Lys Pro Gly Ala

-continued

```
1               5                   10                  15
Ser Val Lys Val Ser Cys Lys Thr Ser Gly Tyr Thr Phe Thr Asp Tyr
                20                  25                  30

Tyr Ile His Trp Val Arg Gln Ala Pro Gly Gln Gly Leu Glu Trp Met
                35                  40                  45

Gly Glu Ile Tyr Pro Gly Ser Gly Asn Thr Tyr Tyr Ala Gln Lys Phe
 50                      55                  60

Gln Gly Arg Val Thr Met Thr Ala Asp Thr Ser Thr Ser Thr Ala Tyr
 65                  70                  75                  80

Met Glu Leu Ser Ser Leu Arg Ser Glu Asp Thr Ala Val Tyr Tyr Cys
                85                  90                  95

Ala Arg Gly Asn Asp Tyr Asp Ala Trp Phe Val Tyr Trp Gly Gln Gly
                100                 105                 110

Thr Leu Val Thr Val Ser Ser Gly Ser Thr Ser Gly Ser Gly Lys Pro
                115                 120                 125

Gly Ser Gly Glu Gly Ser Thr Lys Gly Asp Ile Val Met Thr Gln Ser
 130                     135                 140

Pro Asp Ser Leu Ala Val Ser Leu Gly Glu Arg Val Thr Met Asn Cys
 145                 150                 155                 160

Lys Ser Ser Gln Ser Leu Leu Asn Ser Gly Thr Arg Lys Asn Tyr Leu
                165                 170                 175

Ala Trp Tyr Gln Gln Lys Pro Gly Gln Pro Pro Lys Leu Leu Ile Tyr
                180                 185                 190

Trp Ala Ser Ile Arg Glu Ser Gly Val Pro Asp Arg Phe Ser Gly Ser
                195                 200                 205

Gly Ser Gly Thr Asp Phe Thr Leu Thr Ile Ser Ser Val Gln Ala Glu
 210                     215                 220

Asp Val Ala Val Tyr Tyr Cys Lys Gln Ser Tyr Ser Leu Tyr Thr Phe
 225                 230                 235                 240

Gly Gln Gly Thr Lys Leu Glu Ile Lys Gly Ser Thr Thr Thr Pro Ala
                245                 250                 255

Pro Arg Pro Pro Thr Pro Ala Pro Thr Ile Ala Ser Gln Pro Leu Ser
                260                 265                 270

Leu Arg Pro Glu Ala Cys Arg Pro Ala Ala Gly Gly Ala Val His Thr
                275                 280                 285

Arg Gly Leu Asp Phe Ala Cys Asp Ile Tyr Ile Trp Ala Pro Leu Ala
                290                 295                 300

Gly Thr Cys Gly Val Leu Leu Leu Ser Leu Val Ile Thr Leu Tyr Cys
 305                     310                 315                 320

Lys Arg Gly Arg Lys Lys Leu Leu Tyr Ile Phe Lys Gln Pro Phe Met
                325                 330                 335

Arg Pro Val Gln Thr Thr Gln Glu Glu Asp Gly Cys Ser Cys Arg Phe
                340                 345                 350

Pro Glu Glu Glu Glu Gly Gly Cys Glu Leu Arg Val Lys Phe Ser Arg
                355                 360                 365

Ser Ala Asp Ala Pro Ala Tyr Gln Gln Gly Gln Asn Gln Leu Tyr Asn
                370                 375                 380

Glu Leu Asn Leu Gly Arg Arg Glu Glu Tyr Asp Val Leu Asp Lys Arg
 385                 390                 395                 400

Arg Gly Arg Asp Pro Glu Met Gly Gly Lys Pro Arg Arg Lys Asn Pro
                405                 410                 415

Gln Glu Gly Leu Tyr Asn Glu Leu Gln Lys Asp Lys Met Ala Glu Ala
                420                 425                 430
```

Tyr Ser Glu Ile Gly Met Lys Gly Glu Arg Arg Gly Lys Gly His
        435                 440                 445

Asp Gly Leu Tyr Gln Gly Leu Ser Thr Ala Thr Lys Asp Thr Tyr Asp
    450                 455                 460

Ala Leu His Met Gln Ala Leu Pro Pro Arg
465                 470

<210> SEQ ID NO 87
<211> LENGTH: 1422
<212> TYPE: DNA
<213> ORGANISM: Artificial Sequence
<220> FEATURE:
<223> OTHER INFORMATION: Description of Artificial Sequence: Synthetic
      polynucleotide

<400> SEQUENCE: 87

| | |
|---|---|
| caagttcagc tggtgcagtc cggagccgag gtcaagaagc ccggagccag cgtgaaagtc | 60 |
| tcatgtaaaa ccagcggcta caccttcacc gactactaca tccactgggt ccgacaagcc | 120 |
| cccggtcaag gtttagagtg gatgggcgag atctaccccg gctccggcaa cacctactac | 180 |
| gcccagaagt tccaaggtcg tgtgaccatg acagccgaca ccagcacctc caccgcctac | 240 |
| atggaactgt cctctctgcg ttctgaggac acagccgttt actactgcgc cagaggcaac | 300 |
| gactacgacg cttggttcgt gtactggggc caaggaacat tagtgaccgt gcctccgga | 360 |
| tccacatccg gcagcggaaa gcccggtagc ggcgagggca gcaccaaagg agacatcgtc | 420 |
| atgacccaga gccccgattc tttagccgtg tctttaggcg aaagagtgac catgaactgc | 480 |
| aagtccagcc agtcttttact gaattccggc actcgaaaaa actatttagc ttggtaccag | 540 |
| cagaaacccg gccagccccc taagctgctg atctactggg ctagcattcg agaatccggc | 600 |
| gtgcccgatc gctttagcgg cagcggtagc ggcaccgact tactttaac catcagcagc | 660 |
| gtgcaagctg aggacgtggc tgtgtactat tgcaagcagt cctactcttt atacaccttc | 720 |
| ggccaaggaa caaagctgga gatcaagggg tccaccacga cgccagcgcc gcgaccacca | 780 |
| acaccggcgc ccaccatcgc gtcgcagccc ctgtccctgc gcccagaggc gtgcggcca | 840 |
| gcggcggggg gcgcagtgca cacgagggg ctggacttcg cctgtgatat ctacatctgg | 900 |
| gcgcccttgg ccgggacttg tggggtcctt ctcctgtcac tggttatcac cctttactgc | 960 |
| aaacggggca gaaagaaact cctgtatata ttcaaacaac catttatgag accagtacaa | 1020 |
| actactcaag aggaagatgg ctgtagctgc cgatttccag aagaagaaga aggaggatgt | 1080 |
| gaactgagag tgaagttcag caggagcgca gacgcccccg cgtaccagca gggccagaac | 1140 |
| cagctctata cgagctcaa tctaggacga agagaggagt acgatgtttt ggacaagagg | 1200 |
| cgtggccggg accctgagat ggggggaaag ccgagaagga agaaccctca ggaaggcctg | 1260 |
| tacaatgaac tgcagaaaga taagatggcg gaggcctaca gtgagattgg gatgaaaggc | 1320 |
| gagcgccgga ggggcaaggg gcacgatggc ctttaccagg gtctcagtac agccaccaag | 1380 |
| gacacctacg acgccttca catgcaggcc ctgccccctc gc | 1422 |

<210> SEQ ID NO 88
<211> LENGTH: 474
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 88

-continued

```
Gln Val Gln Leu Val Gln Ser Gly Ala Glu Lys Pro Gly Ala
1               5                   10                  15

Ser Val Lys Val Ser Cys Lys Thr Ser Gly Tyr Thr Phe Thr Asp Tyr
            20                  25                  30

Tyr Ile His Trp Val Arg Gln Ala Pro Gly Gln Gly Leu Glu Trp Ile
        35                  40                  45

Gly Glu Ile Tyr Pro Gly Ser Gly Asn Thr Tyr Ala Gln Lys Phe
    50                  55                  60

Gln Gly Arg Ala Thr Leu Thr Ala Asp Thr Ser Thr Ser Thr Ala Tyr
65                  70                  75                  80

Met Glu Phe Ser Ser Leu Arg Ser Glu Asp Thr Ala Val Tyr Tyr Cys
                85                  90                  95

Ala Arg Gly Asn Asp Tyr Asp Ala Trp Phe Val Tyr Trp Gly Gln Gly
                100                 105                 110

Thr Leu Val Thr Val Ser Ser Gly Ser Thr Ser Gly Ser Gly Lys Pro
            115                 120                 125

Gly Ser Gly Glu Gly Ser Thr Lys Gly Asp Ile Val Met Thr Gln Ser
    130                 135                 140

Pro Asp Ser Leu Ala Val Ser Leu Gly Glu Arg Ala Thr Ile Asn Cys
145                 150                 155                 160

Lys Ser Ser Gln Ser Leu Leu Asn Ser Gly Thr Arg Lys Asn Tyr Leu
                165                 170                 175

Ala Trp Tyr Gln Gln Lys Pro Gly Gln Pro Pro Lys Leu Leu Ile Tyr
                180                 185                 190

Trp Ala Ser Ile Arg Glu Ser Gly Val Pro Asp Arg Phe Ser Gly Ser
            195                 200                 205

Gly Ser Gly Thr Asp Phe Thr Leu Thr Ile Ser Ser Leu Gln Ala Glu
    210                 215                 220

Asp Val Ala Val Tyr Tyr Cys Lys Gln Ser Tyr Ser Leu Tyr Thr Phe
225                 230                 235                 240

Gly Gln Gly Thr Lys Leu Glu Ile Lys Gly Ser Thr Thr Thr Pro Ala
                245                 250                 255

Pro Arg Pro Pro Thr Pro Ala Pro Thr Ile Ala Ser Gln Pro Leu Ser
                260                 265                 270

Leu Arg Pro Glu Ala Cys Arg Pro Ala Ala Gly Gly Ala Val His Thr
                275                 280                 285

Arg Gly Leu Asp Phe Ala Cys Asp Ile Tyr Ile Trp Ala Pro Leu Ala
                290                 295                 300

Gly Thr Cys Gly Val Leu Leu Leu Ser Leu Val Ile Thr Leu Tyr Cys
305                 310                 315                 320

Lys Arg Gly Arg Lys Lys Leu Leu Tyr Ile Phe Lys Gln Pro Phe Met
                325                 330                 335

Arg Pro Val Gln Thr Thr Gln Glu Glu Asp Gly Cys Ser Cys Arg Phe
                340                 345                 350

Pro Glu Glu Glu Glu Gly Gly Cys Glu Leu Arg Val Lys Phe Ser Arg
                355                 360                 365

Ser Ala Asp Ala Pro Ala Tyr Gln Gln Gly Gln Asn Gln Leu Tyr Asn
                370                 375                 380

Glu Leu Asn Leu Gly Arg Arg Glu Glu Tyr Asp Val Leu Asp Lys Arg
385                 390                 395                 400

Arg Gly Arg Asp Pro Glu Met Gly Gly Lys Pro Arg Arg Lys Asn Pro
                            405                 410                 415
```

```
Gln Glu Gly Leu Tyr Asn Glu Leu Gln Lys Asp Lys Met Ala Glu Ala
            420                 425                 430

Tyr Ser Glu Ile Gly Met Lys Gly Glu Arg Arg Gly Lys Gly His
        435                 440                 445

Asp Gly Leu Tyr Gln Gly Leu Ser Thr Ala Thr Lys Asp Thr Tyr Asp
450                 455                 460

Ala Leu His Met Gln Ala Leu Pro Pro Arg
465                 470
```

<210> SEQ ID NO 89
<211> LENGTH: 1422
<212> TYPE: DNA
<213> ORGANISM: Artificial Sequence
<220> FEATURE:
<223> OTHER INFORMATION: Description of Artificial Sequence: Synthetic polynucleotide

<400> SEQUENCE: 89

| | | | | |
|---|---|---|---|---|
| caagttcagc tggtgcagag cggcgctgag gtgaagaagc ccggtgcctc cgtgaaggtg | | | | 60 |
| tcttgtaaga ccagcggcta caccttcacc gactactaca tccactgggt ccgacaagct | | | | 120 |
| cccggtcaag gtttagagtg gattggcgag atctatcccg gcagcggcaa cacctactac | | | | 180 |
| gcccagaagt tccaaggacg tgccacttta accgctgaca ccagcaccag caccgcctac | | | | 240 |
| atggagttct cctctttaag gagcgaggac accgccgtgt attactgcgc tcgtggcaac | | | | 300 |
| gactatgacg cttggttcgt gtactggggt caaggaacat tagtgacagt gagcagcgga | | | | 360 |
| tccaccagcg gatccggcaa gcccggtagc ggagaaggca gcaccaaggg cgacatcgtg | | | | 420 |
| atgacccaga gccccgattc tttagctgtg agccttggag agagggccac catcaactgc | | | | 480 |
| aagtcctccc agtctttact gaacagcggc actcgaaaaa actatttagc ttggtaccag | | | | 540 |
| cagaaacccg gccagccccc taagctgctg atctactggg cctccattcg tgaaagcggc | | | | 600 |
| gtgcccgata gattcagcgg cagcggctcc ggaaccgact ttactttaac catctcctct | | | | 660 |
| ttacaagctg aggacgtggc tgtgtactac tgcaagcaga gctactcttt atacaccttc | | | | 720 |
| ggccaaggaa caaagctgga aatcaaggg tccaccacga cgccagcgcc gcgaccacca | | | | 780 |
| acaccggcgc ccaccatcgc gtcgcagccc ctgtccctgc gcccagaggc gtgccggcca | | | | 840 |
| gcggcggggg gcgcagtgca cacgagggg ctggacttcg cctgtgatat ctacatctgg | | | | 900 |
| gcgcccttgg ccgggacttg tggggtcctt ctcctgtcac tggttatcac cctttactgc | | | | 960 |
| aaacggggca gaaagaaact cctgtatata ttcaaacaac catttatgag accagtacaa | | | | 1020 |
| actactcaag aggaagatgg ctgtagctgc cgatttccag aagaagaaga aggaggatgt | | | | 1080 |
| gaactgagag tgaagttcag caggagcgca gacgcccccg cgtaccagca gggccagaac | | | | 1140 |
| cagctctata acgagctcaa tctaggacga agagaggagt acgatgtttt ggacaagagg | | | | 1200 |
| cgtggccggg accctgagat ggggggaaag ccgagaagga agaaccctca ggaaggcctg | | | | 1260 |
| tacaatgaac tgcagaaaga taagatggcg gaggcctaca gtgagattgg gatgaaaggc | | | | 1320 |
| gagcgccgga ggggcaaggg gcacgatggc ctttaccagg gtctcagtac agccaccaag | | | | 1380 |
| gacacctacg acgccttca catgcaggcc ctgccccctc gc | | | | 1422 |

<210> SEQ ID NO 90
<211> LENGTH: 473
<212> TYPE: PRT
<213> ORGANISM: Artificial Sequence
<220> FEATURE:
<223> OTHER INFORMATION: Description of Artificial Sequence: Synthetic polypeptide

```
<400> SEQUENCE: 90

Val Gln Leu Val Gln Ser Gly Ala Glu Val Lys Lys Pro Gly Ala Ser
1               5                   10                  15

Val Lys Val Ser Cys Lys Thr Ser Gly Tyr Thr Phe Thr Asp Tyr Tyr
            20                  25                  30

Ile His Trp Val Arg Gln Ala Pro Gly Gln Gly Leu Glu Trp Ile Gly
        35                  40                  45

Glu Ile Tyr Pro Gly Ser Gly Asn Thr Tyr Tyr Ala Gln Lys Phe Gln
    50                  55                  60

Gly Arg Ala Thr Leu Thr Ala Asp Thr Ser Thr Ser Thr Ala Tyr Met
65                  70                  75                  80

Glu Phe Ser Ser Leu Arg Ser Glu Asp Thr Ala Val Tyr Tyr Cys Ala
                85                  90                  95

Arg Gly Asn Asp Tyr Asp Ala Trp Phe Val Tyr Trp Gly Gln Gly Thr
            100                 105                 110

Leu Val Thr Val Ser Ser Gly Ser Thr Gly Ser Gly Lys Pro Gly
        115                 120                 125

Ser Gly Glu Gly Ser Thr Lys Gly Asp Ile Val Met Thr Gln Ser Pro
130                 135                 140

Asp Ser Leu Ala Val Ser Leu Gly Glu Arg Val Thr Met Asn Cys Lys
145                 150                 155                 160

Ser Ser Gln Ser Leu Leu Asn Ser Gly Thr Arg Lys Asn Tyr Leu Ala
                165                 170                 175

Trp Tyr Gln Gln Lys Pro Gly Gln Pro Pro Lys Leu Leu Ile Tyr Trp
            180                 185                 190

Ala Ser Ile Arg Glu Ser Gly Val Pro Asp Arg Phe Ser Gly Ser Gly
        195                 200                 205

Ser Gly Thr Asp Phe Thr Leu Thr Ile Ser Ser Val Gln Ala Glu Asp
    210                 215                 220

Val Ala Val Tyr Tyr Cys Lys Gln Ser Tyr Ser Leu Tyr Thr Phe Gly
225                 230                 235                 240

Gln Gly Thr Lys Leu Glu Ile Lys Gly Ser Thr Thr Thr Pro Ala Pro
                245                 250                 255

Arg Pro Pro Thr Pro Ala Pro Thr Ile Ala Ser Gln Pro Leu Ser Leu
            260                 265                 270

Arg Pro Glu Ala Cys Arg Pro Ala Ala Gly Gly Ala Val His Thr Arg
        275                 280                 285

Gly Leu Asp Phe Ala Cys Asp Ile Tyr Ile Trp Ala Pro Leu Ala Gly
    290                 295                 300

Thr Cys Gly Val Leu Leu Leu Ser Leu Val Ile Thr Leu Tyr Cys Lys
305                 310                 315                 320

Arg Gly Arg Lys Lys Leu Leu Tyr Ile Phe Lys Gln Pro Phe Met Arg
                325                 330                 335

Pro Val Gln Thr Thr Gln Glu Glu Asp Gly Cys Ser Cys Arg Phe Pro
            340                 345                 350

Glu Glu Glu Glu Gly Gly Cys Glu Leu Arg Val Lys Phe Ser Arg Ser
        355                 360                 365

Ala Asp Ala Pro Ala Tyr Gln Gln Gly Gln Asn Gln Leu Tyr Asn Glu
    370                 375                 380

Leu Asn Leu Gly Arg Arg Glu Glu Tyr Asp Val Leu Asp Lys Arg Arg
385                 390                 395                 400

Gly Arg Asp Pro Glu Met Gly Gly Lys Pro Arg Arg Lys Asn Pro Gln
```

```
                    405                 410                 415
Glu Gly Leu Tyr Asn Glu Leu Gln Lys Asp Lys Met Ala Glu Ala Tyr
            420                 425                 430

Ser Glu Ile Gly Met Lys Gly Glu Arg Arg Gly Lys Gly His Asp
        435                 440                 445

Gly Leu Tyr Gln Gly Leu Ser Thr Ala Thr Lys Asp Thr Tyr Asp Ala
    450                 455                 460

Leu His Met Gln Ala Leu Pro Pro Arg
465                 470

<210> SEQ ID NO 91
<211> LENGTH: 1422
<212> TYPE: DNA
<213> ORGANISM: Artificial Sequence
<220> FEATURE:
<223> OTHER INFORMATION: Description of Artificial Sequence: Synthetic
      polynucleotide

<400> SEQUENCE: 91
caagttcagc tggtccagag cggcgctgaa gtgaagaagc cggcgctag cgtcaaagtc       60 tcatgcaaaa cctccggcta ccctttacc gactactaca tccactgggt ccgacaagct     120
cccggtcaag gtctggagtg gatcggcgag atctaccccg gcagcggcaa cacctactac     180
gcccagaagt tccaaggacg tgccactta accgctgaca ccagcacctc caccgcctac     240
atggagttca gctcttaag gtccgaggac accgccgtgt actactgcgc tcgtggcaac     300
gattacgacg cttggttcgt gtactgggga caaggaacat tagtgaccgt gtccagcggc     360
agcacaagcg gaagcggcaa gcccggtagc ggcgagggaa gcaccaaggg cgatatcgtg     420
atgacccaga gccccgattc tttagccgtg tctttaggag agagtgac catgaactgc     480 aagagcagcc agtctttact gaacagcggc accagaaaga actatttagc ttggtaccag     540
cagaagcccg gccagcctcc caagctgctg atctactggg ccagcattcg tgagagcgga     600
gtgcccgaca gattcagcgg cagcggctcc ggcaccgact tactttaac catcagcagc     660 gtgcaagctg aggatgtggc cgtgtattac tgcaagcagt cctactcttt atacaccttt     720
ggccaaggaa caaagctgga gatcaaaggg tccaccacga cgccagcgcc gcgaccacca     780
acaccggcgc ccaccatcgc gtcgcagccc ctgtccctgc gcccagaggc gtgccggcca     840
gcggcggggg gcgcagtgca cacgaggggg ctggacttcg cctgtgatat ctacatctgg     900
gcgcccttgg ccgggacttg tggggtcctt ctcctgtcac tggttatcac cctttactgc     960
aaacggggca gaaagaaact cctgtatata ttcaaacaac catttatgag accagtacaa    1020
actactcaag aggaagatgg ctgtagctgc cgatttccag aagaagaaga aggaggatgt    1080
gaactgagag tgaagttcag caggagcgca gacgcccccg cgtaccagca gggccagaac    1140
cagctctata cgagctcaa tctaggacga agagaggagt acgatgtttt ggacaagagg    1200
cgtggccggg accctgagat gggggaaag ccgagaagga agaaccctca ggaaggcctg    1260
tacaatgaac tgcagaaaga taagatggcg gaggcctaca gtgagattgg gatgaaaggc    1320
gagcgccgga ggggcaaggg gcacgatggc ctttaccagg gtctcagtac agccaccaag    1380
gacacctacg acgccttca catgcaggcc ctgccccctc gc                       1422

<210> SEQ ID NO 92
<211> LENGTH: 33
<212> TYPE: PRT
<213> ORGANISM: Artificial Sequence
<220> FEATURE:
```

<223> OTHER INFORMATION: Description of Artificial Sequence: Synthetic
      polypeptide

<400> SEQUENCE: 92

Met Glu Ala Ala Val Ala Ala Pro Arg Pro Arg Leu Leu Leu Leu Val
1               5                   10                  15

Leu Ala Ala Ala Ala Ala Ala Ala Ala Leu Leu Pro Gly Ala Thr
            20                  25                  30

Ala

<210> SEQ ID NO 93
<211> LENGTH: 126
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 93

Met Glu Ala Ala Val Ala Ala Pro Arg Pro Arg Leu Leu Leu Leu Val
1               5                   10                  15

Leu Ala Ala Ala Ala Ala Ala Ala Ala Leu Leu Pro Gly Ala Thr
            20                  25                  30

Ala Leu Gln Cys Phe Cys His Leu Cys Thr Lys Asp Asn Phe Thr Cys
        35                  40                  45

Val Thr Asp Gly Leu Cys Phe Val Ser Val Thr Glu Thr Thr Asp Lys
    50                  55                  60

Val Ile His Asn Ser Met Cys Ile Ala Glu Ile Asp Leu Ile Pro Arg
65                  70                  75                  80

Asp Arg Pro Phe Val Cys Ala Pro Ser Ser Lys Thr Gly Ser Val Thr
                85                  90                  95

Thr Thr Tyr Cys Cys Asn Gln Asp His Cys Asn Lys Ile Glu Leu Pro
            100                 105                 110

Thr Thr Val Lys Ser Ser Pro Gly Leu Gly Pro Val Glu Leu
            115                 120                 125

<210> SEQ ID NO 94
<211> LENGTH: 22
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 94

Met Gly Arg Gly Leu Leu Arg Gly Leu Trp Pro Leu His Ile Val Leu
1               5                   10                  15

Trp Thr Arg Ile Ala Ser
            20

<210> SEQ ID NO 95
<211> LENGTH: 32
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 95

Met Leu Leu Leu Val Thr Ser Leu Leu Leu Cys Glu Leu Pro His Pro
1               5                   10                  15

Ala Phe Leu Leu Ile Pro Glu Gln Lys Leu Ile Ser Glu Glu Asp Leu
                20                  25                  30

<210> SEQ ID NO 96
<211> LENGTH: 96
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 96
atgcttctcc tggtgacaag ccttctgctc tgtgagttac cacacccagc attcctcctg      60
attcctgaac agaagctgat aagtgaggag gacttg                               96

<210> SEQ ID NO 97
<211> LENGTH: 152
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 97

Met Glu Ala Ala Val Ala Ala Pro Arg Pro Arg Leu Leu Leu Leu Val
1               5                   10                  15

Leu Ala Ala Ala Ala Ala Ala Ala Ala Leu Leu Pro Gly Ala Thr
                20                  25                  30

Ala Leu Gln Cys Phe Cys His Leu Cys Thr Lys Asp Asn Phe Thr Cys
            35                  40                  45

Val Thr Asp Gly Leu Cys Phe Val Ser Val Thr Glu Thr Thr Asp Lys
    50                  55                  60

Val Ile His Asn Ser Met Cys Ile Ala Glu Ile Asp Leu Ile Pro Arg
65                  70                  75                  80

Asp Arg Pro Phe Val Cys Ala Pro Ser Ser Lys Thr Gly Ser Val Thr
                85                  90                  95

Thr Thr Tyr Cys Cys Asn Gln Asp His Cys Asn Lys Ile Glu Leu Pro
            100                 105                 110

Thr Thr Val Lys Ser Ser Pro Gly Leu Gly Pro Val Glu Leu Ala Ala
        115                 120                 125

Val Ile Ala Gly Pro Val Cys Phe Val Cys Ile Ser Leu Met Leu Met
    130                 135                 140

Val Tyr Ile Arg Val Asn Arg Gln
145                 150

<210> SEQ ID NO 98
<211> LENGTH: 194
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 98

Met Gly Arg Gly Leu Leu Arg Gly Leu Trp Pro Leu His Ile Val Leu
1               5                   10                  15

Trp Thr Arg Ile Ala Ser Thr Ile Pro Pro His Val Gln Lys Ser Val
                20                  25                  30

Asn Asn Asp Met Ile Val Thr Asp Asn Asn Gly Ala Val Lys Phe Pro
            35                  40                  45

-continued

Gln Leu Cys Lys Phe Cys Asp Val Arg Phe Ser Cys Asp Asn Gln
    50                  55                  60

Lys Ser Cys Met Ser Asn Cys Ser Ile Thr Ser Ile Cys Glu Lys Pro
 65                  70                  75                  80

Gln Glu Val Cys Val Ala Val Trp Arg Lys Asn Asp Glu Asn Ile Thr
                 85                  90                  95

Leu Glu Thr Val Cys His Asp Pro Lys Leu Pro Tyr His Asp Phe Ile
                100                 105                 110

Leu Glu Asp Ala Ala Ser Pro Lys Cys Ile Met Lys Glu Lys Lys
                115                 120                 125

Pro Gly Glu Thr Phe Phe Met Cys Ser Cys Ser Ser Asp Glu Cys Asn
130                 135                 140

Asp Asn Ile Ile Phe Ser Glu Glu Tyr Asn Thr Ser Asn Pro Asp Leu
145                 150                 155                 160

Leu Leu Val Ile Phe Gln Val Thr Gly Ile Ser Leu Leu Pro Pro Leu
                165                 170                 175

Gly Val Ala Ile Ser Val Ile Ile Phe Tyr Cys Tyr Arg Val Asn
                180                 185                 190

Arg Gln

<210> SEQ ID NO 99
<211> LENGTH: 137
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 99

Thr Ile Pro Pro His Val Gln Lys Ser Val Asn Asn Asp Met Ile Val
 1               5                  10                  15

Thr Asp Asn Asn Gly Ala Val Lys Phe Pro Gln Leu Cys Lys Phe Cys
                20                  25                  30

Asp Val Arg Phe Ser Thr Cys Asp Asn Gln Lys Ser Cys Met Ser Asn
                35                  40                  45

Cys Ser Ile Thr Ser Ile Cys Glu Lys Pro Gln Glu Val Cys Val Ala
 50                  55                  60

Val Trp Arg Lys Asn Asp Glu Asn Ile Thr Leu Glu Thr Val Cys His
 65                  70                  75                  80

Asp Pro Lys Leu Pro Tyr His Asp Phe Ile Leu Glu Asp Ala Ala Ser
                 85                  90                  95

Pro Lys Cys Ile Met Lys Glu Lys Lys Lys Pro Gly Glu Thr Phe Phe
                100                 105                 110

Met Cys Ser Cys Ser Ser Asp Glu Cys Asn Asp Asn Ile Ile Phe Ser
                115                 120                 125

Glu Glu Tyr Asn Thr Ser Asn Pro Asp
            130                 135

<210> SEQ ID NO 100
<211> LENGTH: 167
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 100

Thr Ile Pro Pro His Val Gln Lys Ser Val Asn Asn Asp Met Ile Val

```
                1               5                  10                 15
            Thr Asp Asn Asn Gly Ala Val Lys Phe Pro Gln Leu Cys Lys Phe Cys
                            20                 25                 30

Asp Val Arg Phe Ser Thr Cys Asp Asn Gln Lys Ser Cys Met Ser Asn
                        35                 40                 45

Cys Ser Ile Thr Ser Ile Cys Glu Lys Pro Gln Glu Val Cys Val Ala
                    50                 55                 60

Val Trp Arg Lys Asn Asp Glu Asn Ile Thr Leu Glu Thr Val Cys His
             65                 70                 75                 80

Asp Pro Lys Leu Pro Tyr His Asp Phe Ile Leu Glu Asp Ala Ala Ser
                            85                 90                 95

Pro Lys Cys Ile Met Lys Glu Lys Lys Pro Gly Glu Thr Phe Phe
                        100                105                110

Met Cys Ser Cys Ser Ser Asp Glu Cys Asn Asp Asn Ile Ile Phe Ser
                        115                120                125

Glu Glu Tyr Asn Thr Ser Asn Pro Asp Leu Leu Leu Val Ile Phe Gln
                        130                135                140

Val Thr Gly Ile Ser Leu Leu Pro Pro Leu Gly Val Ala Ile Ser Val
             145                150                155                160

Ile Ile Ile Phe Tyr Cys Tyr
                            165
```

<210> SEQ ID NO 101
<211> LENGTH: 159
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 101

```
            Thr Ile Pro Pro His Val Gln Lys Ser Val Asn Asn Asp Met Ile Val
             1               5                  10                 15

Thr Asp Asn Asn Gly Ala Val Lys Phe Pro Gln Leu Cys Lys Phe Cys
                            20                 25                 30

Asp Val Arg Phe Ser Thr Cys Asp Asn Gln Lys Ser Cys Met Ser Asn
                        35                 40                 45

Cys Ser Ile Thr Ser Ile Cys Glu Lys Pro Gln Glu Val Cys Val Ala
                    50                 55                 60

Val Trp Arg Lys Asn Asp Glu Asn Ile Thr Leu Glu Thr Val Cys His
             65                 70                 75                 80

Asp Pro Lys Leu Pro Tyr His Asp Phe Ile Leu Glu Asp Ala Ala Ser
                            85                 90                 95

Pro Lys Cys Ile Met Lys Glu Lys Lys Pro Gly Glu Thr Phe Phe
                        100                105                110

Met Cys Ser Cys Ser Ser Asp Glu Cys Asn Asp Asn Ile Ile Phe Ser
                        115                120                125

Glu Glu Tyr Asn Thr Ser Asn Pro Asp Ser Gly Pro Ile Leu Leu Thr
                        130                135                140

Ile Ser Ile Leu Ser Phe Phe Ser Val Ala Leu Leu Val Ile Leu
             145                150                155
```

<210> SEQ ID NO 102
<211> LENGTH: 162
<212> TYPE: PRT
<213> ORGANISM: Artificial Sequence
<220> FEATURE:

<223> OTHER INFORMATION: Description of Artificial Sequence: Synthetic
       polypeptide

<400> SEQUENCE: 102

```
Thr Ile Pro Pro His Val Gln Lys Ser Val Asn Asn Asp Met Ile Val
1               5                   10                  15

Thr Asp Asn Asn Gly Ala Val Lys Phe Pro Gln Leu Cys Lys Phe Cys
            20                  25                  30

Asp Val Arg Phe Ser Thr Cys Asp Asn Gln Lys Ser Cys Met Ser Asn
        35                  40                  45

Cys Ser Ile Thr Ser Ile Cys Glu Lys Pro Gln Glu Val Cys Val Ala
    50                  55                  60

Val Trp Arg Lys Asn Asp Glu Asn Ile Thr Leu Glu Thr Val Cys His
65                  70                  75                  80

Asp Pro Lys Leu Pro Tyr His Asp Phe Ile Leu Glu Asp Ala Ala Ser
                85                  90                  95

Pro Lys Cys Ile Met Lys Glu Lys Lys Lys Pro Gly Glu Thr Phe Phe
            100                 105                 110

Met Cys Ser Cys Ser Ser Asp Glu Cys Asn Asp Asn Ile Ile Phe Ser
        115                 120                 125

Glu Glu Tyr Asn Thr Ser Asn Pro Asp Ser Gly Pro Ile Leu Leu Thr
    130                 135                 140

Cys Pro Thr Ile Ser Ile Leu Ser Phe Phe Ser Val Ala Leu Leu Val
145                 150                 155                 160

Ile Leu
```

<210> SEQ ID NO 103
<211> LENGTH: 200
<212> TYPE: PRT
<213> ORGANISM: Artificial Sequence
<220> FEATURE:
<223> OTHER INFORMATION: Description of Artificial Sequence: Synthetic
       polypeptide

<400> SEQUENCE: 103

```
Ala Cys Val Leu Trp Lys Lys Arg Ile Lys Pro Ile Val Trp Pro Ser
1               5                   10                  15

Leu Pro Asp His Lys Lys Thr Leu Glu His Leu Cys Lys Lys Pro Arg
            20                  25                  30

Lys Asn Leu Asn Val Ser Phe Asn Pro Glu Ser Phe Leu Asp Cys Gln
        35                  40                  45

Ile His Arg Val Asp Asp Ile Gln Ala Arg Asp Glu Val Glu Gly Phe
    50                  55                  60

Leu Gln Asp Thr Phe Pro Gln Gln Leu Glu Glu Ser Glu Lys Gln Arg
65                  70                  75                  80

Leu Gly Gly Asp Val Gln Ser Pro Asn Cys Pro Ser Glu Asp Val Val
                85                  90                  95

Ile Thr Pro Glu Ser Phe Gly Arg Asp Ser Ser Leu Thr Cys Leu Ala
            100                 105                 110

Gly Asn Val Ser Ala Cys Asp Ala Pro Ile Leu Ser Ser Ser Arg Ser
        115                 120                 125

Leu Asp Cys Arg Glu Ser Gly Lys Asn Gly Pro His Val Tyr Gln Asp
    130                 135                 140

Leu Leu Leu Ser Leu Gly Thr Thr Asn Ser Thr Leu Pro Pro Pro Phe
145                 150                 155                 160

Ser Leu Gln Ser Gly Ile Leu Thr Leu Asn Pro Val Ala Gln Gly Gln
```

```
                165                 170                 175
Pro Ile Leu Thr Ser Leu Gly Ser Asn Gln Glu Glu Ala Tyr Val Thr
            180                 185                 190

Met Ser Ser Phe Tyr Gln Asn Gln
        195                 200

<210> SEQ ID NO 104
<211> LENGTH: 359
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 104

Thr Ile Pro Pro His Val Gln Lys Ser Val Asn Asn Asp Met Ile Val
1               5                   10                  15

Thr Asp Asn Asn Gly Ala Val Lys Phe Pro Gln Leu Cys Lys Phe Cys
            20                  25                  30

Asp Val Arg Phe Ser Thr Cys Asp Asn Gln Lys Ser Cys Met Ser Asn
        35                  40                  45

Cys Ser Ile Thr Ser Ile Cys Glu Lys Pro Gln Glu Val Cys Val Ala
    50                  55                  60

Val Trp Arg Lys Asn Asp Glu Asn Ile Thr Leu Glu Thr Val Cys His
65                  70                  75                  80

Asp Pro Lys Leu Pro Tyr His Asp Phe Ile Leu Glu Asp Ala Ala Ser
                85                  90                  95

Pro Lys Cys Ile Met Lys Glu Lys Lys Pro Gly Glu Thr Phe Phe
            100                 105                 110

Met Cys Ser Cys Ser Ser Asp Glu Cys Asn Asp Asn Ile Ile Phe Ser
        115                 120                 125

Glu Glu Tyr Asn Thr Ser Asn Pro Asp Ser Gly Pro Ile Leu Leu Thr
    130                 135                 140

Ile Ser Ile Leu Ser Phe Phe Ser Val Ala Leu Leu Val Ile Leu Ala
145                 150                 155                 160

Cys Val Leu Trp Lys Lys Arg Ile Lys Pro Ile Val Trp Pro Ser Leu
                165                 170                 175

Pro Asp His Lys Lys Thr Leu Glu His Leu Cys Lys Lys Pro Arg Lys
            180                 185                 190

Asn Leu Asn Val Ser Phe Asn Pro Glu Ser Phe Leu Asp Cys Gln Ile
        195                 200                 205

His Arg Val Asp Asp Ile Gln Ala Arg Asp Glu Val Glu Gly Phe Leu
    210                 215                 220

Gln Asp Thr Phe Pro Gln Gln Leu Glu Glu Ser Glu Lys Gln Arg Leu
225                 230                 235                 240

Gly Gly Asp Val Gln Ser Pro Asn Cys Pro Ser Glu Asp Val Val Ile
                245                 250                 255

Thr Pro Glu Ser Phe Gly Arg Asp Ser Ser Leu Thr Cys Leu Ala Gly
            260                 265                 270

Asn Val Ser Ala Cys Asp Ala Pro Ile Leu Ser Ser Ser Arg Ser Leu
        275                 280                 285

Asp Cys Arg Glu Ser Gly Lys Asn Gly Pro His Val Tyr Gln Asp Leu
    290                 295                 300

Leu Leu Ser Leu Gly Thr Thr Asn Ser Thr Leu Pro Pro Pro Phe Ser
305                 310                 315                 320
```

```
Leu Gln Ser Gly Ile Leu Thr Leu Asn Pro Val Ala Gln Gly Gln Pro
                325                 330                 335

Ile Leu Thr Ser Leu Gly Ser Asn Gln Glu Glu Ala Tyr Val Thr Met
            340                 345                 350

Ser Ser Phe Tyr Gln Asn Gln
        355

<210> SEQ ID NO 105
<211> LENGTH: 362
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 105

Thr Ile Pro Pro His Val Gln Lys Ser Val Asn Asn Asp Met Ile Val
1               5                   10                  15

Thr Asp Asn Asn Gly Ala Val Lys Phe Pro Gln Leu Cys Lys Phe Cys
            20                  25                  30

Asp Val Arg Phe Ser Thr Cys Asp Asn Gln Lys Ser Cys Met Ser Asn
        35                  40                  45

Cys Ser Ile Thr Ser Ile Cys Glu Lys Pro Gln Glu Val Cys Val Ala
    50                  55                  60

Val Trp Arg Lys Asn Asp Glu Asn Ile Thr Leu Glu Thr Val Cys His
65                  70                  75                  80

Asp Pro Lys Leu Pro Tyr His Asp Phe Ile Leu Glu Asp Ala Ala Ser
                85                  90                  95

Pro Lys Cys Ile Met Lys Glu Lys Lys Lys Pro Gly Glu Thr Phe Phe
            100                 105                 110

Met Cys Ser Cys Ser Ser Asp Glu Cys Asn Asp Asn Ile Ile Phe Ser
        115                 120                 125

Glu Glu Tyr Asn Thr Ser Asn Pro Asp Ser Gly Pro Ile Leu Leu Thr
    130                 135                 140

Cys Pro Thr Ile Ser Ile Leu Ser Phe Phe Ser Val Ala Leu Leu Val
145                 150                 155                 160

Ile Leu Ala Cys Val Leu Trp Lys Lys Arg Ile Lys Pro Ile Val Trp
                165                 170                 175

Pro Ser Leu Pro Asp His Lys Lys Thr Leu Glu His Leu Cys Lys Lys
            180                 185                 190

Pro Arg Lys Asn Leu Asn Val Ser Phe Asn Pro Glu Ser Phe Leu Asp
        195                 200                 205

Cys Gln Ile His Arg Val Asp Asp Ile Gln Ala Arg Asp Glu Val Glu
    210                 215                 220

Gly Phe Leu Gln Asp Thr Phe Pro Gln Gln Leu Glu Glu Ser Glu Lys
225                 230                 235                 240

Gln Arg Leu Gly Gly Asp Val Gln Ser Pro Asn Cys Pro Ser Glu Asp
                245                 250                 255

Val Val Ile Thr Pro Glu Ser Phe Gly Arg Asp Ser Ser Leu Thr Cys
            260                 265                 270

Leu Ala Gly Asn Val Ser Ala Cys Asp Ala Pro Ile Leu Ser Ser Ser
        275                 280                 285

Arg Ser Leu Asp Cys Arg Glu Ser Gly Lys Asn Gly Pro His Val Tyr
    290                 295                 300

Gln Asp Leu Leu Leu Ser Leu Gly Thr Thr Asn Ser Thr Leu Pro Pro
305                 310                 315                 320
```

```
Pro Phe Ser Leu Gln Ser Gly Ile Leu Thr Leu Asn Pro Val Ala Gln
            325                 330                 335

Gly Gln Pro Ile Leu Thr Ser Leu Gly Ser Asn Gln Glu Glu Ala Tyr
            340                 345                 350

Val Thr Met Ser Ser Phe Tyr Gln Asn Gln
            355                 360

<210> SEQ ID NO 106
<211> LENGTH: 159
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 106

Met Leu Leu Leu Val Thr Ser Leu Leu Cys Glu Leu Pro His Pro
1               5                   10                  15

Ala Phe Leu Leu Ile Pro Thr Ile Pro Pro His Val Gln Lys Ser Val
            20                  25                  30

Asn Asn Asp Met Ile Val Thr Asp Asn Asn Gly Ala Val Lys Phe Pro
            35                  40                  45

Gln Leu Cys Lys Phe Cys Asp Val Arg Phe Ser Thr Cys Asp Asn Gln
50                  55                  60

Lys Ser Cys Met Ser Asn Cys Ser Ile Thr Ser Ile Cys Glu Lys Pro
65                  70                  75                  80

Gln Glu Val Cys Val Ala Val Trp Arg Lys Asn Asp Glu Asn Ile Thr
            85                  90                  95

Leu Glu Thr Val Cys His Asp Pro Lys Leu Pro Tyr His Asp Phe Ile
            100                 105                 110

Leu Glu Asp Ala Ala Ser Pro Lys Cys Ile Met Lys Glu Lys Lys Lys
            115                 120                 125

Pro Gly Glu Thr Phe Phe Met Cys Ser Cys Ser Ser Asp Glu Cys Asn
        130                 135                 140

Asp Asn Ile Ile Phe Ser Glu Glu Tyr Asn Thr Ser Asn Pro Asp
145                 150                 155

<210> SEQ ID NO 107
<211> LENGTH: 169
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 107

Met Leu Leu Leu Val Thr Ser Leu Leu Cys Glu Leu Pro His Pro
1               5                   10                  15

Ala Phe Leu Leu Ile Pro Glu Gln Lys Leu Ile Ser Glu Glu Asp Leu
            20                  25                  30

Thr Ile Pro Pro His Val Gln Lys Ser Val Asn Asn Asp Met Ile Val
            35                  40                  45

Thr Asp Asn Asn Gly Ala Val Lys Phe Pro Gln Leu Cys Lys Phe Cys
        50                  55                  60

Asp Val Arg Phe Ser Thr Cys Asp Asn Gln Lys Ser Cys Met Ser Asn
65                  70                  75                  80

Cys Ser Ile Thr Ser Ile Cys Glu Lys Pro Gln Glu Val Cys Val Ala
            85                  90                  95
```

```
Val Trp Arg Lys Asn Asp Glu Asn Ile Thr Leu Glu Thr Val Cys His
            100                 105                 110

Asp Pro Lys Leu Pro Tyr His Asp Phe Ile Leu Glu Asp Ala Ala Ser
            115                 120                 125

Pro Lys Cys Ile Met Lys Glu Lys Lys Pro Gly Glu Thr Phe Phe
            130                 135                 140

Met Cys Ser Cys Ser Ser Asp Glu Cys Asn Asp Asn Ile Ile Phe Ser
145                 150                 155                 160

Glu Glu Tyr Asn Thr Ser Asn Pro Asp
            165

<210> SEQ ID NO 108
<211> LENGTH: 381
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 108

Met Leu Leu Leu Val Thr Ser Leu Leu Leu Cys Glu Leu Pro His Pro
1               5                   10                  15

Ala Phe Leu Leu Ile Pro Thr Ile Pro Pro His Val Gln Lys Ser Val
            20                  25                  30

Asn Asn Asp Met Ile Val Thr Asp Asn Asn Gly Ala Val Lys Phe Pro
        35                  40                  45

Gln Leu Cys Lys Phe Cys Asp Val Arg Phe Ser Thr Cys Asp Asn Gln
50                  55                  60

Lys Ser Cys Met Ser Asn Cys Ser Ile Thr Ser Ile Cys Glu Lys Pro
65                  70                  75                  80

Gln Glu Val Cys Val Ala Val Trp Arg Lys Asn Asp Glu Asn Ile Thr
                85                  90                  95

Leu Glu Thr Val Cys His Asp Pro Lys Leu Pro Tyr His Asp Phe Ile
            100                 105                 110

Leu Glu Asp Ala Ala Ser Pro Lys Cys Ile Met Lys Glu Lys Lys Lys
            115                 120                 125

Pro Gly Glu Thr Phe Phe Met Cys Ser Cys Ser Ser Asp Glu Cys Asn
        130                 135                 140

Asp Asn Ile Ile Phe Ser Glu Glu Tyr Asn Thr Ser Asn Pro Asp Ser
145                 150                 155                 160

Gly Pro Ile Leu Leu Thr Ile Ser Ile Leu Ser Phe Phe Ser Val Ala
                165                 170                 175

Leu Leu Val Ile Leu Ala Cys Val Leu Trp Lys Lys Arg Ile Lys Pro
            180                 185                 190

Ile Val Trp Pro Ser Leu Pro Asp His Lys Lys Thr Leu Glu His Leu
        195                 200                 205

Cys Lys Lys Pro Arg Lys Asn Leu Asn Val Ser Phe Asn Pro Glu Ser
    210                 215                 220

Phe Leu Asp Cys Gln Ile His Arg Val Asp Asp Ile Gln Ala Arg Asp
225                 230                 235                 240

Glu Val Glu Gly Phe Leu Gln Asp Thr Phe Pro Gln Gln Leu Glu Glu
                245                 250                 255

Ser Glu Lys Gln Arg Leu Gly Gly Asp Val Gln Ser Pro Asn Cys Pro
            260                 265                 270

Ser Glu Asp Val Val Ile Thr Pro Glu Ser Phe Gly Arg Asp Ser Ser
```

-continued

```
            275                 280                 285
Leu Thr Cys Leu Ala Gly Asn Val Ser Ala Cys Asp Ala Pro Ile Leu
        290                 295                 300

Ser Ser Ser Arg Ser Leu Asp Cys Arg Glu Ser Gly Lys Asn Gly Pro
305                 310                 315                 320

His Val Tyr Gln Asp Leu Leu Leu Ser Leu Gly Thr Thr Asn Ser Thr
                325                 330                 335

Leu Pro Pro Pro Phe Ser Leu Gln Ser Gly Ile Leu Thr Leu Asn Pro
                340                 345                 350

Val Ala Gln Gly Gln Pro Ile Leu Thr Ser Leu Gly Ser Asn Gln Glu
                355                 360                 365

Glu Ala Tyr Val Thr Met Ser Ser Phe Tyr Gln Asn Gln
            370                 375                 380

<210> SEQ ID NO 109
<211> LENGTH: 391
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 109

Met Leu Leu Leu Val Thr Ser Leu Leu Leu Cys Glu Leu Pro His Pro
1               5                   10                  15

Ala Phe Leu Leu Ile Pro Glu Gln Lys Leu Ile Ser Glu Glu Asp Leu
            20                  25                  30

Thr Ile Pro Pro His Val Gln Lys Ser Val Asn Asn Asp Met Ile Val
        35                  40                  45

Thr Asp Asn Asn Gly Ala Val Lys Phe Pro Gln Leu Cys Lys Phe Cys
    50                  55                  60

Asp Val Arg Phe Ser Thr Cys Asp Asn Gln Lys Ser Cys Met Ser Asn
65                  70                  75                  80

Cys Ser Ile Thr Ser Ile Cys Glu Lys Pro Gln Glu Val Cys Val Ala
                85                  90                  95

Val Trp Arg Lys Asn Asp Glu Asn Ile Thr Leu Glu Thr Val Cys His
            100                 105                 110

Asp Pro Lys Leu Pro Tyr His Asp Phe Ile Leu Glu Asp Ala Ala Ser
        115                 120                 125

Pro Lys Cys Ile Met Lys Glu Lys Lys Lys Pro Gly Glu Thr Phe Phe
    130                 135                 140

Met Cys Ser Cys Ser Ser Asp Glu Cys Asn Asp Asn Ile Ile Phe Ser
145                 150                 155                 160

Glu Glu Tyr Asn Thr Ser Asn Pro Asp Ser Gly Pro Ile Leu Leu Thr
                165                 170                 175

Ile Ser Ile Leu Ser Phe Phe Ser Val Ala Leu Leu Val Ile Leu Ala
            180                 185                 190

Cys Val Leu Trp Lys Lys Arg Ile Lys Pro Ile Val Trp Pro Ser Leu
        195                 200                 205

Pro Asp His Lys Lys Thr Leu Glu His Leu Cys Lys Lys Pro Arg Lys
    210                 215                 220

Asn Leu Asn Val Ser Phe Asn Pro Glu Ser Phe Leu Asp Cys Gln Ile
225                 230                 235                 240

His Arg Val Asp Asp Ile Gln Ala Arg Asp Glu Val Glu Gly Phe Leu
                245                 250                 255
```

```
Gln Asp Thr Phe Pro Gln Gln Leu Glu Ser Glu Lys Gln Arg Leu
            260                 265                 270

Gly Gly Asp Val Gln Ser Pro Asn Cys Pro Ser Glu Asp Val Val Ile
        275                 280                 285

Thr Pro Glu Ser Phe Gly Arg Asp Ser Ser Leu Thr Cys Leu Ala Gly
    290                 295                 300

Asn Val Ser Ala Cys Asp Ala Pro Ile Leu Ser Ser Ser Arg Ser Leu
305                 310                 315                 320

Asp Cys Arg Glu Ser Gly Lys Asn Gly Pro His Val Tyr Gln Asp Leu
                325                 330                 335

Leu Leu Ser Leu Gly Thr Thr Asn Ser Thr Leu Pro Pro Pro Phe Ser
            340                 345                 350

Leu Gln Ser Gly Ile Leu Thr Leu Asn Pro Val Ala Gln Gly Gln Pro
        355                 360                 365

Ile Leu Thr Ser Leu Gly Ser Asn Gln Glu Glu Ala Tyr Val Thr Met
    370                 375                 380

Ser Ser Phe Tyr Gln Asn Gln
385                 390

<210> SEQ ID NO 110
<211> LENGTH: 381
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 110

Met Leu Leu Leu Val Thr Ser Leu Leu Cys Glu Leu Pro His Pro
1               5                   10                  15

Ala Phe Leu Leu Ile Pro Thr Ile Pro Pro His Val Gln Lys Ser Val
            20                  25                  30

Asn Asn Asp Met Ile Val Thr Asp Asn Gly Ala Val Lys Phe Pro
            35                  40                  45

Gln Leu Cys Lys Phe Cys Asp Val Arg Phe Ser Thr Cys Asp Asn Gln
50                  55                  60

Lys Ser Cys Met Ser Asn Cys Ser Ile Thr Ser Ile Cys Glu Lys Pro
65                  70                  75                  80

Gln Glu Val Cys Val Ala Val Trp Arg Lys Asn Asp Glu Asn Ile Thr
                85                  90                  95

Leu Glu Thr Val Cys His Asp Pro Lys Leu Pro Tyr His Asp Phe Ile
            100                 105                 110

Leu Glu Asp Ala Ala Ser Pro Lys Cys Ile Met Lys Glu Lys Lys Lys
        115                 120                 125

Pro Gly Glu Thr Phe Phe Met Cys Ser Cys Ser Ser Asp Glu Cys Asn
    130                 135                 140

Asp Asn Ile Ile Phe Ser Glu Glu Tyr Asn Thr Ser Asn Pro Asp Ser
145                 150                 155                 160

Gly Pro Ile Leu Leu Thr Ile Ser Ile Leu Ser Phe Phe Ser Val Ala
                165                 170                 175

Leu Leu Val Ile Leu Ala Cys Val Leu Trp Lys Lys Arg Ile Lys Pro
            180                 185                 190

Ile Val Trp Pro Ser Leu Pro Asp His Lys Lys Thr Leu Glu His Leu
        195                 200                 205

Cys Lys Lys Pro Arg Lys Asn Leu Asn Val Ser Phe Asn Pro Glu Ser
    210                 215                 220
```

```
Phe Leu Asp Cys Gln Ile His Arg Val Asp Asp Ile Gln Ala Arg Asp
225                 230                 235                 240

Glu Val Glu Gly Phe Leu Gln Asp Thr Phe Pro Gln Gln Leu Glu Glu
            245                 250                 255

Ser Glu Lys Gln Arg Leu Gly Gly Asp Val Gln Ser Pro Asn Cys Pro
        260                 265                 270

Ser Glu Asp Val Val Ile Thr Pro Glu Ser Phe Gly Arg Asp Ser Ser
        275                 280                 285

Leu Thr Cys Leu Ala Gly Asn Val Ser Ala Cys Asp Ala Pro Ile Leu
    290                 295                 300

Ser Ser Ser Arg Ser Leu Asp Cys Arg Glu Ser Gly Lys Asn Gly Pro
305                 310                 315                 320

His Val Tyr Gln Asp Leu Leu Leu Ser Leu Gly Thr Thr Asn Ser Thr
                325                 330                 335

Leu Pro Pro Pro Phe Ser Leu Gln Ser Gly Ile Leu Thr Leu Asn Pro
                340                 345                 350

Val Ala Gln Gly Gln Pro Ile Leu Thr Ser Leu Gly Ser Asn Gln Glu
            355                 360                 365

Glu Ala Tyr Val Thr Met Ser Ser Phe Tyr Gln Asn Gln
        370                 375                 380

<210> SEQ ID NO 111
<211> LENGTH: 394
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 111

Met Leu Leu Leu Val Thr Ser Leu Leu Leu Cys Glu Leu Pro His Pro
1               5                   10                  15

Ala Phe Leu Leu Ile Pro Glu Gln Lys Leu Ile Ser Glu Glu Asp Leu
            20                  25                  30

Thr Ile Pro Pro His Val Gln Lys Ser Val Asn Asn Asp Met Ile Val
        35                  40                  45

Thr Asp Asn Asn Gly Ala Val Lys Phe Pro Gln Leu Cys Lys Phe Cys
    50                  55                  60

Asp Val Arg Phe Ser Thr Cys Asp Asn Gln Lys Ser Cys Met Ser Asn
65                  70                  75                  80

Cys Ser Ile Thr Ser Ile Cys Glu Lys Pro Gln Glu Val Cys Val Ala
                85                  90                  95

Val Trp Arg Lys Asn Asp Glu Asn Ile Thr Leu Glu Thr Val Cys His
            100                 105                 110

Asp Pro Lys Leu Pro Tyr His Asp Phe Ile Leu Glu Asp Ala Ala Ser
        115                 120                 125

Pro Lys Cys Ile Met Lys Glu Lys Lys Pro Gly Glu Thr Phe Phe
    130                 135                 140

Met Cys Ser Cys Ser Ser Asp Glu Cys Asn Asp Asn Ile Ile Phe Ser
145                 150                 155                 160

Glu Glu Tyr Asn Thr Ser Asn Pro Asp Ser Gly Pro Ile Leu Leu Thr
                165                 170                 175

Cys Pro Thr Ile Ser Ile Leu Ser Phe Phe Ser Val Ala Leu Leu Val
            180                 185                 190

Ile Leu Ala Cys Val Leu Trp Lys Lys Arg Ile Lys Pro Ile Val Trp
```

```
              195                 200                 205
Pro Ser Leu Pro Asp His Lys Lys Thr Leu Glu His Leu Cys Lys Lys
    210                 215                 220

Pro Arg Lys Asn Leu Asn Val Ser Phe Asn Pro Glu Ser Phe Leu Asp
225                 230                 235                 240

Cys Gln Ile His Arg Val Asp Asp Ile Gln Ala Arg Asp Glu Val Glu
                245                 250                 255

Gly Phe Leu Gln Asp Thr Phe Pro Gln Gln Leu Glu Glu Ser Glu Lys
                260                 265                 270

Gln Arg Leu Gly Gly Asp Val Gln Ser Pro Asn Cys Pro Ser Glu Asp
                275                 280                 285

Val Val Ile Thr Pro Glu Ser Phe Gly Arg Asp Ser Ser Leu Thr Cys
    290                 295                 300

Leu Ala Gly Asn Val Ser Ala Cys Asp Ala Pro Ile Leu Ser Ser Ser
305                 310                 315                 320

Arg Ser Leu Asp Cys Arg Glu Ser Gly Lys Asn Gly Pro His Val Tyr
                325                 330                 335

Gln Asp Leu Leu Leu Ser Leu Gly Thr Thr Asn Ser Thr Leu Pro Pro
                340                 345                 350

Pro Phe Ser Leu Gln Ser Gly Ile Leu Thr Leu Asn Pro Val Ala Gln
                355                 360                 365

Gly Gln Pro Ile Leu Thr Ser Leu Gly Ser Asn Gln Glu Glu Ala Tyr
    370                 375                 380

Val Thr Met Ser Ser Phe Tyr Gln Asn Gln
385                 390

<210> SEQ ID NO 112
<211> LENGTH: 384
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 112

Met Leu Leu Leu Val Thr Ser Leu Leu Cys Glu Leu Pro His Pro
1               5                   10                  15

Ala Phe Leu Leu Ile Pro Thr Ile Pro Pro His Val Gln Lys Ser Val
                20                  25                  30

Asn Asn Asp Met Ile Val Thr Asp Asn Asn Gly Ala Val Lys Phe Pro
                35                  40                  45

Gln Leu Cys Lys Phe Cys Asp Val Arg Phe Ser Thr Cys Asp Asn Gln
    50                  55                  60

Lys Ser Cys Met Ser Asn Cys Ser Ile Thr Ser Ile Cys Glu Lys Pro
65                  70                  75                  80

Gln Glu Val Cys Val Ala Val Trp Arg Lys Asn Asp Glu Asn Ile Thr
                85                  90                  95

Leu Glu Thr Val Cys His Asp Pro Lys Leu Pro Tyr His Asp Phe Ile
                100                 105                 110

Leu Glu Asp Ala Ala Ser Pro Lys Cys Ile Met Lys Glu Lys Lys Lys
                115                 120                 125

Pro Gly Glu Thr Phe Phe Met Cys Ser Cys Ser Ser Asp Glu Cys Asn
    130                 135                 140

Asp Asn Ile Ile Phe Ser Glu Glu Tyr Asn Thr Ser Asn Pro Asp Ser
145                 150                 155                 160
```

```
Gly Pro Ile Leu Leu Thr Cys Pro Thr Ile Ser Ile Leu Ser Phe Phe
            165                 170                 175

Ser Val Ala Leu Leu Val Ile Leu Ala Cys Val Leu Trp Lys Lys Arg
        180                 185                 190

Ile Lys Pro Ile Val Trp Pro Ser Leu Pro Asp His Lys Lys Thr Leu
        195                 200                 205

Glu His Leu Cys Lys Lys Pro Arg Lys Asn Leu Asn Val Ser Phe Asn
        210                 215                 220

Pro Glu Ser Phe Leu Asp Cys Gln Ile His Arg Val Asp Asp Ile Gln
225                 230                 235                 240

Ala Arg Asp Glu Val Glu Gly Phe Leu Gln Asp Thr Phe Pro Gln Gln
                245                 250                 255

Leu Glu Glu Ser Glu Lys Gln Arg Leu Gly Gly Asp Val Gln Ser Pro
            260                 265                 270

Asn Cys Pro Ser Glu Asp Val Val Ile Thr Pro Glu Ser Phe Gly Arg
        275                 280                 285

Asp Ser Ser Leu Thr Cys Leu Ala Gly Asn Val Ser Ala Cys Asp Ala
        290                 295                 300

Pro Ile Leu Ser Ser Ser Arg Ser Leu Asp Cys Arg Glu Ser Gly Lys
305                 310                 315                 320

Asn Gly Pro His Val Tyr Gln Asp Leu Leu Leu Ser Leu Gly Thr Thr
                325                 330                 335

Asn Ser Thr Leu Pro Pro Pro Phe Ser Leu Gln Ser Gly Ile Leu Thr
            340                 345                 350

Leu Asn Pro Val Ala Gln Gly Gln Pro Ile Leu Thr Ser Leu Gly Ser
        355                 360                 365

Asn Gln Glu Glu Ala Tyr Val Thr Met Ser Ser Phe Tyr Gln Asn Gln
        370                 375                 380

<210> SEQ ID NO 113
<211> LENGTH: 684
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 113

Gln Val Gln Leu Val Gln Ser Gly Ala Glu Val Lys Lys Pro Gly Ala
1               5                   10                  15

Ser Val Lys Val Ser Cys Lys Thr Ser Gly Tyr Thr Phe Thr Asp Tyr
            20                  25                  30

Tyr Ile His Trp Val Arg Gln Ala Pro Gly Gln Gly Leu Glu Trp Met
        35                  40                  45

Gly Glu Ile Tyr Pro Gly Ser Gly Asn Thr Tyr Tyr Ala Gln Lys Phe
    50                  55                  60

Gln Gly Arg Val Thr Met Thr Ala Asp Thr Ser Thr Ser Thr Ala Tyr
65                  70                  75                  80

Met Glu Leu Ser Ser Leu Arg Ser Glu Asp Thr Ala Val Tyr Tyr Cys
                85                  90                  95

Ala Arg Gly Asn Asp Tyr Asp Ala Trp Phe Val Tyr Trp Gly Gln Gly
            100                 105                 110

Thr Leu Val Thr Val Ser Ser Gly Ser Thr Gly Ser Gly Lys Pro
        115                 120                 125

Gly Ser Gly Glu Gly Ser Thr Lys Gly Asp Ile Val Met Thr Gln Ser
    130                 135                 140
```

```
Pro Asp Ser Leu Ala Val Ser Leu Gly Glu Arg Val Thr Met Asn Cys
145                 150                 155                 160

Lys Ser Ser Gln Ser Leu Leu Asn Ser Gly Thr Arg Lys Asn Tyr Leu
            165                 170                 175

Ala Trp Tyr Gln Gln Lys Pro Gly Gln Pro Lys Leu Leu Ile Tyr
                180                 185                 190

Trp Ala Ser Ile Arg Glu Ser Gly Val Pro Asp Arg Phe Ser Gly Ser
            195                 200                 205

Gly Ser Gly Thr Asp Phe Thr Leu Thr Ile Ser Ser Val Gln Ala Glu
            210                 215                 220

Asp Val Ala Val Tyr Tyr Cys Lys Gln Ser Tyr Ser Leu Tyr Thr Phe
225                 230                 235                 240

Gly Gln Gly Thr Lys Leu Glu Ile Lys Gly Ser Thr Thr Thr Pro Ala
                245                 250                 255

Pro Arg Pro Pro Thr Pro Ala Pro Thr Ile Ala Ser Gln Pro Leu Ser
            260                 265                 270

Leu Arg Pro Glu Ala Cys Arg Pro Ala Ala Gly Gly Ala Val His Thr
            275                 280                 285

Arg Gly Leu Asp Phe Ala Cys Asp Ile Tyr Ile Trp Ala Pro Leu Ala
290                 295                 300

Gly Thr Cys Gly Val Leu Leu Leu Ser Leu Val Ile Thr Leu Tyr Cys
305                 310                 315                 320

Lys Arg Gly Arg Lys Lys Leu Leu Tyr Ile Phe Lys Gln Pro Phe Met
                325                 330                 335

Arg Pro Val Gln Thr Thr Gln Glu Glu Asp Gly Cys Ser Cys Arg Phe
                340                 345                 350

Pro Glu Glu Glu Glu Gly Gly Cys Glu Leu Arg Val Lys Phe Ser Arg
            355                 360                 365

Ser Ala Asp Ala Pro Ala Tyr Gln Gln Gly Gln Asn Gln Leu Tyr Asn
            370                 375                 380

Glu Leu Asn Leu Gly Arg Arg Glu Glu Tyr Asp Val Leu Asp Lys Arg
385                 390                 395                 400

Arg Gly Arg Asp Pro Glu Met Gly Gly Lys Pro Arg Arg Lys Asn Pro
                405                 410                 415

Gln Glu Gly Leu Tyr Asn Glu Leu Gln Lys Asp Lys Met Ala Glu Ala
            420                 425                 430

Tyr Ser Glu Ile Gly Met Lys Gly Glu Arg Arg Gly Lys Gly His
            435                 440                 445

Asp Gly Leu Tyr Gln Gly Leu Ser Thr Ala Thr Lys Asp Thr Tyr Asp
            450                 455                 460

Ala Leu His Met Gln Ala Leu Pro Pro Arg Gly Ser Gly Glu Gly Arg
465                 470                 475                 480

Gly Ser Leu Leu Thr Cys Gly Asp Val Glu Glu Asn Pro Gly Pro Met
            485                 490                 495

Gly Arg Gly Leu Leu Arg Gly Leu Trp Pro Leu His Ile Val Leu Trp
            500                 505                 510

Thr Arg Ile Ala Ser Thr Ile Pro Pro His Val Gln Lys Ser Val Asn
            515                 520                 525

Asn Asp Met Ile Val Thr Asp Asn Asn Gly Ala Val Lys Phe Pro Gln
            530                 535                 540

Leu Cys Lys Phe Cys Asp Val Arg Phe Ser Thr Cys Asp Asn Gln Lys
545                 550                 555                 560
```

| | | | | | | | | | | | |
|---|---|---|---|---|---|---|---|---|---|---|---|
|Ser|Cys|Met|Ser|Asn|Cys|Ser|Ile|Thr|Ser|Ile|Cys|Glu|Lys|Pro|Gln|
| | | | |565| | | |570| | | |575| | | |

Glu Val Cys Val Ala Val Trp Arg Lys Asn Asp Glu Asn Ile Thr Leu
            580                 585                 590

Glu Thr Val Cys His Asp Pro Lys Leu Pro Tyr His Asp Phe Ile Leu
        595                 600                 605

Glu Asp Ala Ala Ser Pro Lys Cys Ile Met Leu Glu Lys Lys Pro
610                 615                 620

Gly Glu Thr Phe Phe Met Cys Ser Cys Ser Ser Asp Glu Cys Asn Asp
625                 630                 635                 640

Asn Ile Ile Phe Ser Glu Glu Tyr Asn Thr Ser Asn Pro Asp Leu Leu
                645                 650                 655

Leu Val Ile Phe Gln Val Thr Gly Ile Ser Leu Leu Pro Pro Leu Gly
                660                 665                 670

Val Ala Ile Ser Val Ile Ile Ile Phe Tyr Cys Tyr
            675                 680

```
<210> SEQ ID NO 114
<211> LENGTH: 2052
<212> TYPE: DNA
<213> ORGANISM: Artificial Sequence
<220> FEATURE:
<223> OTHER INFORMATION: Description of Artificial Sequence: Synthetic
      polynucleotide

<400> SEQUENCE: 114
caagtccaac tggtgcagtc cggagccgag gtcaagaagc ccggagccag cgtgaaagtc    60
tcatgtaaaa ccagcggcta caccttcacc gactactaca tccactgggt ccgacaagcc   120
cccggtcaag gtttagagtg gatgggcgag atctacccccg gctccggcaa cacctactac   180
gcccagaagt tccaaggtcg tgtgaccatg acagccgaca ccagcacctc caccgcctac   240
atggaactgt cctctctgcg ttctgaggac acagccgttt actactgcgc cagaggcaac   300
gactacgacg cttggttcgt gtactgggcc aaggaacat tagtgaccgt gtcctccgga   360
tccacatccg gcagcggaaa gcccggtagc ggcgagggca gcaccaaagg agacatcgtc   420
atgacccaga gccccgattc tttagccgtg tctttaggcg aaagagtgac catgaactgc   480
aagtccagcc agtctttact gaattccggc actcgaaaaa actatttagc ttggtaccag   540
cagaaacccg gccagccccc taagctgctg atctactggg ctagcattcg agaatccggc   600
gtgcccgatc gctttagcgg cagcggtagc ggcaccgact ttacttaac catcagcagc   660 gtgcaagctg aggacgtggc tgtgtactat tgcaagcagt cctactcttt atacaccttc   720
ggccaaggaa caaagctgga gatcaagggg tccaccacga cgccagcgcc gcgaccacca   780
acaccggcgc ccaccatcgc gtcgcaaccc ctgtccctgc gccccgaggc gtgccggcca   840
gcggcggggg gcgcagtgca cacgaggggg ctggacttcg cctgtgatat ctacatctgg   900
gcgcccttgg ccgggacttg tggggtcctt ctcctgtcac tggttatcac cctttattgc   960
aaacggggca gaaagaaact cctgtatata ttcaaacaac catttatgag accagtacaa  1020
actactcaag aggaagatgg ctgtagctgc cgatttccag aagaagaaga aggaggatgt  1080
gaattgagag tgaagttcag caggagcgca gacgcccccg cctatcagca aggccagaac  1140
cagctctata acgagctcaa tttagggcga agagaggagt acgatgtttt ggacaagagg  1200
cgtggccggg accccgaaat ggggggaaag ccgagaagga agaaccctca ggaaggcttg  1260
tacaatgaat tgcagaagga taagatggcg gaggcataca gtgagattgg gatgaaaggc  1320
```

```
gagcgccgga ggggcaaggg gcacgatggc ctttatcagg gtctcagtac agccaccaag   1380
gacacctacg acgcccttca catgcaagcc ctgcccctc gcggctctgg agagggcaga   1440
ggctctctgc tgacctgcgg cgacgtggaa gagaacccag cccatggg aagaggttta    1500 ctgagaggac tgtggccttt acacatcgtg ctgtggactc gtatcgccag caccatcccc   1560
ccccatgtcc aaaagagcgt gaacaacgac atgatcgtga ccgacaacaa tggcgccgtg   1620
aagttccccc agctgtgcaa gttctgcgac gtgaggttca gcacttgtga caaccagaag   1680
agctgcatga gcaactgcag catcacctcc atctgcgaga agccccaaga agtgtgcgtg   1740
gccgtgtgga ggaagaacga cgagaacatc actttagaga cagtgtgcca cgaccccaag   1800 ctgcccctacc acgacttcat tttagaagat gccgccagcc ccaagtgcat catgaaggag   1860
aagaagaagc ccggcgagac cttcttcatg tgttcttgtt cgtctgatga gtgcaacgat   1920
aacatcatct tcagcgagga gtacaacacc agcaaccccg atttactgct ggtgatcttc   1980
caagttaccg gcatttcttt actgcctccg ttgggcgtgg ctatcagcgt gatcatcatc   2040
ttctactgct at                                                      2052
```

<210> SEQ ID NO 115
<211> LENGTH: 684
<212> TYPE: PRT
<213> ORGANISM: Artificial Sequence
<220> FEATURE:
<223> OTHER INFORMATION: Description of Artificial Sequence: Synthetic
    polypeptide

<400> SEQUENCE: 115

```
Gln Val Gln Leu Val Gln Ser Gly Ala Glu Val Lys Lys Pro Gly Ala
1               5                   10                  15

Ser Val Lys Val Ser Cys Lys Thr Ser Gly Tyr Thr Phe Thr Asp Tyr
            20                  25                  30

Tyr Ile His Trp Val Arg Gln Ala Pro Gly Gln Gly Leu Glu Trp Met
        35                  40                  45

Gly Glu Ile Tyr Pro Gly Ser Gly Asn Thr Tyr Tyr Ala Gln Lys Phe
    50                  55                  60

Gln Gly Arg Val Thr Met Thr Ala Asp Thr Ser Thr Ser Thr Ala Tyr
65                  70                  75                  80

Met Glu Leu Ser Ser Leu Arg Ser Glu Asp Thr Ala Val Tyr Tyr Cys
                85                  90                  95

Ala Arg Gly Asn Asp Tyr Asp Ala Trp Phe Val Tyr Trp Gly Gln Gly
            100                 105                 110

Thr Leu Val Thr Val Ser Ser Gly Ser Thr Ser Gly Ser Gly Lys Pro
        115                 120                 125

Gly Ser Gly Glu Gly Ser Thr Lys Gly Asp Ile Val Met Thr Gln Ser
    130                 135                 140

Pro Asp Ser Leu Ala Val Ser Leu Gly Glu Arg Val Thr Met Asn Cys
145                 150                 155                 160

Lys Ser Ser Gln Ser Leu Leu Asn Ser Gly Thr Arg Lys Asn Tyr Leu
                165                 170                 175

Ala Trp Tyr Gln Gln Lys Pro Gly Gln Pro Pro Lys Leu Leu Ile Tyr
            180                 185                 190

Trp Ala Ser Ile Arg Glu Ser Gly Val Pro Asp Arg Phe Ser Gly Ser
        195                 200                 205

Gly Ser Gly Thr Asp Phe Thr Leu Thr Ile Ser Ser Val Gln Ala Glu
    210                 215                 220
```

Asp Val Ala Val Tyr Tyr Cys Lys Gln Ser Tyr Ser Leu Tyr Thr Phe
225                 230                 235                 240

Gly Gln Gly Thr Lys Leu Glu Ile Lys Gly Ser Thr Thr Thr Pro Ala
            245                 250                 255

Pro Arg Pro Thr Pro Ala Pro Thr Ile Ala Ser Gln Pro Leu Ser
        260                 265                 270

Leu Arg Pro Glu Ala Cys Arg Pro Ala Ala Gly Gly Ala Val His Thr
        275                 280                 285

Arg Gly Leu Asp Phe Ala Cys Asp Ile Tyr Ile Trp Ala Pro Leu Ala
        290                 295                 300

Gly Thr Cys Gly Val Leu Leu Leu Ser Leu Val Ile Thr Leu Tyr Cys
305                 310                 315                 320

Lys Arg Gly Arg Lys Lys Leu Leu Tyr Ile Phe Lys Gln Pro Phe Met
            325                 330                 335

Arg Pro Val Gln Thr Thr Gln Glu Glu Asp Gly Cys Ser Cys Arg Phe
        340                 345                 350

Pro Glu Glu Glu Glu Gly Gly Cys Glu Leu Arg Val Lys Phe Ser Arg
            355                 360                 365

Ser Ala Asp Ala Pro Ala Tyr Gln Gln Gly Gln Asn Gln Leu Tyr Asn
370                 375                 380

Glu Leu Asn Leu Gly Arg Arg Glu Glu Tyr Asp Val Leu Asp Lys Arg
385                 390                 395                 400

Arg Gly Arg Asp Pro Glu Met Gly Gly Lys Pro Arg Arg Lys Asn Pro
            405                 410                 415

Gln Glu Gly Leu Tyr Asn Glu Leu Gln Lys Asp Lys Met Ala Glu Ala
            420                 425                 430

Tyr Ser Glu Ile Gly Met Lys Gly Glu Arg Arg Arg Gly Lys Gly His
            435                 440                 445

Asp Gly Leu Tyr Gln Gly Leu Ser Thr Ala Thr Lys Asp Thr Tyr Asp
        450                 455                 460

Ala Leu His Met Gln Ala Leu Pro Pro Arg Gly Ser Gly Glu Gly Arg
465                 470                 475                 480

Gly Ser Leu Leu Thr Cys Gly Asp Val Glu Glu Asn Pro Gly Pro Met
            485                 490                 495

Gly Arg Gly Leu Leu Arg Gly Leu Trp Pro Leu His Ile Val Leu Trp
        500                 505                 510

Thr Arg Ile Ala Ser Thr Ile Pro Pro His Val Gln Lys Ser Val Asn
        515                 520                 525

Asn Asp Met Ile Val Thr Asp Asn Asn Gly Ala Val Lys Phe Pro Gln
530                 535                 540

Leu Cys Lys Phe Cys Asp Val Arg Phe Ser Thr Cys Asp Asn Gln Lys
545                 550                 555                 560

Ser Cys Met Ser Asn Cys Ser Ile Thr Ser Ile Cys Glu Lys Pro Gln
            565                 570                 575

Glu Val Cys Val Ala Val Trp Arg Lys Asn Asp Glu Asn Ile Thr Leu
            580                 585                 590

Glu Thr Val Cys His Asp Pro Lys Leu Pro Tyr His Asp Phe Ile Leu
            595                 600                 605

Glu Asp Ala Ala Ser Pro Lys Cys Ile Met Lys Glu Lys Lys Lys Pro
        610                 615                 620

Gly Glu Thr Phe Phe Met Cys Ser Cys Ser Ser Asp Glu Cys Asn Asp
625                 630                 635                 640

Asn Ile Ile Phe Ser Glu Glu Tyr Asn Thr Ser Asn Pro Asp Leu Leu

-continued

```
                        645                 650                 655
Leu Val Ile Phe Gln Val Thr Gly Ile Ser Leu Leu Pro Pro Leu Gly
                660                 665                 670

Val Ala Ile Ser Val Ile Ile Ile Phe Tyr Cys Tyr
            675                 680

<210> SEQ ID NO 116
<211> LENGTH: 672
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 116

Gln Val Gln Leu Val Gln Ser Gly Ala Glu Val Lys Lys Pro Gly Ala
1               5                   10                  15

Ser Val Lys Val Ser Cys Lys Thr Ser Gly Tyr Thr Phe Thr Asp Tyr
            20                  25                  30

Tyr Ile His Trp Val Arg Gln Ala Pro Gly Gln Gly Leu Glu Trp Met
        35                  40                  45

Gly Glu Ile Tyr Pro Gly Ser Gly Asn Thr Tyr Tyr Ala Gln Lys Phe
    50                  55                  60

Gln Gly Arg Val Thr Met Thr Ala Asp Thr Ser Thr Ser Thr Ala Tyr
65                  70                  75                  80

Met Glu Leu Ser Ser Leu Arg Ser Glu Asp Thr Ala Val Tyr Tyr Cys
                85                  90                  95

Ala Arg Gly Asn Asp Tyr Asp Ala Trp Phe Val Tyr Trp Gly Gln Gly
            100                 105                 110

Thr Leu Val Thr Val Ser Ser Gly Ser Thr Ser Gly Ser Gly Lys Pro
        115                 120                 125

Gly Ser Gly Glu Gly Ser Thr Lys Gly Asp Ile Val Met Thr Gln Ser
    130                 135                 140

Pro Asp Ser Leu Ala Val Ser Leu Gly Glu Arg Val Thr Met Asn Cys
145                 150                 155                 160

Lys Ser Ser Gln Ser Leu Leu Asn Ser Gly Thr Arg Lys Asn Tyr Leu
                165                 170                 175

Ala Trp Tyr Gln Gln Lys Pro Gly Gln Pro Pro Lys Leu Leu Ile Tyr
            180                 185                 190

Trp Ala Ser Ile Arg Glu Ser Gly Val Pro Asp Arg Phe Ser Gly Ser
        195                 200                 205

Gly Ser Gly Thr Asp Phe Thr Leu Thr Ile Ser Ser Val Gln Ala Glu
    210                 215                 220

Asp Val Ala Val Tyr Tyr Cys Lys Gln Ser Tyr Ser Leu Tyr Thr Phe
225                 230                 235                 240

Gly Gln Gly Thr Lys Leu Glu Ile Lys Gly Ser Leu Asp Asn Glu Lys
                245                 250                 255

Ser Asn Gly Thr Ile Ile His Val Lys Gly Lys His Leu Cys Pro Ser
            260                 265                 270

Pro Leu Phe Pro Gly Pro Ser Lys Pro Phe Trp Val Leu Val Val Val
        275                 280                 285

Gly Gly Val Leu Ala Cys Tyr Ser Leu Leu Val Thr Val Ala Phe Ile
    290                 295                 300

Ile Phe Trp Val Arg Ser Lys Arg Ser Arg Leu Leu His Ser Asp Tyr
305                 310                 315                 320
```

```
Met Asn Met Thr Pro Arg Arg Pro Gly Pro Thr Arg Lys His Tyr Gln
            325                 330                 335

Pro Tyr Ala Pro Pro Arg Asp Phe Ala Ala Tyr Arg Ser Leu Arg Val
        340                 345                 350

Lys Phe Ser Arg Ser Ala Asp Ala Pro Ala Tyr Gln Gln Gly Gln Asn
            355                 360                 365

Gln Leu Tyr Asn Glu Leu Asn Leu Gly Arg Arg Glu Glu Tyr Asp Val
        370                 375                 380

Leu Asp Lys Arg Arg Gly Arg Asp Pro Glu Met Gly Gly Lys Pro Arg
385                 390                 395                 400

Arg Lys Asn Pro Gln Glu Gly Leu Tyr Asn Glu Leu Gln Lys Asp Lys
            405                 410                 415

Met Ala Glu Ala Tyr Ser Glu Ile Gly Met Lys Gly Glu Arg Arg Arg
            420                 425                 430

Gly Lys Gly His Asp Gly Leu Tyr Gln Gly Leu Ser Thr Ala Thr Lys
        435                 440                 445

Asp Thr Tyr Asp Ala Leu His Met Gln Ala Leu Pro Pro Arg Gly Ser
        450                 455                 460

Gly Glu Gly Arg Gly Ser Leu Leu Thr Cys Gly Asp Val Glu Glu Asn
465                 470                 475                 480

Pro Gly Pro Met Gly Arg Gly Leu Leu Arg Gly Leu Trp Pro Leu His
            485                 490                 495

Ile Val Leu Trp Thr Arg Ile Ala Ser Thr Ile Pro Pro His Val Gln
            500                 505                 510

Lys Ser Val Asn Asn Asp Met Ile Val Thr Asp Asn Asn Gly Ala Val
        515                 520                 525

Lys Phe Pro Gln Leu Cys Lys Phe Cys Asp Val Arg Phe Ser Thr Cys
    530                 535                 540

Asp Asn Gln Lys Ser Cys Met Ser Asn Cys Ser Ile Thr Ser Ile Cys
545                 550                 555                 560

Glu Lys Pro Gln Glu Val Cys Val Ala Val Trp Arg Lys Asn Asp Glu
            565                 570                 575

Asn Ile Thr Leu Glu Thr Val Cys His Asp Pro Lys Leu Pro Tyr His
            580                 585                 590

Asp Phe Ile Leu Glu Asp Ala Ala Ser Pro Lys Cys Ile Met Lys Glu
        595                 600                 605

Lys Lys Lys Pro Gly Glu Thr Phe Phe Met Cys Ser Cys Ser Ser Asp
            610                 615                 620

Glu Cys Asn Asp Asn Ile Ile Phe Ser Glu Glu Tyr Asn Thr Ser Asn
625                 630                 635                 640

Pro Asp Leu Leu Leu Val Ile Phe Gln Val Thr Gly Ile Ser Leu Leu
            645                 650                 655

Pro Pro Leu Gly Val Ala Ile Ser Val Ile Ile Ile Phe Tyr Cys Tyr
            660                 665                 670

<210> SEQ ID NO 117
<211> LENGTH: 2016
<212> TYPE: DNA
<213> ORGANISM: Artificial Sequence
<220> FEATURE:
<223> OTHER INFORMATION: Description of Artificial Sequence: Synthetic
      polynucleotide

<400> SEQUENCE: 117
caagtccaac tggtgcagtc cggagccgag gtcaagaagc ccggagccag cgtgaaagtc    60
```

-continued

```
tcatgtaaaa ccagcggcta caccttcacc gactactaca tccactgggt ccgacaagcc    120
cccggtcaag gtttagagtg gatgggcgag atctaccccg gctccggcaa cacctactac    180
gcccagaagt tccaaggtcg tgtgaccatg acagccgaca ccagcacctc caccgcctac    240
atggaactgt cctctctgcg ttctgaggac acagccgttt actactgcgc cagaggcaac    300
gactacgacg cttggttcgt gtactgggc caaggaacat tagtgaccgt gtcctccgga    360
tccacatccg gcagcggaaa gcccggtagc ggcgagggca gcaccaaagg agacatcgtc    420
atgacccaga gccccgattc tttagccgtg tctttaggcg aaagagtgac catgaactgc    480
aagtccagcc agtctttact gaattccggc actcgaaaaa actatttagc ttggtaccag    540
cagaaacccg gccagccccc taagctgctg atctactggg ctagcattcg agaatccggc    600
gtgcccgatc gctttagcgg cagcggtagc ggcaccgact ttactttaac catcagcagc    660
gtgcaagctg aggacgtggc tgtgtactat tgcaagcagt cctactcttt atacaccttc    720
ggccaaggaa caaagctgga gatcaagggg tccctagaca atgagaagag caatggaacc    780
attatccatg tgaaagggaa acacctttgt ccaagtcccc tatttcccgg accttctaag    840
cccttttggg tgctggtggt ggttggtgga gtcctggctt gctatagctt gctagtaaca    900
gtggcccttta ttattttctg ggtccgatca aaaaggagca ggctcctgca cagtgactac    960
atgaacatga ctcccccgccg ccccgggccc acccgcaagc attaccagcc ctatgcccca   1020
ccacgcgact cgcagccta cgctccctg agagtgaagt tcagcaggag cgcagacgcc   1080
cccgcgtacc agcaagggca gaaccagctc tataacgagc tcaatctagg acgaagagag   1140
gagtacgatg ttttggacaa gaggcgtggc cgggaccctg agatgggggg aaagccgaga   1200
aggaagaacc ctcaggaagg cctgtacaat gaactgcaga agataagat ggcggaggcc   1260
tacagtgaga ttgggatgaa aggcgagcgc cggaggggca aggggcacga tggcctttac   1320
cagggtctca gtacagccac caaggacacc tacgacgccc ttcacatgca agctctgccc   1380
cctcgcggct ctggagaggg cagaggctct ctgctgacct gcggcgacgt ggaagagaac   1440
ccaggcccca tgggaagagg tttactgaga ggactgtggc ctttacacat cgtgctgtgg   1500
actcgtatcg ccagcaccat cccccccat gtccaaaaga gcgtgaacaa cgacatgatc   1560
gtgaccgaca acaatggcgc cgtgaagttc ccccagctgt gcaagttctg cgacgtgagg   1620
ttcagcactt gtgacaacca gaagagctgc atgagcaact gcagcatcac ctccatctgc   1680
gagaagcccc aagaagtgtg cgtggccgtg tggaggaaga acgacgagaa catcactta   1740
gagacagtgt gccacgaccc caagctgccc taccacgact tcattttaga agatgccgcc   1800
agccccaagt gcatcatgaa ggagaagaag aagcccggcg agaccttctt catgtgttct   1860
tgttcgtctg atgagtgcaa cgataacatc atcttcagcg aggagtacaa caccagcaac   1920
cccgatttac tgctggtgat cttccaagtt accggcattt ctttactgcc tccgttgggc   1980
gtggctatca gcgtgatcat catcttctac tgctat                            2016
```

<210> SEQ ID NO 118
<211> LENGTH: 18
<212> TYPE: PRT
<213> ORGANISM: Artificial Sequence
<220> FEATURE:
<223> OTHER INFORMATION: Description of Artificial Sequence: Synthetic peptide

<400> SEQUENCE: 118

Glu Gly Arg Gly Ser Leu Leu Thr Cys Gly Asp Val Glu Glu Asn Pro
1               5                   10                  15

Gly Pro

<210> SEQ ID NO 119
<211> LENGTH: 54
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 119
gagggcagag gctctctgct gacctgcggc gacgtggaag agaacccagg cccc          54

<210> SEQ ID NO 120
<211> LENGTH: 50
<212> TYPE: PRT
<213> ORGANISM: Artificial Sequence
<220> FEATURE:
<223> OTHER INFORMATION: Description of Artificial Sequence: Synthetic
      polypeptide
<220> FEATURE:
<221> NAME/KEY: SITE
<222> LOCATION: (1)..(5)
<223> OTHER INFORMATION: This region may encompass 1-5 residues
<220> FEATURE:
<221> NAME/KEY: SITE
<222> LOCATION: (6)..(10)
<223> OTHER INFORMATION: This region may encompass 1-5 residues
<220> FEATURE:
<221> NAME/KEY: SITE
<222> LOCATION: (11)..(15)
<223> OTHER INFORMATION: This region may encompass 1-5 residues
<220> FEATURE:
<221> NAME/KEY: SITE
<222> LOCATION: (16)..(20)
<223> OTHER INFORMATION: This region may encompass 1-5 residues
<220> FEATURE:
<221> NAME/KEY: SITE
<222> LOCATION: (21)..(25)
<223> OTHER INFORMATION: This region may encompass 1-5 residues
<220> FEATURE:
<221> NAME/KEY: SITE
<222> LOCATION: (26)..(30)
<223> OTHER INFORMATION: This region may encompass 1-5 residues
<220> FEATURE:
<221> NAME/KEY: SITE
<222> LOCATION: (31)..(35)
<223> OTHER INFORMATION: This region may encompass 1-5 residues
<220> FEATURE:
<221> NAME/KEY: SITE
<222> LOCATION: (36)..(40)
<223> OTHER INFORMATION: This region may encompass 1-5 residues
<220> FEATURE:
<221> NAME/KEY: SITE
<222> LOCATION: (41)..(45)
<223> OTHER INFORMATION: This region may encompass 1-5 residues
<220> FEATURE:
<221> NAME/KEY: SITE
<222> LOCATION: (46)..(50)
<223> OTHER INFORMATION: This region may encompass 1-5 residues
<220> FEATURE:
<221> NAME/KEY: SITE
<222> LOCATION: (1)..(50)
<223> OTHER INFORMATION: This sequence may encompass 1-5 "(G)n(S)n"
      repeating units wherein n = 1-5

<400> SEQUENCE: 120

Gly Gly Gly Gly Gly Ser Ser Ser Ser Ser Gly Gly Gly Gly Ser
1               5                   10                  15

Ser Ser Ser Ser Gly Gly Gly Gly Gly Ser Ser Ser Ser Gly Gly
            20                  25                  30

Gly Gly Gly Ser Ser Ser Ser Ser Gly Gly Gly Gly Gly Ser Ser Ser

```
                  35                  40                  45

Ser Ser
    50

<210> SEQ ID NO 121
<211> LENGTH: 474
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 121

Gln Val Gln Leu Val Gln Ser Gly Ala Glu Val Lys Lys Pro Gly Ala
1               5                   10                  15

Ser Val Lys Val Ser Cys Lys Ala Ser Gly Tyr Thr Phe Thr Asp Tyr
            20                  25                  30

Tyr Ile His Trp Val Arg Gln Ala Pro Gly Gln Gly Leu Glu Trp Met
        35                  40                  45

Gly Glu Ile Tyr Pro Gly Ser Gly Asn Thr Tyr Tyr Ala Gln Lys Phe
    50                  55                  60

Gln Gly Arg Val Thr Met Thr Arg Asp Thr Ser Thr Ser Thr Val Tyr
65                  70                  75                  80

Met Glu Leu Ser Ser Leu Arg Ser Glu Asp Thr Ala Val Tyr Tyr Cys
                85                  90                  95

Ala Arg Gly Asn Asp Tyr Asp Ala Trp Phe Val Tyr Trp Gly Gln Gly
            100                 105                 110

Thr Leu Val Thr Val Ser Ser Gly Ser Thr Ser Gly Ser Gly Lys Pro
        115                 120                 125

Gly Ser Gly Glu Gly Ser Thr Lys Gly Asp Ile Val Met Thr Gln Ser
    130                 135                 140

Pro Asp Ser Leu Ala Val Ser Leu Gly Glu Arg Ala Thr Ile Asn Cys
145                 150                 155                 160

Lys Ser Ser Gln Ser Leu Leu Asn Ser Gly Thr Arg Lys Asn Tyr Leu
                165                 170                 175

Ala Trp Tyr Gln Gln Lys Pro Gly Gln Pro Pro Lys Leu Leu Ile Tyr
            180                 185                 190

Trp Ala Ser Ile Arg Glu Ser Gly Val Pro Asp Arg Phe Ser Gly Ser
        195                 200                 205

Gly Ser Gly Thr Asp Phe Thr Leu Thr Ile Ser Ser Leu Gln Ala Glu
    210                 215                 220

Asp Val Ala Val Tyr Tyr Cys Lys Gln Ser Tyr Ser Leu Tyr Thr Phe
225                 230                 235                 240

Gly Gln Gly Thr Lys Leu Glu Ile Lys Gly Ser Thr Thr Thr Pro Ala
                245                 250                 255

Pro Arg Pro Pro Thr Pro Ala Pro Thr Ile Ala Ser Gln Pro Leu Ser
            260                 265                 270

Leu Arg Pro Glu Ala Cys Arg Pro Ala Ala Gly Gly Ala Val His Thr
        275                 280                 285

Arg Gly Leu Asp Phe Ala Cys Asp Ile Tyr Ile Trp Ala Pro Leu Ala
    290                 295                 300

Gly Thr Cys Gly Val Leu Leu Leu Ser Leu Val Ile Thr Leu Tyr Cys
305                 310                 315                 320

Lys Arg Gly Arg Lys Lys Leu Leu Tyr Ile Phe Lys Gln Pro Phe Met
                325                 330                 335
```

```
Arg Pro Val Gln Thr Thr Gln Glu Glu Asp Gly Cys Ser Cys Arg Phe
            340             345             350
Pro Glu Glu Glu Glu Gly Gly Cys Glu Leu Arg Val Lys Phe Ser Arg
        355             360             365
Ser Ala Asp Ala Pro Ala Tyr Gln Gln Gly Gln Asn Gln Leu Tyr Asn
    370             375             380
Glu Leu Asn Leu Gly Arg Arg Glu Glu Tyr Asp Val Leu Asp Lys Arg
385             390             395             400
Arg Gly Arg Asp Pro Glu Met Gly Gly Lys Pro Arg Arg Lys Asn Pro
                405             410             415
Gln Glu Gly Leu Tyr Asn Glu Leu Gln Lys Asp Lys Met Ala Glu Ala
            420             425             430
Tyr Ser Glu Ile Gly Met Lys Gly Glu Arg Arg Arg Gly Lys Gly His
        435             440             445
Asp Gly Leu Tyr Gln Gly Leu Ser Thr Ala Thr Lys Asp Thr Tyr Asp
    450             455             460
Ala Leu His Met Gln Ala Leu Pro Pro Arg
465             470
```